US006708273B1

(12) United States Patent
Ober et al.

(10) Patent No.: US 6,708,273 B1
(45) Date of Patent: Mar. 16, 2004

(54) APPARATUS AND METHOD FOR IMPLEMENTING IPSEC TRANSFORMS WITHIN AN INTEGRATED CIRCUIT

(75) Inventors: Timothy Ober, Atkinson, NH (US); Peter Reed, Beverly, MA (US); Robert W. Doud, Bedford, MA (US)

(73) Assignee: SafeNet, Inc., Baltimore, MD (US)

( * ) Notice: Subject to any disclaimer, the term of this patent is extended or adjusted under 35 U.S.C. 154(b) by 0 days.

(21) Appl. No.: 09/258,110

(22) Filed: Feb. 25, 1999

Related U.S. Application Data

(63) Continuation of application No. 09/154,443, filed on Sep. 16, 1998.
(60) Provisional application No. 60/059,082, filed on Sep. 16, 1997, provisional application No. 60/059,839, filed on Sep. 16, 1997, provisional application No. 60/059,840, filed on Sep. 16, 1997, provisional application No. 60/059,841, filed on Sep. 16, 1997, provisional application No. 60/059,842, filed on Sep. 16, 1997, provisional application No. 60/059,843, filed on Sep. 16, 1997, provisional application No. 60/059,844, filed on Sep. 16, 1997, provisional application No. 60/059,845, filed on Sep. 16, 1997, provisional application No. 60/059,846, filed on Sep. 16, 1997, and provisional application No. 60/059,847, filed on Sep. 16, 1997.

(51) Int. Cl.$^7$ ................................................. G06F 11/30

(52) U.S. Cl. ....................................... 713/189; 713/192

(58) Field of Search .................................... 713/189, 192

(56) References Cited

U.S. PATENT DOCUMENTS

| 4,987,595 | A | | 1/1991 | Marino, Jr. et al. |
| 5,231,668 | A | * | 7/1993 | Kravitz ........................ 380/28 |
| 5,557,346 | A | | 9/1996 | Lipner et al. |
| 5,623,545 | A | | 4/1997 | Childs et al. |
| 5,631,960 | A | | 5/1997 | Likens et al. |
| 5,721,777 | A | | 2/1998 | Blaze |
| 5,832,207 | A | * | 11/1998 | Little et al. .................. 395/186 |

OTHER PUBLICATIONS

Schneier, Applied Cryptography, 2e, pp. 12, 353–354, 362, 441–443, and 471–472.*

* cited by examiner

Primary Examiner—Ayaz Sheikh
Assistant Examiner—James Seal
(74) Attorney, Agent, or Firm—Gerlad T. Bodner

(57) ABSTRACT

A secure communication platform on an integrated circuit is a highly integrated security processor which incorporates a general purpose digital signal processor (DSP), along with a number of high performance cryptographic function elements, as well as a PCI and PCMCIA interface. The secure communications platform is integrated with an off-the-shelf DSP so that a vendor who is interested in digital signal processing could also receive built-in security functions which cooperate with the DSP. The integrated circuit includes a callable library of cryptographic commands and encryption algorithms. An encryption processor is included to perform key and data encryption, as well as a high performance hash processor and a public key accelerator.

43 Claims, 30 Drawing Sheets

CRYPTIC FUNCTIONAL BLOCK DIAGRAM

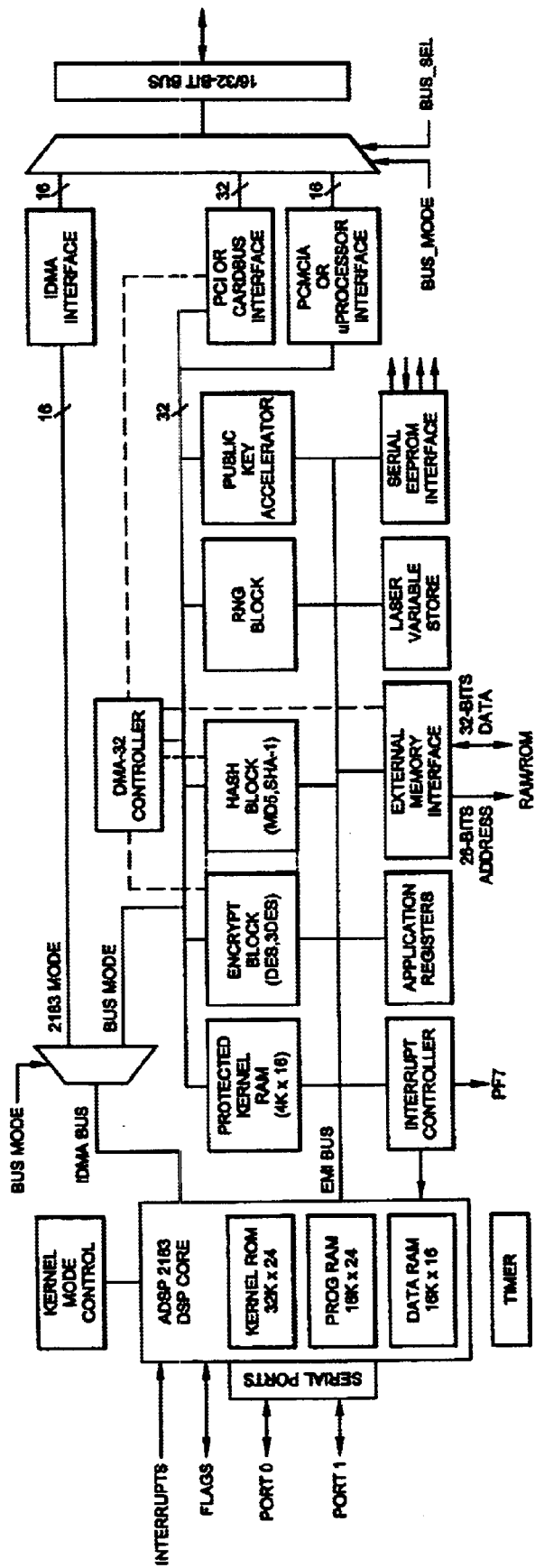
FIG-1A CRYPTIC FUNCTIONAL BLOCK DIAGRAM

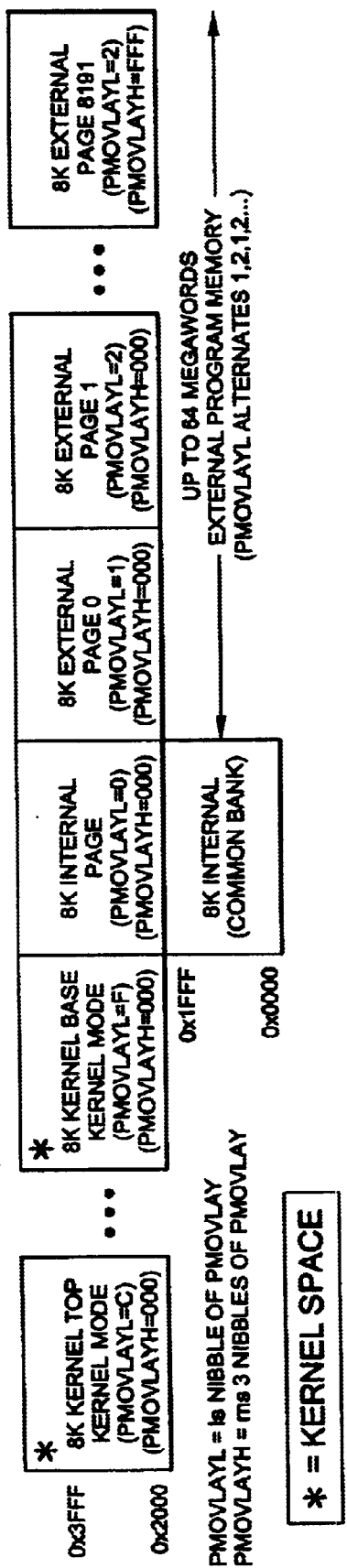
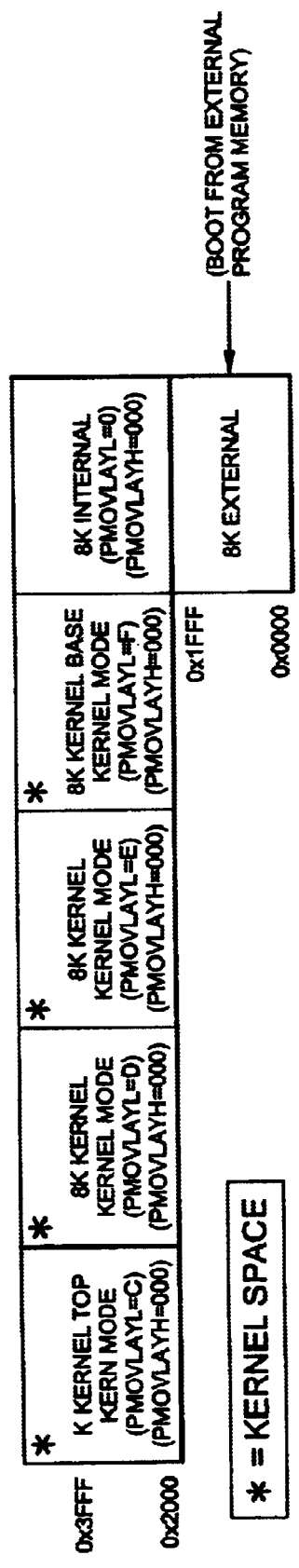

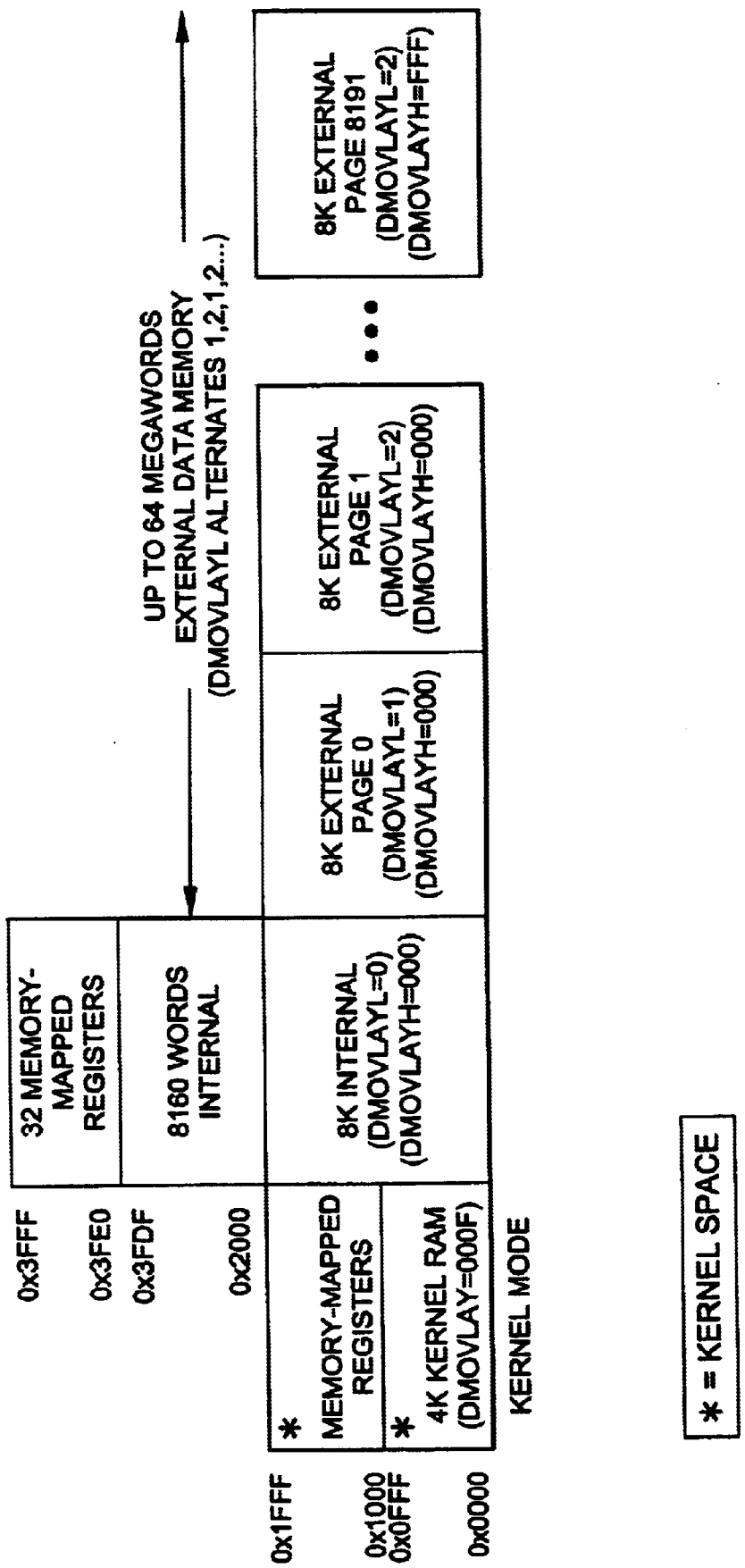
FIG-4 DATA MEMORY

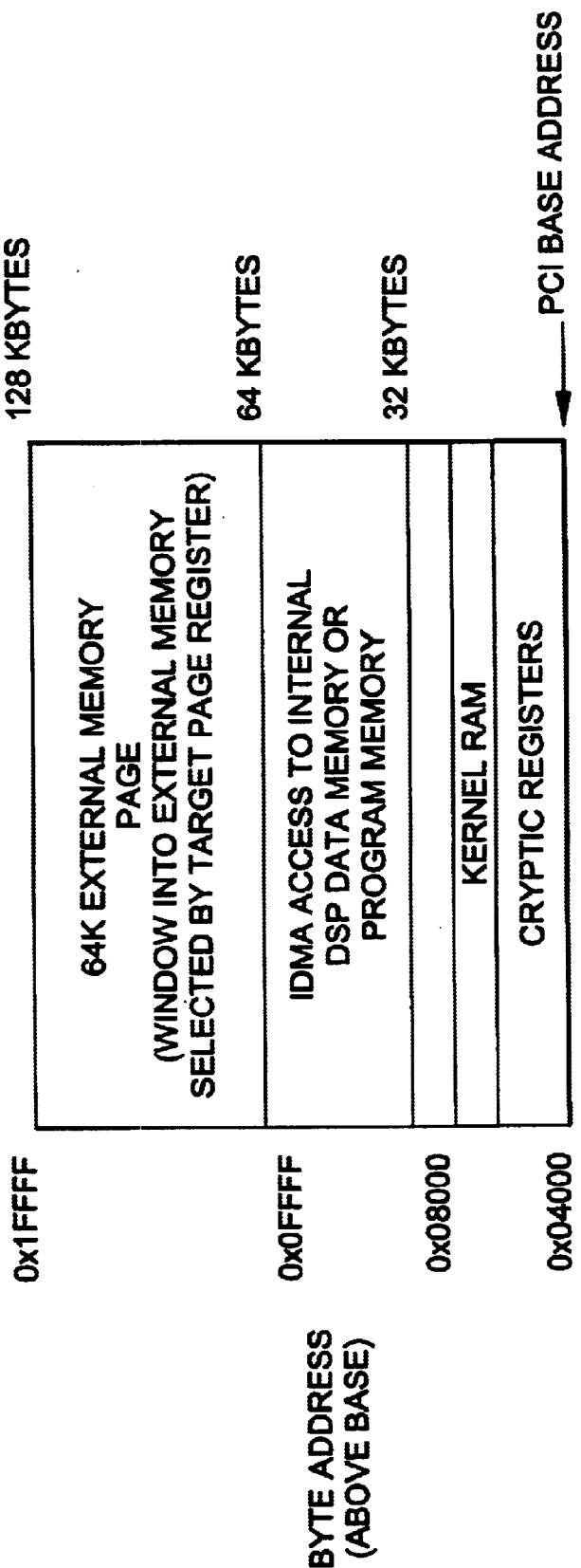
FIG-5 PCI MEMORY MAP

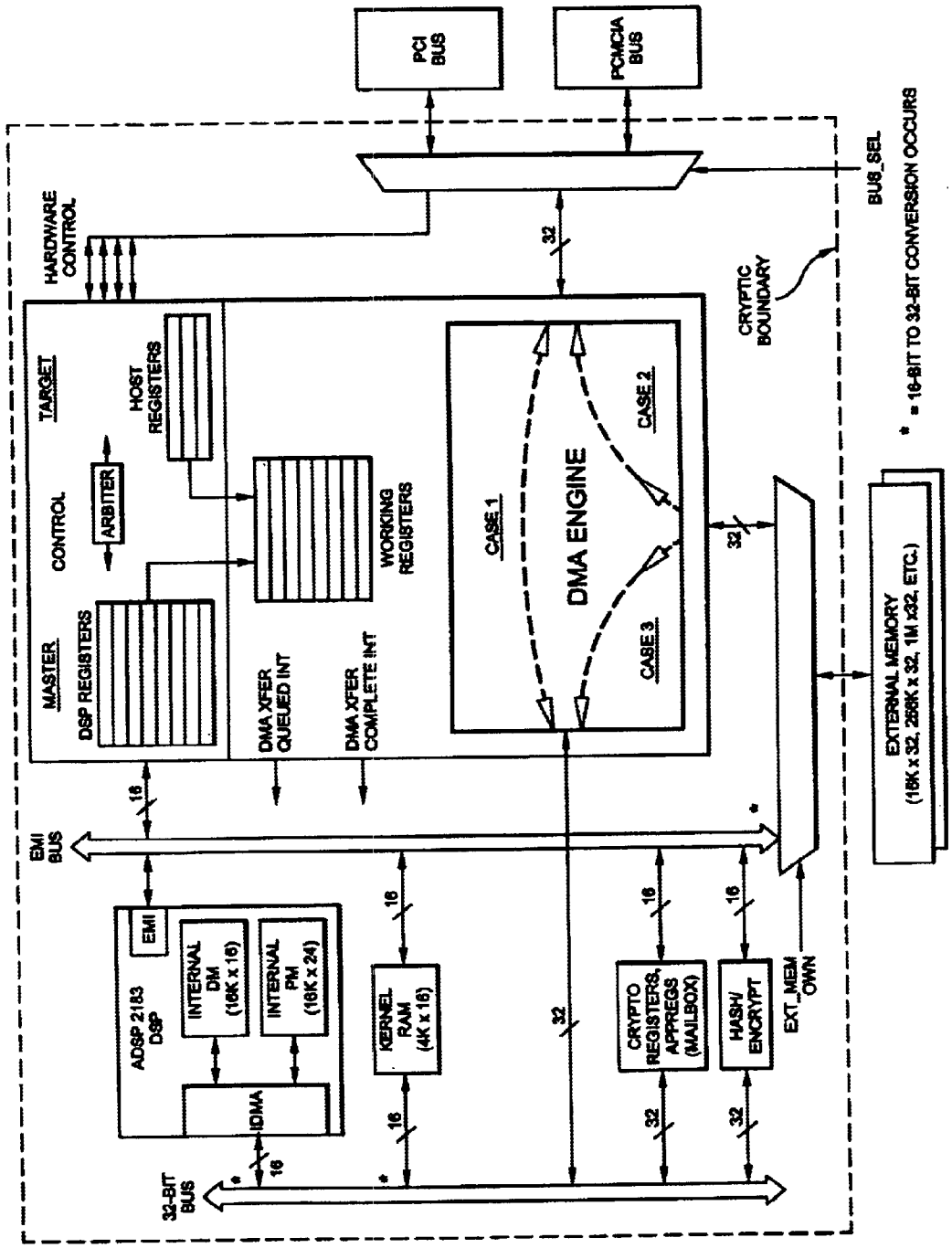
FIG-6 32-BIT DMA SUBSYSTEM

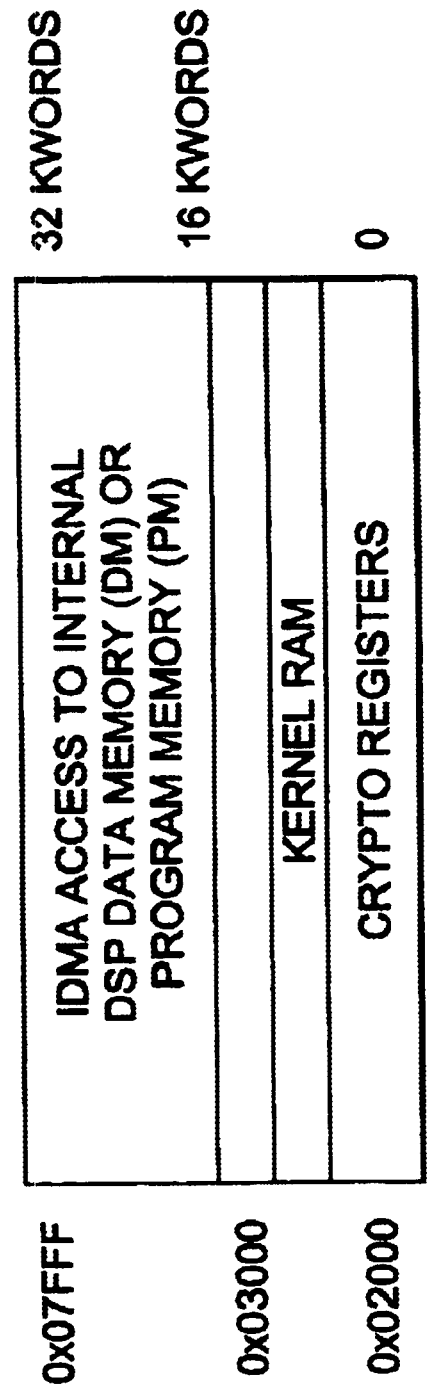
FIG-7 DSP "LOCAL" MEMORY MAP

FIG-8 MASTER DMA FLOWCHART
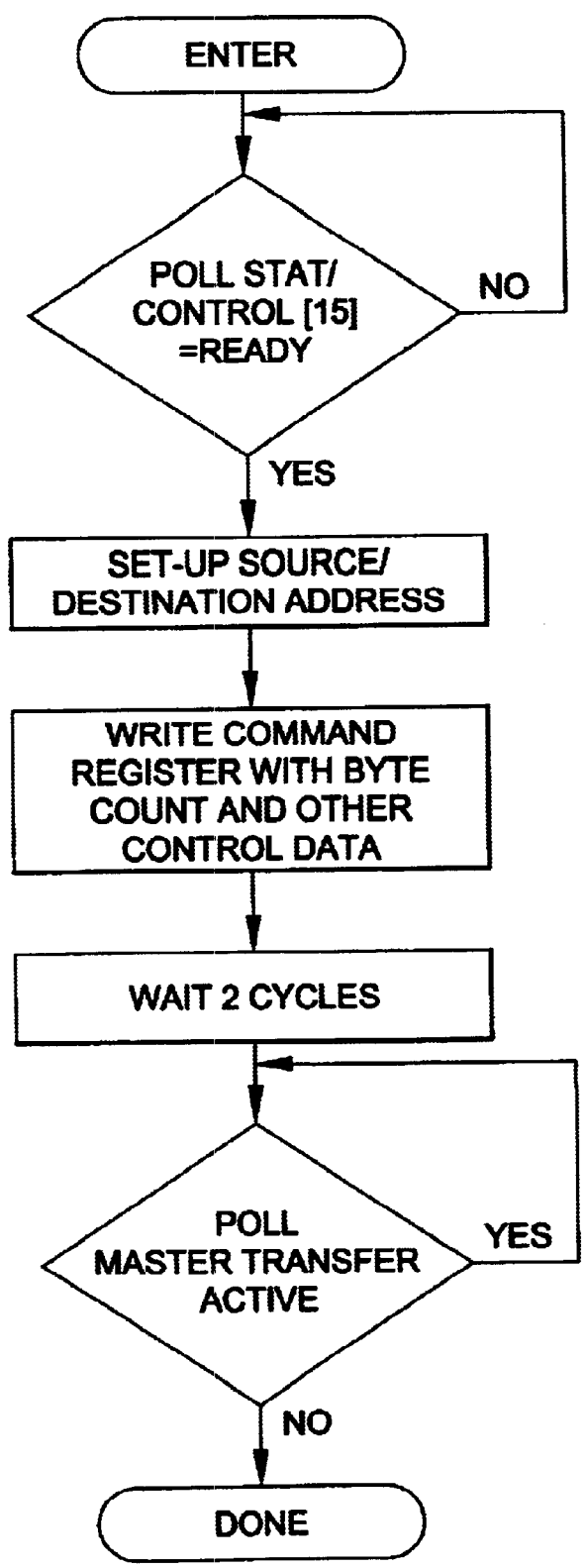

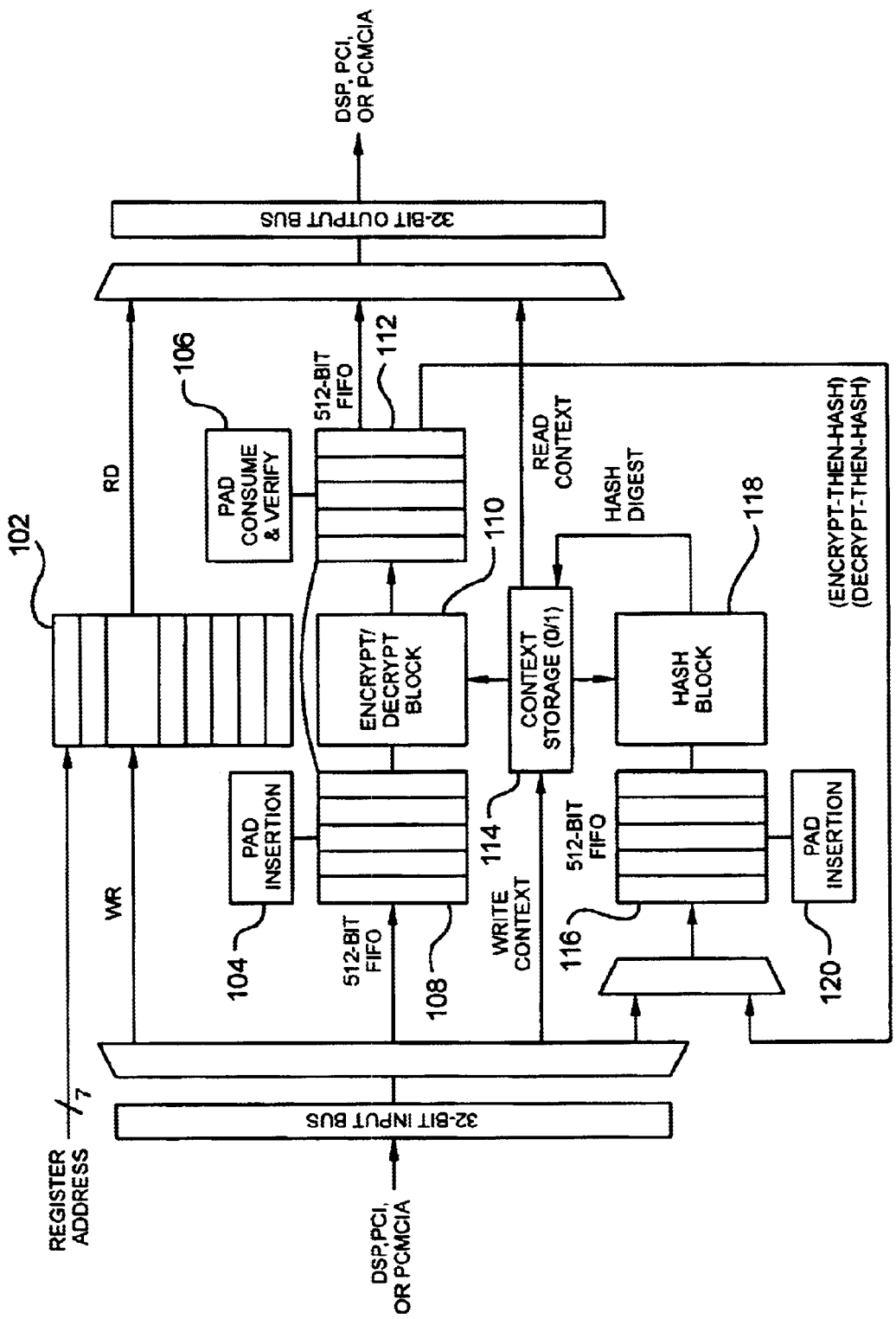
FIG-9 HASH/ENCRYPT FUNCTIONAL BLOCK DIAGRAM

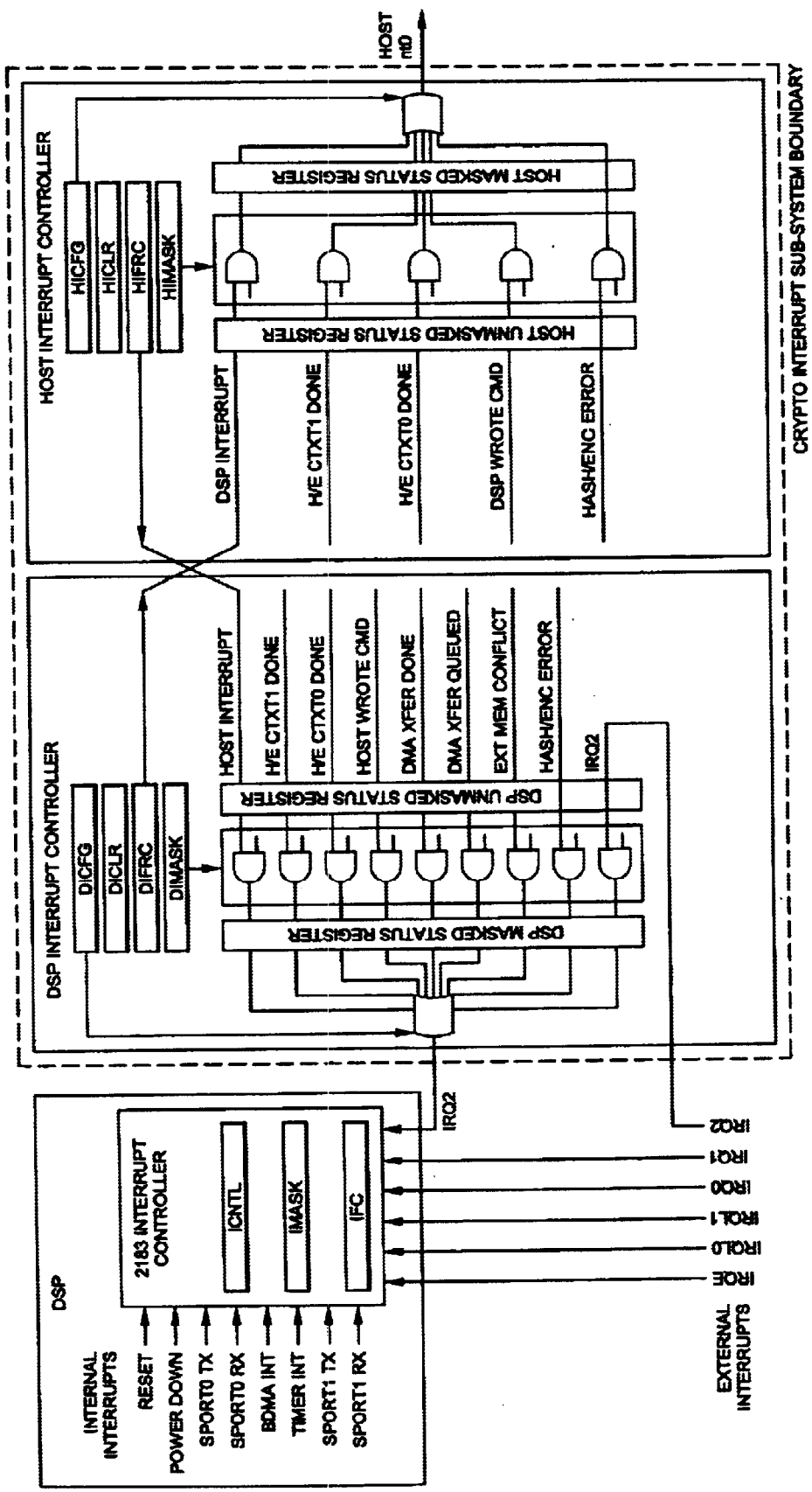
FIG-10 INTERRUPT CONTROLLER BLOCK DIAGRAM

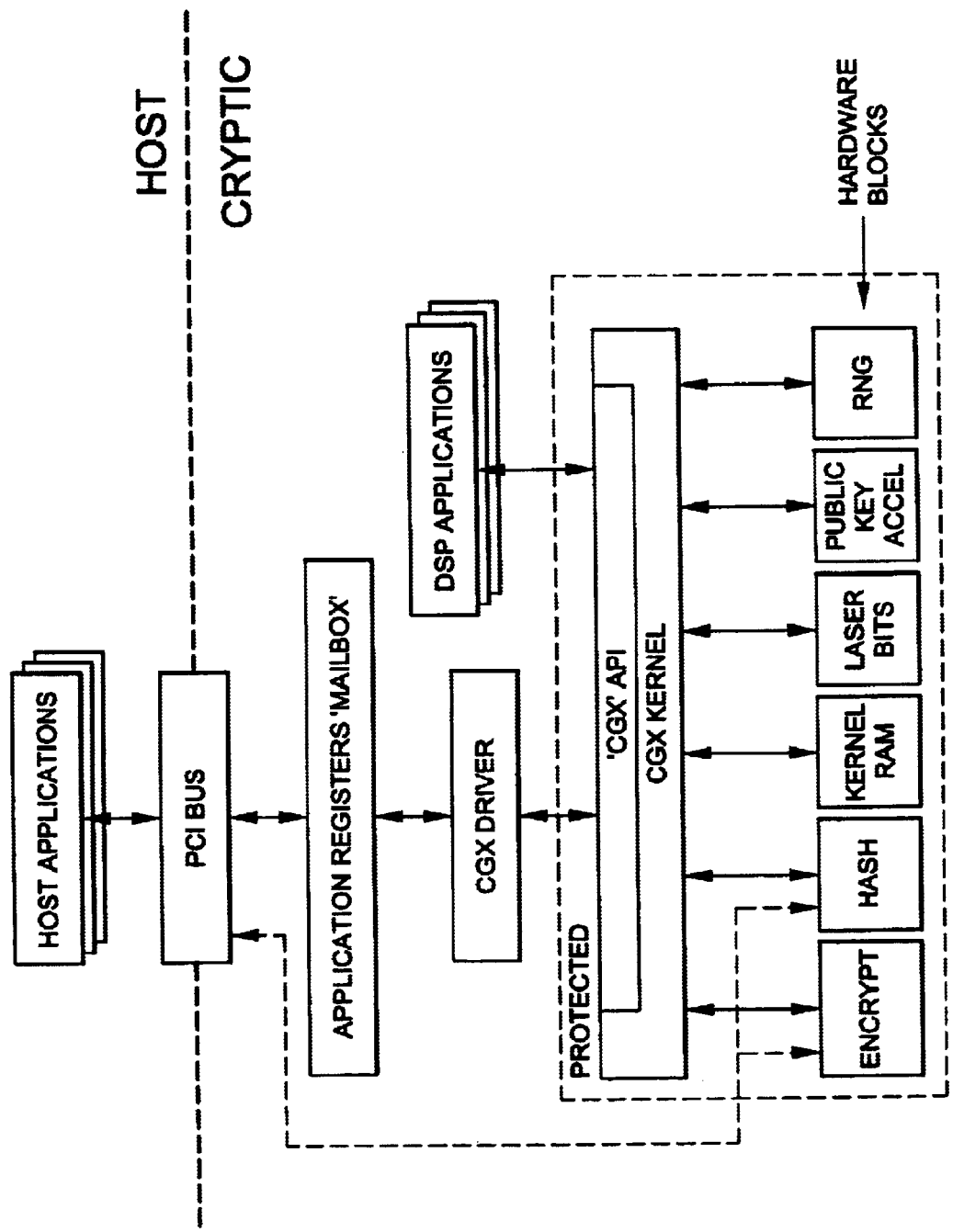
FIG-11 CGX SOFTWARE INTERFACE

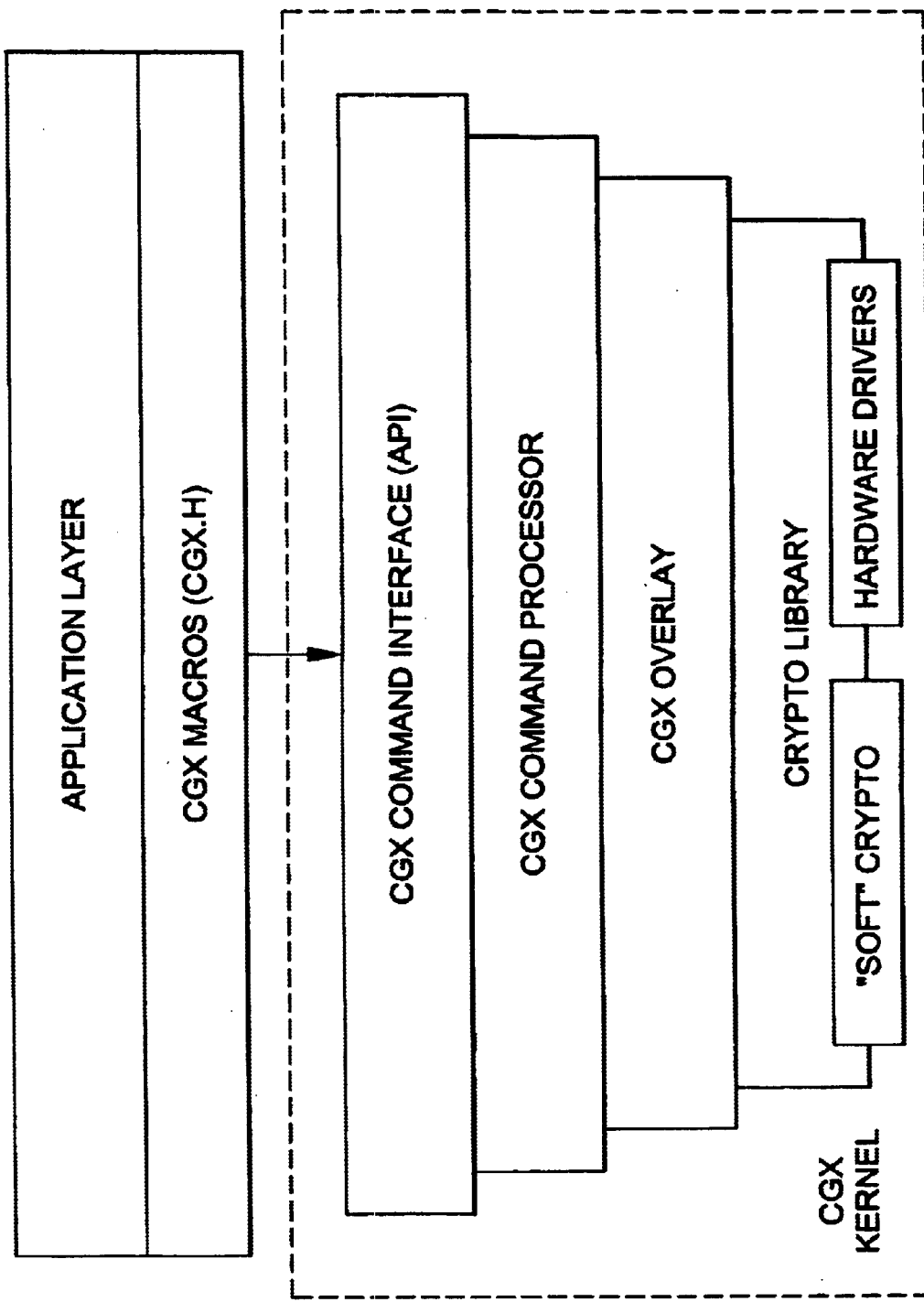
FIG-12 CRYPTIC SOFTWARE LAYERS

FIG-13  CGX OVERLAY INTERFACE
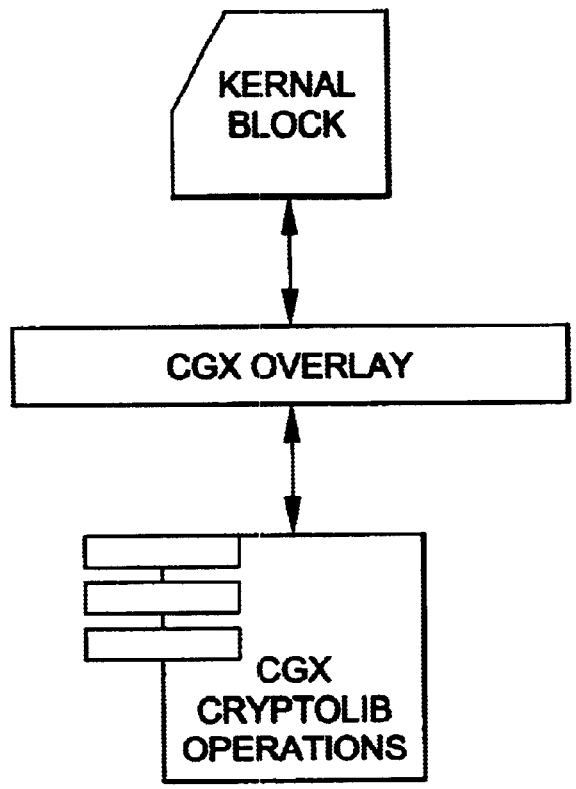
FIG-14  CGX KERNEL CRYPTOGRAPHIC SERVICE HIERARCHICAL INTERFACE
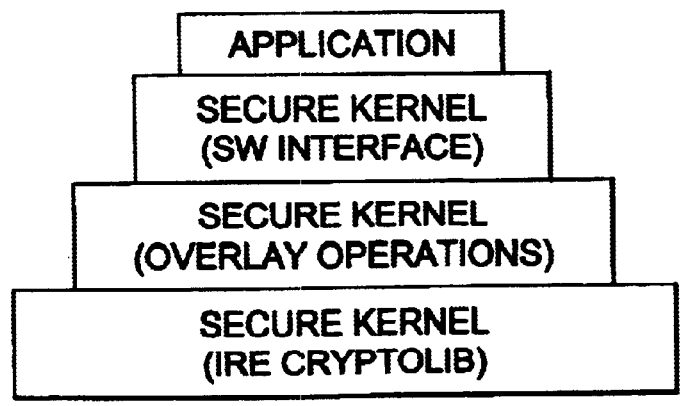

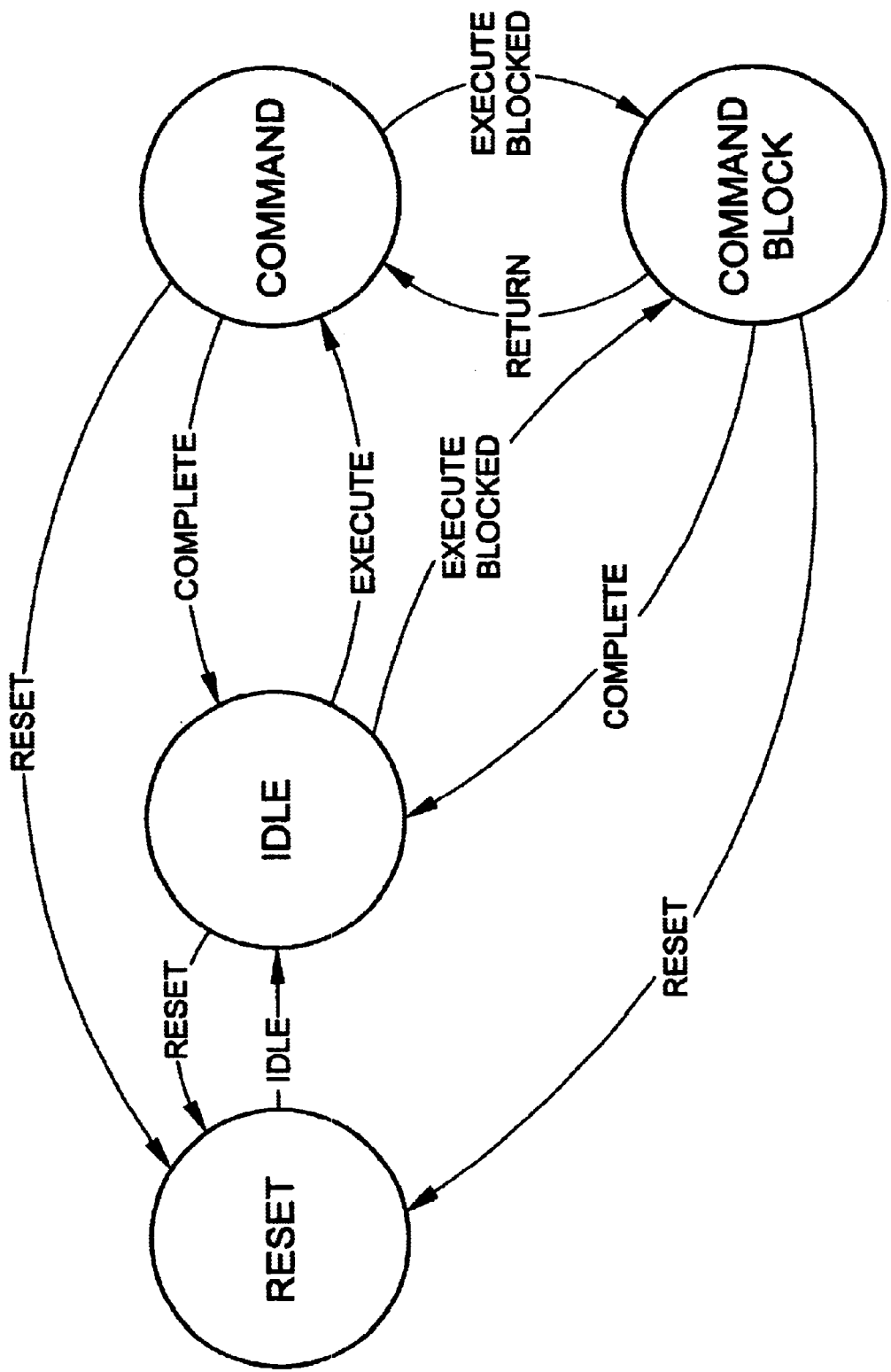
FIG-15 CGX KERNEL STATE DIAGRAM

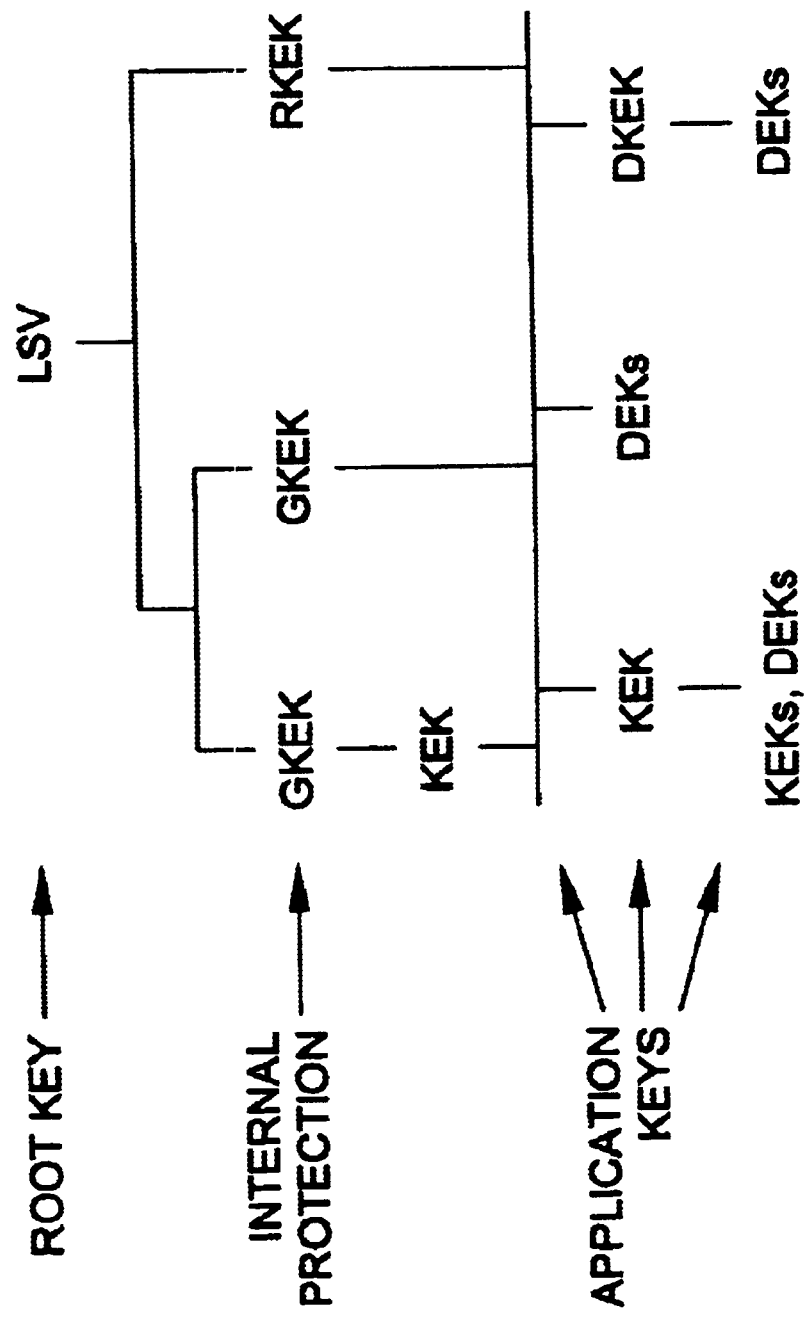
FIG-16 KEK HEIRARCHY

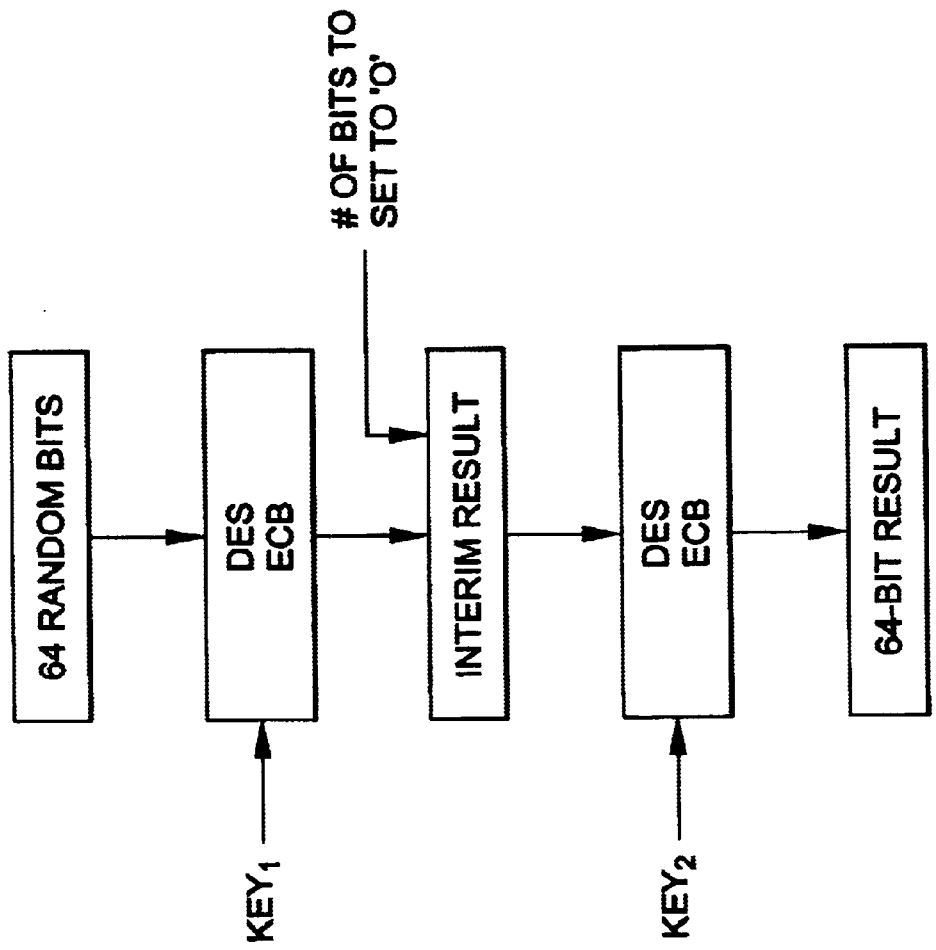

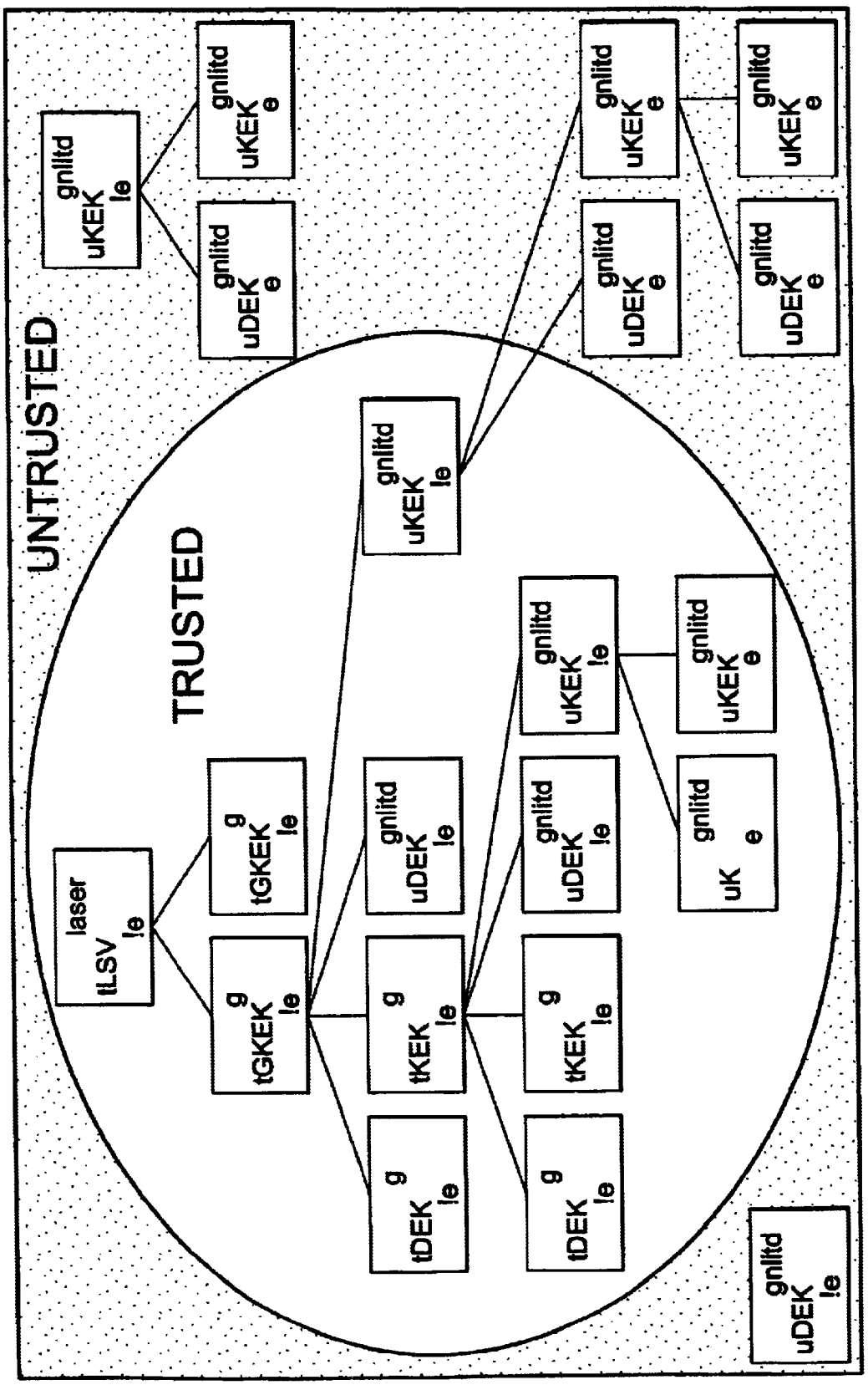
FIG-18 SYMMETRIC KEY HIERARCHY

FIG-19  PCDB DATA TYPE DEFINITION

```
typedef struct _token_pcdb {
signblock token_signature;
UINT16    serial_number[CGX_SERIAL_NUMBER_LEN];
UINT16    length;
UINT16    reserved;
UINT16    pcdb[CGX_PCDB_LEN];
UINT16    reserved1;
} token_pcdb;
```

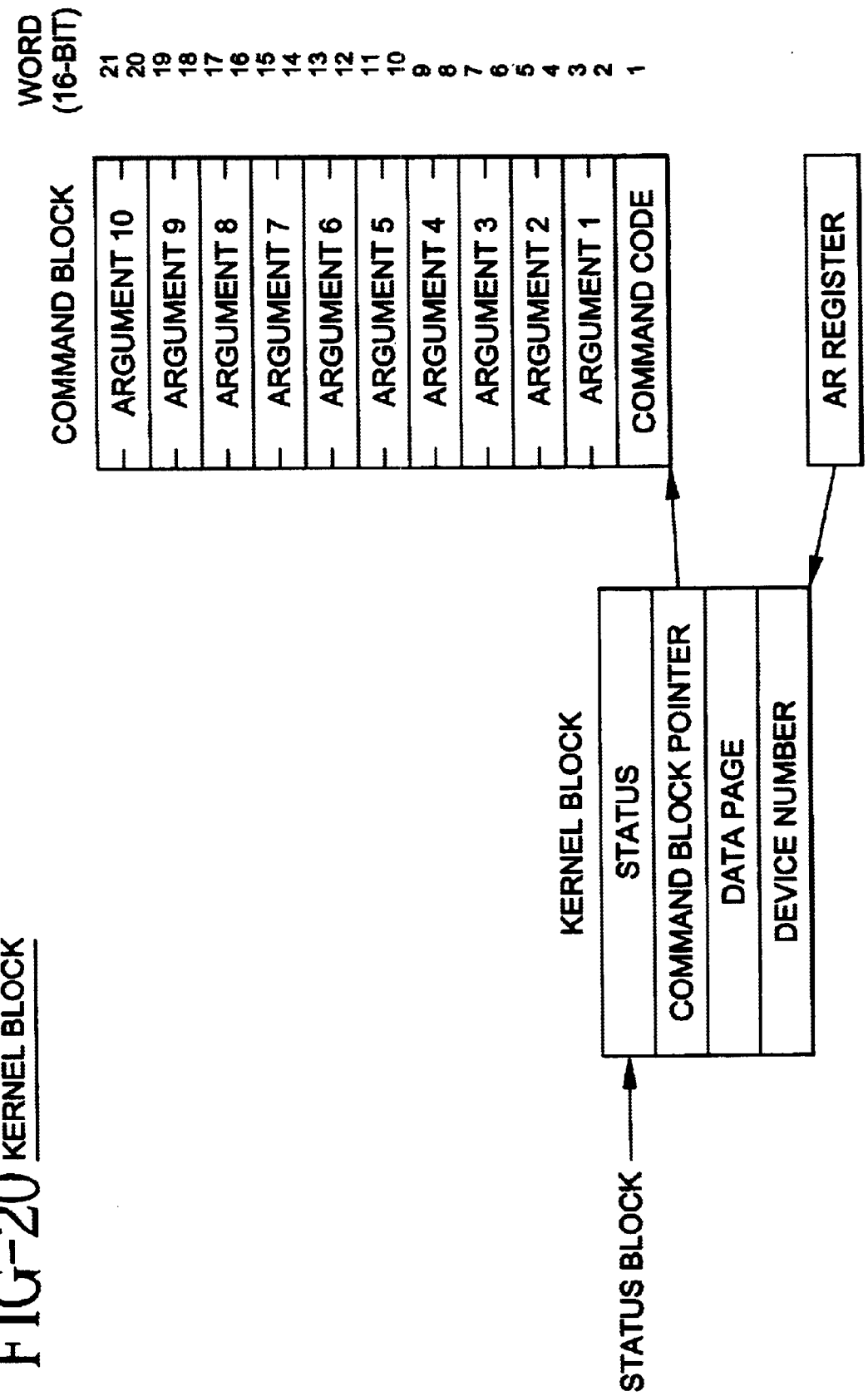
FIG-20 KERNEL BLOCK

FIG-21 KERNEL BLOCK OBJECT DEFINITION

```
typedef unsigned short UINT16; /* unsigned 16 bit integer */ typedef struct _kernelblock {
    UINT16      DeviceNo;   /* command class and memory model */
    UINT16      dp;         /* ADI-2183 specific, data page of cmd/stat */
    cmdblock    *cb;        /* command block object, low memory first */
    UINT16      status;     /* command execution status */
} kernelblock;
```

FIG-22 COMMAND BLOCK OBJECT DEFINITION

```
typedef (void *) VPTR;  /* a pointer to any data type or object */ typedef struct _cmdblock {
    unsigned short  cmd;                            /* micro command */
    VPTR            argument[CGX_MAX_ARGS];         /* argument list */
} cmdblock;
```

FIG-23 SECRET KEY OBJECT DEFINITION

```
typedef WORD16 unsigned short;              /* 16 bits of data */ typedef struct _secretkey {
    UINT16   extra;                         /* for application's use */
    UINT16   type;                          /* the secret key type */
    UINT16   length;                        /* key length */
    UINT16   k[CGX_RAW_SECRET_KEY_HASH_LENGTH];/* secret key, salt, */;
                                            /* plus some attributes & len */
                                            /* plus a SHA-1 HASH digest */
} secretkey;
```

FIG-24 PUBLIC KEYSET OBJECT DEFINITION

```
typedef void            *VPTR;
typedef unsigned short  WORD16;

typedef struct _publickey {
    WORD16   extra;       */ 16 bits of space reserved for the application */
    WORD16   type;        */ public key algorithm; defines keyset object types */
    WORD16   length;      */ modulus length of public key (in bits) */
    VPTR     modulus;     */ modulus object */
    VPTR     pubkey;      */ public key object */
    VPTR     privkey;     */ private key object */
} publickey;
```

FIG-25  DIFFIE-HELLMAN PUBLIC KEYSET OBJECTS

```
typedef unsigned short WORD16;

#define CGX_2048_BITS 128  /* To allocate 2048 bits      */
#define CGX_1024_BITS  64  /* To allocate 1024 bits      */
define CGX_64_BITS     4  /* To allocate   64 bits (salt) */ typedef UINT16 Twokbits[CGX_2048_BITS];
typedef UINT16 Onekbits[CGX_1024_BITS];
typedef UNIT16 Saltbits[CGX_64_BITS];

/* Diffie-Hellman Public Keyset Objects */
typedef struct _DHmodulus {
        WORD16 n[128];          /* max 2048-bit modulus   */
        WORD16 g[128];          /* max 2048-bit base      */
} DHmodulus;

typedef struct _DHpubkey {
        WORD16 Y[128];          /* max 2048-bit public key */
} DHpubkey;

typedef struct _DHprivkey {
        WORD16 salt[4];         /* salt for covering purposes */
        WORD16 y[128];          /* max 2048-bit private key   */
} Dhprivkey;
```

FIG-26 RSA PUBLIC KEYSET OBJECTS

```
typedef unsigned short WORD16;

typedef struct _RSAmodulus {
    WORD16    n[128];      /* maximum 2048 bit modulus        */
} RSAmodulus;

typedef struct _RSApubkey {
    WORD16    e[2];        /* maximum 32 bit public key       */
} RSApubkey;

typedef struct _RSAprivkey {
    WORD16    salt[4];     /* rndm data for covering purposes */
    WORD16    p[64];       /* 1024 bit max prime modulus      */
    WORD16    q[64];       /* 1024 bit max prime modulus      */
    WORD16    dP[64];      /* 1024 bit max, d mod (p-1)       */
    WORD16    dQ[64];      /* 1024 bit max, d mod (q-1)       */
    WORD16    qInv[64];    /* 1024 bit max, q^-1 mod p        */
    WORD16    d[128];      /* maximum 2048 bit private key    */
} RSAprivkey;
```

FIG-27 DSA PUBLIC KEYSET OBJECTS

```
typedef unsigned short WORD16;

typedef struct _DSAmodulus {
        WORD16    p[128];        /* maximum 2048 bit modulus */
        WORD16    q[10];         /* fixed 160 bit modulus */
        WORD16    g[128];        /* maximum 2048, the generator */
} DSAmodulus;

typedef struct _DSApubkey {
        WORD16    y[128];                 /* maximum 2048 bits public key */
} DSApubkey;

typedef struct _DSAprivkey {
        WORD16    salt[2];       /* rndm data for covering purposes */
        WORD16    x[10];         /* fixed private key size, 160 bits */
} DSAprivkey;
```

FIG-28  DSA DIGITAL SIGNATURE OBJECT DEFINITION

```
typedef unsigned short WORD16;      /* 16 bits of data */
typedef void            *VPTR;      /* pointer to any object */ typedef struct _signblock {
    WORD16 r[10];  /* r = (g^k mod p) mod q */
    WORD16 s[10];  /* s = (k^-1 (H(m) + x r)) mod q */
} signature_block;
```

FIG-29

```
typedef unsigned short WORD16;      /* 16 bits of data */ typedef struct _seedkey {
    WORD32 counter;     /* 32 bit counter to verify prime number */
    WORD16 seed[10];    /* 160 bit random data to generate a prime p and q */
} seedkey;
```

FIG-30  KEY CACHE REGISTER DATA TYPE DEFINITION

```
typedef unsigned short kcr;   /* 16 bits only */
```

FIG-31

```
typedef unsigned short WORD16;
typedef unsigned short BOOL;

typedef struct _crypto_cntxt {
    unsigned short config;    /* use one of the constants defined in the document */
                              /* titled, Cryptic Command Interface Specification */
    kcr5      key;            /* KCR ID for secret key */
    WORD16    iv[4];          /* 64 bit for IV, feed-back register */
} crypto_cntxt;
```

FIG-32 ONE-WAY HASH CONTEXT STORE

```
typedef unsigned char BYTE;
typedef unsigned short WORD16;
typedef unsigned long WORD32;

typedef struct {
    WORD32 count[2];          /* number of bits, module 2^64 (lsb first) */
    WORD32 state[4];          /* state (ABCD)                            */
    UINT16 buffer[32];        /* input buffer                            */
} MD5_CTX;

typedef struct {
    WORD32 count[2];          /* 64-bit bit count                        */
    WORD32 digest[5];         /* Message digest                          */
    WORD32 data[16];          /* SHS data buffer                         */
} SHS_INFO;

typedef struct hash_cntxt {
    WORD16 algorithm;         /* Either CGX_MD5_A or CGX_SHS_A           */
    BYTE   *digest;           /* Pointer to message digest [either
                               * 128-bits for MD5 or 160-bits for SHS.
                               */

/* The following buffer stores the algorithm's state
     * information. (96 bytes)
     */
    union {
        MD5_CTX md5;
        SHS_INFO shs;
    } state
} hash_cntxt;
```

FIG-33 EXAMPLE OF CGX WRAP CODE AND COMMAND INTERFACE

```c
#include "cgx.h"

#define cgx_encrypt(kb, datain_pg, datain, dataout_pg, dataout, size, cryptoblock) { \
        kb->cb->cmd          = CGX_ENCRYPT; \
        kb->cb->agrument[0]  = [VPTR]cryptoblock; \
        kb->cb->agrument[1]  = [VPTR]datain_pg; \
        kb->cb->agrument[2]  = [VPTR]datain; \
        kb->cb->agrument[3]  = [VPTR]size; \
        kb->cb->agrument[4]  = [VPTR]dataout_pg; \
        kb->cb->agrument[5]  = [VPTR]dataout; \
        cgx_transfer_secure_kernel(kb); } boolean
encrypt_packet_ecb(unsigned char *data, unsigned size, kcr key, kernelblock *kb)
{
    crypto_cntxt *cb;

cb = (crypto_cntxt *)malloc(sizeof(crypto_cntxt));

cb->config = CGX_DES_ECB_M;
    cb->iv     = (WORD16 *)NULL;
    cb->key1   = key;

cgx_encrypt(kb, 0, data, 0, data, size, cb);  // request CGX Kernel to perform
                                                   // encryption of the data packet, copy
                                                   // of result is written back over src.
    free((unsigned char *)cb);
    /* check the result of the operation */
    if( kb->sb->status == CGX_SUCCESS )
        return TRUE;
    else
        return FALSE;
}
```

FIG-34 CGX OVERLAY TABLE DEFINITION

```
typedef unsigned short WORD16;                      /* 16 bit data */
typedef void            (*CGX_FUNC) (void);         /* function ptr */ typedef struct cgx_overlay_tuple {
    CGX_FUNC cgxf;        /* CGX overlay operation */
    WORD16   control;     /* control variable: preempt */
} cgx_overlay_tuple;
```

FIG-35  KCS OBJECT DEFINITION

```
#define CGX_KCS_VERSION 0x0001
#define CGX_KCS_RESERVED_COUNT 2
typedef struct _kcs {
UINT16  version;                                      /* version of KCS string */
UINT16  reserved[CGX_KCS_RESERVED_COUNT];             /* Reserved fields */
UINT16  rng_alarm_count_threshhold;                   /* RNG Alarm Count Threshhold */
UINT16  rng_enable;                                   /* Enable RNG Clock */
UINT16  kernel_blocked;                               /* address of semaphore */
UINT16  kernel_dsp_dma;                               /* address of semaphore */
UINT16  kernel_dsp_dma_ifc;                           /* IFC for knl DMA release */
UINT16  dma_max_dwords;                               /* Max dwords knl DMA trans */
UINT16  kernel_dsp_hashenc;                           /* address of semaphore */
UINT16  kernel_dsp_hashenc_ifc;                       /* IFC for knl HASHENC rls */
UINT16  kernel_host_hashenc;                          /* enable bus grant/ack */
UINT16  kernel_host_hashenc_ifc;                      /* IFC for knl HASHENC rls */
UINT16  hashenc_iv;                                   /* IV write disable cntl */
UINT16  hashenc_cntl;                                 /* Cntl who owns the HASHENC */
UINT16  fips140_1;                                    /* Enable fips140.1 mode */
UINT16  flipsha;                                      /* Control flips of SHA md */
UINT16  flipgxy;                                      /* Control flips g^xy of DH */
UINT16  rng_control;                                  /* Used to control the RNG */
UINT16  rng_config;                                   /* Used to configure the RNG */
} kcs;
```

APPARATUS AND METHOD FOR IMPLEMENTING IPSEC TRANSFORMS WITHIN AN INTEGRATED CIRCUIT

CROSS-REFERENCE TO RELATED APPLICATIONS

This application is a continuation of Ser. No. 09/154,443, filed Sep. 16, 1998, which is based on U.S. Provisional Patent Application Serial Nos. 60/059,082, 60/059,839, 60/059,840, 60/059,841, 60/059,842, 60/059,843, 60/059,844, 60/059,845, 60/059,846 and 60/059,847, each of which was filed on Sep. 16, 1997, the disclosures of which are incorporated herein by reference.

COPYRIGHT NOTICE

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

BACKGROUND OF THE INVENTION

1. Field of the Invention

The present invention relates generally to a secure communication platform on an integrated circuit, and more particularly relates to a digital signal processor (DSP) with embedded encryption security features.

2. Description of the Prior Art

Digital signal processors (DSPs) are widely used in devices such as modems, cellular telephones and facsimiles. With an increase in digital communications, data transmission security has become an issue in numerous DSP applications. A standard DSP is not capable of providing data transmission security; thus, additional hardware and software are required.

Security for digital communications is available on various integrated circuits. The integrated circuit security features include hardware implemented encryption algorithms such as the Data Encryption Standard (DES), Hash function algorithms and hardware implemented public key accelerators. The availability of this hardware makes it possible to provide security for distributed computing; however, no hardware implemented encryption algorithms have been known to be incorporated in a DSP.

Software encryption algorithms have also been developed to provide security for distributed computing. One commonly used encryption algorithm is the Data Encryption Standard (DES). DES is a block cipher which operates on 64-bit blocks of data and employs a 56-bit key. Another commonly used standard is the Digital Signature Algorithm (DSA). The DSA standard employs an irreversible public key system. These algorithms and more are part of the public domain and are available on the Internet.

Hash function algorithms are used to compute digital signatures and for other cryptographic purposes. One Hash function algorithm is the U.S. government's Secure Hash Algorithm (SHA-1).

Another security standard commonly used is the Internet Protocol Security Standard (IPsec). This standard provides security when communicating across the Internet. The standard requires DES to encrypt an Internet Protocol data packet, SHA-1 for authentication, and a public key algorithm for hand-shaking.

Since the IPsec standard requires different encryption algorithms, a software library is usually created so that a desired algorithm may be accessed when needed. Security systems employing encryption libraries are software implemented and designed specifically to run on the user's processor hardware.

Digital communication systems are not generally designed with security hardware. In most systems, security is achieved by software, such as described above, which is not entirely secure because there is no security hardware to block access to the security software by an intruder. Another problem associated with software encryption algorithms is that some of the software encryption algorithms run slower than when hardware implemented.

OBJECTS AND SUMMARY OF THE INVENTION

It is an object of the present invention to provide a digital signal processor with embedded security functions on a single integrated circuit.

It is another object of the present invention to provide a secure communications platform that can implement a user's application and dedicate cryptographic resources to encryption and decryption requests on demand.

It is another object of the present invention to provide an increase in encryption security through hardware implementations.

It is another object of the present invention to provide a security co-processor for high speed networking products such as routers, switches and hubs.

A cryptographic co-processor constructed in accordance with one form of the present invention includes a processor having encryption circuits built into it. The processor is capable of processing various applications, such as modem and networking applications. The encryption circuits and firmware make it possible to add security to the various processing applications. Hardware such as encryption and hash circuits are provided and structured to work together to provided accelerated encryption/decryption capabilities. A memory is programmed with cryptographic algorithms that support various encryption/decryption techniques. The cryptographic co-processor is structured so that a manufacturer of data communication products could substitute a current processor with the cryptographic co-processor and receive encryption capabilities with little modification to the existing product.

Since DSP's are the building block of many communication systems, a secured DSP with universal security features that may be selected by the manufacturer of the equipment in which the DSP forms part of would have far ranging benefits.

The benefits of a universal cryptographic co-processor (e.g., DSP) is that it can perform standard processor functions and standard encryption functions with no peripheral hardware or cryptographic software. Because the cryptographic co-processor is implemented on a standard processor platform (i.e., substrate or monolithic chip), the processor that is being used in a manufacturer's product can be substituted with the cryptographic co-processor with little or no modification to the original design. The manufactured product incorporating the secure, universal co-processor now has encryption capabilities along with the original processor capabilities.

A preferred form of the cryptographic co-processor, as well as other embodiments, objects, features and advantages of this invention, will be apparent from the following detailed description of illustrated embodiments, which is to be read in connection with the accompanying drawing.

BRIEF DESCRIPTION OF THE DRAWING

FIG. 1A is a block diagram similar to FIG. 1 showing another view of the cryptographic co-processor of the present invention.

FIG. 2 is a block diagram of the program memory preferably used in the co-processor of the present invention for MMAP=0.

FIG. 3 is a block diagram of the program memory preferably used in the co-processor of the present invention for MMAP=1.

FIG. 4 is a block diagram of the data memory preferably used in the co-processor of the present invention.

FIG. 5 is a block diagram of the PCI memory preferably used in the co-processor of the present invention.

FIG. 6 is a block diagram of the DMA subsystem preferably used in the co-processor of the present invention.

FIG. 7 is a block diagram of the DSP "local" memory preferably used in the co-processor of the present invention.

FIG. 8 is a flow chart showing the DMA control preferably used in the co-processor of the present invention.

FIG. 9 is a block diagram of the hash/encrypt circuit preferably used in the co-processor of the present invention.

FIG. 10 is a block diagram of the interrupt controller preferably used in the co-processor of the present invention.

FIG. 11 is a block diagram of the CGX software interface preferably used in the co-processor of the present invention.

FIG. 12 is a block diagram illustrating the layers of software preferably used in the co-processor of the present invention.

FIG. 13 is a block diagram of the CGX overlay interface preferably used in the co-processor of the present invention.

FIG. 14 is a block diagram illustrating the hierarchical interface of the CGX kernel cryptographic service preferably used in the co-processor of the present invention.

FIG. 15 is a functional state diagram illustrating the CGX kernel preferably used in the co-processor of the present invention.

FIG. 16 is a functional tree diagram showing the KEK hierarchy preferably used in the co-processor of the present invention.

FIG. 17 is a block diagram of a symmetric key weakening algorithm preferably used in the co-processor of the present invention.

FIG. 18 is a functional tree diagram showing the symmetric key hierarchy preferably used in the co-processor of the present invention.

FIG. 19 is a portion of a computer program defining the PCDB data type preferably used in the co-processor of the present invention.

FIG. 20 is a block diagram of the kernel block preferably used in the co-processor of the present invention.

FIG. 21 is a portion of a computer program defining the kernel block preferably used in the co-processor of the present invention.

FIG. 22 is a portion of a computer program defining the command block preferably used in the co-processor of the present invention.

FIG. 23 is a portion of a computer program defining the secret key object preferably used in the co-processor of the present invention.

FIG. 24 is a portion of a computer program defining the public keyset preferably used in the co-processor of the present invention.

FIG. 25 is a portion of a computer program defining the Diffie-Hellman public keyset preferably used in the co-processor of the present invention.

FIG. 26 is a portion of a computer program defining the RSA public keyset preferably used in the co-processor of the present invention.

FIG. 27 is a portion of a computer program defining the DSA public keyset preferably used in the co-processor of the present invention.

FIG. 28 is a portion of a computer program defining the DSA digital signature preferably used in the co-processor of the present invention.

FIG. 29 is a portion of a computer program defining the DSA seed key preferably used in the co-processor of the present invention.

FIG. 30 is a portion of a computer program defining the key cache register data type preferably used in the co-processor of the present invention.

FIG. 31 is a portion of a computer program defining the symmetrical encryption context store preferably used in the co-processor of the present invention.

FIG. 32 is a portion of a computer program defining the one-way hash context store preferably used in the co-processor of the present invention.

FIG. 33 is a portion of a computer program defining one example of the CGX wrap code and command interface preferably used in the co-processor of the present invention.

FIG. 34 is a portion of a computer program defining the CGX overlay table preferably used in the co-processor of the present invention.

FIG. 35 is a portion of a computer program defining the KCS object preferably used in the co-processor of the present invention.

DETAILED DESCRIPTION OF THE PREFERRED EMBODIMENTS

Figure 1:
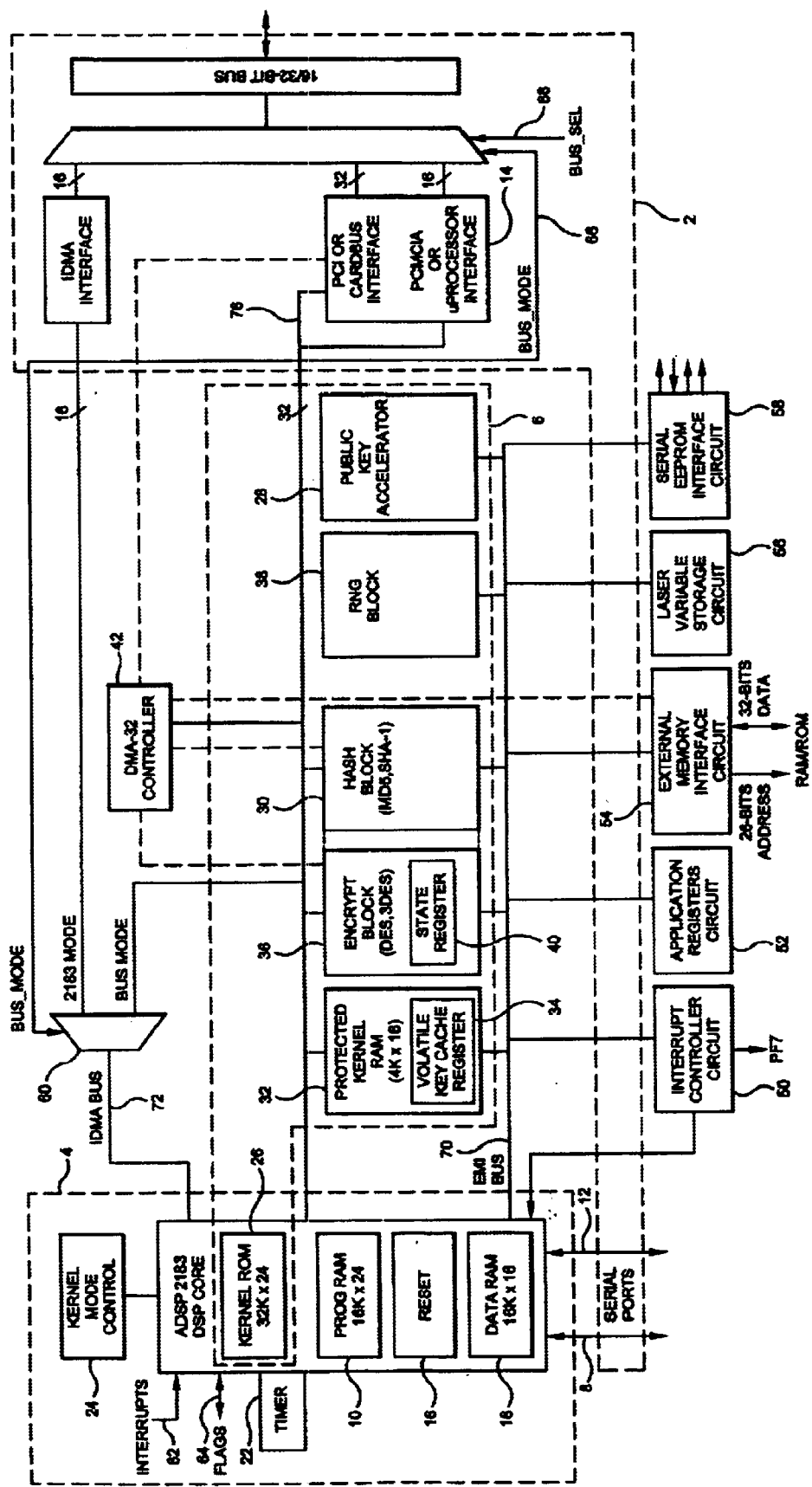
FIG. 1 is a block diagram of the cryptographic co-processor formed in accordance with the present invention.

A block diagram of the cryptographic co-processor hardware formed in accordance with the present invention is illustrated in FIG. 1. The cryptographic co-processor is effectively broken down into three major components: Input/Output (I/O) blocks 2, processor blocks 4 and security blocks 6. Preferably, the co-processor may further include a standard direct memory access (DMA) controller circuit 42, which will be described in greater detail. The Input/Output blocks 2 provide several customized functions that enable the application to gain access outside the cryptographic co-processor. The processor blocks 4 make up the central processing unit and control circuitry used to run and control the overall device. The security blocks 6 implement the security features of the cryptographic co-processor as well as protection schemes.

Like most general purpose DSP platforms, the cryptographic co-processor includes components which provide several Input/Output (I/O) functions. These components include a synchronous serial port 12, a bit I/O circuit 8, and an I/O interface circuit 14 to support Personal Computer Memory Card Industry Association (PCMCIA) standard, or Peripheral Component Interconnect (PCI) interfaces. The IDMA I/O interface circuit 14 is a standard 16 bit interface provided directly on the integrated DSP co-processor. The synchronous serial port 12 is a standard serial port which may be used for serial communications and multiprocessor communications. The synchronous serial port 12 may be used to interface to a coder/decoder (CODEC). The I/O pins 8 are used to control external devices such as analog to digital converters and are used for sensing inputs from external devices (e.g., flow control bits, ring detection).

The processor blocks 4 include a DSP 20, reset control circuit 16 and clock control circuit 22. The DSP 20 used in this embodiment is preferably Part No. 2183 manufactured by Analog Devices Inc. of Norwood, Mass. However, the secure communication platform may be embedded in any standard DSP or other processor. The 2183 DSP provides the necessary processing power (MIPS) and instructions to implement various applications (e.g., V.34 modem, ADSL, 10 Base T Ethernet). The reset control circuit 16 is a standard circuit used to manage the reset of the DSP 20 and/or other hardware blocks tied to the cryptographic co-processor platform. The clock control 22 contains a standard system clock which synchronizes data flow. Standard program random access memory (RAM) 10 and data RAM 18 are included in the DSP for storing application programs and data.

The security portion of the co-processor 6 includes an encryption circuit 36, a random number generator circuit 38, a hardware public key accelerator circuit 28, a secure kernel read only memory (ROM) 26, protected kernel random access memory (RAM) 32, volatile key cache registers 34, hash circuit 30 and kernel mode control circuit 24. It is, of course, understood that the encryption circuit 36, random number generator circuit 38, public key accelerator circuit 28, registers 34, hash circuit 30, mode control circuit 24 and other circuits used in the co-processor may be implemented by discrete components or may be equivalently formed as part of the DSP 20, which may be programmed to provide the functions of these circuits. It should also be noted that the term "circuit" used herein incorporates both hardware and software implemented connotations.

The encryption circuit 36 provides a hardware assisted DES engine. A hardware assisted DES engine is provided because it is faster than a software DES engine, which would require more operations to encrypt and decrypt. The DES engine can be used to implement DES and Triple DES encryption and decryption. Furthermore, it implements four cipher modes: Electronic Code Block (ECB), Cipher Block Chaining (CBC), Cipher Feed Back (CFB), and Output Feed Back (OFB). The DES and Triple DES encrypt/decrypt operations are pipelined and preferably execute full 16-round DES in 4 clock cycles. The DES engine preferably encrypts 64 bits of data at a time and has a separate state register 40 (i.e., the feed-back or initialization vector register) that can be read and written. The state register 40 is important in allowing multiple encryption circuit contexts, thus allowing packet switching. With a writable state register 40, a previous context can be reloaded or a new one created. This minimizes the overhead of changing cryptographic keys and initialization vectors. Hardware circuits are provided for padding insertion, verification and removal which accelerates the encryption operation. A control register is provided to program the algorithm and mode to be used.

The hardware random number generator 38 provides a true, non-deterministic noise for the purpose of generating keys, initialization vectors and other random number requirements. Random numbers are preferably 16 bit words provided to the kernel. The secure kernel requests random numbers as needed to perform requested commands and can directly supply from 1 to 65,535 random bytes to a host application.

The hash circuit 30 provides hardware accelerated SHA-1 and MD5 one-way hash processing. The hash circuit is coupled with the encryption circuit 36 where the combined operation chains both hashing and encrypt/decrypt operations to reduce processing time for data which needs both operations applied. For hash-then-encrypt and hash-then-decrypt operations, the cryptographic co-processor performs parallel execution of both functions from the same source and destination buffers. For encrypt-then-hash and decrypt-then-hash operations, the processing is sequential; however, minimum latency is achieved through the pipeline chaining design. An offset can be specified between the start of hashing and the start of encryption to support certain protocols such as IPsec.

The hardware public key accelerator 28 is provided to support large number addition, subtraction, squaring and multiplication. It operates with the secure kernel to provide full public key services to the application program. The kernel provides macro-level algorithms to perform numerous security functions, such as Diffie-Hellman key agreement, Rivest Shamir Adleman (RSA) encrypt or decrypt and calculate/verify digital signatures. The hardware public key accelerator speeds up the computation intensive operations of the algorithms by providing the mathematical calculations. The secure kernel is embodied as firmware which is mask programmed into a ROM. There are preferably 32K words of kernel ROM 26 available for a cryptographic library and an Application Programming Interface (API).

A kernel mode control circuit 24 is provided for controlling a security perimeter around the cryptographic hardware and software. Because the cryptographic co-processor has a general purpose DSP and a cryptographic co-processor, the device may operate in either a user mode or a kernel mode. In the user mode the kernel space is not accessible, while in the kernel mode it is accessible. When in the kernel mode, the kernel RAM and certain registers and functions are accessible only to the secure kernel firmware. The kernel executes host requested macro level functions and then returns control to the calling application.

The protected kernel RAM 32 provides a secure storage area on the cryptographic co-processor for sensitive data such as keys or intermediate calculations during public key operations. The kernel mode control circuit 24 controls access by only allowing the internal secure kernel mode access to this RAM. A public keyset and a cache of 15 secret keys may be stored in the protected kernel RAM 32. The purpose of having a separate area for volatile key RAM is security related. It isolates the RAM from the application thus making it more difficult to accidentally leak RED (plaintext) key material.

A key feature of the co-processor of the present invention is its universality. First, a manufacturer may substitute the co-processor of the present invention for a conventional digital signal processor (DSP) in the equipment (e.g., modem, cellular phone, etc.) which is being manufactured. The conventional digital signal processor (DSP) does not provide secure communications. However, the co-processor of the present invention performs all of the functions of the conventional DSP but also has the unique capability of providing secure communications.

Secondly, the co-processor of the present invention is also universal in that it provides a library of cryptographic algorithms which may be selected by the manufacturer for use in the digital communications equipment that is being manufactured. The manufacturer may select one or more encryption algorithms or functions (e.g., DES, HASH functions, etc.) for particular use with the equipment being manufactured. The manufacturer uses one or more commands to access the library and select the desired encryption algorithm or function from the library. The advantage of the universal co-processor is that the user does not have to recreate any encryption or hashing or public key algorithms, as they are pre-programmed in the ROM library; all the manufacturer has to do is select whichever algorithm he wishes to use in the encryption or hashing process. Selection of a particular algorithm is facilitated by using a pre-programmed command set which includes a number of encryption, public key and HASH commands. For example, the command CGX-PUBKEY-ENCRYPT refers to a public key encrypt command which is used to encrypt the application's data using an RSA encryption algorithm which is stored in the library. This operation implements encryption or the RSA signature operation using the pubkey member of a public key structure.

These commands are recognized by a microprocessor forming part of the co-processor, which accesses the library and retrieves the particular encryption algorithm, for example, the RSA algorithm, from the library and uses it in the encryption process.

The application software designer selects the encryption and/or HASH functions from the library and thus avoids having to directly communicate with the crypto hardware.

Because the algorithms are mask programmed into the read only memory (ROM) and are on the same platform, i.e., substrate, as the DSP, they are more secure than if they were embodied in pure software.

As mentioned previously, a standard direct memory address (DMA) controller circuit 42 is preferably included within the cryptographic co-processor to facilitate bulk data movements without requiring continuous processor supervision. It preferably allows 32 bit transfers to occur at up to 40 M words per second. The DMA controller circuit 42 is coupled to the input/output section 2 and the security section 6 of the co-processor.

An interrupt controller circuit 50 is coupled to the security blocks 6 and the processor blocks 4. The interrupt controller circuit 50 provides enhancements to the existing interrupt functions in the processor blocks 4. The interrupt controller circuit 50 provides interrupt generation capabilities to the processor blocks 4 or to a standard external host processor. Under programmable configuration control, an interrupt may be generated due to the completion of certain operations such as encryption complete or hash complete.

An application register circuit 52 is coupled to the security blocks 6 and the processor blocks 4. The application register circuit 52 is a set of memory-mapped registers which facilitate communications between the processor blocks 4 and a standard host processor via the PCI or PCMCIA bus. One of the registers is preferably 44 bytes long and is set as a 'mailbox' up to hold a command structure passed between standard host processor and the processor blocks 4. The application register circuit 52 also provides the mechanism which allows the processor blocks 4 and the standard host processor to negotiate which has ownership of the hash block circuit 30 and the encryption block circuit 36.

An external memory interface circuit 54 is coupled to the security blocks 6, the processors blocks 4 and the direct memory address (DMA) controller circuit 42. The external memory interface circuit 54, provides an interface to external memory. The preferred address width is 26 bits wide and the preferred data width is 32 bits wide.

A laser variable storage circuit 56, is coupled to the security blocks 6 and the processor blocks 4. The laser variable storage circuit 56 consists of 256 bits of tamper-proof factory programmed data which is preferably accessible to the processor blocks 4 and the secure kernel. Included in the laser variable bits are: 112-bit local storage variable (master key encryption key), 80-bit randomizer seed, 48-bit program control data (enables/disables various IC features and configures the IC), and 16-bit standard cyclic redundancy check (CRC) of the laser data. The program control data bits (PCDB) preferably includes configuration for permitted key lengths, algorithm enables, red key encryption key loading and internal IC pulse timing characteristics. Some of the PCDB settings may be overridden with a digitally signed token which may be loaded into the cryptographic co-processor when it boots. These tokens are created by the IC manufacturer and each is targeted to a specific IC, using a hash of its unique identity (derived from the above laser variable).

A serial electrically erasable programmable read-only memory (EEPROM) interface circuit 58 is coupled to the security blocks 6 and the processor blocks 4. The serial EEPROM interface circuit 58 is used to allow an external non-volatile memory to be connected to the cryptographic co-processor for the purpose of storing PCI or PCMCIA configuration information (plug and play), as well as general purpose non-volatile storage. For example, encrypted (black) keys could be stored into EEPROM for fast recovery after a power outage.

The cryptographic co-processor may be integrated into a wide variety of systems, including those which already have a processor and those which will use the cryptographic co-processor as the main processor. The cryptographic co-processor and more specifically the input/output blocks 2, can be configured to one of three host bus modes: IDMA 72, PCI 76 or PCMCIA 76. All three of these interface modes are industry standards. A bus mode input 66 and a bus select input 68 is coupled to the input/output blocks 2 for selecting the mode.

The bus mode input 66 is also coupled to a multiplexing circuit 60. The multiplexing circuit 60 is a standard multiplexing circuit used to select between one of the three host bus modes (IDMA, PCI, PCMCIA).

An external memory interface (EMI) 70 is a standard memory interface used to interface with external devices. This interface is coupled to the processor block 4.

An interrupt input circuit 62 is coupled to the processor blocks 4. The interrupt input circuit 62 is a standard interrupt input circuit provided for the use by external devices. A standard flag input/output circuit 64 is also coupled to the processor blocks 4.

The master key (LSV) is intended to be different on each chip. Therefore, it is not mask-programmed. Mask programming is done with lithography which affects the artwork of the integrated circuit. Since no two chips should have the same LSV, the LSV is preferably programmed into a memory of the chip by laser trimming. Laser trimming is advantageous in that each die may be fabricated with a different LSV so that each cryptographic co-processor is individualized with a particular LSV.

The following is a detailed description of the cryptographic co-processor taken from a User's Manual prepared by the assignee and owner of the invention, Information Resource Engineering, Inc. (IRE). The cryptographic co-processor is often referred to herein by the trademark 'CryptIC'. The co-processor is also often referred to by part number ADSP 2141. The following includes a description of each of the major subsystems within the CryptIC co-processor, including complete register details.

GENERAL DESCRIPTION

It can be seen from FIG. 1A that the ADSP 2141 CryptIC is a highly integrated Security Processor ASIC which incorporates a sophisticated, general purpose DSP, along with a number of high-performance Cryptographic function blocks, as well as a PCI, PCMCIA and Serial EEPROM interface. It is fabricated in $0.35\mu$ CMOS triple-layer metal technology utilizing a 3.3V Power Supply. It is initially available in a 208-pin MQFP package with a Commercial (0°–70° C.) Temperature Range. A 208-pin TQFP package will follow.

DSP Core

The DSP Core is a standard Analog Devices ADSP-2183 with full ADSP-2100 family compatibility. The ADSP-2183 combines the base DSP components from the ADSP-2100 family with the addition of two serial ports, a 16-bit Internal DMA port, a Byte DMA port, a programmable timer, Flag I/O, extensive interrupt capabilities, and on-chip program and data memory. The External Memory Interface of the 2183 has been extended to support up to 64M-words addressing for both Program and Data memory. Some core enhancements have been added in the CryptIC version, including on-chip Security ROM and Interrupt functions.

Refer to the Analog Devices ADSP-2183 Rev B datasheet for further information. (Available in Adobe Acrobat format at:

http://www.analog.com/pdf/ADSP_2183.pdf)

Secure Kernel (Firmware)

The Secure Kernel is embodied as firmware which is mask-programmed into ROM within the DSP, thus rendering it tamper-proof The Kernel provides the API (Application Programming Interface) to applications which require security services from the CryptIC. Those applications may be software executing in the 'User Mode' on the DSP, or they may be external 'Host' software accessing the CryptIC via a PCI or PCMCIA bus. Approximately 40 Crypto commands—called CGX (CryptoGraphic extensions)—are provided at the API and a simple Control Block structure is used to pass arguments into the secure Kernel and return Status.

The Secure Kernel firmware runs under a 'Protected Mode' state of the DSP as described below in section 0. This guarantees the security integrity of the system during the execution of Kernel processes and, for example, prevents disclosure of Cryptographic Key data or tampering with a security operation.

Kernel Mode Control

The Kernel Mode Control block is responsible for enforcing the 'Security Perimeter' around the cryptographic functions of the CryptIC. The device may either be operating in 'User Mode' (Kernel Space is not accessible) or 'Kernel Mode' (Kernel Space is accessible) at a given time. When in the Kernel mode, the Kernel RAM and certain protected Crypto registers and functions (Kernel Space) are accessible only to the Secure Kernel firmware. The Kernel executes Host-requested Macro-level functions and then returns control to the calling application. The Kernel Mode Control hardware subsystem will reset the DSP should any security violation occur, such as attempting to access a protected memory location while in User mode. (A readable register reports the memory address of the violation for debug purposes.)

Protected Kernel RAM

The 4K×16 Kernel RAM provides a secure storage area on the CryptIC for sensitive data such as Keys or intermediate calculations during Public Key operations. The Kernel Mode Control block (above) enforces the protection by only allowing internal Secure Kernel Mode accesses to this RAM. A Public Keyset and a cache of up to 15 Secret keys may be stored in Kernel RAM. Secure Key storage may be expanded to 700 Secret Keys by assigning segments of the ADSP2183 internal Data RAM to be 'Protected'. This is accomplished via a CGX_INIT command argument.

Encrypt Block

The Encrypt Block performs high-speed DES and Triple DES encrypt/decrypt operations. All 4 standard modes of DES are supported: Electronic Code Book (ECB), Cipher Block Chaining (CBC), 64-bit Output Feedback (OFB) and 1-bit, 8-bit and 64-bit Cipher Feedback (CFB). The DES encrypt/decrypt operations are highly pipelined and execute full 16-round DES in only 4 clock cycles. Hardware support for Padding insertion, verification and removal further accelerates the encryption operation. Context Switching is provided to minimize the overhead of changing crypto Keys and IV's to nearly zero.

Hash Block

The Secure Hash Block is tightly coupled with the Encrypt Block and provides hardware accelerated one-way Hash functions. Both the MD-5 and SHA-1 algorithms are supported. Combined operations which chain both Hashing and Encrypt/Decrypt functions are provided in order to significantly reduce the processing time for data which needs both operations applied. For Hash-then-Encrypt and Hash-then-Decrypt operations, the CryptIC can perform parallel execution of both functions from the same source and destination buffers. For Encrypt-then-Hash and Decrypt-then-Hash operations, the processing must be sequential, however minimum latency is still provided through the pipeline chaining design. An Offset may be specified between the start of Hashing and the start of Encryption to support certain protocols such as IPsec, and 'Mutable bit' handling is provided in hardware.

Random Number Generator (RNG) Block

The hardware Random Number Generator provides a true, non-deterministic noise source for the purpose of Generating Keys, Initialization Vectors (IV's), and other random number requirements. Random numbers are provided as 16-bit words to the Kernel. The Security Kernel requests Random Numbers as needed to perform requested CGX commands such as CGX_Gen Key, and can also directly supply from 1 to 65,535 Random Bytes to a host application via the CGX_Random CGX command.

Public Key Accelerator

The Public Key Accelerator module works in concert with the CGX Secure Kernel firmware to provide full Public Key services to the host application. The CGX Kernel provides Macro-level library functions to perform Diffie-Hellman Key Agreement, RSA Encrypt or Decrypt, Calculate and Verify Digital Signatures, etc. The hardware accelerator block speeds the computation-intensive operations such as 32×32 multiply, 32-bit adds/subtracts, Squaring, etc.

PCMCIA/☐Processor Interface

A standard 16-bit PCMCIA interface is provided directly on the CryptIC. This interface may also be used in certain applications as a generic 16-bit ☐Processor Interface.

PCI/Cardbus Interface

A full 66/33 MHz PCI v2.1 bus interface has been added to the core DSP functions. The 32-bit PCI interface supports both Bus Master and Target modes. The CryptIC is capable of using DMA to directly access data on other PCI entities and pass that data through its Encryption/Hash engines.

32-Bit DMA Controller

The CryptIC incorporates a high-performance 32-bit DMA controller which can be set-up to efficiently move data between Host PCI memory, the Hash/Encrypt blocks, and/or External Memory. The DMA controller can be used with the PCI bus in Master mode, thus autonomously moving 32-bit data with minimal DSP intervention. Up to 255 long words (1020 bytes) can be moved at a time.

Application Registers

The Application Registers are a set of memory-mapped registers which facilitate communications between the CryptIC DSP and a Host processor via the PCI or PCMCIA bus. One of the Registers is 44 bytes long and is set-up to hold the CGX command structure passed between the Host and DSP processors. The Application Registers also provide the mechanism which allows the DSP to arbitrate whether it or the DMA controller (Host) has ownership of the External Memory interface.

Serial EEPROM Interface

The Serial EEPROM interface is used to allow an external non-volatile memory to be connected to the CryptIC for the purpose of storing PCI or PCMCIA configuration information (Plug and Play), as well as general-purpose non-volatile storage. For example, encrypted (Black) Keys or a digital certificate could be stored into EEPROM for fast recovery after a power outage.

Interrupt Controller

The Security Block Interrupt Controller provides enhancements to the existing Interrupt Functions in the ADSP 2183 core. Primarily, the Interrupt Controller provides a new Interrupt Generation capability to the DSP or to an external Host Processor. Under programmable configuration control, a 'Crypto Interrupt' may be generated due to completion of certain operations such as Encrypt Complete, Hash Complete, etc. The interrupt may be directed either at the DSP core, or provided on an output line (PF7) to a Host subsystem.

Laser Variable Storage

The Laser Variable Storage consists of 256 bits of Tamper-Proof Factory programmed data which is only accessible to the internal function blocks and the Security Kernel. Included in these Laser Variable bits are:

112-bit Local Storage Variable (Master Key-Encryption-Key)
80-bit Randomizer Seed
48-bits Program Control Data (Enables/Disables various IC features and configures the IC)
16-bit CRC of the Laser Data The Program Control Data (PCD) bits include configuration for permitted Key Lengths, Algorithm Enables, Red KEK loading, Internal IC Pulse Shaping Characteristics, etc. Some of the PCD settings may be overridden with a Digitally Signed Token which may be loaded into the CryptIC when it boots. These Tokens are created by IRE and each is targeted to a specific CryptIC using a Hash of its unique identity (derived from the above Laser Variable).

Downloadable Secure Code

The CryptIC is designed to allow additional Security Functions to be added to the device through a Secure Download feature. Up to 16 k words of code may be downloaded into internal memory within the DSP and this code can be given the security privileges of the Kernel firmware. All downloaded firmware is authenticated with a Digital Signature and verified with an on-chip Public Key. Additional functions could include new Encryption, Hash or Public Key algorithms such as IDEA, RC-4, RIPEMD, Elliptic Curve, etc.

Memory Configuration

The CryptIC provides a large amount of on-chip 0 wait-state RAM, a block of mask-programmed ROM and also provides an external memory bus interface in order to allow a considerable expansion using off-chip devices. The on-chip RAM consists of three separate groups: 16 k×24 of Internal Program RAM, 16 k×16 of Internal Data RAM, and 4 k×16 of Kernel RAM.

Memory Map

The CryptIC memory map is very similar to that of the ADSP 2183, except that it includes significantly more Off-Chip memory addressing, and has additional Crypto Registers which are accessible to the User. The CryptIC memory maps are shown in FIGS. 2–4 of the drawings.

The PMOVLAY register is responsible for selecting 8 k-word 'Pages' of upper Program Memory, as shown in the table below.

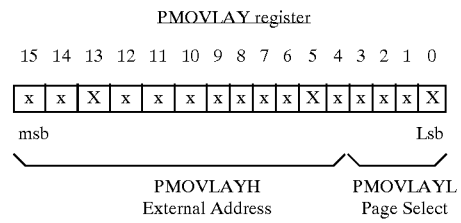

The 4 lsb's (bits 3:0) are interpreted as follows:

| | | |
|---|---|---|
| 1111 | F | Kernel ROM 0 (Base Page) |
| 1110 | E | Kernel ROM 1 |
| 1101 | D | Kernel ROM 2 |
| 1100 | C | Kernel ROM 3 (Top) |
| 1011 | B | reserved |
| . | . | . |
| . | . | . |
| . | . | . |
| 0011 | 3 | reserved |
| 0010 | 2 | External RAM Odd Pages |
| 0001 | 1 | External RAM Even Pages |
| 0000 | 0 | Internal RAM |

The 12 msb's (bits 15:4) are mapped to the most-significant external address pins on the CryptIC (addr 25:14).

Thus, to address Kernel ROM page 1, the PMOVLAY register should be set to 0x000E (although the uppermost 12 bits are ignored in this case). To address External memory page 38, the PMOVLAY register should be set to 0x0131 (0x013 are the 12 msb's representing pages 38 & 39 and a 1 in the least-significant nibble indicates External even page).

The DMOVLAY register is responsible for selecting 8 k-word 'Pages' of lower Data Memory, as shown in the table below.

DMOVLAY register

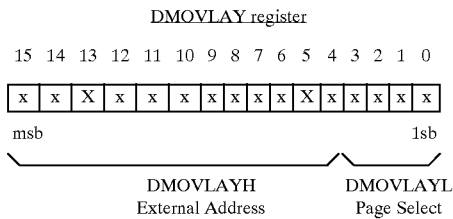

The 4 lsb's (bits 3:0) are interpreted as follows:

| | |
|---|---|
| 1111 | Kernel RAM and Kernel Registers |
| 1110 | reserved |
| 1101 | reserved |
| . | . |
| . | . |
| . | . |
| 0011 | reserved |
| 0010 | External RAM Odd Pages |
| 0001 | External RAM Even Pages |
| 0000 | Internal RAM |

The 12 msb's (bits 15:4) are mapped to the most-significant external address pins on the CryptIC (addr 25:14).

Thus, to address the Kernel RAM/Crypto Registers page, the DMOVLAY register should be set to 0x000F (although the uppermost 12 bits are ignored in this case). To address External memory page 159 (decimal), the DMOVLAY register should be set to 0x04F2 (0x04F are the 12 msb's representing pages 158 & 159 and a 2 in the least-significant nibble indicates External odd page).

Register Set

The CryptIC contains a number of additional registers (beyond those in a ADSP 2183) which are mapped into the ADSP 2183's external data memory space. Some of the Registers are intended to be accessed only by the Secure Kernel and are referred to as Protected Registers (Table 2 below). (In some cases, designers may require features of the CryptIC which are only available in Protected Registers.) The Registers which are accessible either to the DSP running in the User mode or to an outside PCI/PCMCIA Bus entity are referred to as Unprotected Registers and are listed Table 1 below.

All of the Protected Registers are memory-mapped in the Data Memory space of the DSP at 0x1000–0x17FF. The Unprotected registers reside at 0x1800–0x1FFF. The DMOVLAY register must be set to 0x000F to access these registers. From the Host perspective, the base register address in the PCI/PCMCIA space is set by the BASEADDR register.

Note that although the DSP cannot directly read 32-bit registers, it can perform a 32-bit DMA operation from a 32-bit register into its own external memory space. See section on 32-bit DMA Controller, described under a main heading below.

In the table below, 16-bit address refers to the DSP and 32-bit address refers to PCI host.

TABLE 1

CryptIC Unprotected Register Set
UNPROTECTED REGISTERS

| ADDRESS (16 BIT) | ADDRESS (32 BIT) | REGISTER NAME | R/W | Reset Default | DESCRIPTION |
|---|---|---|---|---|---|
| APPLICATION REGISTERS | | | | | |
| 0x1880–0x1895 | 0x0000-2B | CGX Command | R/W | | 44-byte CGX command register |
| 0x18A0 | 0x0040–41 | Status | R | 0x0000 | Application status |
| 0x18A1 | 0x0042–43 | Lock | R/W | | DSP/Host lock control |
| 0x18A2 | 0x0044–47 | Misc Status | R/W | | Miscellaneous status bits: DSP <–> host |
| 0x18A3 | N/A | Select Delay | R/W | | Delay configuration for memory pulse generation |
| 0x18A4 | N/A | Hash/Encrypt Byte Enable | R/W | | Byte enables for data R/W to Hash/Encypt block |
| 0x18A5 | N/A | Reset Violation Memtype/Addr | R | 0x0000 | Holds the memory type and Address of the last protection violation-induced Reset |
| 0x18A6 | 0x004C–4F | Extmem Config | R/W | | External memory configuration |
| DMA & PCI REGISTERS | | | | | |
| DSP-Visible Registers: | | | | | |
| 0x1840 | N/A | Host Address [15:0] | R/W | | Lower 16-bits of Host Address |
| 0x1841 | N/A | Host Address [31:16] | R/W | | Upper 16-bits of Host Address |
| 0x1842 | N/A | Local Address [15:0] | R/W | | Lower 16-bits of Local Address |
| 0x1843 | N/A | Local Address [31:16] | R/W | | Upper 16-bits of Local Address |
| 0x1844 | N/A | Command | R/W | | Command |
| 0x1845 | N/A | Status/Config. | R/W | | Status/Configuration Register |
| 0x1846 | N/A | PCI Core Status/Config. | R/W | | Status/Configuration for PCI core |
| 0x1847 | N/A | PCI Extmem Status | R | | PCI External Memory Status |

TABLE 1-continued

CryptIC Unprotected Register Set
UNPROTECTED REGISTERS

| ADDRESS (16 BIT) | ADDRESS (32 BIT) | REGISTER NAME | R/W | Reset Default | DESCRIPTION |
|---|---|---|---|---|---|
| PCI Host-Visible Registers: | | | | | |
| N/A | 0x00C0–C3 | PCI Target Page | R/W | | Target Page specifier when CryptIC External Memory is Target |
| N/A | 0x00C4–C7 | PCI Target Read Count | R/W | | Maximum number of dwords for Target Read Transfer |
| N/A | 0x00C8–CB | Endian | R/W | | Big/Little Endian select |
| PCMCIA Host-Visible Registers: | | | | | |
| N/A | 0x00C0–C1 | DMA Address | R/W | | DMA address register |
| N/A | 0x00C4–C5 | Start/Stop DMA | R/W | | DMA control |
| N/A | 0x00C8–CB | Endian | R/W | | Big/Little Endian select |
| HASH/ENCRYPT REGISTERS | | | | | |
| Configuration Registers: | | | | | |
| Protected | 0x0200 | H/E control | R/W | 0x0000 | Hash/Encrypt block control word |
| Protected | 0x021E | Pad control | R/W | 0x0000 | Pad control word |
| Protected | 0x0220–0223 | Length | R/W | 0x0000 | 32-bit data length, in bytes |
| Protected | 0x0224 | Offset | R/W | 0x0000 | Offset, (0 to 15 in dwords), from start of hash (encryption) to start of encryption (hash) |
| Protected | 0x0226 | Control | R/W | 0x0007 | Operation control. |
| Protected | 0x0228 | Consume Pad | W | | Command to consume final pad block |
| Status Registers: | | | | | |
| 0x1016 | 0x022C | Pad Status 0 | R | | Decrypted next header byte, # Pad bytes, Context 0 |
| 0x1017 | 0x022E | Pad Status 1 | R | | Decrypted next header byte, # Pad bytes, Context 1 |
| Protected | 0x0230 | GeneralStatus | R | | Status result from Hash/Encrypt operation |
| Protected | 0x0232 | ControlReady | R | | 1 = input ready for new control word, 0 = not ready |
| Protected | 0x0234 | DataReady | R | | 1 = input ready for data FIFO, 0 = not ready |
| Protected | 0x0236 | StatFreeBytes | R | | Number free input bytes in crypto FIFO (in 64-bit blocks) |
| Protected | 0x0238 | StatOutBytes | R | | Number output bytes ready in crypto FIFO (in 64-bit blocks) |
| Context 0 Registers: | | | | | |
| Protected | 0x0240–0247 | Key3_0 | W | | Key 3, for Triple DES: Crypto Context 0 |
| Protected | 0x0248–024F | Key2_0 | W | | Key 2, for Triple DES: Crypto Context 0 |
| Protected | 0x0250–0257 | Key1_0 | W | | Key 1, for Triple DES or DES: Crypto Context 0 |
| Protected | 0x0258–025F | Salt_0 | W | | IV for key decryption: Crypto Context 0 |
| Protected | 0x0260–0267 | IV_0 | R/W | | IV for data encrypt/decrypt: Crypto Context 0 |
| Protected | 0x0268–027B | Digest 0 | R/W | | (Inner) Digest: Crypto Context 0 |
| Protected | 0x027C–028F | OuterDigest_0 | W | | Outer Digest: Crypto Context 0 |
| Protected | 0x0290–0293 | HashByteCnt_0 | R/W | | Starting byte count, for hash resume: Crypto Context 0 |
| Context 1 Registers: | | | | | |
| Protected | 0x02A0–02A7 | Key3_1 | W | | Key 3, for Triple DES: Crypto Context 1 |
| Protected | 0x02A8–02AF | Key2_1 | W | | Key 2, for Triple DES: Crypto Context 1 |
| Protected | 0x02B0–02B7 | Key1_1 | W | | Key 1, for Triple DES or DES: Crypto Context 1 |
| Protected | 0x02B8–02BF | Salt_1 | W | | IV for key decryption: Crypto Context 1 |
| Protected | 0x02C0–02C7 | IV_1 | R/W | | IV for data encrypt/decrypt: Crypto Context 1 |

TABLE 1-continued

CryptIC Unprotected Register Set
UNPROTECTED REGISTERS

| ADDRESS (16 BIT) | ADDRESS (32 BIT) | REGISTER NAME | R/W | Reset Default | DESCRIPTION |
|---|---|---|---|---|---|
| Protected | 0x02C8–02DB | Digest_1 | R/W | | (Inner) Digest: Crypto Context 1 |
| Protected | 0x02D0–02EF | OuterDigest_1 | W | | Outer Digest: Crypto Context 1 |
| Protected | 0x02F–02F3 | HashByteCnt_1 | R/W | | Starting byte count, for hash resume: Crypto Context 1 |

Data In/Out FIFOs:

| | | | | | |
|---|---|---|---|---|---|
| Protected | 0x0380 | Data FIFO | R/W | | FIFO: Data In/Data Out |

INTERRUPT CONTROLLER REGISTERS

DSP-Visible Registers:

| | | | | | |
|---|---|---|---|---|---|
| 0x1800 | N/A | DSP Unmasked Status | R | | Interrupt source current states - Prior to mask |
| 0x1801 | N/A | DSP Masked Statu | R | | Interrupt source current states - Post mask |
| 0x1801 | N/A | DSP Clear Int | W | | Clear selected Interrupt |
| 0x1802 | N/A | DSP Mask Control | R/W | | Interrupt mask register |
| 0x1803 | N/A | DSP Int Config. | R/W | | DSP Interrupt configuration register |
| 0x1804 | N/A | Force Host Int | W | | Force interrupt to Host (PCI/PCMCIA) |
| 0x1805 | N/A | H/E Error Code | R | | Provides the H/E Error Code |

Host-Visible Registers:

| | | | | | |
|---|---|---|---|---|---|
| N/A | 0x0080–0081 | Host Unmasked Status | R | | Interrupt source current states - Prior to mask |
| N/A | 0x0084–0085 | Host Masked Statu | R | | Interrupt source current states - Post mask |
| N/A | 0x0084–0085 | Host Clear Int | W | | Clear selected interrupt |
| N/A | 0x0088–0089 | Host Mask Control | R/W | | Interrupt mask register |
| N/A | 0x008C–008D | Host Int Config. | R/W | | Host interrupt configuration register |
| N/A | 0x0090–0091 | Force DSP Int | W | | Force interrupt to DSP |
| N/A | 0x0094–0095 | H/E Error Code | R | | Provides the H/E Error Code |

IDMA INTERFACE REGISTERS

Host-Visible Registers:

| | | | | | |
|---|---|---|---|---|---|
| N/A | 0x00A0–A1 | IDMA Indirect Address | W | | Address latch for IDMA Indirect transfers |
| N/A | 0x00A4–A5 | IDMA Config | R/W | | IDMA Configuration (Direct or Indirect) |
| N/A | 0x8000-FFFF | IDMA Data | R/W | | 32K IDMA Data Range |

SERIAL EEPROM REGISTERS

| | | | | | |
|---|---|---|---|---|---|
| 0x1900 | N/A | Device ID | R/W | | 16-bit PCI device ID |
| 0x1901 | N/A | Vendor ID | R/W | | 16-bit PCI vendor ID (11D4h) |
| 0x1902 | N/A | Rev ID/Class | R/W | | 8-bit chip Revision ID, 8-bits of PCI Class Code |
| 0x1903 | N/A | Class Code | R/W | | remaining 16-bits of PCI Class Code |
| 0x1904 | N/A | Header Type/Int | R/W | | PCI header type & Interrupt Pin |
| 0x1905 | N/A | Subsystem ID | R/W | | 16-bit PCI Subsystem ID |
| 0x1906 | N/A | Subsystem Vendor ID | R/W | | 16-bit Subsystem Vendor ID |
| 0x1907 | N/A | Max Lat, Min Gnt | R/W | | Maximum Latency, Min Grant parameters |
| 0x1908 | N/A | Cardbus1 | R/W | | lower 16-bits of Cardbus CIS pointer |
| 0x1909 | N/A | Cardbus2 | R/W | | upper 16-bits of Cardbus CIS pointer |
| 0x190A | N/A | Baddr mask1 | R/W | | Specifies 1 = modifiable 0 = our addresses |
| 0x190B | N/A | Baddr mask2 | R/W | | Upper 16 bits |
| 0x190C | N/A | CIS Size | R/W | | CIS Size spec 16-bit (Upper 8 bits are 0) |
| 0x190F | N/A | Cmd/Status | R/W | | EEPROM Command and Status Register |

TABLE 2

CryptIC Protected Register Set
PROTECTED REGISTERS

| ADDRESS (16 BIT) | REGISTER NAME | R/W | Reset Default | DESCRIPTION |
|---|---|---|---|---|
| | | HASH/ENCRYPT REGISTERS | | |
| Configuration Registers: | | | | |
| 0x1000 | H/E control | R/W | 0x0000 | Hash/Encrypt block control word |
| 0x100F | Pad control | R/W | 0x0000 | Pad control word |
| 0x1010–1011 | Length | R/W | 0x0000 | 32-bit data length, in bytes |
| 0x1012 | Offset | R/W | 0x0000 | Offset, (0 to 15 in dwords), from start of hash (encryption) to start of encryption (hash) |
| 0x1013 | Control | R/W | 0x0007 | Operation control. |
| 0x1014 | Consume Pad | W | | Command to consume final pad block |
| Status Registers: | | | | |
| 0x1016 | Pad Status 0 | R | | Decrypted next header byte, # Pad bytes, Context 0 |
| 0x1017 | Pad Status 1 | R | | Decrypted next header byte, # Pad bytes, Context 1 |
| 0x1018 | GeneralStatus | R | | Status result from Hash/Encrypt operation |
| 0x1019 | ControlReady | R | | 1 = input ready for new control word, 0 = not ready |
| 0x101A | DataReady | R | | 1 = input ready for data FIFO, 0 = not ready |
| 0x101B | StatFreeBytes | R | | Number free input bytes in crypto FIFO (in 64-bit blocks) |
| 0x101C | StatOutBytes | R | | Number output bytes ready in crypto FIFO (in 64-bit blocks) |
| Context 0 Registers: | | | | |
| 0x1020–1023 | Key3_0 | W | | Key 3, for Triple DES: Crypto Context 0 |
| 0x1024–1027 | Key2_0 | W | | Key 2, for Triple DES: Crypto Context 0 |
| 0x1028–102B | Key1_0 | W | | Key 1, for Triple DES or DES: Crypto Context 0 |
| 0x102C–102F | Salt_0 | W | | IV for key decryption: Crypto Context 0 |
| 0x1030–1033 | IV_0 | R/W | | IV for data encrypt/decrypt: Crypto Context 0 |
| 0x1034–103D | Digest_0 | R/W | | (Inner) Digest: Crypto Context 0 |
| 0x103E–1047 | OuterDigest_0 | W | | Outer Digest: Crypto Context 0 |
| 0x1048–1049 | HashByteCnt_0 | R/W | | Starting byte count, for hash resume: Crypto Context 0 |
| Context 1 Registers: | | | | |
| 0x1050–1053 | Key3_1 | W | | Key 3, for Triple DES: Crypto Context 1 |
| 0x1054–1057 | Key2_1 | W | | Key 2, for Triple DES: Crypto Context 1 |
| 0x1058–105B | Key1_1 | W | | Key 1, for Triple DES or DES: Crypto Context 1 |
| 0x105C–105F | Salt_1 | W | | IV for key decryption: Crypto Context 1 |
| 0x1060–1063 | IV_1 | R/W | | IV for data encrypt/decrypt: Crypto Context 1 |
| 0x1064–106D | Digest_1 | R/W | | (Inner) Digest: Crypto Context 1 |
| 0x106E–1077 | OuterDigest_1 | W | | Outer Digest: Crypto Context 1 |
| 0x1078–1079 | HashByteCnt_1 | R/W | | Starting byte count, for hash resume: Crypto Context 1 |
| Data In/Out FIFOs: | | | | |
| 0x10C0 | Data FIFO | R/W | | FIFO: Data In/Data Out |
| | | KEY MANAGEMENT REGISTERS | | |
| 0x1180 | RAM control | R/W | | Selects the current KRAM owner: DSP, PK, DMA |
| 0x1181 | PM Reserve | R/W | | Selects 1kword segments of PM to 'Protect' into Kernel |
| 0x1182 | DM Reserve | R/W | | Selects 1kword segments of DM to 'Protect' into Kernel |
| 0x1183 | KM RAM Reserve | R/W | | Selects 256-byte segments of KM to 'Protect' into Kernel |
| 0x1184 | Hash/Enc Control | R/W | | Selects owner of H/E block: DSP or Host |
| 0x1185 | Reset Control | R/W | | Allows internal reset of H/E, PK, RNG |

Bus Interfaces

The CryptIC supports multiple bus interfaces in order to allow it to be integrated into a wide variety of host systems. These buses are:
Host Processor bus
  PCI (also Cardbus)—or—
  PCMCIA—or—
  2183 IDMA
External Memory Interface (EMI) bus
These buses will be described in the following sections.

Host Bus Mode Selection

The CryptIC Host Bus may be configured for one of 4 personalities: ADSP 2183 Compatible IDMA Mode, IDMA Enhanced Mode, PCI Bus Mode, or PCMCIA Bus Mode. The selection of mode is made with 2 Hardware control inputs BUS_MODE and BUS_SEL at boot time.

TABLE 3

Bus Mode Selection

| Bus Mode ☐ Pins ☐ | BUS_MODE | BUS_SEL |
|---|---|---|
| 2183 IDMA Compatible Mode | 0 | 0 |
| 2183 IDMA Enhanced Mode | 0 | 1 |
| PCI Bus Mode | 1 | 0 |
| PCMCIA Bus Mode | 1 | 1 |

A number of pins on the CryptIC are internally multiplexed in order to change bus personalities. Refer to the CryptIC Datasheet for details.

This selection may not be changed after the CryptIC comes out of power-up Reset. It is typically expected that the Bus Mode signals are tied to ground or $V_{DD}$ on the PC Board.

PCI/Cardbus Host Processor Bus

When the CryptIC is configured for the PCI host bus mode, the Multiplex bus pins become personalized to directly connect to a 3.3V PCI local bus. The PCI core on the CryptIC is compliant with version 2.1 of the standard and supports a 32-bit wide bus. The PCI clock speed may be run from 10 MHz to 66 MHz.

PCI Interface Specifications

The CryptIC's PCI 'core' meets the following specifications:
  PCI Version 2.1
  Target/Master transfer capability
  Configuration Space Read/Write
  Memory Mode Read/Write—Single word or Burst transfer
  Abort and auto re-try
The PCI interface does NOT support the following:
  I/O Mode Read/Write
  Fast Back-to-Back transactions
  Memory Write Invalidate operations
PCI Address Map As shown in FIG. 5, the CryptIC appears on the PCI Bus as a single contiguous memory space of 128 k bytes.

The CryptIC presents a 17 bit [16:0] address interface as a PCI Target. Inbound PCI address bits [31:17] are decoded by the CryptIC PCI core to determine whether or not the PCI access matches the PCI Memory Base Address Register, thus determining whether the access is to the CryptIC or not. However, bits [31:17] are not reflected in the CryptIC register addresses.

Once the CryptIC's PCI address has been decoded, the next most significant address bit, [A16], determines whether the lower 16 address bits should be decoded as an internal CryptIC register/memory address or reflected to the CryptIC 's external memory interface. If address bit 16 is 0, the 16 lsb's are interpreted as CryptIC internal register/memory address bits. If address bit 16 is 1, the 16 lsb's [A15–A0] are combined with the 11-bit page designator in the PCI Target Page Register to form the external memory address. The PCI Target Page register is addressable by the Host through the PCI Interface and specifies the 11 upper address bits for PCI transfers from/to external memory. See section on PCI Target Page Register (TARGADCNT) described further below.

PCI Target Mode Transfers

As a PCI Target entity, the CryptIC provides memory-mapped or I/O-mapped access to its 'unprotected' memory and register space. This includes read/write access through the CryptIC to the external memory connected to the EMI bus.

For all Target mode transfers, the CryptIC DMA engine is called upon to perform the data movements inside the CryptIC between the PCI core and the desired memory or register location(s). This DMA action is automatic and the initiating PCI entity is unaware of the DMA participation in the transfer. It is important however to note the DMA's target transfer role as it effects other DSP-initiated DMA operations. Since Target transfers initiated from other PCI entities are typically unaware of other DMA activities occurring within the CryptIC, the DMA arbiter gives precedence to Target DMA transfers. A DMA transfer in-process will not be preempted, however any pending DSP-inititated DMA will be deferred until after all Target transfers have been completed. (A status register in the DMA controller allow the DSP to determine whether it has seized the controller or whether a Target transfer is running.) Refer also to 0 for more information on the DMA controller.

In addition, in order for Target transfers to occur to/from External Memory, the DSP must grant ownership of the External Memory bus to the DMA engine. If the Ext. mem. bus is not granted, then the data written to External memory will be lost and a read will return invalid data. See section 0 for more information.

PCI Target transfers to/from the CryptIC may in some cases experience a timeout abort and re-start due to latencies in the PCI core FIFO's, address/data setup times, memory wait-states, etc. These are more likely to occur with reads than writes due to the 'round-trip' nature of a read. In fact, if writes are kept to 8 dwords or fewer, then timeout aborts can be avoided, since the PCI core write FIFO (12 dwords) can store the written data until it can be DMA'ed to its destination within the CryptIC.

The interaction of the clock speeds of the PCI bus and of the CryptIC core must also be considered. Ideally, the CryptIC core clock should be equal to or faster than the PCI bus clock in order to allow it to unload incoming PCI data at least as fast as it arrives. If this is the case, then only IDMA transfers or transfers to external memory with >1 wait state will result in PCI timeout aborts for transfers >8 dwords.

PCI Master Mode Transfers

The CryptIC can use PCI Master Mode transfers for the most efficient transfer of data into or out of the device. Master mode transfers are always performed under control of the DSP. Refer also to 0 for more information on the DMA controller.

PCI Core Configuration Registers

As viewed from the PCI Host perspective, the 256-byte PCI configuration space is defined below in Table 4. The fields marked xxxxxxxx are 'don't cares'. Shaded fields are read-only registers and are loaded from the serial EEPROM connected to the CryptIC.

internal memory space. These areas include: Internal Data Memory (DM) and Internal Program Memory (PM). Since PM is 24-bits wide, two IDMA cycles are required to access it. IDMA transfers are implemented using cycle-stealing from the CryptIC's internal DSP processor. Note that the CryptIC supports optional memory locking of 1 kword slices

TABLE 4

PCI Configuration Registers

| 31 | | 16 | 15 | | 0 | Addr. |
|---|---|---|---|---|---|---|
| | Device ID | | | Vendor ID | | 00h |
| Status | | | Command | | | 04h |
| | Class Code | | | | Revision ID | 08h |
| BIST | Header Type | | Master Latency Timer | | Cacheline Size | 0Ch |
| I/O Base Address | | | | | | 10h |
| Memory Base Address | | | | | | 14h |
| Reserved (Dual Base) | | | | | | 18h |
| Reserved | | | | | | 1Ch |
| Xxxxxxxx | Xxxxxxxx | | xxxxxxxx | | xxxxxxxx | 20h |
| Xxxxxxxx | Xxxxxxxx | | xxxxxxxx | | xxxxxxxx | 24h |
| Xxxxxxxx | Xxxxxxxx | | xxxxxxxx | | xxxxxxxx | 28h |
| | Subsystem ID | | | Subsystem Vendor ID | | 2Ch |
| Xxxxxxxx | Xxxxxxxx | | xxxxxxxx | | xxxxxxxx | 30h |
| Reserved | | | | | | 34h |
| Reserved | | | | | | 38h |
| Max_Lat | Min_Gnt | | Interrupt Pin | | Interrupt Line | 3Ch |
| Reserved | | | Retry Timeout Value | | TRDY Timeout Value | 40h |
| Reserved | | | | | | 44h-FFh |

The default values for the above registers are as follows:

```
Device ID    = 2F44h     Subsystem ID         = 0000h
Vendor ID    = 11D4h     Subsystem Vendor ID  = 0000h
Class Code   = FF0000h   Max_Lat              = 00h
Revision ID  = 00h       Min_Gnt              = 00h
BIST         = 00h       Interrupt Pin        = 01h
Header Type  = 00h
```

The upper 15 bits of the Base Address registers are writable, allowing the selection of a 128 k-byte address space for the CryptIC. As part of automatic (plug & play) PCI address mapping, it is common for the Host BIOS to write FF's into the Base Address registers and then to read-back the value to determine the address range required by the target PCI device. In the case of the CryptIC, the lower 17 bits will be read as 0's, indicating 128 k. Then, the BIOS writes an appropriate Base Address into the upper 15 bits which were read as 1's.

2183 IDMA Host Processor Bus

The 2183 FDMA Host selection (Internal Direct Memory Access) allows the CryptIC to offer the IDMA interface directly to an outside Host processor. The CryptIC's usage of the IDMA bus is identical to that described in the ADSP 2183 datasheet and ADSP-2100 Family User's Manual.

The IDMA port allows a Host Processor to perform 16-bit DMA reads and writes of selected areas of the CryptIC's of DM or PM. Any locked areas of memory are not visible to a Host via the IDMA port. Typically, the locking of these memory spaces is performed by a custom 'Extended' program invoked via the CGX Kernel interface.

External Memory Interface

The External Memory Interface (EMI) bus is a logical extension to the EMI bus presented on a standard ADSP 218x processor. The CryptIC has enhanced this bus as follows:

Extended data bus width from 8/16/24-bits to 8/16/24/32-bits

Additional Addressing: from 14-bits (16 k words) to 26-bits (64M words)

The EMI interface can support multiple memory types, including I/O, Program Memory (PM), Byte Memory (BM), and 16-bit or 32-bit Data Memory (DM).

Since the EMI bus is shared between the DSP and the DMA engine within the CryptIC, a control register is used to select which bus controller 'owns' the EMI bus. (This applies to all EMI accesses—PM, DM, I/O, BM). Only the DSP has access to this register, so it effectively becomes the arbiter for the EMI bus. This allows straightforward contention management between direct DSP access and DMA access to external memory. It becomes more interesting when Host-initiated Target transfers are expected to external memory, since there is no intrinsic arbitration provided. If a Target transfer is attempted while the DSP owns the EMI bus, the PCI transfer will re-try and then be aborted.

32-Bit DMA Controller

Overview

The CryptIC integrates a high-performance 32-bit DMA controller in order to facilitate bulk data movements within the chip without requiring continuous DSP supervision. The DMA subsystem allows 32-bit transfers to occur within the CryptIC at up to 40 Mwords per second (160 Mbytes/s).

FIG. 6 illustrates the functionality of the 32-bit DMA subsystem.

DMA Controller Functional Description

The DMA controller is shared between one of two 'owners'; either the DSP or the PCI Host processor. This essentially corresponds to whether a 'Master' (DSP-owned) or 'Target' (Host-owned) transfer is needed. An arbiter manages any contention issues when both the DSP and the Host attempt to control the DMA engine at the same time, with Target transfers getting priority. All DMA operations occur on 32-bit buses within the CryptIC, although for some internal locations, the source or destination could be 16-bits wide. In this case, a bus interface state machine converts the data between 16 and 32 bits (see the '*' markings in the figure above).

Because the External Memory bus interface is also multiplexed between the DMA engine and a direct connection to the DSP's EMI bus, a DSP-controlled register output bit (PCIEXTMEM bit 1) selects which is the 'owner' of the External Memory bus. In typical applications (and the CGX Kernel), this bit is normally set to give control to the DMA engine—ensuring that Target bus transactions can complete—and would only be momentarily switched to the DSP during a non-DMA EMI transfer.

DSP Initiated Transfers

When the DSP controls the DMA engine, it truly behaves as a general-purpose DMA controller: The DSP specifies source and destination devices/addresses and the byte count, and the DMA engine then executes the transaction. Status registers may be polled for completion, or an interrupt may be generated at the end of the transfer.

For a PCI host bus, data movements can be handled between:

Case 1.PCI Host<->DSP/Crypto*
Case 2.PCI Host<->External Memory
Case 3.External Memory<->DSP/Crypto*

For cases 1 & 2 above, this is how a PCI 'Master' transaction occurs. Case 3 is a memory-to-memory type transfer.

For a PCMCIA host bus, data movements can be only handled as Target reads/writes between:

Case 1.PCI Host<->DSP/Crypto*

*DSP/Crypto includes: All Crypto registers, Hash/Encrypt block, IDMA to DSP internal RAM, and Kernel RAM—if unlocked.

For most DMA transactions, both the source and destination address pointers will be automatically incremented for each word transferred. The only exceptions to this are when either the source or destination of a transfer is:

Hash/Encrypt Input FIFO
Hash/Encrypt Output FIFO
EDMA Data Register (Indirect mode only)

For those transfers, the FIFO/register address remains fixed and only the 'memory' side address automatically increments.

Memory Map

Addresses and memory domains are specified as part of the DMA setup. Each of the 3 domains—Host memory, External Memory, and DSP/Crypto-register—have slightly different addressing techniques as shown below.

Host Memory

When one end of the DMA transaction is PCI memory (case 1 & 2 above), a full 32-bit address is specified in the Host Address register. This allows a transfer to be done to/from any location in PCI memory space.

External Memory

When transferring to or from External memory, the addressing is slightly different for cases 2 & 3 above. For case #2 (PCI Host to/from External memory), a full 26-bit external memory address is specified in the Local Address register. Also, bit #31 in the Local Address register is set to '1' to indicate External Memory.

For case #3 (External memory to/from DSP/Crypto-registers), bit #14 in the Command register is set to '1'. Then, the 26-bit external memory address is specified in the Host Address register.

DSP/Crypto-register Memory

When one end of the transaction is DSP/Crypto-register/ KRAM space, then a Word (16-bit) address is specified in the Local Address register. This causes the address map to be shifted one address bit from the PCI (byte-oriented) map shown in FIG. 7 is the word memory map of DSP/Crypto-register addresses.

DMA Control Flow

FIG. 8 is a flow chart showing the steps which are typically followed for a DSP-initiated Master transfer.

Code Samples

Below are some code samples for the three types of DSP-initiated DMA transfers:

---

1. PCI Host <-> DSP/Crypto

```
!void
!pci__master__transfer(unsigned short *host__hiaddr   - Host 31–16
!                                                      address bits
!        unsigned short *host__loaddr,                - Host 15–0
!                                                      address bits
!        unsigned short *dsp__addr,                   - DSP 15–0 address
!                                                      bits, intnl
!        unsigned short read,                         - 0=write, non0
!                                                      is a read
!        unsigned short bytes)                        - Number of bytes
!                                                      to read/write
!                                                      of Host memory
!
!  This operation is used to read/write N bytes (i.e. bytes)
!  from/to PCI HOST memory using the DMA controller and
!  performing master reads/writes.
!
!  The PCI HOST addresses are the source addresses. In
!  this example, the DSP is the destination. In fact,
!  the DSP address will be to a crypto register. This
!  code is not concerned with locking in external
!  memory, so it will not allow external memory
!  access.
!
!  This operation will not bump the Host or DSP addresses
!  after the read/write of the block is complete. This will be
!  left to the calling operation.
!
!  Register ar contains the 1st argument: host__hiaddr,
!  and register ayl contains the 2nd argument: host__loaddr.
!  This is how the calling interface works with Analog Device's C
!  compiler and assembler tools.
!
!  This operation assumes the calling function will not request
!  a read or a write that exceeds the maximum transfer
!  size of 1023 bytes.
!
```

-continued

1. PCI Host <-> DSP/Crypto

```
pci_master_transfer_:
    i1=i4;                        !get ptr to stack to get
                                   remaining args
    m3=1;
    modify(i1,m3);                !align to argument 3,
                                   dsp_addr
    my1=dm(i1,m3);                !obtain dsp address, dsp_addr
    mr0=dm(i1,m3);                !obtain transfer direction, read
    sr0=dm(i1,m3);                !obtain byte_cnt, bytes
    si=dmovlay;                   !save away old DMOVLAY
                                   value
    dmovlay=15;                   !enable CryptIC register's
                                   data page
!
!Ensure that the DMA controller is available to accept a command.
!
dma_control_ready:
    sr1=dm(0x1845);               !read DMA status
    af=sr1 and 0x8000;            !if DMA control is not ready
    if eq jump dma_control_ready; !then continue to poll
                                   for ready
!
!Setup DMA address block for actual PCI HOST master read operation
!
    dm(0x1840)=ayl;               !lower 16 bits of 32bit
                                   address of host
    dm(0x1841)=ar;                !upper 16 bits of 32bit
                                   address of host
    dm(0x1842)=my1;               !DSP address, 0:15
    sr1=0;
    dm(0x1843)=sr1;               !internal access, no upper
                                   address
!
!Setup the DMA command and issue it:
!    No HOST generated interrupt
!    Byte count as read from stack above this
!    Master read or write, depends on read argument
!    PCI transfer
!
    ar=sr0;                       !sets up transfer as
                                   master read
    af=pass mr0;                  !if transfer is a read
    if ne jump dma_write_control; !then write DMA control
                                   register
    ar=sr0 or 0x8000;             !set master write bit
                                   with length
dma_write_control:
    dm(0x1844)=ar;                !write DMA control reg.
!
!Important, insert a delay of 2 instruction cycles to ensure that
!the transfer-active flag of the DMA status register will have time
!to be asserted. This avoids a false read by the DSP.
!
    nop; nop;
!
!Poll until the PCI transfer is complete
!
dma_master_transfer_poll:
    sr1=dm(0x1845);               !read DMA status
    af=sr1 and 0x0008;            !if master transfer in
                                   progress
    if ne jump                    !keep polling
    dma_master_transfer_poll;
!
!Restore the DMOVLAY register and return to the calling function.
!
    dmovlay=si;                   !restore previous
                                   data page
    rts;                          !return to caller,
                                   pop return address
```

PCI Host Initiated Transfers (Target Mode)

When a PCI Host performs a Target Read or Target Write of memory or a register within the CryptIC, the DMA controller is automatically called into use. From the Host's perspective, most of the operation of the DMA controller is hidden. The DMA controller interprets the PCI-supplied addresses and other bus control signals and then generates the appropriate addresses for internal/external memory space.

For some PCI Target reads which experience latencies before data is retrieved, the DMA controller may 'fetch-ahead' two or three dwords and place them in the PCI core's read FIFO. This is important to consider when performing reads from the Hash/Encrypt FIFO, since once data is read from the H/E FIFO, it cannot be reversed. Thus, the Host must ensure that no 'fetch-ahead' is performed in these cases.

The PCI_TargetRead_Count register is the mechanism to limit the maximum 'fetch-ahead' data which can be read. For example, if the Host is moving data through the Hash/Encrypt FIFOs in 8-dword blocks, then the PCI_TargetRead_Count register should be programmed with an 0x08. See section on Target Read Count Register (TARGRDCNT) described further below.

All Target mode reads or writes must occur on 32-bit dword boundary. The only exception is reads or writes to the Hash/Encrypt block. In this case, the PCI starting and ending address is decoded down to the byte level so that any number of bytes may be written to or read from the H/E data FIFO.

PCMCIA Host Initiated Transfers

All PCMCIA transactions to the CryptIC are Target transfers. The DMA controller described in this chapter is disabled when the PCMCIA bus is selected. Instead, a separate 16-bit DMA controller is enabled and is controlled via the PCMCIA DMA controller registers described in Applications Registers.

Both single-word reads and writes, as well as multi-word burst DMA transfers are supported.

DMA Arbitration

Since the DMA is a shared resource between the DSP and Host Target mode requests, a deterministic arbitration scheme is required for predictable results. The Arbiter shown in FIG. 6 is responsible for moving DMA requests into the DMA engines working registers. The Arbiter gives priority to Host Target mode requests, so this means the following:

Assume a DMA transaction is in progress, and that another DSP-initiated transfer request is queued-up in the DSP control registers. If a Host (PCI or PCMCIA) Target read or write request occurs before the in-progress transaction has completed, then the Host request will be serviced prior to the queued DSP request. Note that any DMA transfer which is already running will never be preempted. The only way for a DMA transfer to be aborted in mid-stream is for a Host bus error to occur (e.g. a PCI abort due to a Parity error) or for the DSP to force an abort by writing to the PCICSC register 'Force End Transfer' bit.

DMA Register Set

A set of memory-mapped control and status registers are used to operate the DMA controller. These are considered Unprotected Registers, and therefore are visible to either the DSP running in User mode or to an outside PCMCIA/PCI bus entity. They are summarized in Table 5 and described in detail in the following subsections.

(In the table below, 16-bit address refers to the DSP and 32-bit address refers to PCI/PCMCIA host.

TABLE 5

DMA Controller Register Set

| ADDRESS (16 BIT) | ADDRESS (32 BIT) | REGISTER NAME | R/W | Reset Default | DESCRIPTION |
|---|---|---|---|---|---|
| PCI APPLICATION REGISTERS | | | | | |
| DSP-Visible Registers: | | | | | |
| 0x1840 | N/A | Host Address [15:0] | R/W | | Lower 16-bits of Host Address |
| 0x1841 | N/A | Host Address [31:16] | R/W | | Upper 16-bits of Host Address |
| 0x1842 | N/A | Local Address [15:0] | R/W | | Lower 16-bits of Local Address |
| 0x1843 | N/A | Local Address [31:16] | R/W | | Upper 16-bits of Local Address |
| 0x1844 | N/A | Command | R/W | | DMA Command |
| 0x1845 | N/A | Status/Config. | R/W | | DMA Status/Configuration Register |
| 0x1846 | N/A | PCI Core Status/Config. | R/W | | Status/Configuration for PCI core |
| 0x1847 | N/A | PCI Extmem Status | R | | PCI External Memory Status |
| PCI Host-Visible Registers: | | | | | |
| N/A | 0x00C0–C3 | PCI Target Page | R/W | | Target Page specifier when CryptIC External Memory is Target |
| N/A | 0x00C4–C7 | PCI Target Read Count | R/W | | Maximum number of dwords for Target Read Transfer |
| N/A | 0x00C8–CB | Endian | R/W | | Big/Little Endian select |
| PCMCIA Host-Visible Registers: | | | | | |
| N/A | 0x00C0–C1 | DMA Address | R/W | | DMA address register |
| N/A | 0x00C4–C5 | Start/Stop DMA | R/W | | DMA control |
| N/A | 0x00C8–CB | Endian | R/W | | Big/Little Endian select |

PCI Host Address Low Register (PCIHAL)

This 16-bit Read/Write register allows the DSP Software to configure the lower 16 bits of a PCI Host Address for a Master mode transaction. For a DSP-to-External memory transfer, this contains the lower 16-bits of the External Memory address, as shown in the table below. Note that this is a byte address.

Register Address (READ/WRITE)

| DSP | PCMCIA | PCI |
|---|---|---|
| 0x1840 | Not Visible | Not Visible |

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| X | x | X | X | x | x | x | x | x | x | x | x | x | X | x | x |
| Msb | | | | | | | | | | | | | | | lsb |

16 lsb's of Host Address [15:0]

PCI Host Address High Register (PCIHAL)

This 16-bit Read/Write register allows the DSP Software to configure the upper 16 bits of a PCI Host Address for a Master mode transaction. If the transfer is between External Memory and the DSP memory space (case 3), then this register holds the 10 most-significant bits of the External Address [25:16], as shown in the table below. Note that this is a byte address.

Register Address (READ/WRITE)

| DSP | PCMCIA | PCI |
|---|---|---|
| 0x1841 | Not Visible | Not Visible |

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| X | x | x | X | x | x | x | x | x | x | x | x | x | x | x | x |
| Msb | | | | | | | | | | | | | | | lsb |

16 msb's of Host Address [31:16]

PCI Local Address Low Register (PCIHAL)

This 16-bit Read/Write register allows the DSP Software to configure the lower 16 bits of Local (CryptIC) Address for a PCI Master transaction, as shown in the table below. Note that this is a 16-bit word address.

Register Address (READ/WRITE)

| DSP | PCMCIA | PCI |
|---|---|---|
| 0x1842 | Not Visible | Not Visible |

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| X | X | X | X | x | x | x | x | x | x | x | x | x | x | x | x |
| Msb | | | | | | | | | | | | | | | lsb |

16 lsb's of Local Address [15:0]

PCI Local Address High Register (PCIHAH)

If the transfer is between a PCI Host and External Memory (case 3), then this register holds the 10 most-significant bits of the External Address [25:16] and the most-significant bit will be set to '1'. If the transfer is to/from the DSP/Crypto-register space (cases 1 & 2), then there are no address bits contained here and the most-significant bit will be '0', as shown in the table below. Note that this is a 16-bit word address.

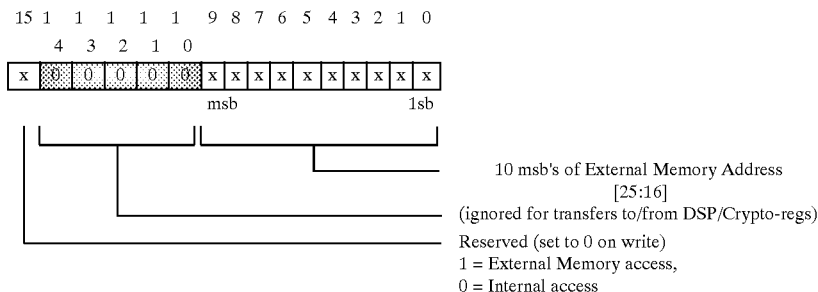

PCI Command Register (PCIC)

This 16-bit Read/Write register, as shown in the table below, is used by the DSP to write Commands to the DMA Controller function.

The first 10 bits indicate the byte count of the requested transfer. Bit 14 selects the type of transfer: Between the DSP/crypto registers and the External Memory space (case 3), or between a PCI Host and either External Memory or the DSP/crypto registers (case 1 or 2).

Bit 15 selects the direction of the DMA transfer.

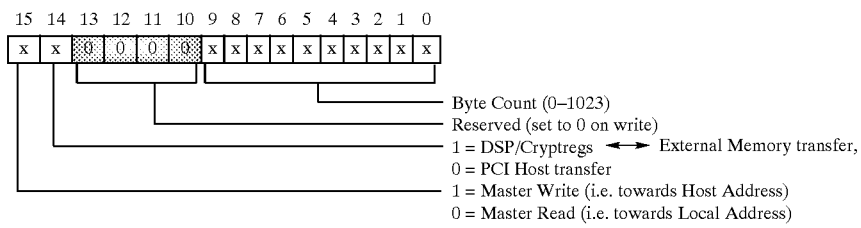

DMA Status/Configuration Register (PCISC)

This 16-bit Read/Write register, as shown in the table below, allows the DSP to configure/monitor the DMA function.

The first 2 bits are Read/Write and select the Wait States when the DMA engine is transferring to or from External Memory. Note that the same number of Wait States should be selected internal to the DSP in the DWAIT bits of the Wait State Control Register.

Bit 2 is a Read-Only status bit which reflects the Host-selected Endian state. All memory and registers within the DSP are Little Endian. The Endian bit determines whether or not the CryptIC has to do Endian conversion on data to/from the host.

The next three bits [3–5] are general status bits which indicate the busy status of the DMA engine for each of its three modes:

Bit 3 set to 1 indicates that a DSP-initiated master transfer is running (could be case 1, 2 or 3). Note that when this bit transitions from 1 to 0, it may cause a Master PCI Transfer Complete interrupt to occur (see section 0).

Bit 4 set to 1 indicates that a Host-initiated target transfer is running (could be case 1 or 2).

Bit 5 set to 1 is a further qualifier on Bit 3 (i.e. bit 3 will also be set): It indicates that the transaction is for case 3.

Bits 12–14 provide PCI core status to the DSP:

Bit 12 indicates that the PCI core has completed a DSP-initiated master transfer.

Bit 13 indicates that the PCI core has detected a PCI parity error on the bus.

Bit 14 indicates that the PCI core has experienced a PCI fatal error.

The last bit [15] indicates that the DSP may write into the DMA engine register set. (Note that another DMA transfer may be underway, but since the DSP side has double-buffered registers, another set of addresses and a command may be queued. Note that when this bit transitions from 0 to 1, it may cause a Master PCI Transfer Queued interrupt to occur. (See section on DSP Unmasked Status Register (DUSTAT) described further below.)

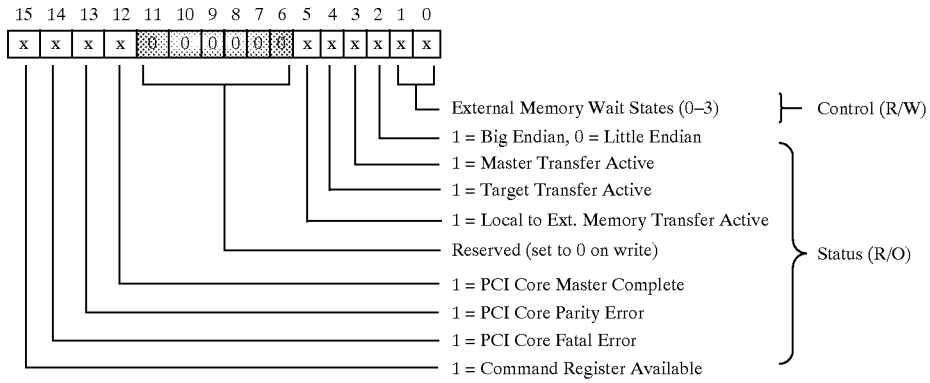

PCI Core Status/Configuration Register (PCICSC)

This 16-bit Read/Write register, as shown in the table below, allows the DSP to configure and monitor the PCI Core function. This register is not normally accessed for most applications.

The first 7 bits allow the DSP to terminate PCI transfers under abnormal circumstances. The last 8 bits provide real-time visibility of PCI core operation status.

PCI External Memory Status Register (PCIEMS)

This 16-bit Read only register, as shown in the table below, reports the status of External memory and Master transfers. The least-significant 8 bits report on the current word count of a transfer. They will start initialized to the number of words in the transfer and will decrement down to 0. Bit 8 indicates if the External Memory bus is in use by the DMA engine.

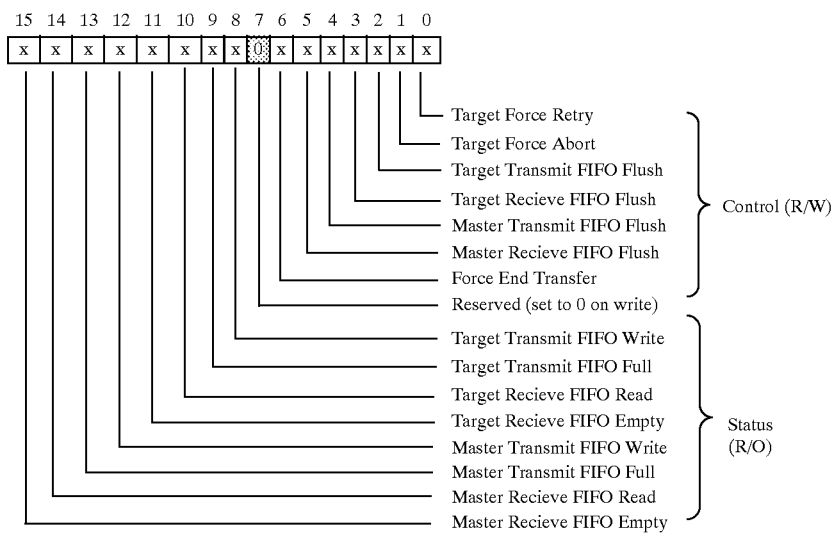

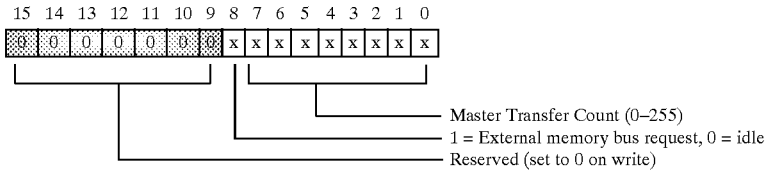

PCI Target Page Register (TARGPAGE)

The table below shows the bit definitions for the Target Page Register. These are used in order to select the 64 kbyte page which the PCI Host may access for a Target read or write. This register is not used for DSP-initiated (Master) transfers. Note that this register is only visible to the PCI Host processor.

On the other hand, anticipatory fetching data from an internal FIFO such as the Hash/Encrypt data FIFO can be dangerous. If the Target read only requires 2 bytes from the FIFO, and 8 bytes are pre-fetched, then data will be lost. For Target reads of the FIFOs, this register should be programmed with the size of the transfer.

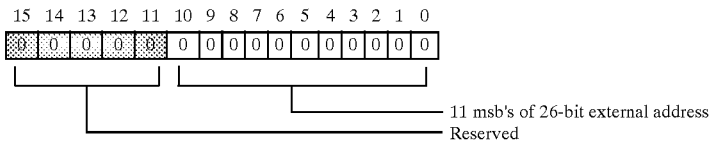

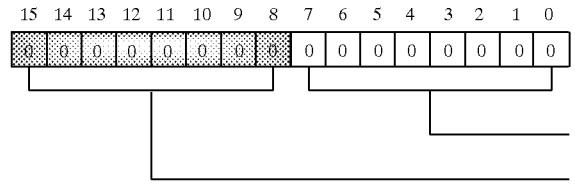

Target Read Count Register (TARGRDCNT)

This register, as shown in the table below, specifies the maximum number of dwords to fetch after a Target mode read has begun. Since Target reads can sometimes timeout due to the access latencies in the path from PCI core to the addressed location, it is desirable to fetch enough data so that on the PCI re-try, sufficient data will be available in the PCI core read FIFO to complete the transaction.

Endian Register (PCIENDIAN)

This register, as shown in the table below, specifies the 'Endianness' of data transfers between the PCI bus and the CryptIC. The DSP is little-endian, so if it is communicating with a big-endian Host, then byte swapping is needed. Setting a 1 in this register will cause a hardware byte-swap to occur on all PCI transfers to any element of the CryptIC, including external memory and internal registers or memory spaces.

The status of this Host selection is reflected on the DSP side in the DMA Status/Configuration register, described above.

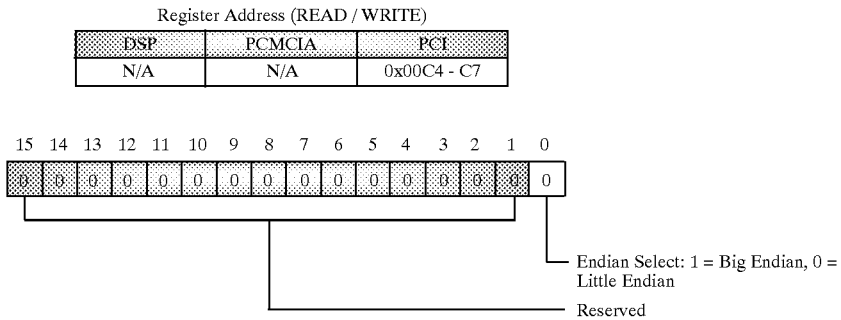

Hash/Encrypt Subsystem

Hash and Encrypt Block Overview

The Encrypt Block is tightly coupled to the Hash Block in the CryptIC and therefore the two are discussed together. Refer to FIG. 9 for the following description:

The algorithms implemented in the Combined Hash and Encryption Block are: DES, Triple DES, MD5 and SHA-1. Data can be transferred to and from the module once to perform both hashing 118 and encryption 110 on the same data stream. The DES encrypt/decrypt operations are highly paralleled and pipelined, and execute full 16-round DES in only 4 clock cycles. The internal data flow and buffering allows parallel execution of hashing 118 and encryption 110 where possible, and allows processing of data concurrently with I/O of previous and subsequent blocks. Context switching is optimized to minimize the overhead of changing cryptographic keys to near zero.

The 'software' interface to the module consists of a set of memory-mapped registers 102, all of which are visible to the DSP and most of which can be enabled for Host access. A set of five, 16-bit registers define the operation to be performed, the length of the data buffer to be processed, in bytes, the offset between the start of hashing and encryption (or vice versa), and the Padding operation. If the data length is unknown at the time the encrypt/decrypt operation is started, the Data Length register may be set to zero which specifies special handling. In this case, data may be passed to the Hash/Encrypt block 124 indefinitely until the end of data is encountered. At that time, the operation is terminated by writing a new control word to the Hash/Encrypt Control Register (either to process the next packet or to invoke the 'idle' state if there is no further work to do). This will 'close-out' the processing for the packet, including the addition of the selected crypto padding.

A set of seven status registers provides information on when a new operation can be started, when there is space available to accept new data, when there is data available to be read out, and the results from the Padding operation.

Crypto Contexts

There are also two sets of 'crypto-context' registers 14. Each context contains a DES or Triple DES key, Initialization Vector (IV), and pre-computed hashes (inner and outer) of the Authentication key for HMAC operations. The contexts also contain registers to reload the byte count from a previous operation (which is part of the hashing context), as well as an IV (also called 'salt') for decrypting a Black key, if necessary.

Once a crypto-context has been loaded, and the operation defined, data is processed by writing it to a data input FIFO. At the I/O interface, data is always written to, or read from, the same address. Internally, the hash and encryption functions have separate 512-bit FIFOs 108, 116, each with their own FIFO management pointers. Incoming data is automatically routed to one or both of these FIFOs 108, 116 depending on the operation in progress.

Output from the encryption block is read from the data output FIFO 112. In encrypt-hash 110, 118 or decrypt-hash 110, 118 operations, the data is also automatically passed to the hashing data FIFO 116. Output from the hash function is always read from the digest register of the appropriate crypto-context.

The Initialization Vector (IV) to be used for a crypto operation can be loaded as part of a crypto-context. When an operation is complete, the same context will contain the resulting IV produced at the end, which can be saved away and restored later to continue the operation with more data.

In certain packet-based applications such as IPsec, a feature is available that avoids the need to generate and load random IV's for outgoing (encrypted) packets. The operating sequence for this feature is as follows:

1) For the first encrypted packet after the CryptIC is initialized, two random numbers should be generated and written to each context's IV register. (This can actually be done as part of the CryptIC boot process.)
2) Control bit 0 in the Hash/Encrypt Control register is set to a '1' in order to prevent subsequent software overwriting of the IV field in the two context registers.
3) Now, at the end of each packet encryption or decryption, the IV register in the active context will contain the last 8 bytes of ciphertext. This 'random' value will remain in the IV register and not be overwritten when the context for the next packet is loaded. (This technique is fully compliant with the IPsec standards.)
4) For decrypted packets, the IV is typically explicitly included with the incoming packet. Thus, the Control bit in step 2 will have to be set to a '0' prior to writing the IV into the context register. After the IV is written, the control bit should be restored to '1'.

Padding

When the input data is not a multiple of 8 bytes (a 64-bit DES block), the encrypt module can be configured to automatically append pad bytes. There are several options for how the padding is constructed, which are specified using the pad control word of the operation description. Options include zero padding, pad-length character padding (PKCS #7), incrementing count, with trailing pad length and next header byte (for IPsec), or fixed character padding. Note that for the IPsec and PKCS#7 pad protocols, there are cases where the padding not only fills-out the last 8-byte block, but also causes an additional 8-byte block of padding to be added.

For the Hash 118 operations, padding 120 is automatically added as specified in the MD-5 and SHA-1 standards. When the 'Hash Final' command is issued indicating the last of the input data, the algorithm-specified padding bits are added to the end of the hash input buffer 116 prior to computing the hash.

Data Offsets

Certain security protocols, including IPsec, require portions of a data packet to be Hashed while the remainder of the data is both hashed and encrypted. The CryptIC supports this requirement through the OFFSET register which allows specifying the number of 32-bit dwords of offset between the hash and encrypt operations.

Black Key Loads

The cryptographic keys loaded as part of a crypto-context can be stored off-chip in a "black" (encrypted) form. If the appropriate control bit is set (HECNTL bit 15), the DES or 3DES key will be decrypted immediately after it is written into the Context register. The hardware handles this decryption automatically. The KEK that covers the black keys is loaded in a dedicated KEK register within the CryptIC. The IV for decrypting the Black secret key is called 'Salt' and must be stored along with the black key (as part of the context). Note that 3DES CBC mode is used for protecting 3DES Black keys and single-DES CBC is used for single-DES Black keys.

When Black keys are used, there is a 6-cycle overhead (0.18 $\mu$s @ 33 MHz) for DES keys or 36-cycle overhead (1.1 $\mu$s @ 33 MHz) for triple-DES keys each time a new crypto-context is loaded. (Note that if the same Context is used for more than one packet operation, the Key decryption does not need to be performed again.) Depending on the sequencing of operations, this key decryption may in fact be hidden (from a performance impact perspective) if other operations are underway. This is because the Black key decryption process only requires that the DES hardware be available. For example, if the DSP is reading the previous Hash result out of the output FIFO, the Black Key decryption can be going on in parallel. Also note that the data driver firmware does NOT have to wait for the key to be decrypted before writing data to the input FIFO. The hardware automatically waits for the key to be decrypted before beginning to process data for a given packet. So it is possible to make the impact of black key essentially zero with efficient pipeline programming.

The Key Encryption Key (KEK) for key decryption is loaded via the Secure Kernel firmware using one of the CGX Key Manipulation commands (see "CGX Interface Programmer's Guide"). This KEK is typically the same for all black keys, since it is usually protecting local storage only. It is designated the KKEK in the CGX API.

One of the Laser Programmned configuration bits specifies whether Red (Plaintext) keys are allowed to be loaded into the CryptIC from a Host. If the RedKeyLoad Laser bit is set, keys may only be loaded in their 'Black' form. This is useful in systems where export restrictions limit the key length which may be used or where the external storage environment is untrusted. If the BlackKeyLoad bit is not set, then keys may either be loaded either in their Black form, or in the 'Red' (unencrypted) form. Note that the Laser Configuration bit may be overridden with a signed Enabler Token (see "CGX Interface Programmer's Guide").

Depending on the definition of the 'Security Module Boundary' in a given application, FIPS 140-1 may require the use of 'black key' to protect key material. In other words, if the Security Boundary does not enclose the database where keys are stored, then those keys must be protected from compromise. Black key is a satisfactory way to meet this FIPS requirement.

Encrypt and Hash Detailed Description

The following sections provide details on the operation of the Hash/Encrypt block of the CryptIC.

DES Subsystem

The 512-bit (64 byte) crypto data FIFO 108, 112 allows up to eight 64-bit blocks to be queued for processing. The FIFO 108, 112 is implemented as a circular buffer, where the processed data is written back to the same location it came from. For most applications, the optimum transfer size is 256-bits (32 bytes) which provides the most efficient 'pipelining'. This allows a set of four 64-bit blocks to be queued, then while those are being processed, the previous four blocks can be output, and a new set of four blocks input.

DES Modes

The CryptIC DES/3-DES engine 110 can perform any of the standard DES modes: ECB, CBC, OFB, CFB in either Single-DES or Triple-DES. Since DES operates on 64-bits at a time, data is always input to the algorithm in 8-byte lumps (or padded to 8 bytes by the CryptIC). The mode of DES operation is selected in the HECNTL register at the same time as an Encrypt/Decrypt operation is started. In the CBC, OFB and CFB modes, the DES algorithm block is used to generate a 'Keystream' which is XORed with Plaintext data in order to product Ciphertext. This XORing is performed within the Encryption hardware, so the user only passes Plaintext or Ciphertext data in and out of the CryptIC.

For Cipher Feedback mode, one of three feedback choices is available: 64-bit, 8-bit, or 1-bit. In 64-bit CFB, data is written to the input FIFO 108 in the same manner as for all other modes. However in 8-bit or 1-bit CFB modes, null bytes must be written to the data FIFO 112 in order to align the desired byte or bit within the 8-byte DES output. For example, in 8-bit CFB mode, 7 null bytes must be written after each 'payload' byte is written to the input FIFO 108.

The Triple-DES (3DES) processing performed by the encrypt hardware 110 employs the 'Outer' 3DES algorithm (as opposed to 'Inner' 3DES). This means that, for a given input block of 8-bytes, the DES engine is first run in Encrypt, then Decrypt, and finally again in Encrypt mode prior to any feedback or XOR operations. Inner 3DES performs feedback operations between each of the 3 DES operations. Most of the security protocol standards call for Outer 3DES, and it is considered the stronger of the two modes.

Crypto Padding

To facilitate peak encrypt/decrypt performance, the CryptIC supports the most commonly needed Padding 104, 106 functions in hardware. The features include:

Generating and appending Pad bytes to the end of a Plaintext packet prior to encryption Verifying correct Pad bytes after decrypting a packet
Consuming (discarding) Pad bytes after decrypting a packet.

Four Padding Modes are supported in the CryptIC hardware, as shown in the table below.

| Number | Mode | Description |
|---|---|---|
| 0 | Zero Pad | Appends 0 to 7 bytes of 0x00 to the Plaintext data to ensure the total number of bytes has no remainder modulo 8. |
| 1 | IPsec | Appends 0 to 7 pad bytes, followed by pad count 'n' (0 to 7) and then a "next header" byte. The pad byte values are a count from 1 to n. The 'Next Header' byte is specified in the Pad Control register. A total of 2 to 9 bytes may be appended. |
| 2 | PKCS #7 | Appends 1 to 8 bytes: Pad byte value = hex value of Pad count, so if 3 pad bytes are needed, they will be: '03, 03, 03'. |
| 3 | Constant Pad | Appends 0 to 7 bytes of a user-specified character to the Plaintext data to ensure the total number of bytes has no remainder modulo 8. The byte (any value from 0x00 to 0xff) is specified in the Read/Write Pad Control Register. |

If the Host system software wishes to implement another type of Padding than is supported in hardware, then Mode 0 (Zero Pad) should be selected. The Host simply insures that the end of the data to be encrypted falls on an 8-byte boundary by inserting Pad characters on its own, in which case the Hardware Padding engine will not add any bytes.

Pad Verification

There is a Pad Verify bit in the General Status register 102 which checks for proper padding in Pad Modes 1 and 2. (Note that this bit is invalid for all blocks read from the hash/encrypt FIFO 108, 112 except the last block to be processed.) The Pad Verification 106 operation checks the decrypted data for the correct Pad properties as specified in the selected Padding Mode (The Next Header byte value is not validated for IPsec mode). If Pad Modes 0 or 3 are selected, the Pad Verify bit will always read 0.

Pad Consumption

The application must always read-out the last block (8-bytes) of decrypted plaintext data if there is at least one user-payload byte in it. When either Pad Mode 1 (IPsec) or Pad Mode 2 (PKCS #7) is selected, the CryptIC can notify the application of the number of Pad bytes (including Pad, Pad length, and Next Header if applicable) detected in the decrypted plaintext through the Pad Status registers 102 (HEPADSTAT0/1). A count of 0 to 9 can be reported.

In addition, these padding modes can cause an additional block of 8 bytes to be produced (since more than 7 bytes may have originally been added to the packet). The presence of this additional block is detected by the CryptIC and the application may command the CryptIC to discard the last Pad block in order to save the time of reading those 8 bytes. A write of any value to the Consume Pad register 102 will cause this discard to occur.

Hash Subsystem

Like the Encrypt/Decrypt subsystem, the hash processing section also has a 512-bit (64 byte) FIFO 116. This represents a single 512-bit input block to the hash algorithm. When the hash buffer is full, and the algorithm section is done processing previous data, the input block is immediately copied to the 512-bit algorithm working buffer, and the entire 512-bit FIFO buffer 116 is available for data input again.

There are several options available to control hashing, in addition to selecting between SHA-1 and MD5. The application may choose to either set the initial state of the hash operation from the constants defined for the algorithms, or from a digest which is loaded as part of a crypto-context. To continue a previous operation, the previous 'interim' digest must be reloaded. If an operation is to be resumed, it is also necessary to load the previous count of bytes processed. This can also be loaded as part of the crypto-context.

Hash Padding

Controls are also provided to determine what is done at the end of the input data stream. If the operation is to be resumed at a later time, then the operation should be defined to exclude 'final' processing. In this case, no special processing will be done at the end beyond making the resulting digest available as part of the output crypto-context. If the operation is to include the end of last of the input data, then the control for 'final' processing should be set, which will cause the padding operations defined for the hashing algorithms to be performed. These include adding a 'pad byte' following the last byte of data, and placing a 64-bit data length, expressed in terms of bits, at the end. If less than 9 bytes are available between the last input data byte, and the next 512-bit block boundary, an extra 512-bit padding hash block will be added to contain the length. Any additional bytes required to fill out the last or extra 512-bit blocks are set to zero.

As previously described, the same input data stream is internally buffered by both the hash and encryption sections, depending on the data flow of the operation selected. In the case of hash-encrypt, where the two components of the operation are done in parallel, if any padding is added to the crypto block according to the option selected, the same padding is added to the hash block.

HMAC

To support the IETF HMAC protocol, the module supports processing an 'outer' hash. Each crypto-context supports loading an 'inner' and an 'outer' pre-computed initial digest. Typically, these would be the results of the HMAC keyed hash pre-processing, and would be stored as part of the security association (SA) negotiated for an IP connection. The pre-computed inner hash is loaded as the initial state of the hash algorithm before processing the input data stream. At the end of the input data, normal 'final' processing is done, then the resulting digest is used as data for an additional round of hash processing, where the initial state is the pre-computed initial 'outer' keyed hash digest.

Hash/Encrypt Data Flow

Depending on how IP headers are processed in the packets to be transformed using hash-encrypt, it may be that the data buffer ends up not being double word aligned with respect to the starting point of the operation in the buffer. If this is the case, PCI transfers can be done using PCI byte enables to begin and end the operation on arbitrary bytes within their respective double words. When the on-chip DSP is used to setup the PCI transfers using PCI Master Mode, it has the capability to control the byte enables by setting the starting offset and byte count. When PCI Target Mode transfers are used, the PCI host is responsible for controlling the byte enables. Byte enables are also used on the 16-bit DSP bus. In this case, the enable signals are set in a register in another block and passed in as a two bit wide signal. This capability only applies to I/O to the data FIFOs. All other registers assume full word (16-bit bus) or double word (32-bit bus) transfers.

The hash-encrypt block also supports communication with host processors which may be either big endian or little endian, in terms of the order of storage within a double word. The default assumption is little endian. If big endian is selected, the module will reorder the input and output bytes, and in the case of the 32-bit bus, align them with the proper edge of the resulting double word. Endian processing applies to both the data and crypto-context registers, but not the control and status registers, where it can be handled in the application software.

The hash-encrypt block is designed to support zero wait state reads on the 16-bit bus to the DSP, and 1 wait state reads on the 32-bit bus to PCI (due to endian processing). Writes experience a one clock latency, as they are first latched, then written to the target address. Writes can be zero wait from the host's perspective, however, as long as a read is not attempted in the immediately following cycle.

Hash/Encrypt Subsystem Notes

Note that due to the pipelining nature of the module, it is possible to begin a new operation before all the data from the previous operation has been processed and read out. The sequence of steps is simplified if operations are performed serially with no overlap.

Final processing for hashing operations, and padding of a short trailing crypto block, is initiated automatically. The end of the input data stream for an operation is determined by counting the number of bytes input and comparing to the byte length entered as part of the operation control. An operation may be ended prematurely by entering a new operation control. If the length field is set to zero, this is the only way to cause a normal end.

Operations can be aborted by resetting the hash-encrypt block. All registers except the KEK will be reinitialized. The hash-encrypt block can be reset in the CryptIC via the kernel mode block hash-encrypt control register.

If black keys are used, the KEK register must be loaded prior to loading either of the crypto contexts.

In the case where the DSP is performing all hash-encrypt actions as a result of calls from application software to the Crypto CGX interface, then all actions described above are reads and writes via DSP (16-bit).

When the DSP is managing the interactions in PCI system, and the data resides in PCI host memory, then the status polling and control actions take place via DSP reads and writes on the 16-bit bus. It this case, however, the crypto-context and data FIFO I/O takes place on the 32-bit bus, as a result of PCI Master Mode transfers initiated by the DSP.

When a host processor is directly managing all aspects of hash-encrypt operation, then all I/O takes place on the 32-bit bus, although in some cases the upper 16-bits of the bus are not used (such as in a PCMCIA environment or with a 16-bit embedded processor).

The Kernel Mode firmware releases access of the Hash/Encrypt function block to the PCI/PCMCIA host whenever it is not executing a CGX command.

Hash/Encrypt Registers

Table 6 lists the memory-mapped register interface to the hash-encrypt module within the CryptIC. These registers may be accessed either from the DSP in Kernel mode, or if granted permission, from a PCI/PCMCIA host external to the CryptIC. Addresses on the 16-bit bus from the DSP are to 16-bit words. Addresses on the 32-bit bus (from PCI host) are to the first 8-bit byte of the 32-bit transfer. Transfers on the 32-bit bus should always be aligned to double word boundaries.

TABLE 6

Hash/Encrypt Registers

| ADDRESS (16 BIT) | ADDRESS (32 BIT) | REGISTER NAME | R/W | Reset Default | DESCRIPTION |
|---|---|---|---|---|---|
| Configuration Registers: | | | | | |
| 0x1000 | 0x0200 | H/E control | R/W | 0x0000 | Hash/Encrypt block control word |
| 0x100f | 0x021e | Pad control | R/W | 0x0000 | Pad control word |
| 0x1010–1011 | 0x0220–0223 | Length | R/W | 0x0000 | 32-bit data length, in bytes |
| 0x1012 | 0x0224 | Offset | R/W | 0x0000 | Offset, (0 to 15 in dwords), from start of hash (encryption) to start of encryption (hash) |
| 0x1013 | 0x0226 | Control | R/W | 0x0007 | Operation control. |
| 0x1014 | 0x0228 | Consume Pad | W | | Command to consume final pad block |
| Status Registers: | | | | | |
| 0x1016 | 0x022c | Pad Status 0 | R | | Decrypted next header byte, # Pad bytes, Context 0 |
| 0x1017 | 0x022e | Pad Status 1 | R | | Decrypted next header byte, # Pad bytes, Context 1 |
| 0x1018 | 0x0230 | GeneralStatus | R | | Status result from Hash/Encrypt operation |
| 0x1019 | 0x0232 | ControlReady | R | | 1 = input ready for new control word, 0 = not ready |
| 0x101a | 0x0234 | DataReady | R | | 1 = input ready for data FIFO, 0 = not ready |
| 0x101b | 0x0236 | StatFreeBytes | R | | Number free input bytes in crypto FIFO (in 64-bit blocks) |
| 0x101c | 0x0238 | StatOutBytes | R | | Number output bytes ready in crypto FIFO (in 64-bit blocks) |
| Context 0 Registers: | | | | | |
| 0x1020–1023 | 0x0240–0247 | Key3_0 | W | | Key 3, for Triple DES: Crypto Context 0 |
| 0x1024–1027 | 0x0248–024F | Key2_0 | W | | Key 2, for Triple DES: Crypto Context 0 |
| 0x1028–102B | 0x0250–0257 | Key1-0 | W | | Key 1, for Triple DES or DES: Crypto Context 0 |
| 0x102C–102F | 0x0258–025F | Salt_0 | W | | IV for key decryption: Crypto Context 0 |
| 0x1030–1033 | 0x0260–0267 | IV_0 | R/W | | IV for data encrypt/decrypt: Crypto Context 0 |
| 0x1034–103D | 0x0268–027B | Digest_0 | R/W | | (Inner) Digest: Crypto Context 0 |
| 0x103E–1047 | 0x027c–028F | OuterDigest_0 | W | | Outer Digest: Crypto Context 0 |
| 0x1048–1049 | 0x0290–0293 | HashByteCnt_0 | R/W | | Starting byte count, for hash resume: Crypto Context 0 |

TABLE 6-continued

Hash/Encrypt Registers

| ADDRESS (16 BIT) | ADDRESS (32 BIT) | REGISTER NAME | R/W | Reset Default | DESCRIPTION |
|---|---|---|---|---|---|
| Context 1 Registers: | | | | | |
| 0x1050–1053 | 0x02A0–02A7 | Key3_1 | W | | Key 3, for Triple DES: Crypto Context 1 |
| 0x1054–1057 | 0x02A8–02Af | Key2_1 | W | | Key 2, for Triple DES: Crypto Context 1 |
| 0x1058–105B | 0x02B0–02B7 | Key1_1 | W | | Key 1, for Triple DES or DES: Crypto Context 1 |
| 0x105C–105F | 0x02B8–02BF | Salt_1 | W | | IV for key decryption: Crypto Context 1 |
| 0x1060–1063 | 0x02C0–02C7 | IV_1 | R/W | | IV for data encrypt/decrypt: Crypto Context 1 |
| 0x1064–106D | 0x02C8–02DB | Digest_1 | R/W | | (Inner) Digest: Crypto Context 1 |
| 0x106E–1077 | 0x02D0–02EF | OuterDigest_1 | W | | Outer Digest: Crypto Context 1 |
| 0x1078–1079 | 0x02F0–02f3 | HashByteCnt_1 | R/W | | Starting byte count, for hash resume: Crypto Context 1 |
| Data In/Out FIFOs: | | | | | |
| 0x10c0 | 0x0380 | Data FIFO | R/W | | FIFO: Data In/Data Out |

Hash/Encrypt Control Register (HECNTL)

This 16-bit Read/Write register, as shown in the table below, allows selecting configuration settings for the Hash/Encrypt subsystem.

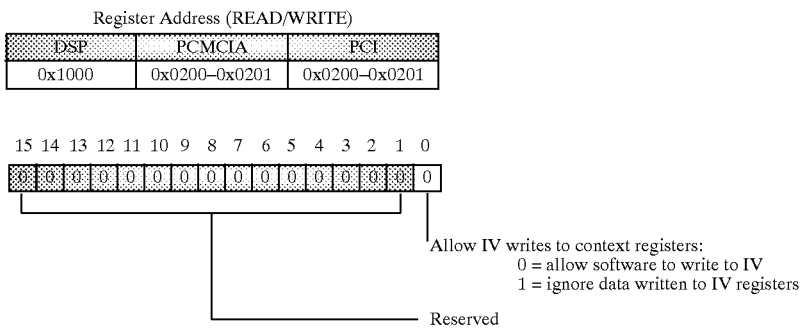

Pad Control Register (HEPADCNTL)

Shown in the table below are the bit definitions for the Pad Control Register:

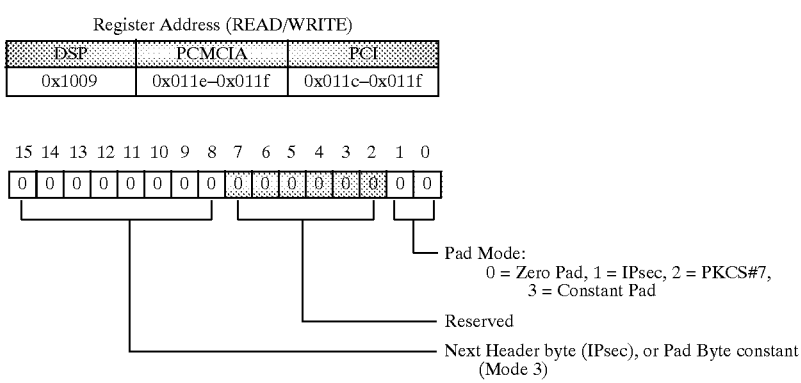

Control Register (HECNTL)

Shown in the table below are the bit definitions for the Hash/Encrypt Control Register:

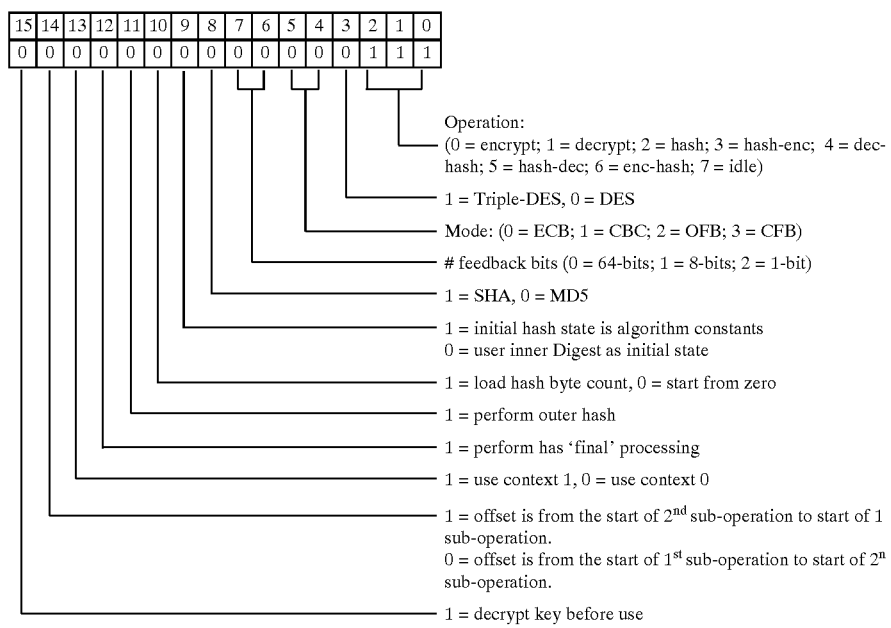

Consume Pad Register (HECONSPAD)

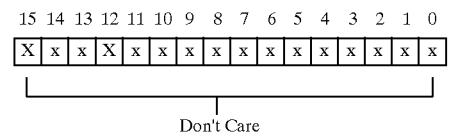

This 16-bit Write-Only register, as shown in the table below, allows the Software to command a discard of the last 8-byte block of decrypted data in the Hash/Encrypt output FIFO. This is typically used to avoid the bus bandwidth of transferring the Pad block back to host memory.

Pad Status Register 0 (HEPADSTAT0)

Shown in the table below are the bit definitions for the Pad Status Register 0:

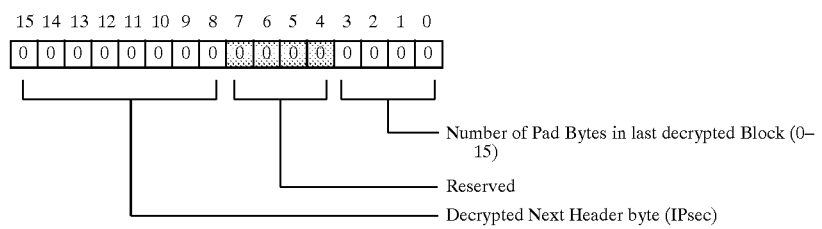

Pad Status Register 1 (HEPADSTAT1)

Shown in the table below are the bit definitions for the Pad Status Register 1:

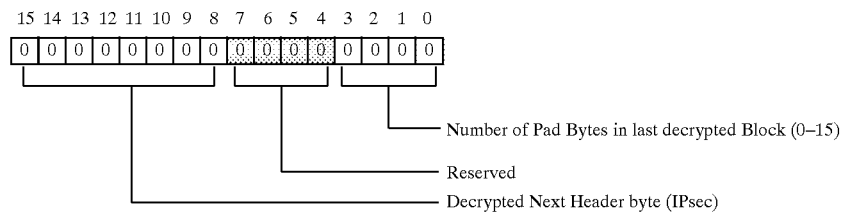

General Status Register (HESTAT)

Shown in the table below are the bit definitions for the Hash/Encrypt General Status Register:

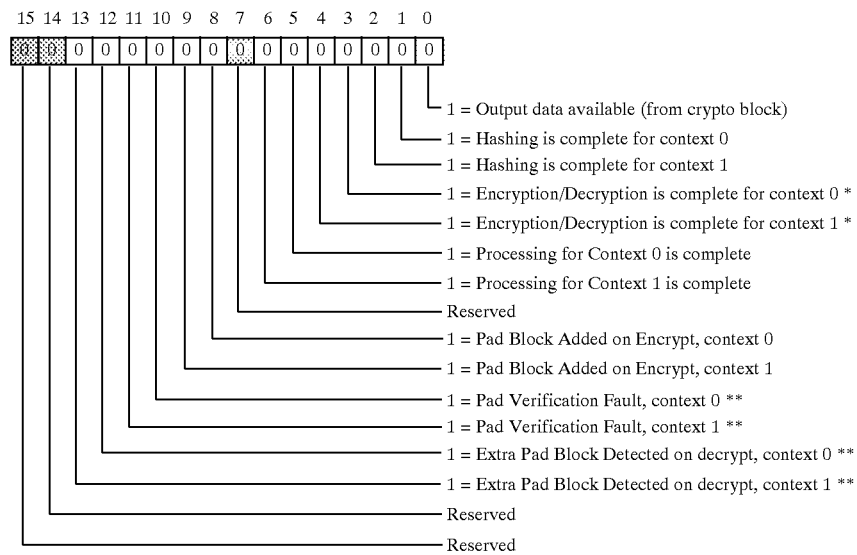

\* IV is available to be read from Context
\*\* Valid only after last decrypted block Application Registers The Application Registers (AppRegs) subsystem provides a bi-directional mailbox facility between a Host and the CryptIC and also contains some miscellaneous configuration registers. The mailbox is specifically designed to facilitate the transfer of CGX crypto commands back and forth between the CryptIC and the calling Host.

Overview

The AppRegs mailbox subsystem is designed to follow a 'ping-pong' protocol between CryptIC and Host. Default power-up ownership of the mailbox is given to the Host. After either side writes an entire message to the mailbox, it automatically switches state so that the other entity is given 'ownership' of the mailbox. Optionally, an Interrupt may be sent to the DSP/Host when the other side has finished writing a message.

Up to a 44-byte (22 word) message may be written to the mailbox by the DSP. The procedure should designate that the least-significant word of the message be written last, since that initiates an 'End-of-Message' sequence. (By using the least-significant word for termination, any length of message from 1 to 44 bytes can be supported.)

Application Registers Register Set

A set of memory-mapped control and status registers are provided in the 'Application Registers' subsystem. These are considered Unprotected Registers, and therefore are visible to either the DSP running in User mode or to an outside PCMCIA/PCI bus entity. They are summarized in Table 7 and described in detail in the following subsections.

(In the table below, 16-bit address refers to the DSP and 32-bit address refers to PCI/PCMCIA host.

TABLE 7

Application Register Set

| ADDRESS (16 BIT) | ADDRESS (32 BIT) | REGISTER NAME | R/W | Reset efaul | DESCRIPTION |
|---|---|---|---|---|---|
| APPLICATION REGISTERS ||||||
| 0x1880–0x1895 | 0x0000-2B | CGX Command | R/W | | 44-byte CGX command register |
| 0x18A0 | 0x0040–41 | Status | R | 0x0000 | Application registers status |
| 0x18A1 | 0x0042–43 | Lock | R/W | | DSP/Host lock control |
| 0x18A2 | 0x0044–47 | Misc Status | R/W | | Miscellaneous status bits: DSP <–>host |
| 0x18A3 | N/A | Select Delay | R/W | | Delay configuration for memory pulse generation |
| 0x18A4 | N/A | Hash/Encrypt Byte Enable | R/W | | Byte enables for data R/W to Hash/Encypt block |
| 0x18A5 | N/A | Reset Violation Memtype/Addr | R | 0x0000 | Holds the memory type and Address of the last protection violation-induced Reset |
| 0x18A6 | 0x004C–4F | Extmem Config | R/W | | External memory configuration |

Mailbox Data Register (MAILDAT)

This is actually a contiguous set of register comprising 44-bytes, as shown in the table below. The least significant word of this register has special properties. When written by the DSP, the lsword will cause a 'DSP_Wrote_Command' interrupt to be issued to the Host processor (if enabled). Similarly, a Host write will cause a 'Host_Wrote_Command' interrupt to be issued to the DSP processor (if enabled). In addition, writing the least-significant word will cause the ownership of the mailbox to automatically flip to the other party.

From the DSP perspective, the mailbox appears as 22 consecutive 16-bit locations:

DSP Register Address (READ/WRITE)

| DSP Address | Mailbox Data |
|---|---|
| 0x1895 | Data Word 21 (msw) |
| 0x1894 | Data Word 20 |
| 0x1893 | Data Word 19 |
| . | . |
| . | . |
| . | . |
| 0x1882 | Data Word 02 |
| 0x1881 | Data Word 01 |
| 0x1880 | Data Word 00 (lsw)** |

**End-of-Write Trigger Word

From the Host perspective, the mailbox appears as 11 consecutive 32-bit locations which are byte-addressable, as shown in the table below:

Host Register Address (READ/WRITE)

| Host Address | Mailbox Data |
|---|---|
| 0x002B | Data Byte 43 (msb) |
| 0x002A | Data Byte 42 |

-continued

Host Register Address (READ/WRITE)

| Host Address | Mailbox Data |
|---|---|
| 0x0029 | Data Byte 41 |
| . | . |
| . | . |
| . | . |
| 0x0002 | Data Byte 02 |
| 0x0001 | Data Byte 01 |
| 0x0000 | Data Byte 00 (lsb)** |

**End-of-Write Trigger Byte

DSP AppRegs Status Register (DSPAPPSTAT)

This 16-bit Read-only register, as shown in the table below, allows the DSP Software to monitor the status of the Mailbox.

Bit #0, Mailbox Write Own, allows the DSP to determine who may next write into the Mailbox.

Bit #1, Host has read Mailbox, allows the DSP to monitor when the Host processor has received a transmitted message in the Mailbox. Bit 1 will be latched as a '1' when the Host has read the least significant data byte of the Mailbox. As soon as the DSP reads DSPAPPSTAT, this bit will automatically be cleared and re-armed for the next Host Mailbox read.

Bits #2 & 3 are read-only status bits which reflect the semaphores written (and read) in the DSPSEMA and HOSTSEMA registers.

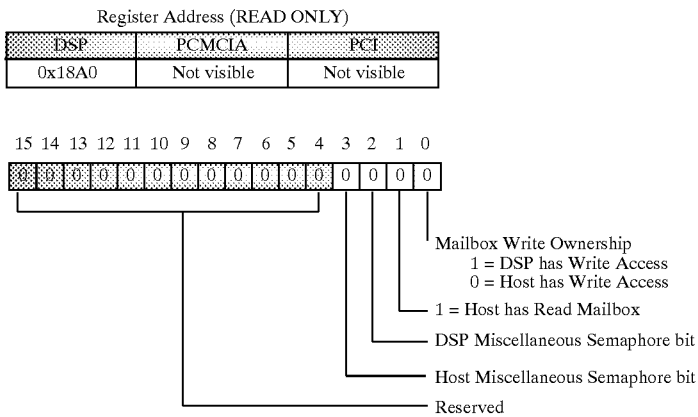

Host AppRegs Status Register (HOSTAPPSTAT)

This Read-only register, as shown in the table below, allows the Host Software to monitor the status of the Mailbox.

Bit #0, Mailbox Write Own, allows the Host to determine who may next write into the Mailbox.

Bit #1, DSP has read Mailbox, allows the Host to monitor when the DSP processor has received a transmitted message in the Mailbox. Bit 1 will be latched as a '1' when the DSP has read the least significant data byte of the Mailbox. As soon as the Host reads HOSTAPPSTAT, this bit will automatically be cleared and re-armed for the next DSP Mailbox read.

Bits #2 & 3 are read-only status bits which reflect the semaphores written (and read) in the DSPSEMA and HOSTSEMA registers.

AppRegs Lock (APPLOCK)

This 16-bit Read/Write register, as shown in the table below, allows the DSP to lock-out Host write access to the Command/Response register. Setting this register to 0x01 effectively makes the Mailbox one-way from the DSP to the Host.

From the Host perspective, this register is read-only.

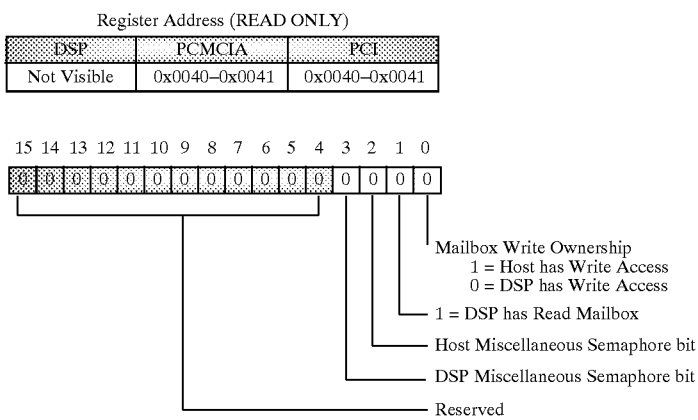

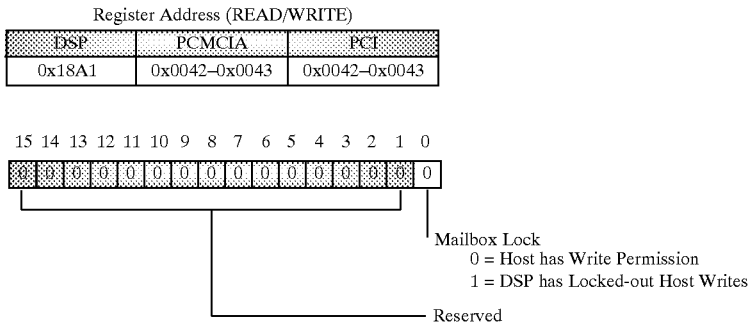

DSP (Host) Miscellaneous Semaphore Register (DSPSEMA, HOSTSEMA)

Viewed from the DSP, this 16-bit Read/Write register, as shown in the table below, allows the DSP Software to assert a semaphore bit to be read by the Host via the AppRegsStatus register.

When viewed from the Host, the lsb of this 32-bit Read/Write register allows the Host Software to assert a semaphore bit to be read by the DSP via the AppRegsStatus register.

The CGX Kernel may be programmed to use these two bits for ownership arbitration of the Hash/Encrypt subsystem. In order to enable this feature, the appropriate CIS initialization bit must be set when calling the CGX_INIT routine. Refer to the CGX Software Users Guide for more details on the behavior of this function.

If the above CGX usage of these semaphores is not selected, then they may be used for any general purpose DSP to Host signalling.

DSPSEMA

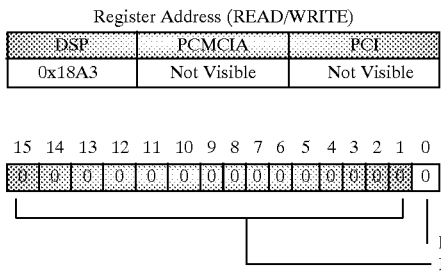

HOSTSEMA

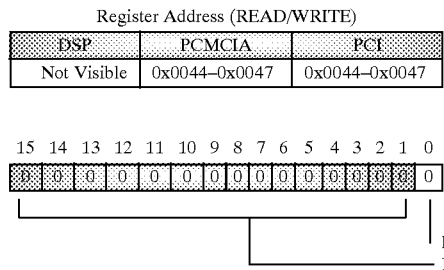

Hash/Encrypt Byte Enable Register (HEBYTEEN)

This 16-bit Read/Write register, as shown in the table below, allows the DSP Software to manage reading and writing fractional words in or out of the Hash/Encrypt FIFO's. Since the DSP is oriented towards a 16-bit bus width, but the FIFO's can manipulate data down to byte granularity, it is necessary for the DSP to specify whether its low or high order byte is to be transferred in or out of the FIFOs.

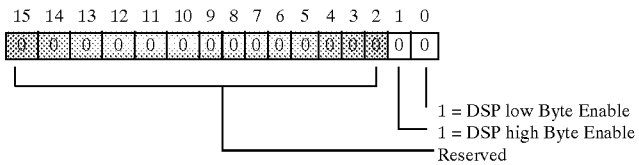

Reset Reason/Instruction Register (RSTREASON)

This 16-bit Read/Write register, as shown in the table below, allows the DSP processor to determine the offending address and memory type which caused a Kernel protection violation reset. The contents of this register are preserved across a CryptIC reset (although of course, not across a power-cycle.) This is useful in de-bugging software which is written for the User Mode of the CryptIC. Refer to section previous described on Kernal Mode Control for more information about the protection features of the CryptIC.

The four memory types are as follows:

PM Instruction Fetch
 An instruction fetch was made either to one of the four blocks of Kernel ROM (i.e. the 4 lsb's of PMOVLAY were set to 0xC, D, E or F and a fetch was made between address 0x2000 and 0x3FFF), or to an internal program memory (PM) location which has been locked-in as Protected Memory by an Extended Mode program.

DM Data Fetch
 A data fetch was made to an internal data memory (DM) location which has been locked-in as Protected Memory by the Kernel. With the standard CGX kernel and no Extended Mode programs active, none of the internal DM should be protected.

PM Data Fetch
 A data fetch was made to an internal program memory (PM) location which has been locked-in as Protected Memory by the Kernel. With the standard CGX kernel and no Extended Mode programs active, none of the internal PM should be protected.

Protected Registers/Kernel RAM Data Fetch
 A data fetch was made to either the Kernel RAM area or one of the Protected crypto registers. This would mean that the 4 lsb's of DMOVLAY were set to 0xF and a data fetch was made between address 0x0000 and 0x17FF Due to a design 'feature' of the CryptIC, this register must be read twice, ignoring the first data read.

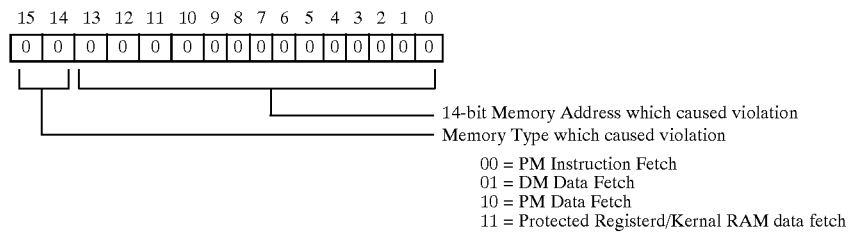

External Memory Configuration Register (EXMEMCFG)

This 16-bit Read/Write register, as shown in the table below, allows selecting configuration settings for the external memory subsystem. Bit 0 configures the nature of the external memory bus. It should normally be programmed at CryptIC power-up and left unchanged. One effect of this bit is that it changes the behavior of external address bit [0] and the CS32 and DMS pins. In 16-bit memory mode, only DMS should be used and A0 functions to select even and odd words of memory.

In 32-bit mode, then memory devices must be used which allow 16-bit bus enables (e.g. either a 32-bit wide device with upper and lower 16-bit enables, or a pair of 16-bit wide devices). In this case, A0 should be left disconnected. DMS will select the 'lower' 16-bits of external memory, and CS32 will select the 'upper' 16-bits. Bit #1, External Memory Own, allows the DSP to arbitrate who owns the external memory bus: either the DSP or the DMA controller (and therefore also the Host processor). Typically, software will leave this bit set to 1 except when external memory must be accessed by the DSP. This allows PCI Target mode transfers to occur to ExtMem (since a Target transfer cannot always be predicted by the DSP).

IRE's CGX software always leaves this bit set to 1 (DMA controller owns), unless it is in the middle of an operation which requires DSP access to ExtMem.

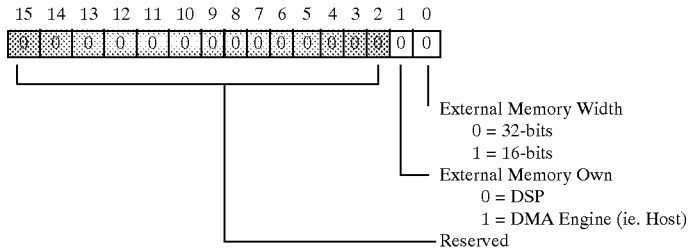

Interrupt Controller

Interrupt Controller Overview

The CryptIC enhances the existing Interrupt controller within the ADSP 2183 DSP with some additional functions related to the Crypto functional blocks and the external Host bus interfaces. Two additional Interrupt Controller subsystems have been added to the basic 2183 Interrupt Controller as shown in FIG. 10.

The DSP Interrupt Controller allows programming between 1 and 7 sources for the IRQ2 interrupt to the DSP. The DIMASK register provides the Mask to select which interrupt source is enabled. A pair of status registers, DUSTAT and DMSTAT, allow the DSP firmware to read the status of any interrupt source either before or after the Mask is applied.

The Host Interrupt Controller allows programming between 1 and 4 sources for the HostIntO interrupt output signal (which may be connected to the interrupt input of the Host system). The HIMASK register provides the mask to select which interrupt source is enabled. A pair of status registers, HUSTAT and HMSTAT, allow the Host firmware to read the status of any interrupt source either before or after the Mask is applied.

Interrupt Source Descriptions

The DSP and Host Interrupt Controllers support the following additional interrupt sources, as shown in the table below.

TABLE 8

Interrupt Sources

| Name | Description |
| --- | --- |
| Host Interrupt | This is a software-forced interrupt towards the DSP from the Host. |
| DSP Interrupt | This is a software-forced interrupt towards the Host from the DSP. |
| H/E Context 0 Done | This indicates that the Hash/Encrypt engine within the CryptIC has just finished fully processing a command for Context 0. It will occur after either the Length bytecount has decremented to 0 or if the H/E Control word is written with an idle command (111 in the 3 lsb's). |

TABLE 8-continued

Interrupt Sources

| Name | Description |
| --- | --- |
| H/E Context 1 Done | Same as above, but for Context 1. |
| Host wrote Command | The Host Processor has just written the least-significant word of the Application Registers mailbox. This notifies the DSP of this event. |
| DSP wrote Command | The DSP has just written the least-significant word of the Application Registers mailbox. This notifies the Host of this event. |
| Master DMA Transfer Done | Indicates that a DSP-initiated Master DMA transaction is complete. This is triggered from bit 3 of the DMA Status/Config. Register going from 1 to 0. |
| Master DMA Transfer Queued | Indicates that a DSP-initiated Master DMA transaction has just been queued in the double-buffered holding register, thus there is no room for another DSP DMA command. This is triggered from bit 15 of the DMA Status/Config. register going from 0 to 1. |
| Host External Memory Conflict | A DMA transfer was attempted to or from External Memory, but the ownership bit was not set to allow the transfer (ie. the DSP had ownership.) See EXMEMCFG register in section 0. |
| Hash/Encrypt Error | A Hash/Encrypt error occurred. The error code is given in the H/E Error Code register. |
| IRQ2 | This is simply the IRQ2 external pin on the CryptIC. This allows the DSP to 'OR' it in with the other crypto-related interrupt sources |

Interrupt Control Resisters (INTC)

The Interrupt Control and Status Registers, as shown in the table below, consist of two sets of 6 registers which allow the DSP or the Host system to enable or disable crypto interrupts, check the status of the most recent interrupt, force an interrupt, etc.

TABLE 9

Interrupt Register Set

| ADDRESS (16 BIT) | ADDRESS (32 BIT) | REGISTER NAME | R/W | Reset efaul | DESCRIPTION |
|---|---|---|---|---|---|
| | | INTERRUPT CONTROLLER REGISTERS | | | |
| DSP-Visible Registers: | | | | | |
| 0x1800 | N/A | DSP Unmasked Status | R | | Interrupt source current states - Prior to mask |
| 0x1801 | N/A | DSP Masked Status | R | | Interrupt source current states - Post mask |
| 0x1801 | N/A | DSP Clear Int | W | | Clear selected Interrupt |
| 0x1802 | N/A | DSP Mask Control | R/W | | Interrupt mask register |
| 0x1803 | N/A | DSP Int Config. | R/W | | DSP Interrupt configuration register |
| 0x1804 | N/A | Force Host Int | W | | Force interrupt to Host (PCI/PCMCIA) |
| 0x1805 | N/A | H/E Error Code | R | | Provides the H/E Error Code |
| Host-Visible Registers: | | | | | |
| N/A | 0x0080–0081 | Host Unmasked Status | R | | Interrupt source current states - Prior to mask |
| N/A | 0x0084–0085 | Host Masked Status | R | | Interrupt source current states - Post mask |
| N/A | 0x0084–0085 | Host Clear Int | W | | Clear selected interrupt |
| N/A | 0x0088–0089 | Host Mask Control | R/W | | Interrupt mask register |
| N/A | 0x008C–008D | Host Int Config. | R/W | | Host interrupt configuration register |
| N/A | 0x0090–0091 | Force DSP Int | W | | Force interrupt to DSP |
| N/A | 0x0092–0093 | H/E Error Code | R | | Provides the H/E Error Code |

DSP Unmasked Status Register (DUSTAT)

This 16-bit Read-Only register, as shown in the table below, provides interrupt status visibility to the DSP, prior to the interrupt mask being applied. Thus, the DSP can view all potential sources of incoming interrupt. All of these sources, whether masked in or out, will be latched in this register and must be cleared using the DICLR register in order to view a subsequent interrupt.

DSP Masked Status Register (DMSTAT)

This 16-bit Read-Only register, as shown in the table below, provides Interrupt Status visibility to the DSP, after the Interrupt Mask is applied. This lets the DSP view the selected sources of Interrupts which are directed to IRQ2. (Note that the DSP must enable IRQ2 via the IMASK register and the global ENA INTS command must be issued in order to actually receive the interrupt.) As with the

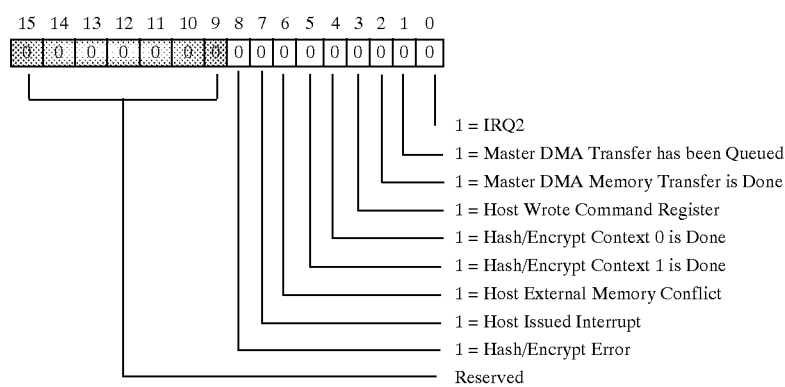

Register Address (READ ONLY)

| DSP | PCMCIA | PCI |
|---|---|---|
| 0x1800 | Not Visible | Not Visible |

15 14 13 12 11 10 9 8 7 6 5 4 3 2 1 0

1 = IRQ2
1 = Master DMA Transfer has been Queued
1 = Master DMA Memory Transfer is Done
1 = Host Wrote Command Register
1 = Hash/Encrypt Context 0 is Done
1 = Hash/Encrypt Context 1 is Done
1 = Host External Memory Conflict
1 = Host Issued Interrupt
1 = Hash/Encrypt Error
Reserved Unmasked status register, all interrupt bits are latched and must be cleared using the DSP Clear Interrupt register.

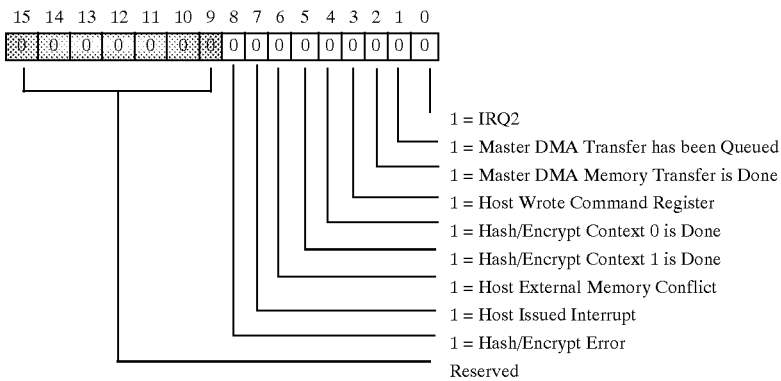

DSP Clear Interrupt Register (DICLR)

This 16-bit Write-Only register allows the Processor to Clear pending Interrupts. It is located at the same address as the Masked Status Register (Write vs. Read) which facilitates performing a read to detect pending interrupts followed by a write of the same bits in order to clear the latched interrupt status.

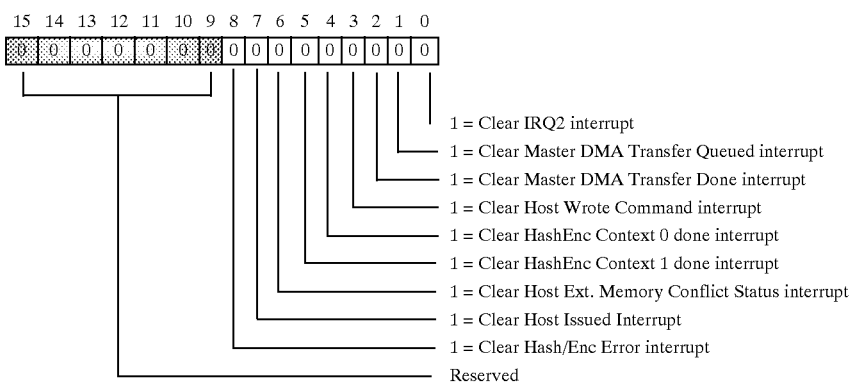

DSP Mask Control Register (DIMASK)

This 16-bit Read/Write register, as shown in the table below, allows configuring the Interrupt Masks for the Crypto subsystem.

Register Access (READ/WRITE)

| DSP | PCMCIA | PCI |
|---|---|---|
| 0x1802 | Not Visible | Not Visible |

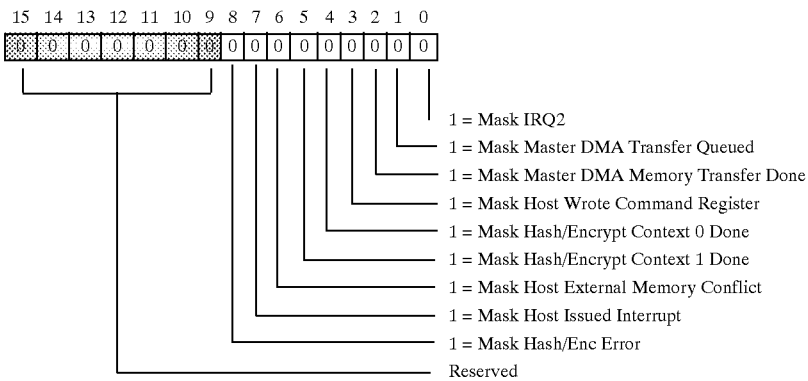

- 1 = Mask IRQ2
- 1 = Mask Master DMA Transfer Queued
- 1 = Mask Master DMA Memory Transfer Done
- 1 = Mask Host Wrote Command Register
- 1 = Mask Hash/Encrypt Context 0 Done
- 1 = Mask Hash/Encrypt Context 1 Done
- 1 = Mask Host External Memory Conflict
- 1 = Mask Host Issued Interrupt
- 1 = Mask Hash/Enc Error
- Reserved

DSP Interrupt Configuration Register (DICFG)

This 16-bit Read/Write register, as shown in the table below, allows configuring the Interrupt type which will be fed into the IRQ2 interrupt line of the CryptIC's DSP. Note that this only effects the final output of the Interrupt subsystem.

Configuring for Pulse will cause the internal interrupt signal to pulse low for two clock cycles when activated. When set for Level, the interrupt signal will be set low until cleared by the DSP (i.e. it will follow the bit in the Masked Status Register).

Register Address (READ/WRITE)

| DSP | PCMCIA | PCI |
|---|---|---|
| 0x1803 | Not Visible | Not Visible |

Interrupt Output Signal Type:
1 = Pulse, 0 = Level
Reserved

Register Address (WRITE ONLY)

| DSP | PCMCIA | PCI |
|---|---|---|
| 0x1804 | Not Visible | Not Visible |

Don't Care

Force DSP Interrupt Register (DIFRC)

This 16-bit Write-Only register, as shown in the table below, allows the DSP Software to Force a Crypto subsystem Interrupt to the external Host processor. The data contents of the Write operation are ignored—any Write to this address will cause an interrupt, if enabled by the HIMASK register.

DSP or Host H/E Errors Register (DSPHERR, HOSTHERR)

This 32-bit Read/Write register, as shown in the table below, provides the error code which resulted in a H/E Error interrupt. Reading a '1' in a bit position within this register indicates the type of error which occurred. In order to clear the error latch, 0's should be written to the desired bit positions.

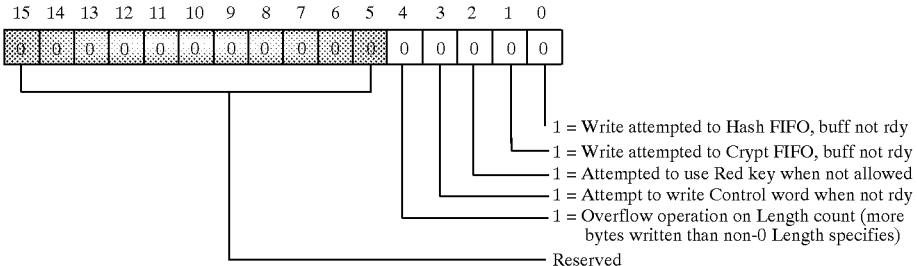

Host Unmasked Status Register (HUSTAT)

This 32-bit Read-Only register, as shown in the table below, provides interrupt status visibility to the Host, prior to the interrupt mask being applied. Thus, the Host can view all potential sources of incoming interrupt. All of these sources, whether masked in or out, will be latched in this register and must be cleared using the HICLR register in order to view a subsequent interrupt. can view all potential sources of incoming interrupt. All of these sources, whether masked in or out, will be latched in this register and must be cleared using the HICLR register in order to view a subsequent interrupt.

Host Masked Status Register (HMSTAT)

This 32-bit Read-Only register, as shown in the table below, provides Interrupt Status visibility to the Host, after the Interrupt Mask is applied. This lets the Host view the selected sources of Interrupts which are directed to PF7 which is normally connected to the Host bus interrupt. As with the Unmasked status register, all interrupt bits are latched and must be cleared using the Host Clear Interrupt register.

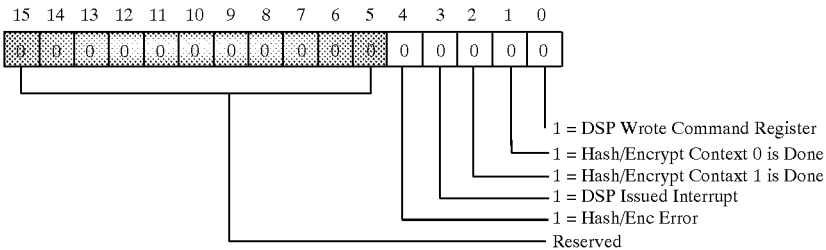

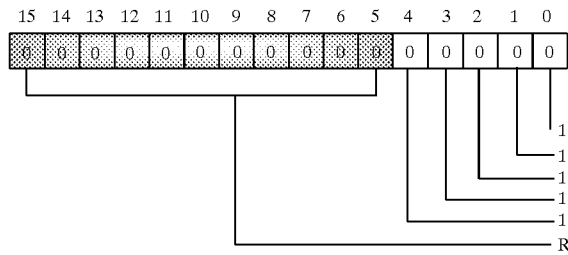

Host Clear Interrupt Register (HICLR)

This 32-bit Write-Only register, as shown in the table below, allows the Host to Clear pending Interrupts. It is located at the same address as the Masked Status Register (Write vs. Read) which facilitates performing a read to detect pending interrupts followed by a write of the same bits in order to clear the latched interrupt status.

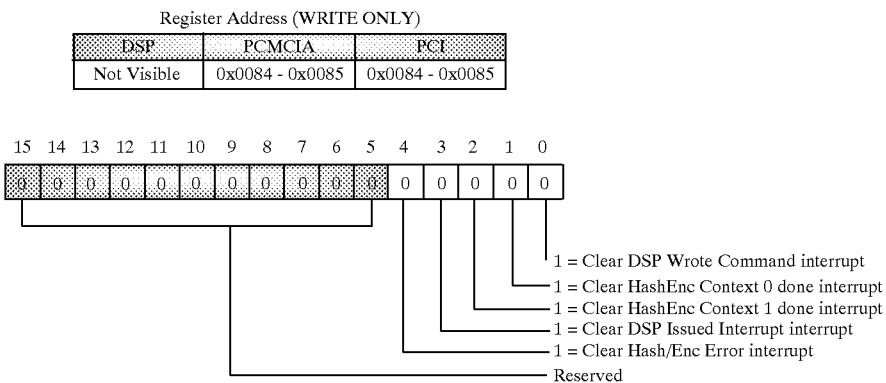

Host Mask Control Register (HIMASK)

This 32-bit Read/Write register, as shown in the table below, allows configuring the Interrupt Masks for the Crypto subsystem.

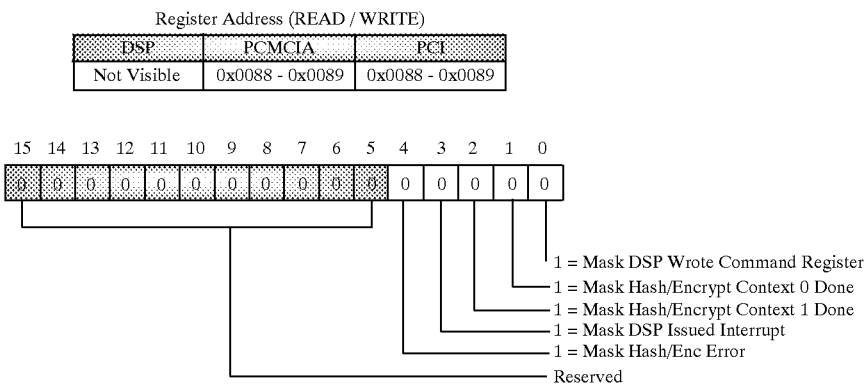

Host Interrupt Configuration Register (HICFG)

This 32-bit Read/Write register, as shown in the table below, allows configuring the Interrupt type which will be fed to the PF7 interrupt line out of the CryptIC. Note that this only effects the final output of the Interrupt subsystem.

Configuring for Pulse will cause the PF7 interrupt output to pulse low for two clock cycles when activated. When set for Level, the interrupt signal will be set low until cleared by the Host (i.e. it will follow the bit in the Masked Status Register).

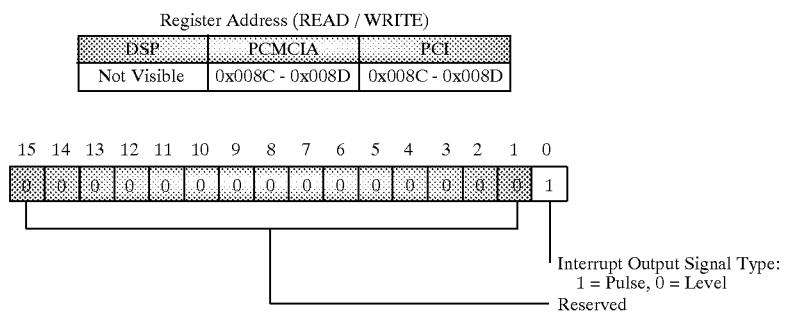

Force Host Interrupt Register (HIFRC)

This 32-bit Write-Only register, as shown in the table below, allows the Host Software to Force a Crypto subsystem Interrupt to the DSP processor. The data contents of the Write operation are ignored—any Write to this address will cause an interrupt, if enabled by the DIMASK register.

Register Address (WRITE ONLY)

| DSP | PCMCIA | PCI |
|---|---|---|
| Not Visible | 0x0090 - 0x0091 | 0x0090 - 0x0091 |

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| X | x | x | x | x | x | x | x | x | x | x | x | x | x | x | x |

Don't Care

Serial EEPROM

Serial EEPROM Overview

The CryptIC provides an interface port for connection of a 2 kbit (256-byte) serial EEPROM (93C66 or equiv.). The principal purpose of this is to allow automatic boot-loading of the PCI or PCMCIA port configuration parameters. The serial EEPROM is not mandatory however, since the DSP may directly program these configuration settings into the PCI/PCMCIA bus core using the registers described below. It should be noted however, that the DSP must be able to program these settings before it can communicate using the PCI/PCMCIA bus. This implies that the CryptIC could not be boot-loaded from the PCI/PCMCIA bus unless a EEPROM was connected.

A secondary use of this EEPROM port can be application-specific. Since there is extra unused space in the EEPROM, a user application may use the remaining space for non-volatile storage of a relatively small amount of data. Examples could include: A Black KEK, a digital certificate, a user authentication 'master' password, etc. Since the EEPROM is directly connected to the CryptIC and can only be controlled by the DSP, there is a certain amount of intrinsic protection to this data store.

For PCI applications, the PCI configuration parameters occupy the first 13 locations of the EEPROM, leaving 243 bytes remaining for user-specific applications. In Cardbus systems, there is additional CIS storage required after the first 13 locations.

For PCMCIA applications, the CIS configuration parameters occupy the first TBD locations of the EEPROM, leaving TBD bytes remaining for user-specific applications.

For applications which do not use either the PCI or the PCMCIA buses, the entire EEPROM (256 bytes) is available for applications.

In order for user applications to utilize the serial EEPROM, a low-level software driver must be written on the DSP to implement the unique bit-level protocol of the serial EEPROM. The EEPROM Command/Status port simply provides read/write access directly to the four EEPROM signal lines: Serial Clock (SK), Data In (DI), Data Out (DO), and Chip Select (CS). Refer to the manufacturers datasheet for the EEPROM for information on its protocol.

'Manual' Host Bus Configuration

As mentioned above, the DSP can override the automatic bootloading of the Host bus (PCI/PCMCIA) static configuration parameters from a EEPROM. The sequence of operations is as follows:

a) Set [bit 1] of the EECMDSTAT register to '1' to stop the autoload state machine.
b) Write valid configuration into the first 13 EEPROM registers.
c) Set [bit 0 & bit 1] of the EECMDSTAT register to '1' to remove the EEPROM busy indication and enable the Host bus.
d) Poll [bit 2] of the EECMDSTAT register to verify a '0' (not busy).

EEPROM Control Registers

The EEPROM Control and Status Registers, as shown in the table below, consist of 14 registers which allow the DSP to directly configure the PCI or PCMCIA configuration registers. The last register, the Command/Status register allows general control of the serial EEPROM interface.

| ADDRESS (16 BIT) | ADDRESS (32 BIT) | REGISTER NAME | R/W | Reset Default | DESCRIPTION |
|---|---|---|---|---|---|
| SERIAL EEPROM REGISTERS | | | | | |
| 0x1900 | N/A | Device D | R/W | | 16-bit PCI device ID |
| 0x1901 | N/A | Vendor ID | R/W | | 16-bit PCI vendor ID (11D4h) |
| 0x1902 | N/A | Rev ID/Class | R/W | | 8-bit chip Revision ID, 8-msb's of PCI Class Code |
| 0x1903 | N/A | Class Code | R/W | | remaining 16-lsb's of PCI Class Code |
| 0x1904 | N/A | Header Type/Int | R/W | | PCI header type & Interrupt Pin |
| 0x1905 | N/A | Subsystem ID | R/W | | 16-bit PCI Subsystem ID |
| 0x1906 | N/A | Subsystem Vendor ID | R/W | | 16-bit Subsystem Vendor ID |
| 0x1907 | N/A | Max Lat, Min Gnt | R/W | | Maximum Latency, Min Grant parameters |
| 0x1908 | N/A | Cardbus1 | R/W | | lower 16-bits of Cardbus CIS pointer |
| 0x1909 | N/A | Cardbus2 | R/W | | upper 16-bits of Cardbus CIS pointer |
| 0x190A | N/A | Baddr mask1 | R/W | | Specifies 1 = modifiable 0 = our addresses |
| 0x190B | N/A | Baddr mask2 | R/W | | Upper 16 bits |
| 0x190C | N/A | CIS Size | R/W | | CIS Size spec 16-bit (Upper 8 bits are 0) |
| 0x190F | N/A | Cmd/Status | R/W | | EEPROM Command and Status Register |

EEPROM Command/Status Register (EECMDSTAT)

This 16-bit Read/Write register, as shown in the table below, allows control and status monitoring of various serial EEPROM functions. It also provides access to the input/output lines of the EEPROM, if enabled.

Bit 0: Clear EEPROM busy indication. The DSP should write a 1 to this bit after it has loaded the 13 PCI configuration registers.
Bit 1: Allows the DSP to shut-off the automatic hardware state machine which attempts to automatically download the PCI config/PCMCIA CIS into the bus interface core. It must be set to a 1 in order to program the first 13 EEPROM registers.
Bit 2: This bit indicates whether the hardware state machine is still attempting to load the configuration from the EEPROM into the bus core. It must be a 0 to enable the PCI interface. It will clear to 0 if state machine finishes or if the DSP writes a 1 to bit 0.
Bits [7:4] allow the DSP direct access to the corresponding pins on the EEPROM device. For these register bits to be active, a '1' must be written to the Stop EEPROM State Machine [bit 1] of this register.

Register Address (READ / WRITE)

| DSP | PCMCIA | PCI |
|---|---|---|
| 0x190F | N/A | N/A |

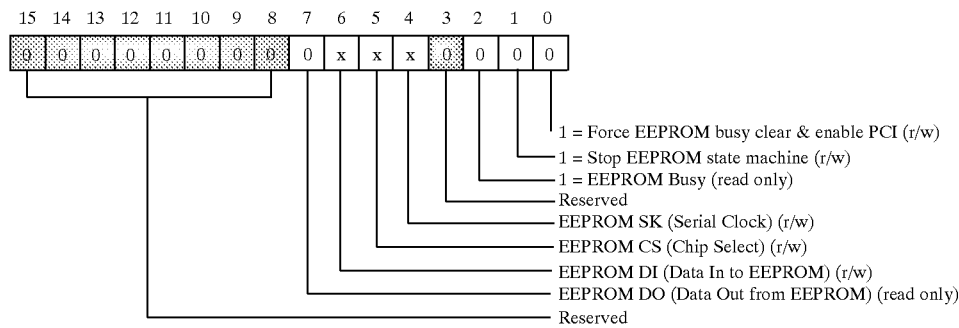

1 = Force EEPROM busy clear & enable PCI (r/w)
1 = Stop EEPROM state machine (r/w)
1 = EEPROM Busy (read only)
Reserved
EEPROM SK (Serial Clock) (r/w)
EEPROM CS (Chip Select) (r/w)
EEPROM DI (Data In to EEPROM) (r/w)
EEPROM DO (Data Out from EEPROM) (read only)
Reserved Boot Loading Boot Loading Overview The CryptIC provides multiple modes of boot-loading it operating software. Virtually all implementations of the CryptIC require at least some application-specific code running on its internal DSP. Of course, the CGX security kernel is hard-coded into ROM on the device and does not need to be boot-loaded from the outside.

The boot modes are as follows:
Byte Memory Booting (BDMA)
Host Bus Booting
   From PCI
   From PCMCIA
   From IDMA
Local ROM Booting Byte Memory Booting In order to bootload the CryptIC from Byte memory, an 8-bit wide PROM must be connected to the CryptIC's external memory bus in the 'Byte Memory' space (using BMS chip select).

To specify bootloading from Byte memory via the BDMA port, the following mode pin states must be set:

MMAP=0
BMODE=0
BUS_MODE=Don't care
BUS_SEL=Don't care

When the Crypt powers-up, it will automatically begin DMA'ing the first 32 Program Memory words (96 bytes) into the base of internal Program Memory (PM). It will then begin program execution at address 0x0000 with a BDMA interrupt pending.

In fact, this bootloading process is identical to that for a standard ADSP 2181/2183 device. Refer to the Analog Devices ADSP-2100 Family User's Manual for more information on 'Boot Memory Interface'.

Host Bus Booting

The CryptIC may also be bootloaded via the Host processor bus interface. The procedure is slightly different, depending on which bus mode is selected.

PCI Bus Booting

In order to bootload from the PCI bus, the following mode pin states must be set:

MMAP=0
BMODE=1
BUS_MODE=1
BUS_SEL=0

In addition, a serial EEPROM must be connected to the CryptIC in order for it to automatically load its PCI default configuration parameters and enter the PCI-Enabled state.

Once the CryptIC is powered-up, its PCI core will automatically initialize itself and the DSP will enter a Reset state. It will then wait for code to be bootloaded from the PCI host.

The PCI host will initially program the necessary data in the PCI Configuration registers of the CryptIC (ie. Base Address Registers, etc.), and then may begin downloading a bootloader code segment into the CryptIC's internal PM memory space. Downloading occurs by using Target mode IDMA writes into the internal PM space. See section PCI Address Map described previously for additional information.

The procedure dictates that PM address 0x0000 be loaded last, since this causes program execution to begin automatically (Reset is deasserted by the CryptIC). Refer to the Analog Devices ADSP-2100 Family User's Manual for more information on 'Bootloading through the IDMA port'.

Acronyms/Terms

Acronyms

The following table is a list of acronyms used with the description of the co-processor.

| Acronym | Meaning |
| --- | --- |
| ASIC | Application-Specific Integrated Circuit |
| CGX | CryptoGraphic eXtensions |
| CT | Cipher Text |
| DES | Data Encryption Standard |
| D-H | Diffie-Hellman |
| DMA | Direct Memory Access |
| DSA | Digital Signature Algorithm |
| IV | Initialization Vector |
| KCR | Key Cache Register |
| KEK | Key Encryption Key |
| LSV | Local Storage Variable |
| MAC | Message Authentication Code |
| PCDB | Program Control Data Bits |
| PIN | Personal Identification Number |
| PT | Plain Text |
| SHA | Secure Hash Algorithm |
| SHS | Secure Hash Standard |

Terms

The following table is a list of terms used with the description of the co-processor.

| Term | Meaning |
| --- | --- |
| BLACK Key | A secret/private key that is encrypted or covered by a KEK, it can be securely given to another party. |
| Covered Key | A secret key that has been encrypted, via a KEK, to protect the key from being seen by an undesirable party. Similar to a Black key. |
| Key Cache Register (KCR) | A working storage area for secret keys, addressable via a register ID between 0 and N. |
| Key RAM (KRAM) | A volatile public key work area. The public key will be lost during a power-down or reset. |
| Local Storage Variable (LSV) | A non-volatile Laser-programmed secret key that can be used by the application as its own unique private key. Each CryptIC has a unique LSV programmed into it at the factory. |
| Program Control Data Bits (PCDB) | Programmable control bits to customize the secure Kernel features (such as allowing RED key exportation/importation, LSV changes, exportable chip, etc.). |
| RED Key | A secret/private key that is not encrypted or covered by another KEK. It is in its raw unprotected form. |

The following is a detailed description of the cryptographic co-processor taken from a CGX interface programmer's guide prepared by the assignee and owner of the invention, Information Resource Engineering, Inc. (IRE). As with the previous description taken from the user's guide, the cryptographic co-processor is often referred to herein by the trademark 'CryptIC'. The co-processor is also often referred to by part number ADSP 2141. The following includes a detailed description for software developers intending to use the CGX library embedded in the CryptIC. It includes an overview of the CryptIC's CGX software architecture, its key management structure, the command interface, and a detailed description of CGX commands. Incorporated herein by reference is also the Analog Devices ADSP-2100 family User's Manual which includes further information on programming the DSP embedded within the CryptIC.

GENERAL DESCRIPTION

The CryptIC device is designed to be a highly integrated, general purpose 'security system on-a-chip'. It combines a set of high-performance Hardware blocks to accelerate time consuming cryptographic operations, together with an embedded Digital Signal Processor (DSP) which serves as a crypto system controller. The DSP:

Implements a 'Security Kernel' which simultaneously enforces certain security policies within the CryptIC and insulates Applications from the details of many complex cryptographic operations.

Can be used as a security co-processor to manage data movement between a Host system and the CryptIC.

Can be used to run general-purpose User applications such as a V.34 modem or a Network Interface Card controller.

The Security firmware which is mask-programmed into ROM on the CryptIC is designated as the CGX (CryptoGraphic extensions) Kernel. It is a suite of approximately 40 functions which are available to Applications which require security services.

A protection model is built into the DSP so that security-related and real-time intensive applications can coexist. At any instant in time, the DSP can either be operating in 'Kernel Mode' which means that one of the CGX commands is in process or it can be in 'User Mode' which means that a user application is running. In Kernel Mode, all of the CryptIC resources are available to the CGX firmware. In User Mode, access to Key Storage locations and many of the Security Blocks is restricted in order to enforce proper security policy. A degree of multi-tasking can be achieved between User and Kernel processes, and Kernel Mode processing can be interrupted by User code. In addition, a subset of the CGX commands may be preempted by another CGX command.

To simplify Application-level access to crypto functions and allow the coexistence of general-purpose applications running on the DSP, an Application Programming Interface (API) is provided to the CGX Kernel. The CGX Command Interface defines the boundaries between the security functions (which the CGX Kernel implements) and the externally running applications, either on the CryptIC's DSP or on external Hosts communicating via the PCI/PCMCIA bus. A block diagram of the CGX software interface is shown in FIG. 11.

CGX Software Overview

One of the primary goals of the CryptIC CGX software is to abstract the hardware blocks of the CryptIC from the application in a secure and efficient manner. The CGX Kernel has been designed so as to avoid the common problems of linking-in security software with an application or worrying about what resources the application must set aside to accommodate the security software.

The CGX interface is designed so that it can be viewed in one of two ways, depending on the preference of the application programmer. The actual CGX interface is the same for both views; the difference is in how the application utilizes the CGX interface.

It can be viewed as a Crypto Library with a C-structure like interface with argument and pointer-passing It can be viewed as a Hardware-accelerated subsystem of the chip, with a register-based interface In the hardware-oriented view, the CGX interface appears as a 21-word register set (the command block) which is mapped into an application-specified memory space in the CryptIC. This is similar to the concept of the MMX (Multi-Media eXtension) instructions enhancements to Intel's Pentium chips. The CryptIC can similarly be viewed as a single-chip general-purpose processor with added CGX (CryptoGraphic eXtensions) instructions.

To implement the CGX command set, both hardware and software components are integrated on the CryptIC. The hardware components are essential in providing the crypto acceleration and for the protection/security of the CGX Kernel and key material from the user application and the external world. As shown in FIG. 12, the CryptIC's hardware components are accessed mainly in the Crypto Library, and some are also used in the CGX Command Processor to implement protection features.

The CGX software resides within the dashed line illustrated in FIG. 12. The application runs on the DSP and uses the CGX Command Interface as an API to access the CGX command set. To better understand the software architecture of the CryptIC security software, a description of each layer is provided in the sub-sections below.

Application Layer

The application layer is where the actual application program and data space resides. The application has full-control of the general purpose DSP and its associated hardware resources. In order to access the cryptographic services, the application must invoke the command interface and pass-in a command code and arguments. The application running in the User space of the DSP can implement anything from a router security co-processor to a V.34 modem data pump.

Residing as part of the application layer are the macro functions which IRE provides in its cgx.h file. These macros assist the application in preparing the command messages prior to calling the CGX kernel.

CGX Command Interface Layer

The CGX command interface layer is an Application Programming Interface (API) which defines the boundaries between the application and the CGX Kernel. The CGX command interface provides the hardware mechanism to enter and exit the CGX Kernel to execute a specific cryptographic command. Part of the command interface function invokes the kernel protection logic to isolate the CGX Kernel and its associated security resources from the external application via the Kernel Protection Logic built into the CryptIC. This prevents the possibility of leaking Red key material or of unauthorized external access to the CGX Kernel's program or data space.

The software interface to the CGX Kernel is via a data structure called the kernel block. The kernel block is split into two fields: the command block and status block. The command block is used to request a specific cryptographic command and to provide a means to pass-in arguments. The status block provides the application with a means to track the status of the CGX Kernel (i.e. is it active or idle) and a means to determine the result status of a requested cryptographic service.

Therefore, all communications between the application and CGX Kernel is via the command interface and a Kernel block. The command interface is discussed in more detail in the section Command Interface.

CGX Command Processor Layer

The CGX Command Processor implements a secure Operating System responsible for processing application requests for various cryptographic services. The CGX Command Processor is invoked by the application via a call to the CGX entry address (0x2000 with PMOVLAY=0x000F). Once the CGX Kernel is active, it can process the requested cryptographic function specified in the kernel block defined as part of the CGX command interface layer. The CGX Command Processor is responsible for maintaining the security of the internal cryptographic software, key material, and associated security devices.

Like other operating systems, the CGX Command Processor is responsible for time-sharing the security resources. It does this through DSP context management, preemption management, and system integrity management.

DSP Context Management

Once the CGX Command Processor is activated via the call to address 0x2000, it invokes its DSP context management software. The DSP context management software is responsible for saving the application's current context (i.e. the DSPs registers, frame pointer, and stack pointer). This allows the CGX Kernel to use the full DSP register set. Furthermore, the CGX Command Processor must update the application's status block to reflect a 'running' state. Once a cryptographic function is complete, the CGX Command Processor cleans up, modifies the application's status block with the result of the cryptographic service, restores the applications DSP context, and returns back to the application.

Preemption Management

For certain CGX commands, the Command Processor can allow a new command to preempt a running one. This includes when it is actively processing one of the public key or digital signature commands and the preempting command is a hash or symmetric key command. This feature is provided because some of the public key commands can take hundreds of milliseconds to complete. However, if a preemptive request comes in and the CGX Kernel is not executing one of the preemptable commands, the CGX Command Processor will return a CGX_BUSY_S status code and will not execute the command.

System Integrity Management

Lastly, the CGX Command Processor is responsible for monitoring the security integrity of the CryptIC software and hardware resources. As part of initialization processing, the CGX Command Processor runs a suite of self-tests to verify the health of the security components. The CGX Command Processor will not give control of the DSP to the application until the self-test suite completes successfully. Furthermore, there are several protection mechanisms to prevent key material leakage which require the CGX Command Processor to explicitly set hardware register bits enabling specific cryptographic service. This level of control is only permitted for the CGX Command Processor; thus preventing accidental or intentional access to areas of the security blocks not allowed.

CGX Overlay Layer

The CGX overlay layer is provided as the interface into IRE's CryptoLIB software. The CryptoLIB software is a library that is designed for multiple platforms, ranging from the PC to embedded systems. The CGX overlay acts as the 'wrap code' to enable the library to execute on the CryptIC platform unmodified. FIG. 13 illustrates the data flow through the CGX overlay layer.

When a cryptographic request is received, the CGX Command Processor parses the kernel block to determine the cryptographic command to execute. The CGX Command Processor executes a CGX overlay operation from a table, based on the command value embedded in the command block portion of the kernel block. The CGX overlay operation is responsible for extracting the arguments from the kernel block and invoking the proper CryptoLIB operations. In some cases, the CGX overlay operation may invoke several CryptoLIB operations. In effect, this is an object-oriented approach where the CGX overlay class is the parent class to the CryptoLIB classes.

CryptoLIB Layer

The CryptoLIB layer contains IRE's Crypto Library software and it also contains drivers for the CryptIC hardware blocks as well as 'soft' versions of the hardware algorithms (the soft versions are ifdef'ed out at compile time for the CryptIC). The CryptoLIB software is a library of many cryptographic classes implementing various cryptographic algorithms from symmetrical encryption algorithms to one-way Hash functions, to public key operations.

The CryptoLIB API is transparent to whether it is running with hardware acceleration or utilizing the library's software crypto functions. This hides the implementation of the CryptIC platform and allows full reuse of the general CryptoLIB software. This provides several advantages including:

The CryptoLIB software can be independently used in the PC environment

The software only 'C' version of CryptoLIB can be used during development of products which will use the CryptIC.

Enhancements and modifications to the CryptoLIB can be made and tested in the PC environment before migrating them into the hardware of the CryptIC.

CGX Software Components

This section describes the various software components that make up the CryptIC in more detail than the previous section. From the CGX programmer's perspective, it is primarily an architectural reference, since most of this functionality is hidden inside the CGX kernel.

CGX Command Processor

The CGX Command Processor is made up of many software components:

Reset processing

Initialization processing

Contention/preemption/reentrance processing

Configuration storage

Key storage

Command interface

Context management

Kernel operations

The following sub-sections describe the components that make up the CGX Command Processor.

Reset Processing

When the CryptIC is first powered-up, or after any Reset event, control is given to the CGX Kernel prior to allowing any application code to execute. The CGX Kernel performs a very quick 'reset-initialization': It first checks a 32-bit INIT flag location in KRAM to determine if the Kernel has previously been initialized. If it has, then the DSP's Computational registers and DAG registers are cleared. If the Kernel has not been initialized, then the DM_Reserve and PM_Reserve registers are cleared in order to free the DSP's internal PM and DM for application use. Finally, the CGX Kernel jumps to address 0x0000 in program memory (PMOVLAY=0) to resume the normal reset sequence.

Initialization Processing

There are two modes of initialization processing in the CGX kernel: Full-Init and Basic-Init. Full-Init occurs when the application issues the CGX_INIT command to the CGX kernel. Basic-Init is a safety net which will be automatically run if a CGX command is issued prior to the Full-Init being run.

The Full-Init actually executes the Basic-Init processing, but in addition provides some Kernel and Hardware configuration capability. When CGX_INIT is called, the application may supply a Kernel Configuration String (KCS) and/or a Program Control Data Bits (PCDB) configuration string in order to modify the behavior of the CGX kernel and the hardware functions of the CryptIC.

At some point after a reset, and the application code has control, the first CGX command is executed, passing control to the CGX Kernel. When the CGX Kernel is entered, it must first determine what type of operation to perform: Basic Initialization or CGX command processing. To determine what to do, the CGX Kernel reads the INIT flag, which is a 32-bit location in Kernel RAM. This flag represent the initialization state of the CGX kernel: If the flag is set to a pre-determined value, then it is an indication that the kernel mode has been previously entered and initialization has occurred, thus the CGX Command Processor proceeds to service the kernel block and implement the requested CGX command.

If the flag is not set to the proper value, then the kernel will assume that it first has to perform Basic-Init processing.

Note that it is normally expected that the application will first execute the CGX_INIT command prior to requesting any other CGX commands.

However, since this cannot be guaranteed, the following processing is included in the CGX entry processing.

Basic-Init Processing

If the CGX Kernel sees that the INIT flag has not been set when a CGX command is issued, it first enters the 'Basic-Init' mode to perform self-tests and other initialization steps. Upon returning from Basic-Init, the CGX Kernel sets the INIT flag, assuming the self-tests pass. From this point on, until the next power-cycle, the INIT flag will indicate that the kernel has been initialized and the CGX Kernel will not re-execute the startup self-tests.

As part of the Basic-Init processing, the CGX Kernel executes a set of self-tests to check the integrity of its ROM (using a pre-calculated MAC) Kernel RAM, and associated security devices (i.e. RNG). If any of these self-tests fail, the CGX Kernel returns a failure code (ie. CGX_RAM_FAIL_S)to the application via the status field of the kernel block and does not set the INIT flag. Furthermore, it will not execute any command until the self-tests pass and the INIT flag is written with a valid value.

Once the self-tests complete successfully, the CGX Kernel can proceed with the remainder of its initialization. There are several areas to initialize, the extended RAM/ROM Reserve bits, the PCDBs, and the KCS. Once the Basic-Init is complete, the CGX Kernel will proceed to process the original requested CGX command.

Full-Init Processing

At any time after reset, the initialization mode can be reentered by the application by using the CGX_INIT command. As part of the initialization command, the application must pass in two initialization strings, the PCDB string and the Kernel Configuration String (KCS). The initialization strings are an array of defined bits to allow the application to set, disable, and enable various features of the CGX Kernel (KCS) and of the CryptIC hardware blocks (PCDBs). Once the full initialization is complete, the CGX Kernel enters an idle mode and returns to the caller, waiting to service application requested CGX commands received across the command interface.

The following sub-sections define the initialization strings and the areas that are initialized as part of the Basic-Init or upon the application's request for the CGX_NIT command.

PM/DM Reserve Bits

If the initialization mode is entered for the first time, the INIT flag will not match its predefined value. In this case, the initialization routine must clear the PM_Reserve and DM_Reserve registers. These are two 16-bit registers for which each bit represents a 1K memory block of internal PM or DM memory. A bit set to '1' indicates that the corresponding 1 k memory block has been locked into use by the CGX Kernel and cannot be accessed in user mode.

These bits are preserved through resets. Therefore, if any of the PM/DM_Reserve bits are set (i.e. a 1) the CGX Kernel must erase the RAM blocks that are locked, since there may be sensitive information in this memory. Then after each locked block is erased, the CGX kernel can release them by clearing the PM & DM Reserve bits to a 0.

Programmable Control Data Bits (PCDB) Initialization

The PCDBs are laser-programmed at the factory with a set of defaults and may later be changed by the application via a special unlock-data token that IRE or a designated OEM can provide. The end-user can use an unlock-data token provided by IRE to later enable/disable various features via the initialize command (i.e. CGX_INIT). Managing the access to the PCDBs with an unlock data message allows IRE or other OEMs to control what type of services customers have access to. The PCDB bits must be initialized if not already done. Initially, the laser-burned copy of the PCDBs are moved to the working RAM copy. However, by invoking the CGX_INIT command, the application can re-program some of the RAM shadowed PCDB bits, providing a digitally-signed token is presented along with the request.

If the application desires to later change the PCDBs back to the factory laser default, the application can use the restore-default command, CGX_DEFAULT.

The PCDBs allow the application to customize the CGX Kernel's cryptographic operations and control. The PCDBs contain such items as: a bit to allow importing Red KEKs, enabling/disabling crypto-algorithms to make a device exportable, configuring symmetric and public key lengths, etc. Refer to the section Kernal Configuration String (KCS) for a detailed description of the PCDB bits and their meanings.

Contention, Preemption, and Reentrance Processing

The CGX Kernel is preemptive, and for certain commands it is also reentrant. Being preemptive means that if an interrupt occurs while the CGX Kernel is active, it allows the interrupt to vector to the application's interrupt service routine (ISR) in 'User memory'. Then after the interrupt has been completely processed, the CGX Kernel is resumed via the application's Return From Interrupt (RTI) instruction; thus the preempted CGX operation is continued.

For certain CGX commands (ie. public key and digital signature), it is possible to interrupt the command while it is running and then, within the interrupt service routine, issue another CGX command. The CGX Kernel firmware maintains two stacks and workspaces in order to allow 1 level of preemption/reentrance. The CGX commands are shown in the table below.

TABLE 10

CGX Command Preemption

| CGX Command | Can Preempt a CGX Command | Can be Preempted by Another CGX Command |
|---|---|---|
| CGX_INIT | | |
| CGX_DEFAULT | | |
| CGX_RANDOM | ☐ | |
| CGX_GET_CHIPINFO | ☐ | ☐ |
| Symmetric Key Commands | | |
| CGX_UNCOVER_KEY | ☐ | |
| CGX_GEN_KEK | ☐ | |
| CGX_GEN_KEY | ☐ | |
| CGX_LOAD_KEY | ☐ | |
| CGX_DERIVE_KEY | ☐ | |
| CGX_TRANSFORM_KEY | ☐ | |
| CGX_EXPORT_KEY | ☐ | |
| CGX_IMPORT_KEY | ☐ | |
| CGX_DESTROY_KEY | ☐ | |
| CGX_LOAD_KG | ☐ | |
| CGX_ENCRYPT | ☐ | |
| CGX_DECRYPT | ☐ | |
| Asymmetric Key Commands | | |
| CGX_GEN_PUBKEY | | ☐ |
| CGX_GEN_NEWPUBKEY | | ☐ |
| CGX_GEN_NEGKEY | | ☐ |
| CGX_PUBKEY_ENCRYPT | | ☐ |
| CGX_PUBKEY_DECRYPT | | ☐ |
| CGX_EXPORT_PUBKEY | | ☐ |
| CGX_EXPORT_PUBKEY | | ☐ |
| Digital Signature Commands | | |
| CGX_SIGN | | ☐ |
| CGX_VERIFY | | ☐ |
| Extended Algorithm Commands | | |
| CGX_LOAD_EXTENDED | | |
| CGX_EXECUTE_EXTENDED | ☐ | ☐ |
| Hash Commands | | |
| CGX_HASH_INIT | ☐ | |
| CGX_HASH_DATA | ☐ | |
| CGX_HASH_ENCRYPT | ☐ | |
| CGX_HASH_DECRYPT | ☐ | |
| Prf Commands | | |
| CGX_PRF_DATA | ☐ | |
| CGX_PRF_KEY | ☐ | |
| CGX_MERGE_KEY | ☐ | |
| CGX_MERGE_LONG_KEY | ☐ | |
| CGX_LONG2BLACK | ☐ | |
| Key Recovery Commands | | |
| CGX_GEN_RKEK | | |
| CGX_SAVE_KEY | | |
| Math Commands | | |
| CGX_MATH | | ☐ |

If an application attempts to perform a CGX preemption (ie. $2^{nd}$ call into CGX) which violates the above policy, or if it attempts to preempt a CGX command with another one while the Kernel is already running a $2^{nd}$ command, then the CGX call will return quickly with a CGX_BUSY_S error code in the Status block. In this case, the application will have to return from interrupt in order to let the currently running CGX command complete before attempting another CGX call.

To aid the application in determining the state of the CGX Kernel, a simple contention management scheme is available to the application. Contention management is necessary in order to prevent the application from attempting to re-enter the CGX Kernel while it is in a preempted state. This is a simple problem from the stand-point of the CGX Kernel because internally it can maintain semaphores to determine if preemption of an active command is allowed or whether it is already one level deep, executing a $2^{nd}$ CGX command. To easily allow the application to determine the CGX Kernel's state, the status of the CGX Kernel (i.e. active, complete, etc.) can be queried by the application at any time. The state can be obtained by looking at the current status block in DSP internal or external memory (the status block is part of the kernel block, as explained later).

This scheme has three advantages: First, the application does not have to invoke a command to query the state of the CGX Kernel, it can be read directly from the status block in memory. Secondly, it removes the complexity and burden of the application keeping track of the CGX Kernel's state on its own. Lastly, the status block provides the means for the CGX Kernel to retrieve the status result of the CGX operation (success or error code) which can be used by the application to debug/test the cryptographic operations.

Saving DSP Context at Interrupt

When a CGX operation is interrupted by the application, certain elements of the DSP processor's context must be saved and then restored upon return-from-interrupt. (This is of course necessary with any interrupt service routine.) The DSP hardware automatically saves the Program Counter on the hardware PC Stack and the Status Registers on the Status Stack. It is up to the application to determine if it should pull these values off of the hardware stack and move them to an application software stack.

In addition, the interrupting code must save the DAG registers, the PX register (lower 8-bits of Program Memory reads) and PMOVLAY, DMOVLAY registers as well as the computational registers (2 banks). In order to optimize interrupt processing, the application code can be designed to run in the Primary register set, while the CGX code can execute in the Secondary set. In this case, the application code will have to insure that the register set selection (MSTAT register) is properly handled upon interrupt and return-from-interrupt.

Once the external interrupt service completes, it restores the CGX Kernel context and invokes the RTI operation. The Status registers and Program Counter are automatically popped off the hardware stack at the RTI instruction. The return-from-interrupt operation vectors back into the CGX Kernel mode, at which point the Kernel Protection logic will resume and the interrupted CGX command processing will continue.

Storage Management

The CGX Command Processor is responsible for the storage devices associated with the security block of the CryptIC. The storage areas that concern the CGX Command Processor are the CGX Kernel's KRAM, the volatile Key Cache Registers, and the PM/DM_Reserve RAM blocks.

Furthermore, for the CGX Command Processor to fully protect key material and algorithms, it provides a protection of the DSP's registers as well as its RAM space. Although the RAM space is protected via specialized hardware, the CGX Command Processor uses critical regions (interrupts disabled) to protect registers. For example, when key material is moved in or out of the Kernel RAM, the DSP's registers are used. Therefore, a potential to read the key material exists should an intruder try to single-step the CGX Kernel via interrupts. Although the application can not read the protected KRAM and kernel ROM, it could read the DSP's registers. Therefore, all key material movement is done via the mem_cpy operation. This operation copies data from one place to another with interrupts disabled, and at the end it sets the registers it used to 0. This prevents applications from single stepping the Kernel. The same is done to the pm_cpy operation which is used to read program memory.

As mentioned earlier, the hardware provides key aspects to protecting various memory stores. In particular, the hardware provides several bus transceivers to only allow one memory to be accessed at a time. So that when the external RAM/ROM is accessed the external application can not read any of the CGX Kernel's internal memory (KRAM, kernel ROM, and extended RAM/ROM). Furthermore, the bus transceivers are placed on some of the security block memory devices in order to prevent the CGX Kernel from accidentally mixing Red key material with other memory devices used by the CGX Kernel. The following subsections outline the areas where the CGX Kernel enforces the security model.

Volatile Key Storage

The volatile key storage houses the private portion of a public key in the public key area and a fixed number of secret keys in the Key Cache Register (KCR) area. The volatile key area is also referred to as the actively working keys. All cryptographic commands operate only on the active volatile working keys. The application is responsible for moving keys between the outside world and the KCRs.

The CGX Command Processor only allocates enough space in the volatile KRAM for 15 symmetric Key Cache Registers. The CGX Command Processor provides ease of access to the secret keys by allowing them to be referenced by a register ID with numbers from 0 through 14.

Extended (Reserved) RAM Blocks

Under various circumstances, one or more 1 kword segments of PM and/or DM memory can be locked-into the kernel space. For example, as part of the CGX_INIT processing, the application can request to allocate some of the DM towards extending the number of Key Cache Registers.

The CGX Command Processor takes care of setting and resetting the PM_Reserve and DM_Reserve bits to lock and unlock blocks of memory. It also manages the secure information which is stored in these blocks and insures that if a block is unlocked, that its data is first erased.

Command Interface Processing

The CGX Command Processor is responsible for managing the command interface between the application and itself or the cryptographic services. The command interface to the CGX Kernel is a accomplished using a shared memory block and a special transfer address mechanism. The shared memory block (kernel block) provides the means for the application to communicate with the CGX Kernel, allowing the application the ability to query the CGX Kernel's status and request cryptographic services. The special transfer mechanism (CGX Kernel transfer routine) allows the application to invoke the CGX Kernel. The command interface is described in detail in the section Command Interface.

Command Processor Micro-Operations

The CGX Command Processor is similar to a command interpreter; it consumes the command and its arguments, invokes the proper service to execute the command, and returns the result. However, the CGX Command Processor is a little more complicated than that since it must perform several more micro-tasks similar to an OS. It must perform context switching, I/O services, and monitor the security, integrity, and health of the internal hardware components.

The CGX Command Processor is comprised of three modules of software: the entry code, the cryptographic service executor, and the exit code.

Entry

When the transfer vector is initiated by the application, the CGX Kernel is entered by setting the PMOVLAY register to 0x000F and then executing a CALL 0x2000 instruction. From the call instruction and some associated hardware logic and signals, the internally ROM encoded CGX Kernel program block is overlaid in the upper portion of the DSP's program space. This allows the CGX Kernel code to become active and transparent to the application. When the ROM-based CGX Kernel program block is overlaid, the processor immediately branches to the CGX Command Processor entry handler. The purpose of the CGX Command Processor entry handler is to determine the type of service it must perform. The entry code is all written in assembler due to real-time constraints of context saving and service restoration in the case of a command preemption.

The entry code runs with all interrupts disabled upon entry. The interrupts remain disabled for just for the entry code, until a point at which the CGX kernel has verified that it can perform the operation and has saved the application's context.

Once the entry code is operational, it sets up a local stack to execute from, and the CGX Command Processor saves the context of the externally running application (i.e. saves registers, the PC return address, the stack pointer, frame pointer, etc.), assigns a global pointer to the command block, writes a CGX_RUNNING_S code to the external status block (i.e. the CGX Command Processor is active), reenables interrupts, and calls the cryptographic command interpreter (described in the next sub-section).

However, if the CGX Command Processor is already active, it sets up a second local stack to execute from, (i.e. it is now being preempted) it saves the context of the externally running application (i.e. saves registers, the PC return address, the stack pointer, frame pointer, etc.), it saves a context of the preempted cryptographic command (i.e. save the global pointers to the command/status blocks, etc.), assigns a global pointer to the command block, writes a CGX_RUNNING_S code to the external status block (i.e. the CGX Command Processor is active), reenables interrupts, and calls the cryptographic command interpreter (described in the next sub-section).

Cryptographic Service Execution

The cryptographic command interpreter is fairly simple. The code accesses the command block pointer established in the entry code and based on the command, it invokes a cryptographic operation from a table of CGX overlay operations. No arguments are passed into the overlay operations. The overlay operations use the command block pointer to get access to the argument list. FIG. 14 illustrates this hierarchical approach to accessing the cryptographic operations.

The purpose of the layered hierarchical approach is simply to isolate the knowledge each layer needs to operate within the CGX Kernel. This allows the lowest level, the CryptoLIB to only have to implement cryptographic operations. To make this work, a middle layer called the CGX overlay is provided. The middle layer actually implements the wrap code around the cryptographic library, enabling memory, accessing the key RAM, etc.

As FIG. 14 shows, the overlay operation is responsible for invoking the CryptoLIB operations in order to carry out the requested cryptographic service. The overlay wrap code extracts the inputs and outputs from the command block and passes them as arguments to the CryptoLIB operations. Furthermore, the overlay operations, which are actually CGX Kernel operations, are responsible for enabling write access to external RAM and for updating the status field of the status block. This isolates the control of the sensitive hardware access features to the CGX Kernel only. Once the overlay operation is complete, the exit code is invoked.

Exit

The exit handler of the CGX Command Processor performs the following:

disable interrupts to establish a critical region,
restores the external application's DSP context,
writes the result code to the status block,
re-enables interrupts, and
cause the transfer back into the application and user memory space.

Also, as a security precaution, the write access enable to external RAM is disabled before returning to the application.

CGX Overlay

The purpose of the overlay operations is two fold: first, it provides a standardized interface to IRE's CryptoLIB. The overlay operations contain some wrap code and calls to CryptoLIB operations. The second purpose is to allow the reuse of IRE's CryptoLIB intact. Without the overlay operations, the CryptoLIB code would have to understand the kernel block interface; thus creating a non-standard package. Instead, a clean implementation of the CryptoLIB, using a C interface, is possible.

There is a CGX overlay operation for every cryptographic command provided by the command interface. The CGX operations reside in a single table that is accessed by the CGX Command Processor software by the command value embedded in the command block of the kernel block. Part of this table are bits that represent the preemption requirements and the privilege access bits.

CryptoLIB

The CryptoLIB software is a library of software functions that implement a full suite of cryptographic services. It is designed to be portable and flexible and the interface allows for certain functions to be customized by the application.

The interface to the CryptoLIB follows the ANSI C standards, and the CryptoLIB is all written in ANSI C format. The reason behind this is so that the same library base can be used in desktop environments as well as embedded applications like the CryptIC.

Therefore, since no special modifications to the CryptoLIB have been made, the CGX Kernel is recognized as another application to the CryptoLIB software. The CGX Kernel uses the library calls as would any other application in a PC environment or another embedded environment would. This has been accomplished because of the CryptoLIB's ability to allow it to be customized by the application.

Hardware/Platform Specific Drivers

A number of CryptIC specific drivers are provided. The drivers provided are:

a BIGNUM hardware assist driver,
a random number generator driver, and
crypto-block operations (i.e. DES engine).

Self-Tests

The self-test routines provide an integral part of determining the integrity and health of the security blocks. The self-test operations are used as part of the CGX Kernel reset processing to verify the health of the security blocks. The following is a list of self-tests that are supported:

CGX Kernel code integrity check,
   This self-test checks the integrity of the CGX Kernel's program by running a MAC over its entire 32K program space and comparing the MAC to the ROM encoded MAC.

randomizer check,
   This self-test checks the operation of the hardware randomizer. The method for this test is described in the FIPS 140-1 document for 'Continuous Random Number' test.

volatile key storage checks
   This self-test checks the volatile key storage (i.e. internal KRAM). The purpose is to verify the key storage integrity. To do this read, write, and stuck-at checks are performed.

Software States

The CGX Kernel is driven by a state machine as shown in FIG. 15. As can be seen in the figure, the state machine is fairly simple, comprising only four states.

RESET State

The RESET state can be transitioned to from any one of the four states, including the RESET state. The RESET state is entered upon powering up of the CryptIC, through the command of the application, or a fatal error detected by the CGX Kernel.

As discussed in the section Reset Processing, the RESET state performs the Basic-Init functions which include testing the sanity and integrity of its services, resources, and program. If any of these items fail, the CGX Kernel will reset the processor and the RESET state will be re-entered.

At the successful completion of self-tests the CGX Kernel will transition to the IDLE state. The only other state the CGX Kernel can transition to is the RESET state.

IDLE State

The IDLE state can be transitioned to from either the COMMAND state or COMMAND_BLOCK state. The IDLE state is entered upon the successful completion of the CGX Kernel's reset self-test suite or after the completion of a cryptographic command requested by the application.

In the IDLE state the CGX Kernel is inactive, it is idly waiting for the application's request for the next cryptographic command. Upon the request of a cryptographic command the CGX Kernel will transition to the RESET, COMMAND, or COMMAND_BLOCK state. The CGX Kernel will transition to the RESET state if an invalid kernel block is received. The CGX Kernel will transition to the COMMAND state if the preemption bit in the control field in the CGX overlay tupple data structure (cgx_overlay_tuple) is set to a 0; otherwise if the bit is set to a 1, it transitions to the COMMAND_BLOCK state. The preemption bit is described in the section CGX Overlay Interface.

COMMAND State

The COMMAND state can be transitioned to from either the COMMAND_BLOCK state or IDLE state. The COMMAND state is entered upon a request from the application of a cryptographic command; either back from preemption or an initial application request. When in the COMMAND state, the CGX Kernel allows the current cryptographic command to be preempted. However, only certain commands can be preempted and only certain commands can cause the preemption.

All of the public key and digital signature operations have the preemption bit set to a 0; thus allowing them to be preempted and causing the CGX Kernel to enter the COMMAND state from the IDLE state. A number of other CGX commands are allowed to preempt the public key and digital signature algorithms (see section 0).

Furthermore, the CGX Kernel only allows one level deep of preemption. Therefore, upon preemption the CGX Kernel transitions into the COMMAND_BLOCK state to prevent further preemptions. Thus, the cryptographic operation that caused the preemption must run to completion before the original one can complete or another one can preempt.

At the completion of the requested cryptographic command the CGX Kernel transitions back to the IDLE state. However, if some sort of severe error or hardware failure occurred the CGX Kernel will reset the processor; thus transition to the RESET state.

COMMAND BLOCK State

The COMMAND_BLOCK state can be transitioned to from either the COMMAND state or IDLE state. The COMMAND_BLOCK state is entered upon request by the application of a cryptographic command; either through preemption out of the COMMAND state, or via a single application request of a non-preemptable cryptographic command. When in the COMMAND_BLOCK state, the CGX Kernel will not allow the current cryptographic command to be preempted.

At the completion of the requested cryptographic command, the CGX Kernel transitions back to the IDLE state if it was not previously entered due to preemption. If the CGX Kernel entered the COMMAND_BLOCK state because the application requested a CGX command that caused an active CGX command to be preempted, the CGX Kernel will transition back into the COMMAND state to complete the original CGX command. However, if some sort of severe error or hardware failure occurred, the CGX Kernel will reset the processor; thus transitioning to the RESET state.

Key Management

INTRODUCTION

It is well known that a carefully designed and implemented Key Management infrastructure is a critical component of a good security system. In keeping with the philosophy of a 'security system on-a-chip', the CryptIC incorporates a powerful and secure key management system into both its hardware and CGX firmware.

There are generally 5 elements of key management to consider:

1) Key Generation
   2) Key Distribution
   3) Key Storage
   4) Key Selection (and use)
   5) Key Destruction The CryptIC's features support a consistent flow of Key Material through all of the five phases. In particular:

The facilities are provided by the CGX library (and the integrated hardware blocks) to generate and safely store key material.

Key 'covering' with a Key Encryption Key (KEK) is a CGX service which allows secure key distribution and secure storage.

Key selection is consistently handled through CGX library arguments and safeguards are implemented against key hijacking, spoofing, alteration, etc.

Key destruction may easily be achieved either by powering-off the CryptIC, or by executing a Destroy_Key CGX command.

The CryptIC allows a wide range of key management implementations, since it is only concerned with supplying the primitive key management utilities. This allows the application using the CryptIC to create either a simple 'flat' key management structure, or a highly layered and complex 'military-grade' key management system.

The following sections describe the types of keys used on the CryptIC, the key handling and usage conventions, and finally a discussion of key storage requirements and definitions.

Keys

The CryptIC supports the following algorithms and key sizes for Symmetric (secret key) and Asymmetric (public key) cryptographic operations, shown in the table below:

TABLE 11

Algorithms and Key Sizes

| | KEY SIZES | In Steps Of |
|---|---|---|
| SYMMETRIC ENCRYPTION: | | |
| DES | 40–56 bits | 8 bits |
| Triple-DES (two key) | 64–112 bits | 8 bits |
| Triple-DES (three key) | 120–168 bits | 8 bits |
| PUBLIC KEY ENCRYPTION: | | |
| Diffie-Hellman | 512–2048 bits | 64 bits |
| RSA* | 512–2048 bits | 64 bits |
| DIGITAL SIGNATURES: | | |
| DSA | 512–2048 bits | 64 bits |
| RSA* | 512–2048 bits | 64 bits |

*requires RSA licensed version of CryptIC

Since the CryptIC implements multiple cryptographic algorithms, there is a need for several types of key. The following descriptions of the keys are grouped into Symmetric keys (also known as secret keys) and Asymmetric keys (or public key pairs).

Symmetric Keys

Symmetric keys are used in order to support the symmetric cryptographic algorithms (i.e. DES, Triple DES). The CryptIC supports several symmetric key types for data encryption and key encryption (covering/covering). In addition to describing the three types of symmetric keys, there are several other issues discussed in this section. These include: key length, key generation, key access, and key protection.

Symmetric Key Types

There are three types of symmetric keys used on the CryptIC:

Data Encryption Keys (DEKs)
Key Encryption Keys (KEKs)
Message Authentication Code keys (HMAC).

Each of the keys are described along with their respective properties in the following subsections.

Data Encryption Keys (DEKs)

Data encryption keys (otherwise known as session keys or traffic keys) allow a message, a communications channel, a data file, etc. to be encrypted using one of the symmetric algorithms (i.e. DES, triple-DES, etc.) supported by the CryptIC.

All DEKs are stored in and retrieved from volatile Key Cache Registers (KCRs) or written to the encrypt hardware engine's context_0 or context_1 data key register. By default, a DEK is not allowed to be exported (i.e. read by the application) unless it is covered by a key encryption key. However, the DEK must be uncovered in the CryptIC device to be used as a traffic key.

A DEK can be generated via all the means described in the section Symmetric Key Generation, or can be imported as a Red key that was generated by an external application (assuming the applicable Program Control Data Bit allows Red key load).

Typically, DEKs are short lived (ephemeral); they are around long enough to encrypt the active secure channel. Once the secure channel is no longer required, the DEK is destroyed. The CGX Kernel that controls the cryptographic operations on the CryptIC is not responsible for destroying DEKs since it doesn't know when a secure channel has terminated. This is left to the application via the CGX_DESTROY_KEY command. However, the CGX Kernel will destroy all volatile key cache locations upon a reset or protection violation.

Key Encryption Keys (KEKs)

A key encryption key (otherwise known as a covering key) allows keys to be off-loaded from the CryptIC for storage (ie. power-down recovery, key escrow, etc.), to allow key distribution, or for the secure exchange of traffic keys. The CryptIC supports five types of KEKs:

Local Storage Variable (LSV)

internal Generator Key Encrypting Key (GKEK)

one or more application Key Encrypting Keys (KEKs)

one or more Hash/Encrypt Data Key protection KEKs (DKEKs)

optionally a Recovery KEK (RKEK)

Only the LSV is preserved across resets since it is laser-stored within the CryptIC. Therefore, the storage requirements for other KEKs must be implemented by the application. This would be achieved by off-loading the KEK covered by another KEK. (The LSV is used to cover the RKEK and GKEKs. GKEKs or other KEKs are used to cover application KEKs, DKEKs and DEKs.) The KEK heirarchy is shown in FIG. 16.

Local Storage Variable (LSV)

The LSV is a non-volatile 112-bit KEK which is laser-burned into each CryptIC device at fabrication. It is unique to each CryptIC produced and can be considered that chip's master 'root' key. Only GKEKs and the RKEK may be covered by the LSV.

Internal Generator KEK (GKEK)

The GKEK allows the application to safely build its own symmetric key hierarchy trees securely by not allowing any of the user key's Red material to be exposed. The GKEKs allow for the off-loading of internally generated user keys to be stored in the application's non-volatile store. The GKEKs effectively insulate the LSV from any direct attack, since GKEKs are always trusted and cannot be imported or exported.

Application-created KEKs

Applications can generate multiple KEKs by calling upon the CGX library to generate a KEK and then request the CryptIC to use the generated key to cover/uncover other keys. The application must off-load or export the KEK and store it for later use. This means the application must first cover the newly generated KEK with either the GKEK or another KEK so that it can leave the CryptIC. This approach offers a layered model of KEKs.

Hash/Encrypt Data Key Protection KEKs (DKEKs)

DKEKs are used exclusively to cover and uncover DEKs which will be used in the Hash/Encrypt hardware engine. This KEK will typically be written into the hardware context 0 or context 1 DKEK register so that it can automatically decrypt 'Black' DEKs which may be stored in a crypto context database off-chip. DKEKs cannot encrypt other KEKs.

Recovery KEK (RKEK)

A single RKEK is supported in the CryptIC. The RKEK is always a Diffie-Hellman derived key and requires an IRE-certified request to generate it. It may be off-loaded from the CryptIC covered by the LSV. The RKEK is used for covering DEKs, KEKs, or DKEKs for escrowing off-chip or for Key Recovery implementations.

HMAC Keys

An HMAC key is a special type of key which does not impose formatting constraints. An HMAC key type may be used to store the secret output of a hash result—perhaps as part of a key derivation process, or it may be used to store a secret value to be used as the input to an HMAC function. HMAC keys may be from 40 to 160-bits long in 8-bit steps.

Since it is un-formatted, key weakening is never applied to an HMAC key.

Symmetric Key Lengths

The CryptIC supports several key lengths depending on the symmetric block algorithm and the type of device (i.e. domestic version versus exportable one). The key length can be adjusted between the range of 40 bits and 168 bits, depending on the PCDB programming within the CryptIC (i.e. configured for domestic or export).

For a domestic CryptIC all DES and Triple DES keys can have a 40 bit to 168 bit key length, programmable in 8-bit increments by the application. This allows for variable key lengths other than the typical 40, 56, 112, and 168-bit key lengths. The CryptIC defines triple DES keys as three 56 bit DES keys (i.e. 168 bits in total), however a triple DES key will actually occupy 192 bits (i.e. 24 bytes) since in DES, one bit of each key byte is considered a parity bit. To allow for non-standard size keys, a symmetric key weakening algorithm is used and described below in this section.

Any key which is specified to be 40, 48 or 56-bits will automatically be considered a single-DES key. Any key which has an effective length of 64 to 112 bits will become a two-key, triple-DES key. That is, the significant bits of the key will be distributed between the first and second 56-bit sub-keys, and then the third sub-key will be a copy of the first. Any key with an effective length of 120 to 168 bits will become a three-key, triple-DES key.

This means that any key longer than 56 bits is represented in a triple DES form—ie. three 56-bit DES keys. The keys are always expanded to the full 168-bits in a manner to reflect the number of bits chosen by the application.

Symmetric Key Generation

Symmetric keys can be generated six ways on the CryptIC as described in the table below:

TABLE 12

Key Generation Techniques

| KEY GEN Technique | CGX Call | Description |
|---|---|---|
| Generate DEK from RNG | CGX_GEN_KEY | Samples the output of the Random Number Generator to assemble the desired length DEK |
| Generate KEK from RNG | CGX_GEN_KEK | Samples the output of the Random Number Generator to assemble the desired length GKEK |
| Negotiate Diffie-Hellman | CGX_GEN_NEGKEY | Perform the Diffie-Hellman $G^{xy}$ exponentiation in order to arrive at a shared secret value. Based on ANSI X9.42. |
| Hash from Password/ Passphrase | CGX_DERIVE_KEY | Derive a symmetric secret key by hashing an application-supplied Password or Passphrase. |
| Transform key (i.e. IPsec) | CGX_TRANSFORM_KEY | Transform a key using a combination of Hashing, Mixing with fixed data and re-Hashing, XORing, etc. |
| Import a Red key from the application | CGX_LOAD_KEY | Import a Red key provided by the application. |

Symmetric Key Representation

Symmetric keys are represented in three ways, an Internal form, an IRE External form, and a Inter-operable External form. The first two representations are used in order to enforce the security policy of the CryptIC, and the last is used in order to allow the CryptIC to share key material with other vendor's implementations.

Symmetric Key IRE Internal Representation

Symmetric keys are stored within the CryptIC in Key Cache Registers (KCRs). Note that all of the data stored is in a plaintext (Red) form so that the CGX software may access it without the overhead of decrypting anything. Untrusted software running in the 'User Mode' of the DSP does not have access to the KCRs.

The format of the storage is as follows:

[type][keylength][key-bits][weakened_keybits][keycount][attributes]

The type field specifies the algorithm for which the key is to be used (e.g. DES, 3-DES, RC-5, etc.)

The keylength field indicates the length, in bytes, of the key. For the CryptIC, it will be either 8 or 24.

The keybits field is 192-bits long (three 64-bit DES keys). It contains the actual key bits which will be used by the DES or triple-DES algorithm. For single-DES, only 64-bits are used and the remaining 128-bits will be zero. The least significant bit of each byte is considered the DES parity bit and is ignored. The weakened_keybits field is 64-bits long and contains the 'original' bit values which were overwritten by 0's during the key weakening process. This is necessary if the key needs to be Exported in an interoperable format. Prior to exporting, the key is 'un-weakened' back to its original form. Upon importing a key, the weakening process is again performed to restore the original key. This behavior and thus the need to preserve the 'weakened bits' is needed in order to protect against key-size tampering when exporting/importing a key.

The keycount field indicates the length of the key in 64-bit blocks. For the CryptIC, it will be either 1 or 3. Although the keycount can be inferred from the keylength field, it is provided in order to optimize performance.

The attributes field is a 16-bit value with the following bit definitions, shown in the table below:

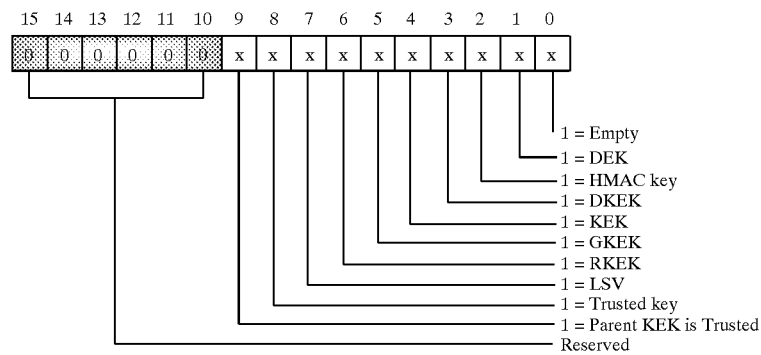

This attributes field is created when the key is first generated and stays with the key both internally and when it is off-loaded. The only exception is when a key is Exported or Imported. In these operations, the key is always considered Untrusted and the import/export operation specifies the key type.

Symmetric Key IRE External Representation

When a symmetric key is off-loaded, the key must be put into an 'IRE-external' form. The external form consists of all of the original random key bits, salt bits, attributes, and SHA-1 message digest. The entire external form is encrypted, including the SHA-1 message digest. The salt bits and attributes are pre-pended to the key bits to provide randomness to skew the external key once it is encrypted (in CBC mode).

[userfield][type][keylength] . . .
 . . .$E_{KEK}$ {[salt][attributes][key-bits][weeakened-bits][keylength]
                 [hash-digest][DES-pad]}
                 . . . [32-pad]

Where $E_{KEK}$ indicates the encryption of the data in { } by the specified KEK.

The secretkey object is 576 bits/72 bytes/18 dwords long. This contains the following:

| Field | Length | Description |
| --- | --- | --- |
| Userfield | 16 | An application-specified field which may be used for any purpose |
| type | 16 | Algorithm for which the key was created (DES, triple DES) |
| keylength | 16 | Length of the key, in bytes. This field is duplicated inside the covered portion |
| salt | 54 | Random bits used to enhance the key encryption process. Similar to an IV |
| attributes | 10 | Attribute bitmap. See description above |

-continued

| Field | Length | Description |
| --- | --- | --- |
| key-bits | 192 | The actual DES or triple-DES key bits. If DES, then last 128 bits are zero |
| weakened-bits | 64 | The bits overwritten in the key-weakening process |

-continued

| Field | Length | Description |
| --- | --- | --- |
| keylength | 16 | Length of the key, in bytes. Duplicated here to be included in the Hash |
| hash digest | 160 | A SHA-1 hash of the key, attributes and salt. Provides an authentication code |
| DES-pad | 16 | Zero-pad bits to round-up to the nearest 64-bit boundary (for DES encryption) |
| 32-pad | 16 | Zero-pad bits to round-up to the nearest 32-bit dword boundary |

The purpose of the DES-pad field is because DES is 8-byte block oriented and the seven blocks are formed so they can each be properly encrypted without needing padding. The 32-pad field allows the secretkey object to fall on a 32-bit dword boundary which eases handling on the PCI bus.

The SHA-1 message digest is computed over the salt, attributes, key-bits and weakened-bits fields. Once the message digest is inserted in the object, the salt through message digest fields are encrypted by a KEK. The encryption mode is typically CBC, although for untrusted keys, the application may specify a different mode. A fixed IV is used for encrypting the key blob, since the random salt takes care of randomizing the encryption. This symmetric key blob is then returned to the application.

Upon loading-in the Black symmetric key blob, the CGX Kernel decrypts the key blob and runs the SHA-1 hash over the specified bits and compares the message digest to the one stored in the blob. If the message digest comparison fails, the symmetric key is rejected (i.e. not loaded).

Symmetric Key Inter-Operable External Representation

When an application chooses to exchange an IRE symmetric key with another crypto-vendor, the symmetric key must be converted from IRE's storage format into one that is more easily extractable so that it can inter-operate with other crypto-vendors. (Note that keys which are exported from or imported to the CryptIC are always considered untrusted.)

To do this, a basic storage format based on Microsoft's CryptoAPI has been adopted. The general form of the symmetric key to be exported/imported is:

$$E_{KEK}\{[\text{salt-bits}][\text{key-bits}][\text{data-bits}]\}$$

Where $E_{KEK}$ indicates the encryption of the data in { } by the specified KEK.

The application can specify no salt, it can explicitly define the salt bits, or it can request the CryptIC to generate the salt bits. The key bits consist of the Red symmetric key bits as defined in the IRE external symmetric key formation. A DES key will occupy 8 bytes and a triple-DES key (2-key or 3-key) will occupy 24 bytes. The key bits are laid out in big-endian form. The data field is supplied by the application, it can contain anything the application chooses, or it may be omitted if the application desires.

The one to three pieces of external symmetric key (salt, key bits, and data) are put into a buffer that is then encrypted by a symmetric KEK. The attributes and message digest of the IRE External form are not included in this format.

Since the external symmetric key must be covered with a symmetric KEK, the salt bits (if present) must be in multiples of 8 bytes and the data bits (if present) must be in multiples of 8 bytes as well. The exception to this rule is for HMAC keys. In this case the key must be in multiples of 2 bytes. Therefore, an HMAC key with a length of 5 bytes will be exported as 6 bytes with the $6^{th}$ byte exported as a 0.

In the case of covering the external symmetric key with a public key, the salt bits (if present) can be as many bytes as the application chooses and the data bits (if present) can be as many bytes as the application chooses. However, the entire size of the salt, key, and data bits must be less than or equal to the size of the public key's modulus used to cover them.

Symmetric Key Weakening Process

As shown in FIG. 17, the symmetric key weakening algorithm is similar to the one created by IBM called CDMF key shortening. IRE's approach is similar, with the difference in that we write 0s into the key bits starting at 0 going for the amount to be shortened by. In the CDMF approach, various bits are masked with zero.

To implement the key weakening scheme, the number of random key bits to be used is important. For 40-bits to 56-bits, 64-bits of random data are to be provided, for 64-bits to 112-bits, 128-bits of random data are to be provided, and for 120-bits to 169-bits, 192-bits of random data are to be provided. The number of random bits specified is critical in that it allows the key shortening algorithm to work correctly.

The weakening process consists of two encryptions; thus implying there are at least two fixed symmetric keys used to do this. There are 14 unique fixed symmetric keys used for this process. A set of symmetric keys for each key length between 8-bits and 56-bits is provided; thus 7 pairs of fixed symmetric keys.

The algorithm to shortening the symmetric key is first to encrypt a full 64-bits with the first key of the fixed symmetric key set. Once the encryption is complete that output is shortened by overwriting it with zeros for the amount to be shortened by. For example, if a 40-bit key is needed, the first 24-bits of the interim result will be overwritten. Once the zeros are written onto the interim result, it is encrypted again with the second fixed key. The result of the second encryption is then used as the weakened symmetric key. This has the effect of distributing the weakened bits over the entire key.

Since we allow for key lengths to be between 40-bits and 192-bits with increments of 8-bits we also have to distribute the weakened key between the 3 key blocks (a block is defined as a 64-bit key block) if the key is to be 64-bits or greater. For 40-bits to 56-bits the key distribution does not occur, it fits in one key block.

To distribute larger keys they are first evenly distributed between the first two key blocks if they can all fit. This means that a 72-bit key is broken up so that 40-bits are in block one and the other 32-bits in block 2. This means that the bits are evenly distributed into blocks 1 and 2 and if the key length is odd (meaning the key length can not evenly distribute into the two key blocks) the extra 8 bits is put into block 1. Then when the key is laid out in the two blocks, block 1 is copied to block 3 to create a triple DES key. However, if there 128-bits or more of key, then the remaining bits are put into block 3 to complete the triple DES key.

HMAC keys are never weakened.

Symmetric Key Access and Protection

Providing access to the symmetric keys has been carefully considered in light of security and flexibility. Since the philosophy of the CryptIC is to provide a general-purpose interface, the application is given a variety of importing and exporting rules.

Each of the symmetric key types have their own rules on key access and are addressed in more detail below in their respective sections. Furthermore, depending on the Program Control Data Bits (PCDBs), the application could be allowed to import its own Red keys to be used as KEKs and DEKs.

Asymmetric Keys

Asymmetric keys allow for the implementation of public key algorithms and digital signatures. The following sections describe the public keysets (public and private) that are used by the three asymmetric cryptographic algorithms supported by the CryptIC.

Asymmetric Key Types

Like symmetric keys, the CryptIC supports several flavors of asymmetric keys. The three types are:

Diffie-Hellman public keys:
   Used for computation of a negotiated key based on a previously generated modulus and base RSA public keys:
   Used for both encryption and digital signatures DSA public keys:
   Used for digital signatures only The application is responsible for storage of public keyset, eliminating the need for the CGX Kernel to store public keys. The modulus and public parts of the keyset are stored off-chip in the Red form, while the private portion of the key is covered. When requesting a public key operation, the application is required to provide as a parameter the public keyset it wishes to use. The CGX Kernel, in turn, makes a local copy of the public key and, if necessary, uncovers the private portion into the public key working kernel RAM in the CryptIC. When the operation completes, the local copy of the private key is destroyed.

Diffie-Hellman

As in all public key schemes Diffie-Hellman uses a pair of keys, public and private. However, Diffie-Hellman is unique in that it does not perform encryption/decryption or signatures as do the other public key systems. Rather, it implements a means to generate a shared secret or a negotiated DEK (i.e. traffic key or session key).

Unlike RSA, a fixed modulus (n) and generator (g) can be shared among a community of users; therefore, the generation of a new stored modulus will not occur often. The modulus, public key and private keys can be exported/imported from/to the CryptIC.

A new public key (X) is generated upon request by the application; many private and public keys can be generated from one common modulus. At the same time, a private key (x) is also generated. The public key is generated using the newly generated private key ($X=g^x \mod n$).

A shared secret key or DEK can later be created by using the other CryptIC's public key ($DEK=Y^x \mod n$). The negotiated DEK can be exported from the CryptIC but it must first be covered by one of the CryptIC's KEKs (GKEK, or an application-generated KEK).

RSA

As in all public key schemes RSA uses a pair of keys, public and private, to encrypt/decrypt and implement digital signatures. However, unlike Diffie-Hellman the modulus can not be fixed. A new modulus must be generated for each new public key pair. The public exponent is calculated, based on a starting point specified by the application (up to 64-bits maximum). Typically, the starting exponent is 65537, which avoids all of the known attacks on the fixed exponent of 3. Therefore, the public key is made up of the modulus (n=pq) and an exponent (e>=65537).

The private key (d) is generated by taking the multiplicative inverse of the public key ($d=e^{-1} \mod ((p-1)(q-1))$). Like the public key, an optimization is performed by using the values of p and q during the decryption and signing operations of RSA. The optimization consists of precomputing $d_p$ and $d_q$ and using the Chinese Remainder theorem (CRT). Therefore, the CGX kernel keeps p and q and the precomputations around as part of the private key.

The key pair can be exported from the CryptIC. The public key returned is made up of e and n, the private key returned is made up of d, p, q, $d_p$, $d_q$, $p^{-1} \mod q$, and $q^{-1} \mod p$. Storing all of these values is essential in order to optimize the RSA decryption process using the Chinese Remainder Theorem. Naturally, allowing these private components to be seen would be a security breach, therefore the private key components are returned covered via one of the CryptIC's GKEKs or an application-generated KEK.

DSA

DSA also uses a pair of keys, public and private, to implement digital signatures only. Unlike RSA, fixed moduli (p and q, and generator g) can be shared among a community of users. Therefore, the generation of a new stored modulus will not occur often. The modulus, public key and private keys can be exported/imported from/to the CryptIC.

The public key is composed of two pieces: the public key (y) and the modulus data (p, q, and g). The CryptIC will allow a modulus size to be between 512 and 2048 bits with increments of 64 bits.

The private key (x) is a random 160-bit number. For every signature, a new 160-bit k is created. Once the signature is created, k can be destroyed. Furthermore, the signature process creates r and s, they are used in the verification process to generate v which is compared to r to verify a signature. The CryptIC's command CGX_SIGN returns r and s and the command CGX_VERIFY expects r and s as arguments.

A DSA key pair can be exported from the CryptIC. The public key returned is made up of y, p, q, and g; the private key returned is made up of x. The private key is returned covered via one of the CryptIC's GKEKs or an application-generated KEK.

Program Control Data Key (PCDK)

The PCDK is a fixed DSA public key that is stored in masked ROM. The PCDK is used to verify the digital signature on a PCDB modification token (this is explained in more detail in the section Programmable Control Data Bits Initialization String (PCDB_IS) or to verify the signature on 'Extended Code' which may be loaded into the chip at run-time. The PCDK is hard-coded into the CGX kernel and cannot be off-loaded or exported.

Asymmetric Key Lengths

Since the CryptIC supports several public key algorithms, the requirements for public key pairs and their moduli differ. However, in general the CryptIC will support keys and moduli in the range of 512 bits to 2048 bits in multiples of 64 bits.

Asymmetric Key Generation

Public key generation like symmetric key generation is very important to the security of the system. Poorly generated public keys or moduli will result in inferior crypto-protection. The main tenet behind public key generation is the generation of random numbers with a high probability of being prime. The CryptIC implements a widely accepted method of testing for primality, the Rabin-Miller algorithm. Moreover, all prime numbers generated by the chip will have the most significant bit set and will be odd.

The CryptIC will never reuse the same modulus for an RSA or DSA new public key. However, the CryptIC does allow for a common exponent to be used for the RSA exponent. The typical choice is to use the a starting point of 65537 as the RSA encrypt exponent.

DSA Key Generation

The application has several configurable ways to generate the public keyset for DSA operations. It can generate the modulus' p and q in a safe or weak manner. The safe method is based on appendix A of the X9.30 specification. It goes through a formal method of creating p and q from a 160 bit seed and 16 bit counter. In this method the application is ensured of not using a 'cooked modulus'.

In the weak method, the modulus' p and q are generated in a simple method of finding q a prime factor of p-1. This doesn't provide for a seed and counter but generates p and q faster.

In either case, p and q are tested to determine if they are prime. As noted earlier, they are tested using the Rabin-Miller primality test and the application can specify the number of times it wants to run the test. The more times it is run, the higher the probability that the number is prime. However, the more times the test is run, the longer it takes to generate p and q. Also, as part of the primality test, the prime number to be tested goes through a small divisor test of the primes between 1 and 257.

The private exponent is generated using the random number generator and the public exponent is derived from the private and modulus data. Furthermore, the application can change the private and public parts as often as it chooses for a given modulus using the CGX_GEN_NEWPUBKEY command.

RSA Key Generation

The RSA moduli, p and q, are generated by first finding a prime number p and then another prime number q that is close in value to p.

In either case, p and q are tested to determine if they are prime. As noted earlier, they are tested using the Rabin-Miller primality test and the application can specify the number of times it wants to run the test. The more times it is run, the higher the probability that the number is prime. However, the more times the test is run, the longer it takes to generate p and q. Also, as part of the primality test, the prime number to be tested goes through a small divisor test of the primes between 1 and 257.

The public exponent is created by finding an e that is relatively prime to □(n), the product (p−1)(q−1). The starting point of this search is 65537. In most cases e remains 65537. In the event that □(n)=65537 k, where k>=1, then the encryption exponent will be the next largest odd value which is relatively prime to □(n).

The private exponent is found by taking the multiplicative inverse of e mod (p−1)(q−1).

Diffie-Hellman Key Generation

The application has several configurable ways to generate the public keyset for Diffie-Hellman operations. It can generate the modulus p in a safe or weak manner. The safe method finds a safe prime, one of 2q+1.

In the weak method, the modulus p is generated as a random number. In this case, the modulus is weak but will be generated very quickly. Furthermore, the modulus p is not tested for primality.

In either case, p and q are tested to determine if they are prime. As noted earlier, they are tested using the Rabin-Miller primality test and the application can specify the number of times it wants to run the test. The more times it is run, the higher the probability that the number is prime. However, the more times the test is run, the longer it takes to generate p and q. Also, as part of the primality test, the prime number to be tested goes through a small divisor test of the primes between 1 and 257.

The private exponent is generated using the random number generator and the public exponent is derived from the generator, private exponent and modulus. Furthermore, the application can change the private and public parts as often as it chooses for a given modulus using the CGX_GEN_NEWPUBKEY command.

Asymmetric Key Representation

Asymmetric key sets are represented in one of two forms, an IRE external form, or an Inter-operable External form. The IRE External form is a subset of the Inter-operable External form. The external form is modeled after the Microsoft CryptoAPI specification. Note that the asymmetric key sets contain the Public key, the Modulus/Generator, and the Private key. Only the private key portion is covered by a KEK.

Asymmetric Key IRE External Representation

When an application chooses to create an IRE private key for local storage, this format is used. This is the format that is returned for the CGX_GEN_PUBKEY and CGX_GEN_NEWPUBKEY operations.

[userfield][type][keylength][datapage][pointer-to-modulus][pointer-to-pubkey] . . . [pointer-to-privkey]

and:

The modulus/generator element is: [modulus-generator-packed]

The public key element is: [public-keybits-packed]

The private key element is: $E_{KEK}\{$[salt-bits][private-keybits-packed]$\}$

Where $E_{KEK}$ indicates the encryption of the data in { } by the specified KEK.

For the private key portion, the application can specify salt, no salt, or request the CryptIC to generate the salt bits. Moreover the application can use the salt bits as a means to prepend a formatted packet of data in front of the private key. The key bits are the Red private key bits. For DSA it will just include, x, a 160-bit key. For Diffie-Hellman it will just include the private key, x, a key between 160 and 2048-bits. For RSA the private key bits will be p, q, d mod (p−1), d mod (q−1), and $q^{-1}$ mod p, and d (in this order). The key bits are laid out in little-endian form.

The private key bits and salt are put into a buffer that is encrypted by an untrusted symmetric KEK.

If salt is to be supplied, it must be in 16-bit units, no single bytes allowed. Furthermore, the total byte count of salt, and key bits must be a multiple of 8-bytes in order to fall on a DES block boundary.

Asymmetric Key Inter-Operable External Representation

When an application chooses to exchange an IRE private key with another crypto-vendor, the private key must be translated from IRE's storage format into one that is more easily extractable.

To do this, a basic storage format based on Microsoft's CryptoAPI has been adopted. The general form of the private key element to be exported/imported is:

The private key element is: $E_{KEK}\{$[salt-bits][key-bits][data-bits]$\}$

Where $E_{KEK}$ indicates the encryption of the data in { } by the specified KEK.

The application can specify salt, no salt, or request the CryptIC to generate the salt bits. Moreover the application can use the salt bits as a means to prepend a formatted packet of data in front of the private key. The key bits are the Red private key bits. For DSA it will just include, x, a 160 bit key. For Diffie-Hellman it will just include the private key, x, a key between 160 and 2048 bits. For RSA the private key bits will be p, q, d mod (p−1), d mod (q−1), and $q^{-1}$ mod p, and d (in this order). The key bits are laid out in little endian form. The data field is supplied by the application, it can contain anything the application chooses or it can be left out if the application does not require it.

The private key (salt, key bits, and data) are put into a buffer that is encrypted by an untrusted symmetric key.

If salt or data are to be supplied, they must be in 16 bit units, no single bytes allowed. Furthermore, the total byte count of salt, key bits, and data bits must be a multiple of 8 bytes in order to fall on a DES block boundary.

Key Handling Requirements

An important requirement to defining a key management scheme is setting forth requirements on how the keys are handled by the CGX Kernel and application. The CGX Kernel presents several requirements on key handling for both public and symmetric keys. This is followed by a detailed discussion of secret/public key hierarchy and control.

The following are requirements the application must abide by in order to create and manipulate keys using the CryptIC:

1) By default, Red key exchange between the application and the CGX Kernel is only allowed in the direction from the application to the CGX Kernel (i.e., loading), for all user symmetric keys (KEKs and DEKs). Absolutely no Red key exportation is allowed.

2) All keys stored in the internal KCRs are in the Red form, no internal Black key storage is allowed.

3) Black keys are not allowed as part of encryption or public key operations. In other words a key must be uncovered, in its Red form, before it can be used in any of the CGX Kernel commands. This is true for the private key of a public keyset as well.

4) All key management commands supported by the CryptIC (e.g. CGX_GEN_KEY, CGX_GEN_KEK, or CGX_GEN_PUBKEY, etc.) are atomic. This means that when a key is created, derived, or negotiated, a covered (i.e. Black or encrypted) copy of the key is returned at the same time, as part of the same command. Therefore, the only way to get back a key (i.e. the Black one) is via the command that created it. This prevents an intruder application from hijacking a key.
5) All keys used or stored by the CryptIC fall under two umbrellas of protection, trusted or untrusted. Trusted keys can never be exposed in their Red form; the CryptIC stores them in a secure and protected manner. An untrusted key can be used in many flexible ways but secure protection is left to the application.
6) All keys in a trusted tree (see FIG. 18) can not move from that tree, they are permanently stored in the tree.
7) All keys in an untrusted tree (see FIG. 18) can move to other untrusted trees and/or a trusted tree, once under a trusted tree the key can not move (as stated in item 6 above).
8) There are two classes of keys, IRE external keys (symmetric and public) and interoperable keys (symmetric and public). IRE external keys contain secure attributes that describe its trust and key type. Interoperable keys contain nothing but the key material, formatted with optional salt bits in the front and optional application-supplied data bits at the end of the key material.
9) Internal IRE keys contain two attributes: Use and Trust level. The use attributes specify the key type (ie. KEK, DEK, DKEK). The trust level is Trusted or Untrusted (as explained in item 5 above). The use attribute mandates how a key can be used and which commands will allow it.
10) As a means to combat many types of cipher-text attacks on Red key storage, all symmetric keys and private keys (of a public keyset) will include 'Salt' which are random bits prepended to the key material prior to encrypting. The random salt data helps to prevent statistical cipher-text attacks; thus better securing a covered key.
11) In order to off load and protect user keys securely (i.e. Diffie-Hellman negotiated ones, CGX_GEN_KEY ones, or imported Red user keys) a generated internal key encryption key (GKEK) must be used. This provides an internally protected conceptual boundary around the CryptIC device and the application's non-volatile storage memory. This is because the GKEK is an extension of the CryptIC, it is never exposed and the keys covered under it are therefore never exposed.
12) The LSV is laser programmed at the factory and is unique for each CryptIC device.
13) The LSV is a two-key, triple-DES key (i.e. 112 bits), all GKEKs are covered under the LSV using triple DES in the CBC mode.
14) All GKEKs are internally generated using the CGX_GEN_KEK command.
15) To off-load a GKEK, it must be covered under the LSV (no other covering key is permitted).
16) All GKEKs are triple DES keys (i.e. 192 bits), all user keys are covered under the GKEK using triple DES in the CBC mode. The CGX Kernel supplies a fixed IV.
17) The LSV can not be exported in any form. Furthermore, the LSV can only be used by the CGX_GEN_KEK, CGX_GEN_RKEK or CGX_UNCOVER_KEY commands.
18) GKEKs can not be exported/imported, although they may be off-loaded in IRE External form. Furthermore, GKEKs can only be used to cover user keys, not as traffic keys. Therefore, the GKEK can only be used by the CGX_UNCOVER_KEY, CGX_GEN_KEY, CGX_DERIVE_KEY, CGX_LOAD_KEY, CGX_GEN_PUBKEY, and CGX_GEN_NEWPUBKEY commands.
19) A user key can be created internally via CGX_GEN_KEY (for symmetric keys) and CGX_GEN_PUBKEY (for public keys), imported in the Red form, derived via CGX_DERIVE_KEY, or negotiated via the Diffie-Hellman key exchange (symmetric key only).
20) User keys are also known as KEKs, DEKs (a symmetric key), or a Public keyset. All user keys must be covered by a GKEK, RKEK or KEK in order to be exported.
21) Once a user key is covered under a GKEK it can not be covered by any other key. In other words, the user key can not be propagated down or across in the symmetric key hierarchy. This rule prevents key stealing or spoofing.
22) User keys covered by a KEK can use either the DES or triple-DES algorithm. For untrusted keys, the application is responsible for providing an IV for the appropriate modes (i.e., CBC, CFB, and OFB).
23) The depth of the symmetric key hierarchy is unlimited, KEKs can be covered under KEKs 'N' deep as long as it abides by these key handling rules. This is the same for trusted KEKs as well.
24) The CGX Kernel knows if a KCR contains a key, the key type, the key length, and its attributes. Anything beyond that is the responsibility of the application.

Symmetric Key Handling

The CryptIC provides support for eight kinds of symmetric keys: LSV, hardware only, protection, generated, loaded, imported, negotiated, transformed, and derived. The master key is the unique LSV laser programmed into each CryptIC device. The LSV provides the ability for the application to safely off-load key material with out the possibility of exposing the key's Red contents.

Hardware only keys, DKEKs, are internally generated symmetric keys (via the CGX_GEN_KEY operation) that are used to cover symmetric keys, DEKs, only. The DKEK keys allow applications to load Black symmetric DEKs into the hash/encrypt crypto interface to be uncovered and used as traffic keys. This allows the application to use the hash/encrypt hardware interface securely since keys are never exposed in the Red form.

Protection keys, GKEKs, are internally generated symmetric keys (via the CGX_GEN_KEK operation) that can only be covered by the LSV. The protected keys allow the application to build a symmetric key tree hierarchy that to the application is protected internally within the CryptIC device. This protection is a conceptual boundary around the CryptIC and the application's non-volatile memory storage. Protected keys are returned in the Black form.

Generated keys are user keys generated internally to the CryptIC, they never reside in the Red form outside the bounds of the CryptIC device. All generated keys are created via the CGX_GEN_KEY operation. An internal user key can be used as a KEK or DEK, but is always known as a trusted key by the CGX Kernel unless the application requests it to be untrusted.

Loaded keys are user keys loaded in the Red form. They can be used as a KEK or DEK, but is always known as a untrusted key by the CGX Kernel. The loaded key may be covered by a GKEK or another trusted or untrusted KEK. Loaded keys play an important role for applications such as ANSI X9.17 where the application must supply the master keys. The master keys are then used to cover the session keys that can be generated by the CryptIC or imported.

Imported keys are user keys imported from another vendor's crypto-system, in the Black form. They can be used as a KEK or DEK, but is always known as an untrusted key by the CGX Kernel. The imported key can be covered by a GKEK or a trusted/untrusted KEK.

Negotiated secret keys are the result of a Diffie-Hellman key exchange. Negotiated user keys can be used as KEKs or Ks, but are always known as an untrusted key by the CGX Kernel. The negotiated key can be covered by a GKEK or a trusted/untrusted KEK.

Transformed symmetric keys are the result transforming an HMAC key into a useable DES, Triple DES, or RC5 key. The transforms are all based on the current IPsec working group papers on HMACs. Transformed user keys can be used as KEKs or DEKs, but are always known as an untrusted key by the CGX Kernel. The negotiated key can be covered by a GKEK or a trusted/untrusted KEK.

Derived keys are the result of a cryptographic operation that converts a pass-phrase into a symmetric key using a one-way HASH algorithm. Derived keys can be used as KEKs or DEK, but are always known as an untrusted key by the CGX Kernel. The derived key can be covered by a GKEK or a trusted/untrusted KEK.

FIG. 18 presents the symmnetric key tree hierarchy supported by the commands of the CryptIC.

The keys shown in FIG. 18 represent their type (in upper case: LSV, GKEK, KEK, DKEK, or DEK), trust level (the lower case letter to the left of key type, t for trusted and u for untrusted), generation method (the superscript as defined below), and the key movement method (the subscript as defined below).

!e=not exportable
e=exportable g=generated
n=negotiated (Diffie-Hellman)
l=loaded
i=imported
t=transformed
d=derived Since the CryptIC does not contain non-volatile storage, the CGX Kernel must allow a means for the application to safely off-load symmetric keys into some external non-volatile storage for future use. This is accomplished through the classification of symmetric keys shown in FIG. 18 above. All trusted keys (the ones in the white oval) are securely protected via the LSV symmetric key hierarchy. All the other keys (in the gray shaded are of the box) are untrusted and the storage scheme is left to the application.

The trusted tree provides a means to securely store symmetric keys. The storage is secure because the parent KEK is a trusted key and by definition a trusted key means that the key was created in a manner that prevents it from being exposed in the Red form. Therefore, the child keys under a trusted KEK are securely protected because the parent KEK is not compromised.

A trusted key must contain attributes. The attributes are used to define the class of the key and its type. The class defines the key as a trusted or untrusted and the type defines the key to be used as a KEK or data key (DEK) only; it can't be both. For all IRE symmetric keys, the type and class will be securely stored with the key material. Therefore when a key is reloaded into the CryptIC, the type and class is reliably restored.

At the root of the trusted tree resides the LSV. The diagram shows that the LSV is trusted (tLSV), it has been laser programmed ($LSV^{laser}$), and is not exportable ($LSV_{!e}$). The LSV is the master KEK for the CryptIC; it is used as the covering KEK of protected keys, GKEKs; it can not be used by the general encryption commands.

Under the LSV resides the protection keys, the GKEKs. The sole purpose of these keys is to limit the exposure of the LSV so that the application can not determine the LSV from plain-text attacks. The GKEKs are trusted keys (tGKEK), are internally generated so that the Red key material is not easily detectable ($GKEK^g$), and are not exportable ($GKEK_{!e}$).

Under the GKEKs, the application is free to build its own trusted tree or make it a flat one which resides directly under the GKEK and no deeper. To build a deeper secure trusted tree, the application must create trusted KEKs. The trusted KEKs (tKEK) shown in FIG. 18 are formed via the CGX_GEN_KEY command ($KEK^g$) and can never be exported ($KEK_{!e}$). A trusted KEK is similar to the GKEK in all aspects except that its parent KEK is either a GKEK or another trusted KEK; not the LSV. Therefore, the trusted tree can be as deep as one wants but the parent of each branch must be a trusted KEK. Furthermore, all child keys under a trusted KEK can not be exported, they are permanently stored under the trusted KEK.

All session keys (DEKs) stored under a trusted KEK or GKEK can be either trusted or untrusted. The trust state of these keys does not matter; it's the fact that they are stored under a trusted parent that matters. Being a trusted DEK has one slight difference then an untrusted DEK. The difference is that trusted DEKs (tDEK) shown in FIG. 18 are formed via the CGX_GEN_KEY command ($DEK^g$). Untrusted DEKs are created in some untrusted means therefore the Red key material could be determined more easily. However, like trusted DEKs untrusted DEKs under a trusted KEK can not be exported.

Before describing the untrusted trees there is one more interesting point about trusted trees. In FIG. 18, there are two untrusted KEKs which both reside under trusted KEKs (one under a tKEK and the other under a tGKEK). They are both untrusted and therefore their children reside in the untrusted umbrella (the gray area). Although the untrusted KEKs can not be exported (because their parent KEKs are trusted) their children can because their parent is untrusted.

Untrusted trees are ones where the parent KEK of the tree is untrusted. Therefore, all keys regardless of depth under the initial untrusted parent will be marked as untrusted and will be allowed to be exported. No trusted DEK or KEK can be created under an untrusted KEK.

A good example of the untrusted tree is shown in the bottom right side of FIG. 18. The parent KEK is untrusted (i.e. KEK) and could have been created in a multitude of ways ($KEK^{gnlitd}$, generated, negotiated, loaded, imported, and derived) and is exportable ($KEK_e$). All of its children are marked as untrusted and could have been created in many ways, as with its parent. The child keys are exportable.

There is another type of an untrusted tree, called the dangling tree. All dangling trees are by definition are untrusted because the root key is always an untrusted KEK or it has no root KEK at all (ie. an untrusted DEK). The upper right hand of FIG. 18 shows an example of a dangling tree. In this example the parent is the root and is an untrusted KEK. Furthermore, the parent KEK is not exportable because there is no parent KEK to cover it.

One example of this dangling untrusted tree is the case where the untrusted parent or root KEK was created as a derived key (i.e. via a pass-phrase). The application then stores keys under this derived untrusted KEK. It can now safely store away the untrusted keys and not have to store the parent KEK. Anytime it wants to use one of the stored keys it must use the CGX_DERIVE_KEY operation to regenerate the untrusted parent KEK.

Another example of a dangling tree is shown in the lower left corner of FIG. 18. In this example the dangling tree is flat, it is a single untrusted DEK. This key is untrusted and can not be exported because it has no parent to uncover it with. However, the real usefulness of this key is its use as a session key for one time only.

The DKEK keys are not shown in the diagram in FIG. 18 because they function identically to the KEKs in the diagram with one exception. The exception is that the only keys that can be covered under them are DEKs of any type (i.e. derived, loaded, etc). At no time will a KEK or another DKEK be allowed under a DKEK. The DKEK key is reserved for the use of the hardware crypto-block interface. To allow applications to load in Black symmetric DEKs from an external context store (ie. in PCI or External memory space) and not have to expose their keys in the Red form.

Asymmetric Key Handling

Asymmetric keys contain three components: the public exponent, the modulus and generator, and the private exponent. The private exponent can be imported in the Red form, but only exported in the Black form (the private key must be covered). Public key sets can be internally generated using the CGX_GEN_PUBKEY or CGX_GEN_NEWPUBKEY (generates the exponents of a Diffie-Hellman or DSA public keyset) commands.

All asymmetric keys are known as untrusted keys, therefore they can be used to cover symmetric keys to be exported or be exported themselves.

Public keys can be used as covering keys, key exchange keys, and signature keys. However, the application should create different keys for these tasks to protect the keys from various attacks. The CryptIC does not enforce key types for public keyset as it does with symmetric keys.

A public keyset can only be covered by a trusted or untrusted symmetric key, not another public key. Only the private part of the public keyset gets covered; the public key and modulus/generator are always in the Red form.

Software Data Objects

This section describes the various software data objects that make up the CGX Kernel.

Configuration Data

The CGX Kernel maintains the program control data bits. The functionality of the bits are described in the section Kernal Configuration String (KCS). The following subsections describe the data storage definitions for the program control data bits.

Program Control Data Bits

The PCDB allows the application to customize the CGX Kernel. For example, the PCDB contains a bit to allow the exportation of Red key material. However, the application must obtain an unlock-data message to get the proper permission to permanently change the non-volatile copy of the PCDBs. Without the appropriate unlock-data message the application is denied access to the PCDBs. Obtaining the unlock-data message and the process of using it is discussed in the section Kernal Configuration String (KCS).

FIG. 19 specifies the data definition for the PCDB bits.

PCDB Bit Definitions

The following lists the PCDB words in lowest memory order, defining the bits that are programmable by the application:

Word 0

As shown in the table below:

Bits 0–4 set the maximum allowed symmetric key (DES, triple-DES) length. The starting size is 40-bits and these bits allow a step size of 1 byte up to 168-bits.

Bits 5–7 set the maximum allowed asymmetric key (RSA, DSA, D-H) length. The starting size is 512-bits and these bits allow a step size of 256-bits up to 2048 bits.

Bit 8 selects whether triple-DES is allowed for traffic encryption. It is always allowed for Key encryption.

Bit 9 selects whether the CryptIC will allow Red key loading.

Bit 10 selects whether the RSA public key algorithms are enabled. A royalty fee is due to RSA for those chips which have this feature enabled.

Bits 11–15 are reserved.

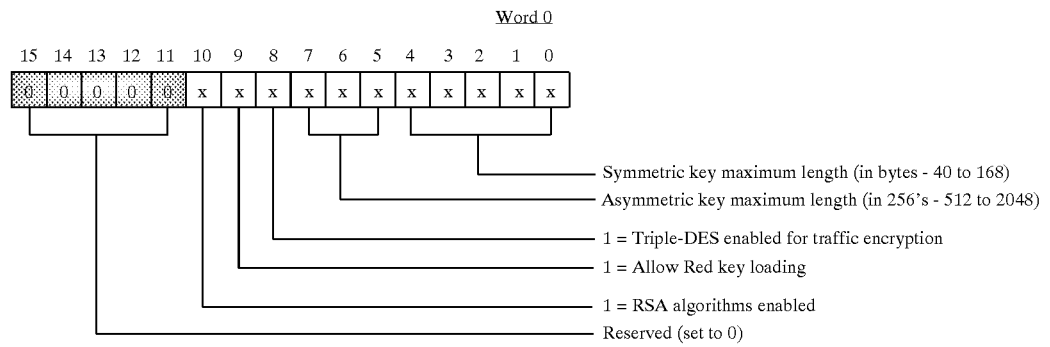

Word 1

As shown in the table below:

Bits 0–2 set a hardware delay-line which is used for adjusting the timing pulse for External Memory access. This is typically configured at the factory to account for IC process changes.

Bits 3–14 set the hardware revision number of the CryptIC. This value is returned in the CGX_GET_CHIPINFO command.

Bit 15 is reserved.

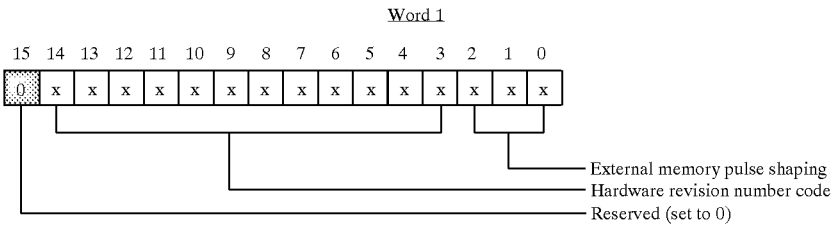

Command Interface

The major component to the command interface is the use of the shared memory, the kernel block, to allow command communication between the application and the CGX Kernel. The following sub-sections defined the kernel block and its two members: the command block and the status block.

Kernel Block

The kernel block is the CGX Kernel's pipeline or socket to the outside world (i.e. the application). The kernel block provides the application and CGX Kernel with the ability to communicate with one another. The kernel block is a pre-formatted shared block of RAM located in the DSP's data address space, neither in internal DM or external DM. The kernel block is shown in FIG. 20.

The kernel block is comprised of two areas: the command block and the status block. The command block is used as the data transfer area between the application and CGX Kernel for servicing cryptographic commands. The status block is used to keep the application updated on the status of the CGX Kernel. The kernel block consists of a status member and a pointer to the command block. Allowing the blocks to be defined as pointers allows the application to build static kernel blocks with the possibility of globalizing the status block. By globalizing the status block the application can reference the single instance; thus making status checks easier to perform. The section Kernal Block Object defines the kernel block as a very simple C data structure.

Moreover, the shared block approach is important for two other reasons. The first is to make the software interface to the CGX Kernel compiler-independent. Otherwise, the interface would be achieved via arguments pushed onto the software stack. All compiler languages support different calling frames; therefore, it would be difficult to come up with a simple scheme to handle all languages easily and efficiently.

The second reason for the shared block approach is to optimize the access to the CGX Kernel. Using the shared block approach, the application can set up static kernel blocks. A static kernel block would have pre-configured arguments and commands. The application would reuse the command block and never have to update it, similar to using a DMA controller. For example, the application could set up a static traffic encryption command block. The command block would be set up once with the following arguments: CGX_ENCRYPT command, the crypto-block context object, a data-in and data-out pointer, and a data-in size. Then for every block(s) of data to encrypt the application would only invoke, cgx_secure_transfer( ), with a pointer to the static kernel block. Like a DMA operation, the input buffer is obtained from the data-in pointer and the output buffer is obtained from the data-out pointer. The application would only have to replenish the data-in buffer and consume the data in the data-out buffer after the service completes. This would save processing time because the application would only have to populate the kernel block once prior to traffic.

The status field provides the CGX Kernel status back to the application (ie. return result code). The status field is a place holder for cryptographic service result codes, the acceptable status codes are specified in the section Status Definitions.

Kernel Block Object

The kernel block object is made up of two independently addressable blocks. FIG. 21 illustrates the kernel block.

The kernel block uses a pointer to the command block to allow for global substitutions of the block. For example, the application may have many static command blocks for several cryptographic services while it only has one kernel block for the entire application.

The 4 word kernelblock object may reside in either the internal DM data page or in any external DM page of the CryptIC. It is important however that when the CGX call is made (transfer vector), that the DMOVLAY register is set to the page in which the kernelblock object resides. The CGX Kernel will not modify the DMOVLAY register until it has read-in the kernel block.

Member Details

The DeviceNo member, as shown below, is used to allow the application to specify which class of command is being requested and the memory model for the command block arguments.

| DeviceNo Code | Operation | Memory Model |
|---|---|---|
| 0x0000 | ByteCode Command | DSP Internal PM |
| 0x0001 | ByteCode Command | DSP Internal DM |
| 0x0002 | CGX Command | PCI (32-bit addresses) |
| 0x0003 | CGX Command | DSP DM (14-bit address, data page) |
| 0x0004 | CGX Command | Mixed Mode (dp = bitmap) |

DeviceNo codes 0 and 1 are reserved for special Byte-Code commands which are used in factory testing. Codes 2–4 are used for CGX commands.

DeviceNo code 0x0002 specifies that if any of the 10 arguments in the command block are pointers, then they will be defined as 32-bit PCI address pointers. For example, if for a given CGX command, argument #3 is a pointer to a data source, then it will be a 32-bit PCI address.

DeviceNo code 0x0003 specifies that if any of the 10 arguments in the command block are pointers, then they will be defined as DSP Data Memory (DM) address pointers. The least-significant word of each argument will hold the 14-bit DM address. The most-significant word for each argument will hold the 16-bit DMOVLAY value for the DM address, thus allowing the pointer to reference any page in internal or external CryptIC memory.

DeviceNo code 0x0004 specifies that the dp member of the kernel block is a bitmap, specifying for each of the 10 arguments whether they are a pointer into PCI memory space (1) or an address/overlay page in DSP data memory space (0). Again, this only applies for those arguments which are pointers rather than explicit data. For example, a CGX command could be executed with a command block pointing to data values both in local DSP memory as well as PCI memory. This avoids having to copy data into the DSP memory prior to executing a CGX command.

The member, dp, is provided to allow flexible location of the command block within the CryptIC's memory spaces. The kernel block (which includes the status block) will be in whatever page is currently active (specified by the DMOV-LAY register) when CGX was entered. However, the dp member allows the application to allocate the command block in any of the external data pages available. This avoids having to use the valuable internal data space if the application chooses not to. As part of the CGX Kernel entry operation the CGX Kernel will save the previous data page and set the 2183 data page to the one passed in the kernel block. Upon exit the CGX Kernel will restore the old data page it saved in the entry operation.

The application may use the status field to determine if a cryptographic service completed successfully or not. The status code will indicate whether the CGX Kernel is busy or not, and will provide a success or failure result code. Note: the application must never modify the status field. The CGX Kernel is the only software that should write to the status field. If the application modifies the status field it may not know if the CGX Kernel is active.

Command Block

The command block provides the argument interface between the application and the CGX Kernel. The command block is comprised of several fields as shown in the C data structure definition below. The command block is made up of a command field and argument list. The command field is loaded with the operation code. The available commands are listed in the section Command Definitions.

The argument list is used to pass-in the command arguments. The argument list is a fixed array of void pointers. The void pointer allows you to establish a pointer to any object as well as passing in arguments by value.

Although most of the commands take a variable number of arguments, the command block is always fixed with 10 argument locations. However, the application does not have to assign the unused arguments to anything if the command does not use them. See the section Command Specification & Arguments for a detail listing of command argument specifications.

Command Block Object

The command block object is used by the application as the communication channel to the CGX Kernel or as the argument list for a cryptographic service. The command block is made up of a command (i.e. the micro commands as defined in the section Command Definitions), and the list of arguments (a maximum of 10 arguments are allowed). The argument list can contain pointers to various objects to be passed into the CGX Kernel. FIG. 22 illustrates the command block object.

Key Objects

Secret Key

As shown in FIG. 23, the secret key object, secretkey, is used to represent a symmetrical key between the application and the CGX Kernel. The data structure contains the key length (i.e. length, allowing the maximum key length of 192 bits for the triple DES algorithm), application specific data, the secret key type (i.e. DES, triple DES, etc.), and the raw buffer (i.e. k[16]).

The raw buffer, k, houses the actual secret key. As part of the secret key, some salt bits are pre-pended to the buffer, k.

There are a total of 54 bits of salt added, followed by 10 bits of key attributes. The key attributes (for details see the section Symmetric Key IRE Internal Representation) define the type of key (i.e. KKEK, KEK, DEK etc.) and its trust level (i.e. Trusted or Untrusted). The next 192 bits contain the actual key bits, followed by 64 bits of overwritten key_weakening data. Then, the 16-bit keylength field appears, followed by a 160-bit SHA-1 digest of the first 256 bits of k. The digest is used to authenticate the salt, attributes, and key.

The secretkey object is only used as a means to communicate and securely store keys off of the chip. Internally, the chip uses the same secretkey structure minus the last 192 bits of the buffer, k, the SHA-1 digest data.

All secret keys will have a type defined as: CGX_DES_A or CGX_TRIPLE_DES_A. The secret key type is used by the CGX Kernel so that it can internally transform the secret key to be usable for the secret key algorithm specified in the type field.

The secret key is stored in a buffer of 16 bit units or WORD16 data types. This allows for more efficient storage and access schemes. By default, the key is stored with its most significant bits in the upper bits of the final WORD16 item. The salt data will fill-in the unused least significant bits of the raw key buffer.

The extra field is 16 bits of data provided to the application for what ever it chooses. The CGX Kernel does not read or write this field. Furthermore, it will preserve this field while the key is internally stored in volatile or non-volatile memory.

Public Key

The public key object, publickey, is used to represent an asymmetric key that is to be used between the application and the CGX Kernel. The data structure is made up of a modulus, public key, and private key objects. The publickey object can accommodate Diffie-Hellman, DSA, and RSA public keys; otherwise known as the public keyset. The publickey object can only manage a maximum key length and/or modulus length of 2048 bits. Public key modulus length can be regulated with PCDBs. If required, an 'Enabler Token' can override the factory laser settings of the PCDBs.

FIG. 24 defines a generic public keyset. The type field identifies the kind of public key contained in the structure. Based on the type field, the application assigns pointers to the appropriate keyset objects: modulus, privkey, and pubkey objects for the appropriate type (i.e. Diffie-Hellman, RSA, and DSA). These pointers reference blocks of data stored in little-endian form.

All public keyset are stored in a packed form. Packed keys are defined as key structures in which the least significant byte of the next public key structure member abuts the most significant byte of the current member. In this way, fragmentation within data structures is minimized and portability of data is enhanced.

The length field specifies the length (in bits) of the modulus for this public key object. The extra field is 16 bits of data provided to the application for whatever it chooses. The CGX Kernel does not read or write this field. Furthermore, it will preserve this field while the public keyset is internally stored in volatile or non-volatile memory.

The following sections define the public keyset objects for each of the algorithm types supported.

Diffie-Hellman Public Keyset

The Diffie-Hellman keyset implements the following formula: $Y=g^y \bmod n$. The two variables g and n are combined to form the modulus, Y is the public key, and y is the private key. The contents of the private key must be protected. Therefore, the variable y of the DHprivkey object must be covered before it can be exported. Also, a salt field is included to avoid cipher-text attacks on the covered Diffie-Hellman private key. FIG. 25 illustrates the three objects that make up a Diffie-Hellman keyset.

RSA Public Keyset

The RSA keyset implements the following formulas: $c=m^e \bmod n$, $m=c^d \bmod n$, where $n=p\,q$. The variable n is the modulus, e is the public key, and p, q, and d make up the private key. The variables p, q, d mod (p−1), d mod (q−1), and $q^{-1}$ mod p are kept around as for optimization; they are used by the Chinese remainder theorem. This data must be protected as the private key is. Therefore, the privkey object must be covered before it can be exported. Also, a salt field has been added to avoid cipher-text attacks on the covered RSA private key. FIG. 26 illustrates the three objects that make up a RSA keyset.

DSA Public Keyset

The DSA keyset's variables implements the following signing formula: $r=(g^k \bmod p) \bmod q$, and $s=(k^{-1}(H(m)+x\,r)) \bmod q$. The following variables implement the verification formula: $u1=(H(m)(s^{-1} \bmod q)) \bmod q$, and $u2=(r\,(s^{-1} \bmod q)) \bmod q$, and $v=((g^{u1}\,y^{u2}) \bmod p) \bmod q$, where $y=g^x \bmod p$. The variables p, q, and g make up the modulus, y is the public key, and x is the private key. The other variables r, s, and v are results from the actual calculation and are not stored in a DSA public keyset. However, the contents of the private key must be protected. Therefore, the variable x of the DSAprivkey object must be covered before it be exported. Also, a salt field has been added to avoid cipher-text attacks on the covered DSA private key. FIG. 27 illustrates the three objects that make up a DSA keyset.

Digital Signature

The digital signature object, signblock, is used to represent a digital signature for DSA public key only. The data structure contains the sign result vectors.

The DSA signblock is represented as two vectors, r and s, to house the results of the DSA digital signature sign operation; stored in two buffers of 16 bit units or WORD16 data types. This allows for more efficient storage and access schemes. By default, the two vectors are stored with its most significant bits in the upper bits of the WORD16 buffers. FIG. 28 shows the DSA signblock object definition.

Seed Key

For generating reproducible prime numbers for DSA modulus', p and q, a seed key object is required. The seed key object is used by the application to provide a 160 bit seed value for generating the primes and for a counter to be used in verifying the primes.

The DSA seedkey object is represented as a 32 bit counter and a 160 bit seed buffer. FIG. 29 shows the DSA seedkey object definition.

Key Cache Register Data Type

Key cache registers are represented by a register ID value. The register ID can be between 0 and 14 (the maximum allowable key cache registers). However, key cache register number 0 is reserved for reference to the LSV (laser-trimmed) key cache register. The key cache register data type is shown in FIG. 30.

Red Keys

The CGX Kernel allows the importation of Red key material, both secret and public keys.

Context Management

Context management for the CGX Kernel is a critical requirement from the point of view of security, real-time, and storage. Context management allows the application to interleave several occurrences of a cryptographic operation. For example, the CGX Kernel only has one KG (or crypto-block) to encrypt with. However, some applications (e.g. packet networks) may have several encryption sessions going on at the same time. If the CGX Kernel did not implement context management then it could not start an encryption session for another party until the current party released the resource. This is because the use of the crypto-block requires state information about the encryption session to be saved between calls to the encryption command, CGX_ENCRYPT. If the state information isn't saved between calls then the next block will not encrypt correctly. So without context management, the application cannot share various resources of the CGX Kernel.

Context Stores

Like the kernel block the context stores are defined as blocks of memory with pointers to buffers specified by byte counts or implicit byte counts; thus providing a language (i.e. compiler or assembler) independent block interface.

Symmetrical Encryption Context Store

The context store for symmetrical (i.e. secret key) cryptographic commands (CGX_ENCRYPT and CGX_DECRYPT) are shown in FIG. 31.

The size of the crypto_cntxt block is 12 bytes of contiguous memory. The config field is used to select the encryption configuration (i.e. modes, loading configuration, and feed-back count); the constants to use for this field are defined in the document titled, CryptIC Command Interface Specification. The size of the KCR ID is 2 bytes. Note that the iv buffer size is fixed to 8 bytes. However, depending on algorithms used in the future, the iv buffer can grow easily if need be. This is because the iv buffer is at the end of the object and can be added to and still allow for backward compatibility.

The state information to restore the secret key context is saved in the buffer, iv, after each call to the CGX_ENCRYPT or CGX_DECRYPT commands. The application is responsible for priming the iv buffer with an initial random value when starting a new encryption session for a key. Moreover, to implement a simple resynchronization service, the application only needs to modify the iv buffer. The CGX Kernel writes back the feed-back register of the hardware crypto-block into the iv buffer for the CBC, CFB, and OFB modes after each call to CGX_ENCRYPT or CGX_DECRYPT. The iv buffer must remain unchanged by the application to maintain synchronization with the receiving end of the encryption session. There is no iv buffer required in the case of the ECB mode; the iv buffer pointer is ignored and the application is not required to set it. Another advantage of the crypto_cntxt is that the application has full access to the iv (i.e. the feed-back register or crypto-block state information) at any time.

One-Way HASH Context Store

The context store for the one-way HASH cryptographic commands (CGX_INIT_HASH and CGX_HASH_DATA) is shown in FIG. 32.

The size of the hash_cntxt block is 96 bytes of contiguous memory. The algorithm field is used to select the one-way HASH function algorithm (i.e., MD5 or SHS); the constants to use for this field are defined in the document titled, CryptIC Command Interface Specification. Note that the digest buffer size is variable depending on the algorithm used; MD5 uses a 128-bit digest and SHS uses a 160-bit digest. Only after closing the hash will the message digest field point to the message digest. The length of the state information is fixed for all algorithms based on the use of a union. The length of the state buffer is defined to be 96 bytes or 48 words.

Software Interfaces

This section describes the two major software interfaces, the command interface and the CGX overlay.

Command Interface

As discussed earlier the command interface provides the API between the CGX Kernel and the application. This is accomplished via a shared memory block and a transfer vector. The shared memory is implemented via the kernel block and the transfer mechanism is via specialized hardware logic.

Shared Memory

The kernel block (defined in the section Kernel Block) provides the shared memory necessary for the CGX Kernel and application to communicate with one another. Furthermore, unlike other shared memory schemes the kernel block is not a static area. The kernel block is reestablished for each cryptographic command request. This has the advantage of allowing the application to dynamically allocate the kernel block on the fly or better yet controlling which pieces of the kernel block (the command and/or status blocks) are statically versus dynamically allocated. The advantage with this is that the application can setup several static copies for each of the cryptographic commands before hand. Thus reducing the overhead of having to repopulate the command fields before each call to the CGX Kernel.

Like everything there are disadvantages to not having a fixed static kernel block. The most interesting disadvantage is that the CGX Kernel becomes a synchronously driven engine; not asynchronous. This is because if it was asynchronous, the CGX Kernel could post events, asynchronously, to the status block to report the health of its crypto-functions in real-time. However, the CGX Kernel does not run asynchronously; it only runs when it is invoked by the application and the rule is that it has control of the processor until it completes. Furthermore, the CGX Kernel will only modify the current kernel block while a cryptographic command is executed.

CGX Kernel Transfer Vector

In order to execute a cryptographic service, the application must explicitly invoke the CGX Kernel. To do this a special transfer vector mechanism has been created. The transfer mechanism is a specific call to address 0x2000 instruction with the PMOVLAY register set to 0x000F. The AR register must contain a pointer to the kernel block which defines the command requested.

When the software call instruction occurs, the special hardware logic (along with some hardware signals and counters) overlay the ROM encoded CGX Kernel program block over a portion of the application's program space. Once control has been passed to the Kernel, the application is prevented from monitoring the CGX Kernel's ROM, RAM or register areas.

To avoid forcing the application to understand the transfer mechanism, a single transfer vector routine is supplied by IRE to be used by the application. Furthermore, all of the cryptographic command definitions are provided as 'wrap code' around this single transfer operation; thus alleviating the application of supporting this operation.

CGX Kernel Transfer Vector Operation

The CGX Kernel transfer operation is fast and simple. The general idea behind the transfer operation is to establish a calling frame (kernel block and command block), transfer into the command mode of the CGX Kernel, execute the command, and return back to the application with the results.

The CGX Kernel transfer operation may be implemented as a function call by the application. A header file defining the operations for all of the cryptographic services is provided. These definitions consist of a macro that is used as wrap code to the transfer vector operation. The macros populate the kernel block with the appropriate commands and arguments. For example, to encrypt a block of data using the encryption command, CGX_ENCRYPT, the application would use the macro wrap definition illustrated in FIG. 33 and found in the cgx.h header file provided by IRE to the customer. The cgx.h header file is provided to the application as the software interface to the CGX Kernel cryptographic services. The application only needs to use this definition file and the transfer operation, _cgx_transfer_secure_kernel, to interface to the CGX Kernel.

As can be seen in FIG. 33, the wrap code prepares the kernel block for communications between the application and the CGX Kernel. (Optimizations to the wrap code have been previously suggested in the description of the kernel block. It is possible that the application can establish the kernel block once and just call the transfer operation cgx_transfer_secure_kernel over and over. This would speed things up so that the kernel block populate code would not be re-executed. This would only be useful for repetitive commands, like traffic encryption.) Looking at the example closer, one notices a call to the operation, cgx_transfer_secure_kernel, at the end of the macro wrap code cgx_encrypt. The transfer operation, cgx_transfer_secure_kernel, performs the actual transfer of control from the application to the CGX Kernel. The transfer operation is responsible for assigning the kernelblock object pointer to the AR register and forcing a software interrupt to cause control to be transferred to the CGX Kernel.

When the transfer operation is invoked it simply performs these four steps:

First it saves the return address to the calling function (i.e. the application) on the software stack, second it populates a general purpose register with the pointer to the kernel block in the AR register, third it transfers control to the CGX Kernel by forcing a software interrupt, and fourth the CGX Kernel returns back into the transfer operation in the application memory space, because of the PC stack save caused by the software interrupt, and it returns to the calling application's operation because of the saved address in step 1.

CGX Overlay Interface

As discussed earlier, the main purpose of the overlay operation is to provide the proper wrap code around the CryptoLIB operations. This allows the total reuse of the CryptoLIB software and hiding the CryptIC platform specific hardware functions from the application and the CryptoLIB software. To do this, there is a one to one mapping of CGX overlay operations (the wrap code) to each cryptographic command supported by the CGX Kernel.

CGX Overlay Table Definition

FIG. 34 shows a single CGX overlay tupple. The CGX overlay table contains N CGX overlay tupples or entries. The member cgxf is a pointer to the CGX overlay operation that is invoked by the CGX Kernel if the control variable satisfies the necessary requirements. The control variable contains a preemption bit.

CGX Overlay Table Processing

To simplify things, the CGX overlay operations reside in a table of CGX overlay tuples as defined by the data structure, cgx_overlay_tuple, that is indexed by the cmd field of the command block of the kernel block (e.g. kb->cb- >cmd). Once the CGX Kernel determines which tupple out of the CGX overlay table is the correct tupple to access, it must perform another check to determine if the application has proper access to the tupple.

To do this, the CGX Kernel must first verify the preemption bit (part of the control field) allows it to enter the command mode. The preemption bit occupies the most significant bit (i.e. bit 15) of the control variable; thus the preemption mask value is 0x8000. If the bit is a 1, it must enter the command_block mode. In the command_block mode, the CGX Kernel will not let another command preempt the current command. If the bit is a 0, the CGX Kernel will enter the command mode where the current command can be preempted by a secret key encryption/decryption or one-way Hash command.

Command Interface Resources

Besides the set of CGX cryptographic commands, the application is presented with various resources, mainly in the area of configuration registers and storage. As in most processor platforms, the developer is presented with a set of instructions and memory stores (either memory or registers) to manipulate data; with the CryptIC the application is also presented with memory storage capabilities.

Initialization Processing

The initialization process of the CGX Kernel can be invoked at any time via the CGX Command Interface. To invoke the initialization processing of the CGX Kernel, the CGX_INIT command is issued. This command allows the application to customize the CGX Kernel in two ways: the Kernel Configuration String and PCDB settings.

To do this, the CGX Kernel allows the application to pass in initialization strings for the two areas. The initialization strings are an array of defined bits to allow the application to set, disable, and enable various features of the CGX Kernel. The following sub-sections define the initialization strings allowed as part of the CGX_INIT command.

Kernel Configuration String (KCS)

The Kernel Configuration String is a set of bit-mapped words which control certain features in the CGX kernel. These features include: Semaphore handling and feature enables. The KCS object definition is shown in FIG. 35.

Programmable Control Data Bits Initialization String (PCDB_IS)

Program Control Data Bits (PCDBs) are a set of bit-mapped words which control certain features in the CryptIC. These features include: Symmetric and Public key lengths, RED key load enable, Algorithm enables, etc. The CryptIC is laser-programmed at the factory with a default set of PCDBs.

The PCDB_IS allows the application to customize the CGX Kernel PCDBs. For example, the PCDB_IS allows the application to give the CGX Kernel permission to change lengths of key material. However, the PCDB_IS needs an unlock-data message to gain permission to change the PCDBs. This message is digitally signed using an IRE private key, and the CryptIC verifies the signature with its public key. Without the unlock-data message the application is denied access to the PCDBs and the PCDB_IS is ignored.

The PCDB_IS's first word is used to specify the number of words succeeding the first word. If the application only wants to program data in the first word of the PCDB_IS it would only need to set the size word (the first word of the PCDB_IS) to a 0x1, and then pass in a PCDB_IS buffer of two words. The remaining words take on the factory default settings. Furthermore, depending on the unlock-data message, the application may not gain permission to all of the PCDBs. The CGX Kernel will ignore any bits in the PCDB_IS that the application has no permission to change in the PCDBs.

The following lists the PCDB_IS words in lowest memory order, defining the bits that are programmable to the application:

Word 0

As shown in the table below:

Bits 0–4 set the maximum allowed symmetric key (DES, triple-DES) length. The starting size is 40-bits and these bits allow a step size of 1 byte up to 168-bits.

Bits 5–7 set the maximum allowed asymmetric key (RSA, DSA, D-H) length. The starting size is 512-bits and these bits allow a step size of 256-bits up to 2048 bits.

Bit 8 selects whether triple-DES is allowed for traffic encryption. It is always allowed for Key encryption.

Bit 9 selects whether the CryptIC will allow Red key loading.

Bit 10 selects whether the RSA public key algorithms are enabled. A royalty fee is due to RSA for those chips which have this feature enabled.

Bits 11–15 are reserved.

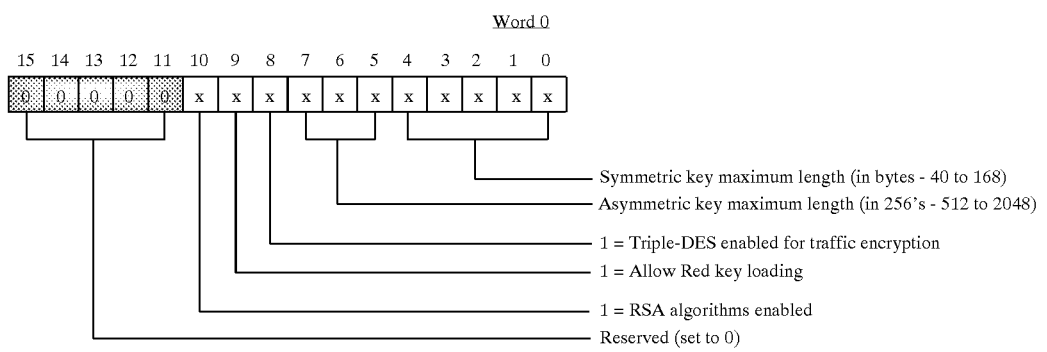

Word 1

As shown in the table below:

Bits 0–2 set a hardware delay-line which is used for adjusting the timing pulse for External Memory access. This is typically configured at the factory to account for IC process changes.

Bits 3–14 set the hardware revision number of the CryptIC. This value is returned in the CGX_GET_CHIPINFO command.

Bit 15 is reserved.

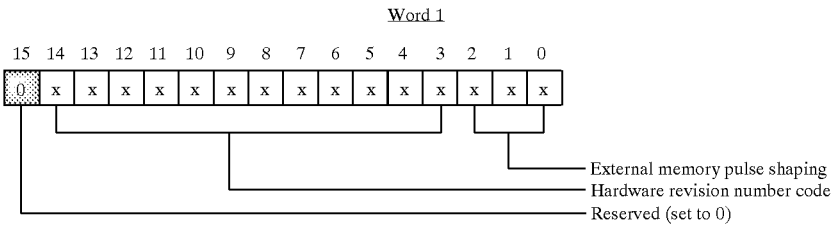

Word 1

- External memory pulse shaping
- Hardware revision number code
- Reserved (set to 0)

Key Storage

The CGX Kernel provides several areas for storage of symmetric and public keys. It contains three areas: Key RAM, Key Cache Registers (KCRs), and the Application Space. The Key RAM is a working area for one public key. A working area implies that it is volatile; in other words the public key is lost on power-down and resets. All public key operations (i.e., encryption or digital signatures) use the volatile key RAM for that single public key storage and for intermediate results.

The volatile Key Cache Registers provide a working area for many symmetric keys. Again, this is a working area so all the keys will be lost during a power-down or reset. The 15 volatile Key Cache registers are addressable via register Ids from 0 through 14 (where 14 is the last addressable register). The key cache register, 0, is reserved for the LSV symmetric key. The command interface uses the key cache register Ids as the addressing mechanism for storage, retrieval, and encryption.

Note: Additional key storage can be achieved within the CryptIC through the use of extended RAM. A parameter can be passed in the CGX_INIT command to request allocation of increments of 1 kbyte of internal DSP Data RAM to key storage. Up to 700 symmetric keys can be accomodated in this manner.

The Application Space can be used for non-volatile or long time storage for persistent key material. The CryptIC does not contain non-volatile memory (other than the Laser-programmed bits). However, the section Key Management discusses how keys can be stored off chip securely using the commands discussed in this memo.

Command Interface Definitions

The following sub-sections provide a listing of the command interface definitions. The definitions provide the proper argument values for micro commands, status information, and object definitions. These definitions must be used in order to communicate correctly with the CGX Kernel.

Command Definitions

The following table represents the valid command definitions:

TABLE 13

| Command Definitions | |
|---|---|
| Name | Value |
| General Commands | |
| CGX_INIT | 0x0000 |
| CGX_DEFAULT | 0x0001 |

TABLE 13-continued

| Command Definitions | |
|---|---|
| Name | Value |
| CGX_RANDOM | 0x0002 |
| CGX_GET_CHIPINFO | 0x0003 |
| Encryption Commands | |
| CGX_UNCOVER_KEY | 0x0004 |
| CGX_GEN_KEK | 0x0005 |
| CGX_GEN_KEY | 0x0006 |
| CGX_LOAD_KEY | 0x0007 |
| CGX_DERIVE_KEY | 0x0008 |
| CGX_TRANSFORM_KEY | 0x0009 |
| CGX_EXPORT_KEY | 0x000A |
| CGX_IMPORT_KEY | 0x000B |
| CGX_DESTROY_KEY | 0x000C |
| CGX_LOAD_KG | 0x000D |
| CGX_ENCRYPT | 0x000E |
| CGX_DECRYPT | 0x000F |
| Public Key Commands | |
| CGX_GEN_PUBKEY | 0x0010 |
| CGX_GEN_NEWPUBKEY | 0x0011 |
| CGX_GEN_NEGKEY | 0x0012 |
| CGX_PUBKEY_ENCRYPT | 0x0013 |
| CGX_PUBKEY_DECRYPT | 0x0014 |
| CGX_EXPORT_PUBKEY | 0x0015 |
| CGX_IMPORT_PUBKEY | 0x0016 |
| Digital Signature Commands | |
| CGX_SIGN | 0x0017 |
| CGX_VERIFY | 0x0018 |
| Extended Algorithm Commands | |
| CGX_LOAD_EXTENDED | 0x0019 |
| CGX_EXEC_EXTENDED | 0x001A |
| Hash Commands | |
| CGX_HASH_INIT | 0x001C |
| CGX_HASH_DATA | 0x001D |
| CGX_HASH_ENCRYPT | 0x001E |
| CGX_HASH_DECRYPT | 0x001F |
| Math Commands | |
| CGX_MATH | 0x0021 |
| PRF Commands | |
| CGX_PRF_KEY | 0x0020 |
| CGX_PRF_DATA | 0x001F |
| CGX_MERGE_KEY | 0x0021 |
| CGX_MERGE_LONG_KEY | 0x0022 |
| CGX_LONG_KEY_EXTRACT | 0x0023 |
| RKEK Commands | |
| CGX_GEN_RKEK | 0x0024 |
| CGX_SAVE_KEY | 0x0025 |

Status Definitions

The following table represents the allowable status definitions, returned by the CGX Kernel:

TABLE 14

Status Definitions

| Command | Value | Description |
|---|---|---|
| CGX_SUCCESS_S | 0x0000 | Cryptographic service completed successfully. |
| CGX_WEAK_KEK_S | 0x0001 | A weakly generated KEK (a secret key) was used as an argument. The KEK is rejected and the service fails. |
| CGX_EMPTY_REG_S | 0x0002 | An empty key cache register was referenced, the service fails. |
| CGX_INVALID_REG_S | 0x0003 | An invalid key cache register was given, the service fails. |
| CGX_ACCESS_DENIED_S | 0x0004 | Attempt to export RED key material but the RED_KEY_EXPORT_ENABLED PCDB bit is not enabled, the service fails. |
| CGX_WEAK_KEY_S | 0x0005 | A weakly generated key (a secret key) was used as an argument. The key is rejected and the service fails. |
| CGX_HARDWARE_FAILURE_S | 0x0006 | One or more hardware devices used to implement the requested service has failed. |
| CGX_BAD_MODULUS_S | 0x0007 | A bad modulus (i.e., not greater than 0) was used. |
| CGX_INVALID_KEY_LEN_S | 0x0008 | Invalid secret key length used. Only 40, 64, and 128 bit length secret key lengths allowed. |
| CGX_BAD_MODE_S | 0x0009 | Invalid mode (i.e., only ECB, CBC, CFB, and OFB modes allowed) used. The service fails. |
| CGX_PRIVILEGE_DENIED_S | 0x000A | Invalid login ID and/or PIN, or login ID does not have privilege access to cryptographic operation. |
| CGX_INVALID_CMD_S | 0x000B | Invalid command opcode (i.e., constant val.) provided. |
| CGX_INVALID_LEN_S | 0x000C | Invalid length (i.e., constant value) provided. Returned for public key operations only. |
| CGX_BAD_KEYSET_S | 0x000D | Specified public keyset source location is empty or contains the incorrect public keyset. |
| CGX_INVALID_SIGNATURE_S | 0x000E | The digital signature verification failed; the signature of the application's message does not match the signature of the verification signature block. |

TABLE 14-continued

Status Definitions

| Command | Value | Description |
|---|---|---|
| CGX_BIGNUM_FAIL_S | 0x000F | Public key processing failed due to large integer failure (i.e., overflow condition). |
| CGX_BAD_KEK_S | 0x001F | Invalid KEK or NULL when KEK argument required. |
| CGX_RAM_FAIL_S | 0x0011 | low level RAM diag's failed |
| CGX_ROM_FAIL_S | 0x0012 | low level ROM diag's failed |
| CGX_LSV_FAIL_S | 0x0013 | low level LSV CRC test failed |
| CGX_NULL_PTR_S | 0x0020 | NULL Pointer passed when argument required. |
| CGX_FAILED_TOKEN_SN_S | 0x0028 | cmd failed token serial number check |
| CGX_FAILED_TOKEN_VERIFY_S | 0x0029 | cmd failed token verify signature |
| CGX_FAILED_RKEK_S | 0x002A | cmd failed RKEK |
| CGX_FAILED_NEG_KEY_S | 0x002B | failed Diffie Hellman negotiate key |
| CGX_FAILED_SAVE_KEY_S | 0x002C | failed save key operation |
| CGX_FAILED_GEN_RKEK_S | 0x002D | failed gen RKEK operation |
| CGX_FAILED_LOAD_KEY_S | 0x002E | failed load key operation |
| CGX_PROG_NOT_RUN | 0x002F | Start address 0 supplied (to IRE internal test programs) |
| CGX_STARTED_S | 0x00FC | Application has made the request to CGX. |
| CGX_RUNNING_S | 0x00FD | CGX has accepted the call and is running. |
| CGX_FAIL_S | 0x00FE | General catch-all failure code. |
| CGX_BUSY_S | 0x00FF | Secure Kernel Busy, can not be preempted. |

Algorithm, Mode, and Key Usage Definitions

This section defines the algorithms, mode, and key usage definitions for symmetric key, public key, digital signatures, and one-way Hash operations.

Key Usage Definitions

The following table defines the key usage bits that must be specified when generating, loading, negotiating, or deriving a public or symmetric key. The constant values referenced in the table must be used in order to use an IRE symmetric or public key within the confines of the CryptIC device.

TABLE 15

Key Usage Definitions

| Name | Value | Description |
|---|---|---|
| CGX_KCR_DEK | 0x0002 | This key definition is reserved for symmetric keys that are to be used for traffic or message encryption only. |
| CGX_KCR_DKEK | 0x0008 | This key definition is reserved for symmetric keys that are to be used to cover other symmetric or public keys. The covered key must be a DEK, not a KEK. |

TABLE 15-continued

Key Usage Definitions

| Name | Value | Description |
|---|---|---|
| CGX_KCR_KEK | 0x0010 | This key definition is reserved for public keys and symmetric keys that are to be used to cover other symmetric or public keys. |
| CGX_KCR_UNTRUSTED | 0x0100 | This constant can be or'ed with any of the three definitions above to force a newly generated, loaded, negotiated, or derived symmetric or public key to be known as an untrusted key. This is important if the application intends to export a particular key; only untrusted keys can be exported. Furthermore, the untrusted key must not be under (i.e. covered by) a trusted parent or it can't be sorted as well. |

Symmetric Key Algorithms

The following tables define the symmetric key algorithms and their operating modes. The constant values referenced in the tables must be used in order to access the CGX Kernel's symmetric key algorithms.

TABLE 16

Symmetric Key Algorithm Bits

| Name | Value | State Context Length (i.e., the dynamic IV) | Description |
|---|---|---|---|
| DES | | | |
| CGX_DES_A | 0x0001 | 0 bits (0 bytes) | Single DES: ECB, CBC, CFB, and OFB |
| Triple DES | | | |
| CGX_TRIPLE_DES_A | 0x0002 | 128 bits (16 bytes) | Triple DES: ECB, CBC, CFB, and OFB |
| RC5 | | | |
| CGX_RC5_A | 0x0004 | 0 bits (0 bytes) | Single RC5: ECB, and CBC |
| HMAC | | | |
| CGX_HMAC_A | 0x0008 | 0 bits (0 bytes) | Only used by the CGX_TRANFORM_KEY command for IPsec key transforms. |

TABLE 17

Symmetric Key Mode Bits

| Name | Value | Description |
|---|---|---|
| CGX_ECB_M | 0x0001 | Electronic CodeBook Mode. No IV |
| CGX_CFB_M | 0x0002 | Cipher FeedBack Mode. IV required |
| CGX_OFB_M | 0x0004 | Output FeedBack Mode. IV required |
| CGX_CBC_M | 0x0008 | Cipher Block Chaining Mode. IV required |
| CGX_1BIT_FB | 0x0010 | Feedback bits for both the OFB mode and the CFB modes above. Defines 1-bit feedback. |

TABLE 17-continued

Symmetric Key Mode Bits

| Name | Value | Description |
|---|---|---|
| CGX_8BIT_FB | 0x0020 | Defines 8-bit feedback. |
| CGX_64BIT_FB | 0x0040 | Defines 64-bit feedback. |

The symmetric key algorithm bits are supplied in the symmetric key object (discussed in the memo, CryptIC Software Architecture), the key type field. When symmetric keys are created or imported into the CryptIC the type of the symmetric key specified in the key type field of the symmetric key object defines the type of symmetric key algorithm to use. The symmetric key algorithm bits are not used as part of the algorithm field of the crypto_cntxt object.

Also, the bits (7 through 9) of the algorithm word, of the algorithm field of the crypto_cntxt object, is used to contain the special encryption control bits. Currently, there are two bits used to specify how keys are loaded into the KG during encryption. The masks are or'ed into the algorithm and mode constants defined above.

TABLE 18

Symmetric Key Load Definitions

| Name | Bit Mask | Description |
|---|---|---|
| CGX_AUTOLOAD_C | 0x0080 | This mask is used to request the CGX Kernel to perform an auto load key when encrypting. The use of auto load means that if the key is already loaded into the KG (i.e., the crypto-block) don't repeat the key load for this operation. This is the default mode. |
| CGX_FORCELOAD_C | 0x0100 | This mask is used to request that the CGX Kernel always loads the key when encrypting. |
| CGX_NOLOAD_C | 0x0200 | This mask is used to request that the CGX Kernel perform no key load when encrypting. |
| CGX_RESYNC_C | 0x0400 | This mask is used to request that the CGX Kernel re-start the OFB or CFB mode. To restart traffic synchronization it only has to encrypt the IV before it can encrypt/decrypt traffic. |

Public Key Algorithms

The following table defines the supported public key algorithms (this includes digital signatures as well) and their operating modes. The constant values referenced in the table must be used to access the CGX Kernel's public key algorithms.

TABLE 19

Public Key Algorithm Definitions

| Name | Value | Description |
|---|---|---|
| CGX_RSA_A | 0x0001 | RSA public key, encryption and signatures. |
| CGX_DSA_A | 0x0002 | DSA public key, signatures. |
| CGX_DH_A | 0x0003 | Diffie-Hellman public key, key exchange. |

One-Way Hash Algorithms

The following table defines the supported one way HASH algorithms and their operating modes. The constant values referenced in the table must be used to access the CGX Kernel's one-way HASH algorithms.

TABLE 20

One Way HASH Algorithm Definitions

| Name | Value | Msg. Digest Length | Description |
| --- | --- | --- | --- |
| CGX_MD5_A | 0x0000 | 128 bits (16 bytes) | Specifies the MD5 one way HASH algorithm. |
| CGX_SHS_A | 0x0001 | 160 bits (20 bytes | Specifies NIST's one way HASH algorithm, SHS-1. |

IPsec Symmetric Key Transformation Algorithms

The following table defines the supported IPsec symmetric key transformation algorithms supported. The constant values referenced in the table must be used to access the CGX Kernel's CGX_TRANSFORM_KEY command.

TABLE 21

IPsec Symmetric Key Transformation Algorithm Definitions

| Name | Value | Description |
| --- | --- | --- |
| CGX_XOR_V | 0x0001 | This operation exclusive-ors a data pattern with the symmetric key and then HASHes it. |
| CGX_PREPEND_V | 0x0002 | This operation pre-pends the data pattern to the symmetric key and then HASHes it. |
| CGX_APPEND_V | 0x0004 | Ths operation appends the data pattern to the symmetric key and then HASHes it. |

Command Specification & Arguments

The following portion of this description defines the command set by specifying in detail a description of the command, the argument list specification (i.e., the kernel block and command block configuration), and result codes. When an asterisk is pre-pended to the command name it implies the command is optional and it may not be implemented.

General Commands

INIT (Initialize Secure Kernel)

Command Name: CGX_INIT

Command Description:

The Init command is used to initialize the secure Kernel; the Init command can be used at any time. However, the entire command interface, volatile key RAM, and volatile key cache registers are reset; the processor is not reset. The Init command allows the application to customize the secure Kernel's PCDBs, the number of Key Cache Registers (from 15 to 700) and the command interface using the KCS. In particular the application must present the unlock-data message at this time to reprogram any PCDBs that it has permission to change.

The command takes, as an input, pointers to unsigned character buffers. The use of unsigned char is to standardize on a little endian memory model as the default. Using the Init command, the application can then change the endian memory model to the memory model it desires.

There are three programmable areas: Program Control Data Bits via the pcdb initialization string (includes the signed token), extending the Key Cache Registers by requesing to lock internal DM, and the Kernel Configuration via the kc initialization string. See the section Software Data Objects for detailed information defining the PCDB and KCS initialization strings.

```
Command Interface:
    /* initialize the secure kernel */
    cgx_init( kernelblock *kb,
        unsigned char *pcdb,
        unsigned char *kdat,
        unsigned char *kstart,
        unsigned char *kc)
    Arguments:
        kb->cb->cmd = CGX_INIT;
        /* the PCDB initialization string */
        /* set to NULL if no initialization required */
        /* the first byte must contain string length in bytes */
        kb->cb->argument[0] = (VPTR)pcdb;
        /* extended key RAM pointer */
        /* set to NULL if no extended KCR required */
        kb->cb->argument[1] = (VPTR)kdat;
        /* extended key RAM start pointer */
        /* set to NULL if no extended KCR required */
        kb->cb->argument[2] = (VPTR)kstart;
        /* the Kernel Configuration String */
        /* set to NULL if no initialization required */
        /* the first byte must contain string length in bytes */
        kb->cb->argument[3] = (VPTR)kc;
    Status:
        kb->sb->status = CGX_SUCCESS_S
```

Default (Restore Factory Default Settings)

Command Name: CGX_DEFAULT

Command Description:

The Default command is used to undo all of the initialization processing that occurred via the CGX_INIT command. This command forces the secure Kernel to reset all of the settings (i.e., command interface and PCDBs) back to factory default settings.

The Default command can be used at any time. However, the entire command interface, volatile key RAM, volatile key cache registers, and PCDB settings are reset; the processor is not reset.

```
Command Interface:
    /* Restore factory default settings */
    cgx_default( kernelblock *kb)
    Arguments:
            kb->cb->cmd = CGX_DEFAULT;
    Status:
        kb->sb->status = CGX_SUCCESS_S
```

Random (Generate Random Numbers)

Command Name: CGX_RANDOM

Command Description:

The Random command is used to obtain random bytes of data. The random bytes come from the random number generator hardware device. The application is allowed to request between 1 and 65535 bytes of random data at a time.

```
Command Interface:
    /* Generate a random number */
    cgx_random( kernelblock *kb,
          VPTR     rbuf,
          unsigned short rbuf_size)
    Arguments:
        kb->cb->cmd     = CGX_RANDOM,
        /* the number of random bytes, between 1 and 65535 bytes */
        kb->cb->argument[0] = (VPTR)rbuf_size;
        /* a buffer to hold the requested random numbers */
        kb->cb->argument[1] = (VPTR)rbuf;
    Status:
        kb->sb->status =  CGX_SUCCESS_S, or
                          CGX_HARDWARE_FAILURE
                          /* RNG hardware failure */
See Also: CGX_TEST
```

Get CHIPINFO (Return CryptIC System Information)
Command Name: CGX_GET_CHIPINFO
Command Description:
The Get_Chipinfo command is used to obtain system information about the secure Kernel. The system information is returned in a data structure defined as:

```
typedef struct_chipinfo {
    WORD16 hw_vsn;          /* contains the hardware
                                version number */
    WORD16 sw_vsn;          /* contains the software
                                version number */
    WORD16 kcr_max;         /* returns max number of
                                KCRs */
    WORD16 kcr_used;        /* returns bit-map of
                                active KCRs */
    WORD16 pcdb[N];         /* contains all of the
                                program control */
                            /* data bit values */
    WORD16 serial_number[10]; /* unique CryptIC ID */
} chipinfo;
```

The application need not use the data structure; however it must pass a pointer to a buffer of the same size as the chipinfo data structure. In any case, the returned data reflects the current status of the secure Kernel's programmable values and its hardware and software release numbers.

```
Command Interface:
    /* obtain information about the secure Kernel and CryptIC */
    cgx_chipinfo( kernelblock   *kb,
           VPTR     cbuf)
    Arguments:
        kb->db->cmd  = CGX_GET_CHIPINFO;
        /* a buffer to hold the requested chip info, */
        /* must allow enough space as defined in data structure above */
        /* in fact an instance of the data struct can be used */
        kb->cb->argument[1] = (VPTR)cbuf;
    Status:
        kb->sb->status = CGX_SUCCESS_S
See Also: CGX_INIT
```

Encryption Commands
Uncover Key (Load And Decrypt A Secret Key)
Command Name: CGX_UNCOVER_KEY
Command Description:
The Uncover Key command allows a generated KEK (i.e. GKEK) or user created key to be decrypted and stored in the key cache. The generated or internal GKEK can only be uncovered by the LSV (i.e. KCR 0) and the user keys can be uncovered by a generated or internal KEK or a user key (i.e. KKEK or KEK), not the LSV. The Uncover Key operation allow user keys to be uncovered using any of the supported secret key algorithms (i.e., DES, Triple DES, etc.), in any of the modes (i.e., ECB, CFB, OFB, and CBC). As for GKEKs, they can only be uncovered by the LSV in the triple DES CBC mode; any attempt to bypass this will fail. The operation copies the secret key from the application's memory in the covered form (i.e., BLACK) and decrypts it into the source key cache register, key.

Like the rule for uncovering the GKEK, any key to be uncovered by a GKEK must also use the triple DES CBC mode. Also, an IV will be returned in the application supplied IV buffer of the crypto_cntxt object. Therefore, the basic requirement is that the parent KEK (i.e. LSV) to GKEKs must be a triple DES key and the GKEK itself must be a triple DES key. This implies the use of triple DES in the CBC mode when these two KEKs are used for uncovering and covering of keys.

Prior to invoking the encryption command, the application must setup the crypto_cntxt block. The application is responsible for setting the mode, masking in one of the special key load options (described below), setting the appropriate secret key KCR ID, and for populating the iv buffer. If the key is a traffic/encryption key (i.e., keys that are not GKEKS), the IV buffer must be populated with the same IV used by the cover operation. Therefore, the application must have archived the IV buffer along with the covered key.

The iv buffer of the crypto_cntxt block must be read- and write-able; the iv buffer is used to maintain the feedback register for the CBC, CFB, and OFB modes. In the ECB mode the iv buffer is ignored. However, in the case of uncovering keys, the IV buffer is not updated as is done in normal encryption. This is because the original IV may be needed to uncover the key again later.

The Uncover Key command allows the application to mask in one of the special configuration and mode control bits defined in section 0, into the algorithm field of the crypto_cntxt block. The control bits are used by the secure Kernel to determine how to load secret keys before the actual encryption of the plain text takes place. The control bits allow the application to request one of these options: auto-load, force-load, or no-load. Auto-load allows the secure Kernel to check which key is currently loaded into the KG, if it's the same as the key specified for the encryption command it is not loaded; otherwise the key is loaded. Force-load tells the secure Kernel to always load the key. No-load tells the secure Kernel to not load the key; more than likely the application has already loaded the key (maybe via the CGX_LOAD_KG command). By default, auto-load is assumed.

```
Command Interfaces:
    /* single encryption mode for key uncover */
    cgx_uncover( kernelblock *kb,
           kcr     key,
             secretkey  *black_key,
             crypto_cntxt *cc)
```

-continued

```
Arguments:
    kb->cb->cmd      = CGX_UNCOVER_KEY;
    /* uncovered and store in key cache register number, key */
    kb->cb->argument[0] = (VPTR)key;
    /* the secretkey object holding key to uncover */
    kb->cb->argument[1] = (VPTR)black_key;
    /* configuration and mode definition, KEK kcr, crypto_cntxt */
    kb->cb->argument[2] = (VPTR)cc;
Status:
    kb->sb->status =  CGX_SUCCESS_S,
                      CGX_EMPTY_REG_S,
                      CGX_BAD_MODE_S, or // GKEK only
                      uses 3DES, CBC
                      CGX_INVALID_REG_S
See Also: CGX_COVER_KEY
```

GEN KEK (Generate An Internal Key Encryption Key)
Command Name: CGX_GEN_KEK
Command Description:
The Generate KEK command allows the application to generate an internal key encryption key (i.e. a GKEK) to be used to cover user secret keys or public keys. The GKEK is generated using the output of the random number generator. In order to return the GKEK it must be covered with the LSV, no other secret key is allowed.

Besides generating a GKEK, this command places a copy of the key in its RED form in a KCR location and returns a BLACK copy of the key all at one time; thus it is an intrinsic key function. By returning a BLACK copy of the GKEK immediately, another application is prevented from obtaining the GKEK before the application responsible for its creation does so. Furthermore, this avoids the potential of duplicate copies of a GKEK; thus strengthening its trust.

The GKEK is viewed as a trusted KEK by the secure Kernel. Therefore, it can never be exported from the device in a BLACK or RED form after it has been created and the initial BLACK copy was returned to the application.

The newly generated KEK is left in the specified key cache register, destkey, in the RED form.

The Generate KEK command only generates Triple-DES secret keys. Once a GKEK is created, the secure Kernel only recognizes the GKEK as an internal key. Furthermore, the newly generated GKEK can only be used to cover/uncover application secret keys and public keys. Moreover, when an uncover operation is invoked to load a GKEK, the application is not allowed to specify any algorithm; the secure Kernel assumes triple DES in CBC mode. Also, the application is not allowed to provide a IV;, the secure Kernel provides it. This holds true for keys that are covered under a GKEK as well.

```
Command Interfaces:
    /*generate a secret key GKEK */
    cgx_gen_kek( kernelblock   *kb,
                 kcr           destkey,
                 secretkey     *bk)
    Arguments:
        kb->cg->cmd   = CGX_GEN_KEK;
        /* KCR ID number to place newly generated GKEK */
        kb->cb->argument[0] = (VPTR)destkey;
        /* BLACK secretkey to return the covered GKEK in */
        /* The GKEK is covered by the LSV */
        kb->cb->argument[1] = (VPTR)bk;
```

```
Status:
    kb->sb->status = CGX_SUCCESS_S,
                     CGX_FAIL_S,
                     CGX_INVALID_REG_S, or
                     CGX_HARDWARE_FAILURE_S
                     /* RNG hardware failure */
See Also: CGX_UNCOVER_KEY
```

GEN RKEK (Generate a Recovery Key Encryption Key)
Command Name: CGX_GEN_RKEK
Command Description:
An RKEK is a Diffie-Hellman negotiated, triple DES, trusted symmetrical key. The RKEK is created by an application, an escrow agent and IRE safenet trusted services to produce the two parts of a negotiated key. IRE safenet trusted services delivers to the application a signed token that contains the chip's serial number and the public key necessary to create the negotiated key. The RKEK can only be generated once the token has been verified.

Besides generating an RKEK, this command places a copy of the key in its RED form in a KCR location and returns a BLACK copy of the RKEK covered by the LSV all at one time; thus it is an intrinsic key function. By returning a BLACK copy of the RKEK immediately, another application is prevented from obtaining the RKEK before the application responsible for its creation does so. Furthermore, this avoids the potential of duplicate copies of a RKEK; thus strengthening its trust.

The RKEK is viewed as a trusted KEK by the secure Kernel. Therefore, it can never be exported from the device in a BLACK or RED form after it has been created and the initial BLACK copy was returned to the application.

The newly generated RKEK is left in the specified key cache register, destkey, in the RED form.

The Generate RKEK command only generates Triple-DES secret keys. Once an RKEK is created, the secure Kernel only recognizes the RKEK as an internal key. Furthermore, the newly generated RKEK can only be used to cover/uncover application secret keys and public keys. Moreover, when an uncover operation is invoked to load an RKEK, the application is not allowed to specify any algorithm; the secure Kernel assumes triple DES in CBC mode. Also, the application is not allowed to provide a IV;, the secure Kernel provides it. This holds true for keys that are covered under an RKEK as well.

```
Command Interfaces:
    /*generate an RKEK */
    cgx_gen_rkek(kernelblock   *kb,
                 token_no_data *t,
                 KCR           kcr
                 publickey     *dhpk
                 publickey     *dhkek
                 secretkey     *rkek)
    Arguments:
        (kb)->cb->cmd = CGX_GEN_RKEK; \
        (kb)->cb->argument[0].addr.dp = (UINT16)((kb)->dp); \
        (kb)->cb->argument[0].ptr = (VPTR)(t); \
        (kb)->cb->argument[1].ptr = (VPTR)(kcr); \
        (kb)->cb->argument[2].addr.dp = (UINT16)((kb)->dp); \
```

-continued

```
    (kb)->cb->argument[2].ptr = (VPTR)(dhpk); \
    (kb)->cb->argument[3].addr.dp = (UINT16)((kb)->dp); \
    (kb)->cb->argument[3].ptr = (VPTR)(dhkek); \
    (kb)->cb->argument[4].addr.dp = (UINT16)((kb)->dp); \
    (kb)->cb->argument[4].ptr = (VPTR)(rkek); \
Status:
    kb->sb->status = CGX_SUCCESS_S,
        CGX_FAILED_RKEK_S,
        CGX_FAILED_GEN_RKEK_S.
See Also: CGX_UNCOVER_KEY and CGX_SAVE_KEY
```

Save Key (Save a Key Under an RKEK)
Command Name: CGX_SAVE_KEY
Command Description:
The save key operation is a special operation used exclusively by an RKEK. The save key operation uncovers a secret key under its context, then covers it under the RKEK.

```
Command Interfaces:
    /*Save a key under an RKEK*/
    cgx_save_key( kernelblock      *kb,
                  secretkey        *bk_uncover,
                  crypto_cntxt     *bkek,
                  secretkey        *bk_returned,
                  crypto_cntxt     *rkek)
    Arguments:
        (kb)->cb->cmd = CGX_SAVE_KEY; \
        (kb)->cb->argument[0].addr.dp = (UINT16)((kb)->dp); \
        (kb)->cb->argument[0].ptr = (VPTR)(bk_uncovered); \
        (kb)->cb->argument[1].addr.dp = (UINT16)((kb)->dp); \
        (kb)->cb->argument[1].ptr = (VPTR)(bkek); \
        (kb)->cb->argument[2].addr.dp = (UINT16)((kb)->dp); \
        (kb)->cb->argument[2].ptr = (VPTR)(bk_returned); \
        (kb)->cb->argument[3].addr.dp = (UINT16)((kb)->dp); \
        (kb)->cb->argument[3].ptr = (VPTR)(rkek); \
    Status:
        kb->sb->status = CGX_SUCCESS_S,
            CGX_FAILED_SAVE_KEY_S.
    See Also: CGX_UNCOVER_KEY and CGX_GEN_RKEK
```

GEN Key (Generate A Secret Key)
Command Name: CGX_GEN_KEY
Command Description:
The Generate Key command allows the application to generate a user secret key. The secret key is generated using random numbers; then transformed into the secret key form as directed by the type of secret key specified (i.e. key_type) in the argument interface. The generated secret key can only be covered by an internal generated KEK (i.e. a GKEK) or via another user secret key (i.e. KKEK [if the generated key is an encryption key] or KEK), not the LSV.

Besides generating a secret key, this command places a copy of the key in its RED form in a KCR location and returns a BLACK copy of it all at one time; thus it is an 'intrinsic key' function. By returning a BLACK copy of the secret key immediately, another application is prevented from obtaining the secret key before the application responsible for its creation does so.

The application must also provide a key usage definition. This is passed in via the argument 'use' and is provided to announce the use of the newly generated secret key. Currently, the application has three options: KKEK (CGX_KCR_KKEK), KEK (CGX_KCR_KEK) or K (CGX_KCR_K). Defining it as KEK or KKEK directs the secure Kernel to only recognize this secret key as a KEK. Furthermore, when defined as a KKEK, the key cannot be used to cover anything other than data keys (type K). KEKs can only be used in key management operations (e.g. CGX_UNCOVER_KEY, etc.). Defining it as K directs the secure Kernel to only recognize it as a session key for traffic or message encryption operations (e.g. CGX_ENCRYPT, etc.).

A trust level must be given to a newly generated secret key. The user can force the secret key to be recognized as an untrusted secret key by or-ing in CGX_KCR_UNTRUSTED with the 'use' argument. This directs the secure Kernel to automatically mark the secret key as untrusted. This is useful if the application has plans to eventually export the secret key via the CGX_EXPORT_KEY command. Although, an untrusted secret key covered under a trusted KEK (i.e. GKEK, LSV, or a trusted KEK or KKEK) can not be exported; it is a securely protected key of the CryptIC device.

Moreover, if the application does not apply the un-trusted attribute to the 'use' argument, the secure Kernel will determine the trust level for the generated secret key. If the secret key is covered under a trusted KEK it will become a trusted key. If the secret key is covered under an untrusted KEK or KKEK it becomes an untrusted secret key. In other words, it inherits its parents trust attribute.

The newly generated secret key is left in the specified key cache register, destkey, in the RED form. A BLACK copy is returned if the application provides storage for a secretkey object and crypto_cntxt object. If either of these objects are NULL then no BLACK secret key is returned. This is otherwise known as a dangling key. A dangling key is dynamic (one time or session oriented) because once the power is lost the secret key is lost as well. Furthermore, the key can not be exported because it has no covering KEK; this is required as authentication for exporting a secret key.

If storage for a BLACK secret key is provided then the newly generated secret key is covered by a KEK or KKEK specified in the crypto_cntxt object. The KCR location referenced in the crypto_cntxt object must point to a KCR that contains a KEK or KKEK or the operation fails. If the referenced KCR contains a KEK or KKEK the newly generated secret key is covered and returned to the application.

The Generate Key command only allows the generation of keys between 32 bits and 168 bits depending on the secret key type and if the state of the device (i.e. domestic or export). The application can choose between that range in increments of 8-bit units. Furthermore, the newly created user secret key can be used as an encryption/decryption key or as a user key encryption key (i.e. KEK) to cover other user secret keys.

```
Command Interfaces:
    /*generate a secret key or KEK */
    cgx_gen_key( kernelblock   *kb,
                 kcr           destkey,
                 unsigned short key_type,
                 unsigned short length,
                 unsigned short use,
                 secretkey     *bk,
                 crypto_cntxt  *kek_cc)
```

-continued

```
Arguments:
    kb->cb->cmd    = CGX_GEN_KEY;
    /* KCR ID number to place newly generated user secret key */
    kb->cb->argument[0]= (VPTR)destkey;
    /* type of secret key to generate, use one of the following:
    * CGX_DES_A, and CGX_TRIPLE_DES_A.
    */
    kb->cb->argument[1] = (VPTR)key_type;
    /* length of user secret key to generate, 40 to 192 bits */
    /* specified in units of bytes, in 8bit units */
    kb->cb->argument[2] = (VPTR)length;
    /* specify the key usage: CGX_KCR_K, CGX_KCR_KKEK
    or CGX_KCR_KEK */
    kb->cb->argument[3] = (VPTR)use;
    /* storage for a BLACK secret key */
    kb->cb->argument[4] = (VPTR)bk;
    /* the KCR KEK location to cover the RED key into
    a BLACK key */
    kb->cb->argument[5] = (VPTR)kek_cc;
Status:
    kb->sb->status =   CGX_SUCCESS_S,
                       CGX_INVALID_REG_S,
                       CGX_INVALID_KEY_LEN_S, or
                       CGX_HARDWARE_FAILURE_S
                       /* RNG hardware failure */
See Also: CGX_EXPORT_KEY, and CGX_UNCOVER_KEY
```

Load Key (Import A RED User Secret Key)
Command Name: CGX_LOAD_KEY
Command Description:

The Load Key command is used to load a user secret key into a specified key cache register. The secret key to be imported is in the RED form, depending on the value of use, the key can be used as either a KEK or as an encryption key. This key is known as a user key to the secure Kernel and can never be covered by the LSV, the secure Kernel does not allow it.

After the secret key is loaded, if the user requested the black copy of the key (i.e., bk is non-NULL), the key is covered using the key encryption key specified in kek_cc. This is the only opportunity for the application to receive the black version of the key; the cover command no longer exists.

The secret key is to be loaded by using the secretkey data structure. The length field of the secretkey structure must be set by the application to indicate the length of the imported secret key. Salt is not required to be added to the key, it is in the RED form.

```
Command Interface:
    /* import an application secret key */
    cgx_load_key( kernelblock      *kb,
            kcr                    key,
            secretkey              *sk,
            UINT16                 use,
            secretkey              *bk,
            crypto_cntxt           *kek_cc)
    Arguments:
        kb->cb->cmd    = CGX_LOAD_KEY;
        /* key cache register ID to load key into */
        kb->cb->argument[0] = (VPTR)key;
        /* secretkey data structure pointer for key to be loaded */
        kb->cb->argument [1] = (VPTR)sk;
        /* kcr type to be used for loaded key (e.g. CGX_KEK_K) */
        kb->cb->argument[2] = (VPTR)use;
        /* pointer to buffer for storing BLACK key (NULL=>ignore) */
        kb->cb->argument[3] = (VPTR)bk;
        /* crypto context for the key encryption key */
        kb->cb->argument[4] = (VPTR)kek_cc;
Status:
    kb->sb->status =   CGX_SUCCESS_S,
                       CGX_FAIL_S, or
                       CGX_INVALID_REG_S
See Also: CGX_UNCOVER_KEY
```

Derive Key (Derive A Secret Key From a Pass Phrase)
Command Name: CGX_DERIVE_KEY
Command Description:

The Derive Key command allows a user secret key to be created from an application's pass-phrase. The secret key is derived by taking the one-way HASH of the application's pass phrase and using the message digest for it as the secret key bits; then transformed into the secret key form as directed by the type of secret key specified (i.e. key_type) in the argument interface. Furthermore, the derived secret key can only be covered by an internal generated KEK (i.e. a GKEK) or via another user secret key (i.e. KEK or KKEK, if the newly generated key is not a KEK), not the LSV.

The application can choose the HASH algorithm to be used via the argument, hash_alg. Furthermore, the algorithm for choosing which bits to use is outlined in Microsoft's CryptoAPI document, this command is implemented to their specification. Also, the algorithm only supports key bit lengths between 32 bits and 112 bits when creating DES or Triple DES keys, 32 bits through 160 bits when creating HMAC keys, and 32 bits through 128 bits when creating RC5 keys.

Besides deriving a secret key this command places a copy of the RED form in a KCR location and returns a BLACK copy of it all at one time; thus an intrinsic key function. By returning a BLACK copy of the secret key immediately another application is prevented from grabbing the secret key before the application responsible for its creation does so.

The application must also provide a key usage definition. This is passed in via the argument, use, and is provided to announce the use of the newly derived secret key. Currently, the application has three options: KEK (CGX_KCR_KEK), KKEK (CGX_KCR_KKEK) or K (CGX_KCR_K). Defining it as KEK directs the secure Kernel to only recognize this secret key as a KEK. Defining the key as a KKEK restricts the use of the key to only covering other keys of type K (CGX_KCR_K). Therefore, these keys can only be used in key management operations (e.g. CGX_UNCOVER_KEY, etc.). Defining it as K directs the secure Kernel to only recognize it as a session key for traffic or message encryption operations (e.g. CGX_ENCRYPT, etc.).

Furthermore, a trust level must be given to a newly derived secret key. The user can force the secret key to be recognized as an untrusted secret key by or-ing in CGX_KCR_UNTRUSTED with the use argument. This directs the secure Kernel to automatically mark the secret key as untrusted. This is useful if the application has plans to eventually export the secret key via the CGX_EXPORT_KEY command. Although, an untrusted secret key covered under a trusted KEK (i.e. GKEK, LSV, or a trusted KEK or KKEK) can not be exported; it's a securely protected key of the CryptIC device.

Moreover, if the application does not apply the un-trust attribute to the use argument the secure Kernel will determine the trust level for the derived secret key. Unlike the secret keys generated via the CGX_GEN_KEY command all secret keys derived with this command are set as untrusted by the secure Kernel.

The newly derived secret key is left in the specified key cache register, destkey, in the RED form. A BLACK copy is returned if the application provides storage for a secretkey object and crypto_cntxt object. If either of these objects are NULL then no BLACK secret key is returned. This is otherwise known as a dangling key. A dangling key is dynamic (one time or session oriented) because once the power is lost the secret key is as well. Furthermore, the key can not be exported because it has no covering KEK, this is required as authentication for exporting a secret key.

If storage for a BLACK secret key is provided then the newly derived secret key is covered by a KEK specified in the crypto_cntxt object. The KCR location referenced in the crypto_cntxt object must point to a KCR that contains a KEK or the operation fails. If the referenced KCR contains a KEK the newly derived secret key is covered and returned to the application.

The Derive Key command only allows the generation of keys between 32-bits and 112-bits depending on the secret key type and if the state of the device (i.e. domestic or export). The application can choose between that range in increments of 8 bit units. Furthermore, the newly created user secret key can be used as an encryption/decryption key or as a user key encryption key (i.e. KEK) to cover other user secret keys.

```
Command Interfaces:
    /*derive a secret key */
    cgx_gen_key( kernelblock        *kb,
            unsigned short pswd_pg,
            unsigned short          *pswd,
            unsigned short pswd_len,
            unsigned short hash_alg,
            kcr      destkey,
            unsigned short key_type,
            unsigned short length,
            unsigned short use,
            secretkey               *bk,
            crypto_cntxt            *kek_cc)
    Arguments:
        kb->cb->cmd   = CGX_DERIVE_KEY;
        /* the application's pass phrase string */
        kb->cb->argument[0] = (VPTR)pswd;
        /* the length of the application's pass phrase string in bytes */
        kb->cb->argument[1] = (VPTR) pswd_len;
        /* the HASH alg to use: CGX_SHS_A, or CGX_MD5_A */
        kb->cb->argument[2] = (VPTR)hash_alg;
        /* KCR ID number to place newly generated user secret key */
        kb->cb->argument[3] = (VPTR)destkey;
        /* type of secret key to generate, use one of the following:
        * CGX_DES_A, and CGX_TRIPLE_DES_A.
        */
        kb->cb->argument[4] = (VPTR)key_type;
        /* length of user secret key to generate, 40 to 192 bits */
        /* specified in units of bytes, in 8bit units */
        kb->cb->argument[5] = (VPTR)length;
        /* specify the key usage: CGX_KCR_K, CGX_KCR_KKEK,
        or CGX_KCR_KEK */
        kb->cb->argument[6] = (VPTR)use;
        /* storage for a BLACK secret key */
        kb->cb->argument[7] = (VPTR)bk;
        /* the KCR KEK location to cover the RED key into
        a BLACK key */
        kb->cb->argument[8] = (VPTR)kek_cc;
        /* For the ADI target only, the data page where the
        pswd resides */
        kb->cb->argument[9] = (VPTR)pswd_pg;
    Status:
        kb->sb->status =   CGX_SUCCESS_S,
                           CGX_INVALID_REG_S,
                           CGX_INVALID_KEY_LEN_S, or
                           CGX_HARDWARE_FAILURE_S
                           /* RNG hardware failure */
See Also: CGX_EXPORT_KEY, and CGX_UNCOVER_KEY
```

Transform Key (Transform A Secret Key Using IPsec)
Command Name: CGX_TRANSFORM_KEY
Command Description:

The Transform Key command allows the application to perform one of the IPsec secret key transforms on an existing secret key. The transform command allows the application to create the HMAC, CBC DES, or CBC Triple DES keys. Furthermore, it can be used to create the IV and replay counters and beyond that it can be used to create the HMAC inner and outer pre-computed digests to speed up the AH processing.

There are several variants of this command. This section describes the common function that supports them all. The Command Interface subsections describe macros that invoke the common function to achieve a specific variation of the command. Users are urged to employ the specific macros to invoke the command variants.

Any untrusted or trusted secret key, K, can be transformed. At no time can a trusted or untrusted KEK, KKEK, GKEK, or LSV be used as the root secret key to be transformed. The result can be returned as a new covered BLACK secret key or as a clear pre-computation of a secret key. However, in either case, the root secret key remains intact—it is read-only.

Besides transforming a secret key, this command places a copy of the key in its RED form (if an HMAC or CBC DES key is to be generated) in a KCR location and returns a BLACK copy of it all at one time; thus it is an intrinsic key function. By returning a BLACK copy of the secret key immediately, another application is prevented from grabbing the secret key before the application responsible for its creation does so.

In the case of generating another secret key the key usage definition of the root secret key is inherited. Therefore, the newly generated secret key will inherit the trust level (i.e. trusted or untrusted) and key usage (i.e. K). However, the application can change the key type to any valid supported key (i.e. DES, triple DES, or RC5) via the argument, ktype. Furthermore, it can generate any key length it desires via the argument, klen.

The newly transformed secret key is left in the specified key cache register (kcr), destkey, in the RED form. A BLACK copy is returned if the application provides storage for a secretkey object, tk. It is covered under the root secret key's KEK which is passed in as the crypto_cntxt object argument, bkek. If the secretkey object argument, tk, is passed in as a NULL pointer, the operation will return a message digest via the hash_context object argument, hc. This returned hash context may be red or black (covered.) If the caller wishes the returned hash context to be black, the user must specify a crypto context, hkek, which the command will use to cover the returned hash context, hc. If the user supplies a NULL parameter for hkek, hc will be returned in the red (uncovered.)

In order to support the current IPsec transform, the application must pass-in the patterns and operation data as arguments. The 'patterns' are the data patterns to be applied (ie. XORed) to a root secret key and then HASHed. Although the IPsec patterns are currently fixed to a single byte that is repeated 64 times, this command forces the application to pass in the full 64-byte patterns required to create a transformed secret key. This allows for the possibility of future changes.

The application must pass in as many 64-byte patterns (i.e. as one large array) as they will generate key bits or as long as specified by the argument, klen. If the key to transform is to be a DES key and klen is less then or equal to 7 bytes, then 64 bytes of pattern are required, if the klen is less than or equal to 14 bytes then 128 bytes—or two 64 byte patterns—in one array are required, and if klen is less than or equal to 21 bytes then 192 bytes—or three 64 byte patterns—in one array are required. If the key to transform is an RC5 key, then the application is only required to pass-in one 64 byte pattern.

The operation argument, oper, is used to specify the operation which will 'combine' the root secret key and the data patterns. Currently, the command supports three operations: exclusive-or (i.e. CGX_XOR_O), pattern append (i.e. CGX_APPEND_O), and pattern pre-pend (i.e. CGX_PREPEND_O).

```
Command Interfaces:
    /*transform a root secret key into a DES or HMAC key */
    /* Common interface. Caller must select proper combination
    of parameters to achieve desired functionality. */
    /* This interface is not recommended for user applications;
    instead user should use one of the subsequently described
    variants */
    cgx_transform_key_common( kernelblock    *kb,
            secretkey                *bk,
            crypto_cntxt             *bkek,
            secretkey                *tk,
            unsigned short ktype,
            unsigned short klen,
            unsigned short           *patterns,
            unsigned short oper,
            unsigned short halg,
            hash_cntxt               *hc,
            crypto_cntxt             *hkek);
    Arguments:
        kb->cb->cmd      = CGX_TRANSFORM_KEY;
        /* the BLACK root secret key */
        kb->cb->argument[0] = (VPTR)bk;
        /* the KCR KEK location to uncover the root BLACK key */
        kb->cb->argument[1] = (VPTR)bkek;
        /* storage for a new BLACK transformed secret key */
        kb->cb->argument[2] = (VPTR)tk; /* see text above */
        /* KCR ID number to place newly generated transformed
        secret key */
        kb->cb->argument[3] = (VPTR)destkey;
        /* type of secret key to generate, use one of the following:
        * CGX_RC5_A, CGX_DES_A,
        and CGX_TRIPLE_DES_A */
        kb->cb->argument[4] = (VPTR)ktype;
        /* length of user secret key to generate, 40 to 168 bits */
        /* specified in units of bytes, in 8-bit units (5–21) */
        kb->cb->argument[5] = (VPTR)klen;
        /* transform 64 byte data patterns */
        kb->cb->argument[6] = (VPTR)patterns;
        /* the data pattern transform operation, XOR, APPEND,
        PREPEND */
        kb->cb->argument[7] = (VPTR)oper;
        /* HASH alg to use: CGX_SHS_A, or CGX_MD5_A */
        kb->cb->argument[8] = (VPTR)hash_alg;
        /* the hash_cntxt to return the pre-comp of HMAC key */
        kb->cb->argument[9] = (VPTR)hc;
        kb->cb->argument[10] = (VPTR)hkek; /* see text above */
    Status:
        kb->sb->status = CGX_SUCCESS_S,
                         CGX_FAIL_S, and
                         CGX_NVALID_REG_S
    /* This variant is preserved only for backward compatibility. One of the
    next three variants to be described is recommended for new development.
    This variant supplies a NULL hkek parameter to the common function,
    thus requesting that any returned hash context (in hc) will be red */
    cgx_transform_key( kernelblock     *kb,
            secretkey               *bk,
            crypto_cntxt            *bkek,
            secretkey               *tk,
            unsigned short ktype,
            unsigned short klen,
            unsigned short          *patterns,
            unsigned short oper,
            unsigned short halg,
            hash_cntxt              *hc)
            This variant is defined as:
        cgx_transform_key_common( (kb), (bk), (bkek), (tk), (ktype),
        (klen), (patterns), (oper), (hash_alg), (hc), NULL)
    /* variant: Transform a root secret key into a pre-computed HMAC
    hash context returned in the red*/
    cgx_transform_precompute_key( kernelblock   *kb,
            secretkey         *bk,
            crypto_cntxt      *bkek,
            unsigned short final,     /* close has context if
                                         final == TRUE */
            unsigned short    *patterns,
            unsigned short oper,
            unsigned short hash_alg,
            hash_cntxt        *hc)
            This variant is defined as:
        cgx_transform_key_common( (kb), (bk), (bkek), NULL, NULL,
        (final), (patterns), (oper), (hash_alg), (hc), NULL)
    /* variant: Transform a root secret key into a black key. */
    cgx_transform_gen_key( kernelblock  *kb,
            secretkey      *bk,
            crypto_cntxt   *bkek,
            secretkey      *tk,
            unsigned short ktype,
            unsigned short klen,
            unsigned short *patterns,
            unsigned short oper,
            unsigned short hash_alg)
            This variant is defined as:
        cgx_transform_key_common( (kb), (bk), (bkek), (tk), (ktype),
        (klen), (patterns), (oper), (hash_alg), NULL, NULL)
    /* variant: Transform a root secret key into a pre-computed HMAC hash
    context returned in the black*/
    cgx_transform_precomputed_bkey( kernelblock   *kb,
            secretkey         *bk,
            crypto_cntxt      *bkek,
            unsigned short final,
            unsigned short    *patterns,
            unsigned short oper,
            unsigned short hash_alg,
            hash_cntxt        *hc,
            crypto_cntxt      *hkek);
            This variant is defined as:
        cgx_transform_key_common( (kb), (bk), (bkek), NULL, NULL,
        (final), (patterns), (oper), (hash_alg), hc, hkek)
    See Also: CGX_HASH_ENCRYPT or CGX_HASH_DECRYPT
```

Export Key (Export An IRE Secret Key)

Command Name: CGX_EXPORT_KEY

Command Description:

The Export Key command allows the application to move an IRE secret key form into an external secret key form. The external secret form must be covered either with a secret key or public key, this is specified by the application via the command arguments.

The application must present a BLACK copy of the IRE secret key to export along with the crypto_cntxt object to reference the KEK or KKEK to uncover it. Also, the application must provide a buffer (i.e. ebk) to copy the external secret key into that is converted from the BLACK IRE secret key along with a crypto_cntxt object referencing a KEK to cover it or a publickey object to cover it with.

The IRE secret key to export must be an untrusted key, KKEK or KEK. Furthermore, it must not reside (or covered by) under a parent KEK that is trusted (i.e. LSV, GKEK, or trusted KEK or KKEK). Moreover, the secure attributes stored in each of the IRE BLACK secret keys are removed before the secret key is exported. These bits are not used or would not be understood in other vendor's crypto equipment. Therefore, the main purpose of this command is to provide some sort of key interoperability between an IRE crypto device and some other vendor's crypto equipment (software or hardware based).

As part of the command the application is allowed to program salt bits that will be prepended to the secret key bits of the external secret key. When exporting a secret key under another secret key the application has the choice of providing salt bits in multiples of 2 bytes, requesting the secure Kernel generate salt bits in multiples of 2 bytes, or not storing any salt bits. However, the total of salt bytes, data bytes, and the key bytes must be a multiple of 8 bytes. When covering under a public key it can request salt in multiples of 2 bytes and the total of salt, data, and secret key only has to be a multiple of 2 bytes and less than the modulus length; at least make sure its most significant bit is not set.

Also, the command allows the application to program data bits that will be appended to the secret key bits of the external secret key. When exporting a secret key under another secret key the application has the choice of providing data bits in multiples of 2 bytes, requesting the secure Kernel generate data bits in multiples of 2 bytes, or not storing any data bits. However, the total of salt bytes, data bytes, and the key bytes must be a multiple of 8 bytes. When covering under a public key it can request data in multiples of 2 bytes and the total of salt, data, and secret key only has to be a multiple of 2 bytes.

The command does not store all keys in multiples of 8 bytes. For example the HMAC and RC5 keys may not be exported out in an 8 byte multiple if its size is not of 8 byte multiples. However, DES and Triple DES keys will always be exported in multiples of 8 bytes. Furthermore the secret key is flipped when exported, it is put into big endian order.

All DES and Triple DES keys follow these storage rules. If the key is less than or equal to 7 bytes in length then it is exported as 8 bytes, if the key is less than or equal to 14 bytes in length then it is exported as 16 bytes, and if the key is less than or equal to 21 bytes in length it is exported as 24 bytes. The expansion in key size is due to the DES parity bits.

All RC5 keys follow these storage rules. If the key is odd size in length an extra byte is added to make it a multiple of 2; the extra byte is a 0. Otherwise, the RC5 key is exported out as is, its programmed length. The zero is appended to key so that the 0 can be used by Microsoft CAPI CSPs as a key delimiter.

All HMAC keys follow these storage rules. If the key is odd size in length an extra byte is added to make it a multiple of 2; the extra byte is a 0. Otherwise, the HMAC key is exported out as is, its programmed length. The zero is appended to key so that the 0 can be used by Microsoft CAPI CSPs as a key delimiter.

If the argument, salt_len, is set to 0 the application requests that no salt bits be prepended. If the argument, salt, is NULL it requests that the secure Kernel generate salt_len bytes; otherwise the application is providing salt_len bytes of salt.

If the argument, data_len, is set to 0 the application requests that no data bits be prepended. If the argument, data, is NULL it requests that the secure Kernel generate data_len bytes; otherwise the application is providing data_len bytes of data.

If the publickey argument, pk, is NULL then the secret key to export is covered with the KEK, ekek_cc. If pk is not NULL then the secret key to export is covered with the public key pk object.

```
Command Interfaces:
    /* export an IRE secret key under another untrusted secret key */
    cgx_export_key( kernelblock      *kb,
            secretkey                *bk,
            crypto_cntxt             *bkek_cc,
            unsigned short           *ebk,
            crypto_cntxt             *ekek_cc,
            unsigned short           *salt,
            unsigned short salt_len,
            unsigned short           *data,
            unsigned short data_len)
    Arguments:
        kb->cb->cmd     = CGX_EXPORT_KEY;
        /* the BLACK IRE secret key to export */
        kb->cb->argument[0] = (VPTR)bk;
        /* the KCR KEK location to uncover the BLACK IRE
        secret key */
        kb->cb->argument[1] = (VPTR)bkek_cc;
        /* the buffer to house the external secret key */
        kb->cb->argument[2] = (VPTR)ebk;
        /* the KCR KEK location to cover the RED exported IRE
        secret key */
        kb->cb->argument[3] = (VPTR)ekek_cc;
        /*salt bits to prepend to key bits */
        kb->cb->argument[4] = (VPTR)salt;
        /* the number of salt bits to prepend to the key bits */
        /* this must be in units of 2bytes */
        kb->cb->argument[5] = (VPTR)salt_len;
        /*data bits to prepend to key bits */
        kb->cb->argument[6] = (VPTR)data;
        /* the number of data bits to prepend to the key bits */
        /* this must be in units of 2bytes */
        kb->cb->argument[7] = (VPTR)data_len;
        /* pubkey key to cover with */
        kb->cb->argument[8] = (VPTR)NULL;
    /*export an IRE secret key under a public key */
    cgx_export_key( kernelblock      *kb,
            secretkey                *bk,
            crypto_cntxt             *bkek_cc,
            unsigned short           *ebk,
            publickey                *pk,
            unsigned short           *salt,
            unsigned short salt_len,
            unsigned short           *data,
            unsigned short data_len)
    Arguments:
        kb->cb->cmd     = CGX_EXPORT_KEY;
        /* the BLACK IRE secret key to export */
        kb->cb->argument[0] = (VPTR)bk;
        /* the KCR KEK location to uncover the BLACK IRE
        secret key */
        kb->cb->argument[1] = (VPTR)bkek_cc;
        /* the buffer to house the external secret key */
        kb->cb->argument[2] = (VPTR)ebk;
        /* the KCR KEK location to cover the RED exported IRE
        secret key */
        kb->cb->argument[3] = (VPTR)NULL;
```

```
         /*salt bits to prepend to key bits */
         kb->cb->argument[4] = (VPTR)salt;
         /* the number of salt bits to prepend to the key bits */
         /* this must be in units of 2bytes */
         kb->cb->argument[5] = (VPTR)salt_len;
         /*data bits to prepend to key bits */
         kb->cb->argument[6] = (VPTR)data;
         /* the number of data bits to prepend to the key bits */
         /* this must be in units of 2bytes */
         kb->cb->argument[7] = (VPTR)data_len;
         /* pubkey key to cover with */
         kb->cb->argument[8] = (VPTR)pk;
    Status:
         kb->sb->status =    CGX_SUCCESS_S, or
                             CGX_INVALID_REG_S
See Also: CGX_GEN_KEY, CGX_DERIVE_KEY,
CGX_LOAD_KEY, and CGX_IMPORT_KEY
```

Import Key (Import An IRE Secret Key)

Command Name: CGX_IMPORT_KEY

Command Description:

The Import Key command allows the application to load an IRE secret key form in external secret key form into the secure kernel.

This command allows the application to import a key into the specified key cache register. The application must present the external form of the key to be imported, ibk, and specify the length of the salt prepended to the key through the salt_len parameter. The salt length is assumed to be a multiple of 2 bytes, and can be 0 bytes. The crypto_cntxt, ikek_cc, will be used to decrypt the salt (if present), key and any additional padding.

The application controls the algorithm type, key_type, and length of the key being imported. The application also specifies how the key is to be used, e.g. encryption key or key encryption key. However, the kernel makes no assumptions about the security of the key being imported. Therefore, upon completion of the command, the newly imported key is treated as an untrusted key.

The bk parameter can be used to request a covered version of the key once it has been successfully imported. If bk is non-NULL, and the import succeeds, the key will be covered under the crypto_cntxt pointed to by kek_cc and stored at the location specified by bk.

```
Command Interfaces:
         /*import an IRE secret key */
         cgx_import_key(kernelblock    *kb,
                        secretkey      *ibk,
                        UINT 16        salt_len,
                        crypto_cntxt   *ikek_cc,
                        kcr            dest_kcr,
                        UINT16         key_type,
                        UINT16         length,
                        UINT16         use,
                        secretkey      *bk,
                        crypto_cntxt   *kek_cc)
    Arguments:
         kb->cb->cmd    = CGX_IMPORT_KEY;
         /* the secret key blob to import */
         kb->cb->argument[0] = (VPTR)ibk;
         /* the length of the salt before the key material */
         kb->cb->argument[1] = (VPTR)salt_len;
         /* the KCR KEK location used to uncover the imported secret key */
         kb->cb->argument[2] = (VPTR)ikek_cc;
         /* the destination KCR location for storing the imported key */
         kb->cb->argument[3] = (VPTR)dest_kcr;
         /* the algorithm type of key being imported */
         kb->cb->argument[4] = (VPTR)key_type;
         /* the KCR KEK location to cover the imported IRE secret key */
         kb->cb->argument[5] = (VPTR)length;
                   /* how the imported key will be used in the key hierarchy
         *(e.g. CGX_KCR_K)
         */
         kb->cb->argument[6] = (VPTR)use;
         /* location to store resulting covered secretkey (NULL=>ignore) */
         kb->cb->argument[7] = (VPTR)bk;
         /* the KCR KEK location to cover the imported IRE secret key */
         kb->cb->argument[8] = (VPTR)kek_cc;
    Status:
         kb->sb->status =   CGX_SUCCESS_S,
                            CGX_INVALID_REG_S,
                            CGX_EMPTY_REG_S,
                            CGX_INVALID_LEN_S, or
                            CGX_FAIL_S
See Also: CGX_GEN_KEY, CGX_DERIVE_KEY, CGX_LOAD_KEY, and
CGX_EXPORT_KEY
```

Destroy Key (Remove Secret Key From KCR)

Command Name: CGX_DESTROY_KEY

Command Description:

The Destroy Key command is used to remove a secret key from one the specified key cache register.

Access to the secret keys is via key cache register IDs. The key cache register IDs are numbered from 0 to N, there are N secret key registers available to the application. Key cache register 0 is reserved for the LSV and, therefore, cannot be destroyed. Therefore, the key cache register available to the application range are from 1 to N.

If the KCR is already empty, the command will report back as though it successfully removed the secret key from the KCR.

Command Interface:
```
/* destroy a secret key in either the FLASH or volatile KCR areas */
cgx_destroy_key(kernelblock *kb, kcr key)
Arguments:
    kb->cb->cmd = CGX_DESTROY_KEY;
    /* the KCR ID to remove */
    kb->cb->argument[0] = (VPTR)key;
Status:
    kb->sb->status = CGX_SUCCESS_S, or
                     CGX_INVALID_REG_S /* KCR invalid id */
See Also: CGX_LOAD_KEY
```

Load KG (Load Secret Key Into HW/SW KG)

Command Name: CGX_LOAD_KG

Command Description:

The Load KG command is used to load DES/Triple DES secret keys into the hardware key generator and RC5 keys into the RC5 software key generator. The typical use of this command is to fully optimize secret key traffic. For example, loading the KG once and using the static kernel block approach will speed the encryption process because of fewer secret key context switches.

Prior to invoking the Load KG command, it is preferred if the application sets up the crypto_cntxt block. The application is responsible for setting the mode, setting the appropriate secret key KCR ID, and for priming the iv buffer with an initial random number (if this is the first time the crypto_cntxt is loaded). After this the application need not modify the crypto_cntxt block unless something changes (i.e., secret key KCR ID location, and/or the iv to cause a resynchronization).

The iv buffer of the crypto_cntxt block must be read- and write-able; the iv buffer is used to maintain the feedback register for the CBC, CFB, and OFB modes. In the ECB mode the iv buffer is ignored.

The secret key to be loaded as referenced via the crypto_cntxt must have the key usage setting of CGX_KCR_K. This command only allows traffic or data keys to be loaded or it will fail. The key usage information is programmed by the application at the time a secret key has been loaded, generated, derived, or negotiated and is maintained securely by the secure Kernel. This means an LSV, GKEK, or KEK type of secret key can not be loaded by this command.

If a KKEK (i.e. DES or Triple DES only) is loaded it is loaded into the special hardware KKEK register to be used to externally uncover application BLACK secret keys.

Command Interface:
```
/* load a single secret key into the SW/HW KG */
cgx_load_kg(kernelblock *kb,
            crypto_cntxt *cb,
            unsigned short direction)
/* load multiple secret keys for triple DES into the HW KG */
Arguments:
    kb->cb->cmd = CGX_LOAD_KG;
    /* pointer to the crypto_cntxt to load into the HW/SW KG */
    kb->cb->argument[0] = (VPTR)cb;
    // direction is used to specify the use of the KG,
    // encrypt or decrypt. To specify the encrypt operation direction
    // must be set to non-0, for decrypt then direction must be set
    // to 0
    kb->cb->argument[1] = (VPTR)direction;
Status:
    kb->sb->status = CGX_SUCCESS_S,
                     CGX_WEAK_KEY_S,
                     CGX_EMPTY_REG_S, or
                     CGX_INVALID_REG_S
See Also: CGX_ENCRYPT, CGX_DECRYPT,
CGX_HASH_ENCRYPT, CGX_HASH_DECRYPT,
or CGX_STREAM
```

Encrypt (Encrypt Data)

Command Name: CGX_ENCRYPT

Command Description:

The Encrypt command is used to perform symmetrical encryption. The encrypt operation supports many secret key algorithms (i.e., DES, Triple DES, and RC5) in any of the modes (i.e., ECB, CFB, OFB, and CBC).

The Encrypt command only supports block encryption, a block must be 64 bits long. The Encrypt command can handle as many blocks as the application chooses to encrypt at one time. Furthermore, an encrypted data session can extend beyond one call to the encryption command; this is accomplished via a crypto_cntxt block (described below).

The data buffers, datain (plain-text) and dataout (cipher-text), can share the same address. Moreover, the chip currently only supports cipher-block symmetrical algorithms but the encrypt interface provides for the addition of a stream interface. It does this by defining datain and dataout as unsigned char pointers and the data length of datain to be in bytes. Allowing the byte count makes the interface portable for the later addition of stream based algorithms. However, if the algorithm to be used in the encrypt operation is cipher-block based the byte count must be evenly divisible by 8, any fragments are ignored by the operation.

Prior to invoking the encryption command the application must setup the crypto_cntxt block. The application is responsible for setting the mode, masking in one of the special key load options (described below), setting the appropriate secret key KCR ID, and for priming the iv buffer with an initial random number (only for the first call). After this the application need not modify the crypto_cntxt block unless something changes (i.e., secret key KCR ID location, algorithm, and/or the iv to cause a resynchronization).

The KCR key specified in the crypto_cntxt contains the algorithm to use as part of the secret key object stored in the specified KCR location. This secret key type specifies the secret key algorithm to use.

The iv buffer of the crypto_cntxt block must be read and writeable; the iv buffer is used to maintain the feedback register for the CBC, CFB, and OFB modes. In the ECB mode the iv buffer is ignored.

The Encrypt command allows the application to mask in one of the special algorithm and mode control bits defined in section 0, into the algorithm field of the crypto_cntxt block. The control bits are used by the secure Kernel to determine how to load secret keys before the actual encryption of the plain-text takes place. The control bits allow the application to request one of these options: auto-load, force-load, or no-load. Auto-load allows the secure Kernel to check which key is currently loaded into the KG, if it's the same as the key specified for the encryption command it is not loaded; otherwise the key is loaded. Force-load tells the secure Kernel to always load the key. No-load tells the secure Kernel to not load the key; more than likely the application has already loaded the key (maybe via the CGX_LOAD_KG command). By default, auto-load is assumed.

The secret key to be loaded as referenced via the crypto_cntxt must have the key usage setting of CGX_KCR_K. This command only allows traffic or data keys to be loaded or it will fail. The key usage information is programmed by the application at the time a secret key has been loaded, generated, derived, or negotiated and is maintained securely by the secure Kernel. This means an LSV, GKEK, or KEK type of secret key can not be loaded by this command.

When using the CFB or OFB modes the application can signal the start of secure traffic or resynchronize it by setting the CGX_RESYNC_C control bit. This will signal the CGX_ENCRYPT command to first encrypt the application's IV before encrypting the input data. This command does not clear the bit so upon return the application should clear the CGX_RESYNC_C bit before invoking the command again or the IV resynchronization will occur again.

```
Command Interface:
    cgx_encrypt(kernelblock *kb,
        unsigned short datain_page,
        unsigned char *datain,
        unsigned short dataout_page,
        unsigned char *dataout,
        unsigned  byte_cnt,
        crypto_cntxt *cb)
    Arguments:
        kb->cb->cmd       = CGX_ENCRYPT;
        /* mode selection,
        * mask one of the special algorithm
        * control bits with the mode here via the crypto_cntxt block
        */
        kb->cb->argument[0] = (VPTR)cb;
        /* data block(s) to be encrypted data page, only needed */
        /* for the ADI 2181 platform, all other platform ignore it */
        kb->cb->argument[1] = (VPTR)datain_page;
        /* data block(s) to be encrypted */
        kb->cb->argument[2] = (VPTR)datain;
        /* specified in units of bytes, in the current case all the */
        /* algorithms use 64 bit blocks so the value of byte_cnt must */
        /* be evenly divisible by 8, any fragments are ignored */
        kb->cb->argument[3] = (VPTR)byte_cnt;
        /* data block(s) to be encrypted data page, only needed */
        /* for the ADI 2181 platform, all other platform ignore it */
        kb->cb->argument[4] = (VPTR)dataout_page;
        /* output the encrypted data blocks */
        kb->cb->argument[5] = (VPTR)dataout;
```

-continued

```
Status:
    kb->sb->status =  CGX_SUCCESS_S,
                      CGX_WEAK_KEY_S,
                      CGX_EMPTY_REG_S, or
                      CGX_INVALID_REG_S
See Also: CGX_LOAD_KG and CGX_DECRYPT
```

Decrypt (Decrypt Data)
Command Name: CGX_DECRYPT
Command Description:

The Decrypt command is used to perform symmetrical decryption. The decrypt operation supports many secret key algorithms (i.e., DES, Triple DES, and RC5) in any of the modes (i.e., ECB, CFB, OFB, and CBC).

The Decrypt command only supports block decryption, a block must be 64 bits long. The Decrypt command can handle as many blocks as the application chooses to decrypt at one time. Furthermore, a decrypted data session can extend beyond one call to the decryption command; this is accomplished via a crypto_cntxt block (described below).

The data buffers, datain (plain-text) and dataout (cipher-text), can share the same address. Moreover, the chip currently only supports cipher-block symmetrical algorithms but the decrypt interface provides for the addition of a stream interface. It does this by defining datain and dataout as unsigned char pointers and the data length of datain to be in bytes. Allowing the byte count makes the interface portable for the later addition of stream based algorithms. However, if the algorithm to be used in the decrypt operation is cipher-block based the byte count must be evenly divisible by 8, any fragments are ignored by the operation.

Prior to invoking the Decrypt command the application must setup the crypto_cntxt block. The application is responsible for setting the mode, masking in one of the special key load options (described below), setting the appropriate secret key KCR ID, and for priming the iv buffer with an initial random number (only for the first call). After this the application need not modify the crypto_cntxt block unless something changes (i.e., secret key KCR ID location, algorithm, and/or the iv to cause a resynchronization).

The KCR key specified in the crypto_cntxt contains the algorithm to use as part of the secret key object stored in the specified KCR location. This secret key type specifies the secret key algorithm to use.

The iv buffer of the crypto_cntxt block must be read and writeable; the iv buffer is used to maintain the feedback register for the CBC, CFB, and OFB modes. In the ECB mode the iv buffer is ignored.

The Decrypt command allows the application to mask in one of the special algorithm and mode control bits defined in section 0, into the algorithm field of the crypto_cntxt block. The control bits are used by the secure Kernel to determine how to load secret keys before the actual encryption of the plain-text takes place. The control bits allow the application to request one of these options: auto-load, force-load, or no-load. Auto-load allows the secure Kernel to check which key is currently loaded into the KG, if its the same as the key specified for the encryption command it is not loaded; otherwise the key is loaded. Force-load tells the secure Kernel to always load the key. No-load tells the secure Kernel to not load the key; more than likely the application has already loaded the key (maybe via the CGX_LOAD_KG command). By default, auto-load is assumed.

The secret key to be loaded as referenced via the crypto_cntxt must have the key usage setting of CGX_KCR_K. This command only allows traffic or data keys to be loaded or it will fail. The key usage information is programmed by the application at the time a secret key has been loaded, generated, derived, or negotiated and is maintained securely by the secure Kernel. This means an LSV, GKEK, or KEK type of secret key can not be loaded by this command.

When using the CFB or OFB modes the application can signal the start of secure traffic or resynchronize it by setting the CGX_RESYNC_C control bit. This will signal the CGX_DECRYPT command to first encrypt the application's IV before decrypting the input data. This command does not clear the bit so upon return the application should clear the CGX_RESYNC_C bit before invoking the command again or the IV resynchronization will occur again.

```
Command Interface:
        cgx_decrypt(kernelblock *kb,
                    unsigned short datain_page,
                    unsigned short *datain,
                    unsigned short dataout_page,
                    unsigned short *dataout,
                    unsigned       byte_cnt,
                    crypto_cntxt *cb)
    Arguments:
        kb->cb->cmd    = CGX_DECRYPT;
        /* mode selection,
            *mask one of the special algorithm
            * control bits with the mode here via the
            crypto_cntxt block
            */
        kb->cb->argument[0] = (VPTR)cb;
        /* data block(s) to be decrypted data page, only needed */
        /* for the ADI 2181 platform, all other platform ignore it */
        kb->cb->argument[1] = (VPTR)datain_page;
        /* data block(s) to be decrypted */
        kb->cb->argument[2] = (VPTR)datain;
        /* specified in units of blocks, in the current case all the */
        /* algorithms use 64 bit blocks so the value of byte_cnt must */
        /* be evenly divisible by 8, any fragments are ignored */
        kb->cb->argument[3] = (VPTR)byte_len;
        /* data block(s) to be decrypted data page, only needed */
        /* for the ADI 2181 platform, all other platform ignore it */
        kb->cb->argument[4] = (VPTR)dataout_page;
        /* output the decrypted data blocks */
        kb->cb->argument[5] = (VPTR)dataout;
    Status:
        kb->sb->status =   CGX_SUCCESS_S,
                           CGX_WEAK_KEY_S,
                           CGX_EMPTY_REG_S, or
                           CGX_INVALID_REG_S
See Also: CGX_LOAD_KG and CGX_ENCRYPT
```

Public Key Commands
GEN PUBKEY (Generate a Public Keyset)
Command Name: CGX_GEN_PUBKEY
Command Description:

This operation will generate an entire public keyset comprised of the modulus, private, and public blocks. This operation can create public keyset for several public key algorithms. It currently supports: Diffie-Hellman, RSA, and DSA public keys. The returned keyset will consist of data stored in little endian order.

The newly generated public keyset is returned to the application via the publickey parameter. The modulus and public key are returned in the RED form while the private key is returned in the BLACK form covered by the specified secret key. The crypto_cntxt parameter is used for this purpose. The application can invoke other public key commands operating on the newly created public key by passing it as a parameter to the desired operation.

All public keyset are returned to the application in a packed form. Packed keys are defined as key structures in which the least significant byte of the next public key structure member abuts the most significant byte of the current member. In this way, fragmentation within data structures is minimized and portability of data is enhanced.

Depending on the type of key being generated, some specific key generation parameters may be required. The sixth element of the kernel block's parameter area is used for this purpose:

For DSA keys, the application may specify a seed key to be used for prime number generation. The seed key consists of a 16-bit counter and a 160-bit seed value. If no seed is specified (i.e., NULL is passed as this parameter), then the kernel will generate its own seed key. If a seed key is presented, the operation may fail if it cannot generate a prime from the seed. If so, the application should continue re-seeding the seed value and retrying until the operation succeeds. Upon success, the kernel will set the 16-bit counter.

This command is responsible for generating the random numbers and prime numbers to create the vectors for the public keyset. Furthermore, the command is responsible for executing the primality test specified by Rabin-Miller to accept/reject prime numbers. In all cases, the application is responsible for specifying the number of Rabin-Miller tests to perform. This allows the application to trade the strength of the generated prime numbers against the amount of time required to generate the primes.

The method parameter is a bit-mask controlling: 1) the type of prime numbers to generate, either weak or strong, and 2) how to search for prime numbers, either randomly (i.e. choosing a new random number for each prime number candidate) or sequentially from a random base (i.e. choose a random base and continue sequentially for each prime number candidate).

This command can be preempted by any command with the exception of the other public key commands.

```
Command Interface:
    /* generate a Diffie-Hellman Public Keyset */
    cgx_gen_dh_pubkey(kernelblock  *kb,
                      unsigned short modulus_len,
                      unsigned short tests,
                      unsigned short method,
                      publickey     *pk,
                      crypto_cntxt  *cc)
    /* generate a RSA Public Keyset */
    cgx_gen_rsa_pubkey(kernelblock *kb,
                       unsigned short modulus_len,
                       unsigned short base,
                       unsigned short tests,
                       unsigned short method,
                       publickey     *pk,
                       crypto_cntxt  *cc)
```

-continued

```
/* generate a DSA Public Keyset */
cgx_gen_dsa_pubkey(kernelblock  *kb,
                   unsigned short modulus_len,
                   unsigned short tests,
                   unsigned short method,
                   seedkey      *sk,
                   publickey    *pk,
                   crypto_cntxt *cc)
Arguments:
    kb->cb->cmd      = CGX_GEN_PUBKEY;
    cgx_gen_dh_pubkey(k, modulus_len, tests, method, pk, cc)
    /* a pointer to the public key to work with */
    kb->cb->argument[0] = (VPTR)pk;
    /* a pointer to the public key's crypto_cntxt (for private
     * portion)
     */
    kb->cb->argument[1] = (VPTR)cc;
    /* specify the public keyset to generate */
    kb->cb->argument[2] = (VPTR)CGX_DH_A;
    /* the length of the modulus key to generate, between 512 and
     * 2048 bits in increments of 64 bits, specify in units of bits
     */
    kb->cb->argument[3] = (VPTR)modulus_len;
    /* the number of Rabin-Miller Primality Tests to perform */
    kb->cb->argument[4] = (VPTR)tests;
    /* the methods for generating prime numbers */
    kb->cb->argument[5] = (VPTR)method;
    cgx_gen_rsa_pubkey(k, modulus_len, base, tests, method,
    pk, cc)
    /* a pointer to the public key to work with */
    kb->cb->argument[0] = (VPTR)pk;
    /* a pointer to the public key's crypto_cntxt (for private
     * portion)
     */
    kb->cb->argument[1] = (VPTR)cc;
    /* specify the public keyset to generate */
    kb->cb->argument[2] = (VPTR)CGX_RSA_M;
    /* the length of the modulus key to generate, between 512 and
     * 2048 bits in increments of 64 bits, specify in units of bits
     */
    kb->cb->argument[3] = (VPTR)modulus_len;
    /* the number of Rabin-Miller Primality Tests to perform */
    kb->cb->argument[4] = (VPTR)tests;
    /* the methods for generating prime numbers */
    kb->cb->argument[5] = (VPTR)method;
    /* the sixth parameter holds the starting point for the public
     * exponent search.
     */
    kb->cb->argument[6] = (VPTR)base;
    cgx_gen_dsa_pubkey(k, modulus_len, tests, method, sk,
    pk, cc)
    /* a pointer to the public key to work with */
    kb->cb->argument[0] = (VPTR)pk;
    /* a pointer to the public key's crypto_cntxt (for private
     * portion)
     */
    kb->cb->argument[1] = (VPTR)cc;
    /* specify the public keyset to generate */
    kb->cb->argument[2] = (VPTR)CGX_DSA_M;
    /* the length of the modulus key to generate, between 512 and
     * 2048 bits in increments of 64 bits, specify in units of bits
     */
    kb->cb->argument[3] = (VPTR)modulus_len;
    /* the number of Rabin-Miller Primality Tests to perform */
    kb->cb->argument[4] = (VPTR)tests;
    /* the methods for generating prime numbers */
    kb->cb->argument[5] = (VPTR)method;
    /* a pointer to the seed key */
    kb->cb->argument[6] = (VPTR) NULL;
```

-continued

```
Status:
    kb->sb->status = CGX_SUCCESS_S,
        CGX_BAD_MODE_S, /* invalid type requested */
        CGX_INVALD_LEN_S, or /* invalid modulus or private
                             * length used
                             */
        CGX_FAIL_S   /* failure during specific key
                     * generation operation
                     */
See Also: CGX_GEN_NEWPUBKEY, CGX_PUBKEY_ENCRYPT,
CGX_PUBKEY_DECRYPT
```

GEN NEWPUBKEY (Generate Part of A Public Keyset)

Command Name: CGX_GEN_NEWPUBKEY

Command Description:

The Generate New public key operation is used to generate new public and private blocks for a Diffie-Hellman or DSA public keyset. This command is only valid for Diffie-Hellman or DSA public keyset.

The command allows the flexibility to import a modulus block from the application and use it to generate the new private and public blocks. Furthermore, the application has control over which parts to generate and return via the two control constants CGX_X_V (i.e. the private part) and CGX_Y_V (i.e. the public part). Using combinations of these control masks allows the application with a flexible key generation interface. The following uses of the masks are permissible:

CGX_X_V
  generates and returns a new private part, no public part is returned.

CGX_Y_V
  generates and returns a new public part, no public part is returned. A private member must be passed in to create the new public part.

CGX_X_V|CGX_Y_V
  generates and returns a new private/public part, both parts are returned.

Once generated, the public key is returned to the application for use with subsequent public key commands. The modulus and public portions of the key are returned in the RED while the private portion of the key is returned in the BLACK, reflecting the sensitivity of the private data. As with all public key commands, this operation will generate key components which are stored in little endian order and are stored "packed".

For Diffie-Hellman keys, this operation provides the application with the ability to substitute its own value for the generator, e.g. When a Diffie-Hellman key is generated, the value 2 is used for the generator.

Typically, this command is used to generate new public and private keys reusing the publicly shared modulus vectors so that a new secret keys can be derived. For Diffie-Hellman keys, the application can follow this command with the CGX_GEN_NEGKEY to generate the derived secret key from the receiver's public key.

For DSA keys, this operation can be followed by the CGX_SIGN and CGX_VERIFY operations using the newly generated DSA keyset.

This command can be preempted by any command which is not a public key command.

Command Interface:
/* modify the public and private vectors of a Diffie-Hellman or DSA
Public Keyset */
```
    cgx_gen_newpubkey(kernelblock  *kb,
                      publickey     *modulus,
                      crypto_cntxt  *cc,
                      unsigned short key_gen)
    Arguments:
        kb->cb->cmd    = CGX_GEN_NEWPUBKEY;
        /* modulus must point to either a Diffie-Hellman or DSA
        keyset. */
        /* the kernel will load the modulus portion of the key and use */
        /* it to create the new private and public portions of the */
        /* keyset. For Diffie-Hellman keys, the length member of the */
        /* private portion of the key will be used when generating the */
        /* private portion of the key.
        kb->cb->argument[0] = (VPTR)modulus;
        /* the crypto_cntxt to use when covering the newly generated */
        /* private portion of the keyset. */
        kb->cb->argument[1] = (VPTR)cc;
        /* specifies which key parts to return: CGX_X_V and/or
        CGX_Y_V */
        kb->cb->argument[2] = (VPTR)key_gen;
    Status:
        kb->sb->status = CGX_SUCCESS_S,
                         CGX_BAD_KEYSET_S, /* keyset
                         contains NULL data */
                         CGX_INVALD_LEN_S, /* invalid mod/
                         priv len used */
                         CGX_FAIL_S, or /* invalid keyset type
                         (RSA) or
                                  * error during key generation */
                         CGX_BAD_MODE_S, /* unrecognized keyset
                         type */
    See Also: CGX_GEN_PUBKEY, CGX_GEN_NEGKEY, CGX_SIGN,
    and CGX_VERIFY
```

GEN NEGKEY (Generate the DH Derived Secret Key)
Command Name: CGX_GEN_NEGKEY
GEN NEGKEY_GXY
(Cover and return the DH Derived Secret Key, $(g^x)^y$)
Command Name: CGX_GEN_NEGKEY_GXY
Command Descriptions:
These operations will complete the Diffie-Hellman exchange by deriving the shared secret key from the receiver's public key. The CryptIC supports dynamically negotiated keys as specified in the X9.42 Standard. Currently, the MQV 1 and 2 protocols are not supported. This command is only used for Diffie-Hellman public keyset.

To calculate the derived secret key the application must import the receiver's public key vector using the publickey definition. For the received public key, the application only needs to populate the public key field and algorithm type of the publickey. For the local private key, both the modulus and private keys are required. Because the private portion of the locally stored key is used, the crypto_cntxt which was used to cover the key must be presented as a parameter also. The secure kernel uses the imported public key to derive $g^{xy}$.

The commands CGX_GEN_NEGKEY and CGX_GEN_NEGKEY_GXY differ in what they do with the derived Diffie-Hellman shared secret key, $g^{xy}$.

The command CGX_GEN_NEGKEY truncates the shared secret key into a secret key of the desired length. The imported public key is discarded after the command completes. If for some reason the application needs to regenerate the derived secret key, it must reload the other parties' public key.

The application calling command CGX_GEN_NEGKEY must provide a destination key cache register to receive the derived secret key and a destination black secret key and a KEKcc (a crypto context.) Furthermore, the application must specify the size of the derived secret key. The size can be specified as: 32–168 bits in length, specified in units of bytes (8 bits). The secret key will be created from the least significant bits of the shared secret. By definition, secret keys created via this command are untrusted keys. The secret key can be either a key encryption key (KEK or KKEK) or a data encryption key (K). The KEKcc designates a kcr holding an encryption key and also supplies an initialization vector, which, using the kcr, is used to cover the derived private key. The covered (black) key is then returned to the calling application via the argument supplied.

The command CGX_GEN_NEGKEY_GXY returns a covered (black) version of the shared secret key. The application calling command CGX_GEN_NEGKEY_GXY must provide a destination public key and a KEKcc (a crypto context.) The KEKcc must designate a key cache register ID (kcr) to cover the shared key. The KEKcc supplies the initialization vector, which, using the kcr, is used to cover the shared secret key, $g^{xy}$. The covered key is then returned to the calling application via the argument supplied. Only the privatekey member of the destination public key is populated; the calling application must ensure that the privatekey member of the destination public key has sufficient memory to receive the covered private key, viz., local public key's modulus size plus 8 bytes. The returned covered key may be used subsequently as input to the command CGX_PRF_GXY or other CGX commands which facilitate IPSec operations.

Both commands can be preempted by any command which is not a public key command.

Command Interface:
/* derive a secret key using the Diffie-Hellman algorithm and public keyset */
```
    cgx_negkey(kernelblock  *kb,
               publickey     *localpk,
               crypto_cntxt  *lkek_cc,
               publickey     *remotepk,
               kcr           destkcr,
               UINT16        type,
               UINT16        len,
               UINT16        use,
               secretkey     *bk,
               crypto_cntxt  *bkek_cc)
```

-continued

```
Arguments:
    kb->cb->cmd       =CGX_GEN_NEGKEY;
    /* a pointer to the publickey used to house the local public */
    /* key. The modulus and private key fields are used to derive */
    /* the shared secret. */
    kb->cb->argument[0] = (VPTR)localpk;
    /* a pointer to the crypto_cntxt which will be used to uncover */
    /* the private portion of the local public key.         */
    kb->cb->argument[1] = (VPTR)lkek_cc;
    /* a pointer to the publickey where the receiver's public key */
    /* is stored. The receiver's public key is used to derive */
    /* a secret key. All other fields except the pubkey member of */
    /* the publickey are ignored. */
    kb->cb->argument[2] = (VPTR)remotepk;
    /* destination KCR ID for newly derived secret key */
    kb->cb->argument[3] = (VPTR)destkcr;
    /* the algorithm type of the secret key which will be derived */
    kb->cb->argument[4] = (VPTR)type;
    /* the length of the secret key which will be derived. The */
    /* length indicates how many bits to use for the secret key, */
    /* ranging from 32–168 bits (expressed in units of bytes). */
    kb->cb->argument[5] = (VPTR)len;
    /* how this key will be used. By definition, the key will be */
    /* untrusted, but the application must identify this as either */
    /* a key encryption key (KEK) or a data encryption key (K). */
    kb->cb->argument[6] = (VPTR)use;
    /* pointer to storage for the black version of the generated */
    /* key. A NULL value for this parameter will cause a "dangling" */
    /* key to be generated in a kcr within the key hierarchy. */
    kb->cb->argument[7] = (VPTR)bk;
    /* the crypto_cntxt used to cover the black version of the key. */
    kb->cb->argument[8] = (VPTR)bkek_cc;
    kb->cb->argument[9] = (VPTR)NULL;
Status:
    kb->sb->status = CGX_SUCCESS_S,
            CGX_BAD_KEYSET_S, /* either local or remote */
                    /* publickey is not a DH key */
            CGX_INVALID_KEY_LEN_S, /* invalid secret key len */
            CGX_WEAK_KEY_S, /* remote public key was +/-1 */
            CGX_FAIL_S, or     */ use or type not provided */
            CGX_INVALID_REG_S, /* invalid destkcr or bkek_cc */
                    /* kcr */
Command Interface:
    /* derive a secret key using the Diffie-Hellman algorithm and public keyset */
    cgx_negkey_gxy(kernelblock *kb,
        publickey       *localpk,
        crypto_cntxt *lkek _cc,
        publickey       *remotepk,
        publickey       *gxy,
        crypto_cntxt *gyx_kek_cc)
Arguments:
    kb->cb->cmd       =CGX_GEN_NEGKEY;
    /* a pointer to the publickey used to house the local public */
    /* key. The modulus and private key fields are used to derive */
    /* the shared secret. */
    kb->cb->argument[0] = (VPTR)localpk;
    /* a pointer to the crypto_cntxt which will be used to uncover */
    /* the private portion of the local public key.         */
    kb->cb->argument[1] = (VPTR)lkek_cc;
    /* a pointer to the publickey where the receiver's public key */
    /* is stored. The receiver's public key is used to derive */
    /* a secret key. All other fields except the pubkey member of */
    /* the publickey are ignored. */
    kb->cb->argument[2] = (VPTR)remotepk;
    kb->cb->argument[7] = (VPTR)NULL;
    /* ptr to returned covered public key structure */
    /* the crypto_cntxt used to cover the black version of the key. */
    kb->cb->argument[8] = (VPTR)gxy_kek_cc;
    kb->cb->argument[9] = (VPTR)gxy;
```

-continued

```
Status:
    kb->sb->status = CGX_SUCCESS_S,
                CGX_BAD_KEYSET_S, /* either local or remote */
                                  /* publickey is not a DH key */
                CGX_INVALD_KEY_LEN_S, /* invalid secret key len */
                CGX_WEAK_KEY_S, /* remote public key was +/-1 */
                CGX_FAIL_S or /* use or type not provided */
                CGX_INVALID_REG_S, /* invalid destkcr or bkek_cc */
                                  /* kcr */
See Also: CGX_PRF_GXY, CGX_GEN_PUBKEY and
CGX_GEN_+NEWPUBKEY
```

PUBKEY ENCRYPT (Encrypt Data Using RSA Public Key)

Command Name: CGX_PUBKEY_ENCRYPT

Command Description:

The Public Key Encrypt command is used to encrypt the application's data using the RSA encryption algorithm. This operation implements encryption or the RSA signature operation using the pubkey member of a publickey structure. Control over which operation is performed lies with the application. If the private key member if NULL, RSA encryption occurs. If the public key is NULL, an RSA signature is generated. The public keyset member of the RSA publickey structure must be present for either of these operations to occur.

The input data buffer, datain, must be a multiple of the length of public keyset's modulus. Also, the value of the message must not exceed the value of the modulus. (The message to be encrypted, like the public keyset components, is stored in little endian order.) Furthermore, the output buffer, dataout, must be at least as large as the input buffer. Data from the datain buffer will be encrypted in blocks equal to the size of the modulus and stored at the same relative offset in the dataout buffer. This implies that the encryption algorithm will break the input message into chunks of modulus length size and process each chunk until the input is consumed.

If the output buffer isn't the same size as the input buffer, the application takes the chance of the operation failing if the result of the encryption can overflow the size of the output data buffer.

```
Command Interface:
    /*encrypt the application's data using the RSA public keyset */
    cgx_pubkey_encrypt(kernelblock *kb,
            publickey      *pk,
            crypto_cntxt *pkek_cc,
            UINT16         dataoutpg,
            BYTE           *dataout,
            UINT16         datainpg,
            BYTE           *datain,
            UINT16         len)
Arguments:
        kb->cb->cmd      =CGX_PUBKEY_ENCRYPT;
        /* a pointer to the public keyset to use for the encryption */
        /* operation. If the pkek_cc is NULL, the public portion of */
        /* the keyset will be used for this operation. If the pkek_cc */
        /* is not NULL, the private exponent will be used for encryption */
        bk->cb->argument[0] = (VPTR)(pk);
        /* a pointer to the crypto context used to cover the private */
        /* portion of the public keyset */
        bk->cb->argument[1] = (VPTR)(pkek_cc);
        /* data page of output data buffer store the cipher-text */
        bk->cb->argument[2] = (VPTR)(dpg);
        /* output data buffer to store cipher-text of the message */
        bk->cb->argument[3] = (VPTR)(dp);
        /* data page of input data buffer to be encrypted */
        bk->cb->argument[4] = (VPTR)(sdp);
        /* input data buffer to be encrypted */
        bk->cb->argument[5] = (VPTR)(sp);
        /* the length of the data to encrypt. The buffer length must be */
        /* a multiple of the modulus size. In addition, the output */
        /* buffer length should be at least as large as the input buffer */
        bk->cb->argument[6] = (VPTR)(len);
```

```
Status:
    kb->sb->status = CGX_SUCCESS_S,
                CGX_BAD_KEYSET_S,      /* both privkey and pubkey
                                        * present
                                        */
                CGX_INVALD_LEN_S       /* invalid length specified */
                CGX_BAD_KEYSET_S,      /* keyset not an RSA keyset */
                CGX_BAD_MODULUS_S, or  /* message > modulus */
                CGX_FAIL_S             /* zero modulus */
See Also: CGX_GEN_PUBKEY, CGX_PUBKEY_DECRYPT
```

PUBKEY Decrypt (Decrypt Data Using RSA Public Key)

Command Name: CGX_PUBKEY_DECRYPT

Command Description:

The Public Key Decrypt command is used to decrypt the application's data using the RSA decryption algorithm, or to verify an RSA signature. Control over which operation is performed lies with the application. If the public key member of the key is NULL, an RSA decryption will be performed. If the private key member of the structure is NULL, a signature verification will be performed. The public keyset must be provided by the application and contain the private key portion of the keyset in order for this command to complete.

The size of the input data buffer, datain, must be a multiple of the public keyset's modulus size. Furthermore, the output buffer, dataout, must have a length greater than or equal to the size of the input buffer. The input buffer will be decrypted in chunks equal to the size of the modulus, until the input buffer is consumed. The output message will be written into the dataout buffer at the same relative offset as the input buffer.

If the output buffer size isn't at least as large as the input buffer, the application takes the chance of the operation failing if the result of the decryption can overflow the size of the output data buffer.

```
Command Interface:
    /*decrypt the application's data using the RSA public keyset */
    cgx_pubkey_decrypt(kernelblock *kb,
            publickey    *pk,
            crypto_cntxt *pkek_cc,
            UINT16       dataoutpg,
            BYTE         *dataout,
            UINT16       datainpg,
            BYTE         *datain,
            UINT16       len)
Arguments:
    kb->cb->cmd         =CGX_PUBKEY_DECRYPT;
    /* a pointer to the public keyset to use for the decryption */
    /* operation. If the pkek_cc is NULL, the public portion of */
    /* the keyset will be used for this operation. If the pkek_cc */
    /* is not NULL, the private exponent will be used for decryption */
    bk->cb->argument[0] = (VPTR)(pk);
    /* a pointer to the crypto context used to cover the private */
    /* portion of the public keyset */
    bk->cb->argument[1] = (VPTR)(pkek_cc);
    /* data page of output data buffer store the plain-text */
    bk->cb->argument[2] = (VPTR)(dpg);
    /* output data buffer to store plain-text of the message */
    bk->cb->argument[3] = (VPTR)(dp);
    /* data page of input data buffer to be decrypted */
    bk->cb->argument[4] = (VPTR)(sdp);
    /* input data buffer to be decrypted */
    bk->cb->argument[5] = (VPTR)(sp);
    /* the length of the data to decrypt. The buffer length must be */
    /* a multiple of the modulus size. In addition, the output */
    /* buffer length should be at least as large as the input buffer */
    bk->cb->argument[6] = (VPTR)(len);
Status:
    kb->sb->status = CGX_SUCCESS_S,
                CGX_BAD_OUTPUT,       /* output buffer too small */
                CGX_BAD_INPUT, or     /* input buffer too large */
                CGX_BAD_KEYSET_S      /* empty key RAM */
See Also: CGX_GEN_PUBKEY and CGX_ENCRYPT_PUBKEY
```

Export Pubkey (Export An IRE Public Key)

Command Name: CGX_EXPORT_PUBKEY

Command Description:

The Export Pubkey command allows the application to move an IRE public key form into an external public key form. The external public form must be covered with a secret key, this is specified by the application via the command arguments.

The application must present a BLACK copy of the IRE public key to export along with the crypto_cntxt object to reference the KEK to uncover it. Also, the application must provide a buffer (i.e. ebk) to copy the external public key into that is converted from the BLACK IRE public key along with the publickey object. Furthermore, the exported public key can be covered by an untrusted key (i.e. K) or a KEK.

The IRE public key to export must not reside (or covered by) under a parent KEK that is trusted (i.e. LSV, GKEK, or trusted KEK). The main purpose of this command is to provide some sort of key interoperability between an IRE crypto device and some other vendor's crypto equipment (software or hardware based).

The public key to export is passed in via the argument, pk, the publickey object. The privkey, type and length members must be present in order to export the public key. Therefore, the private key is the only portion of the public keyset that is exported. The application can move the public and modulus portion itself.

As part of the command the application is allowed to program salt bits that will be prepended to the private key bits of the external public key. When exporting a private key under a secret key the application has the choice of providing salt bits in multiples of 2 bytes, requesting the secure Kernel generate salt bits in multiples of 2 bytes, or not storing any salt bits. However, the total of salt bytes, data bytes, and the private key bytes must be a multiple of 8 bytes.

Also, the command allows the application to program data bits that will be appended to the private key bits of the external secret key. When exporting a private key under a secret key the application has the choice of providing data bits in multiples of 2 bytes, requesting the secure Kernel generate data bits in multiples of 2 bytes, or not storing any data bits. However, the total of salt bytes, data bytes, and the key bytes must be a multiple of 8 bytes.

If the argument, salt_len, is set to 0 the application requests that no salt bits be prepended. If the argument, salt, is NULL it requests that the secure Kernel generate salt_len bytes; otherwise the application is providing salt_len bytes of salt.

If the argument, data_len, is set to 0 the application requests that no data bits be prepended. If the argument, data, is NULL it requests that the secure Kernel generate data_len bytes; otherwise the application is providing data_len bytes of data.

Command Interfaces:
```
/* export an IRE private key under an untrusted secret key KEK */
cgx_export_pubkey( kernelblock   *kb,
    publickey      *pk,
    crypto_cntxt   *pkek_cc,
    unsigned short *ebk,
    crypto_cntxt   *ekek_cc,
    unsigned short *salt,
    unsigned short salt_len
    unsigned short *data,
    unsigned short data_len)
```

Arguments:
```
kb->cb->cmd       = CGX_EXPORT_PUBKEY;
/* the BLACK IRE private key to export */
kb->cb->argument[0] = (VPTR)pk;
/* the KCR KEK location to uncover the BLACK IRE private key */
kb->cb->argument[1] = (VPTR)pkek_cc;
/* the buffer to house the external private key */
kb->cb->argument[2] = (VPTR)ebk;
/* the KCR K or KEK location to cover the IRE private key */
kb->cb->argument[3] = (VPTR)ekek_cc;
/*salt bits to prepend to key bits */
kb->cb->argument[4] = (VPTR)salt;
/* the number of salt bits to prepend to the key bits */
/* this must be in units of 2 bytes */
kb->cb->argument[5] = (VPTR)salt_len;
/*data bits to prepend to key bits */
kb->cb->argument[6] = (VPTR)data;
/* the number of data bits to prepend to the key bits */
/* this must be in units of 2 bytes */
kb->cb->argument[7] = (VPTR)data_len;
```
Status:
```
kb->sb->status  CGX_SUCCESS_S, or
                CGX_INVALID_REG_S
```

See Also: CGX_GEN_PUBKEY, CGX_GEN_NEWPUBKEY, and CGX_IMPORT_PUBKEY

Import PUBKEY (Import An IRE Public Key)

Command Name: CGX_IMPORT_PUBKEY

Command Description:

The Import Pubkey command allows the application to move an external public key form into an IRE internal form. The external public form must be covered with a secret key, this is specified by the application via the command arguments. The main purpose of this command is to provide some sort of key interoperability between an IRE crypto device and some other vendor's crypto equipment (software or hardware based).

The application must present a BLACK copy of the external public key via the ibuf argument to import along with the crypto_cntxt object to reference the untrusted K or KEK to uncover it, an untrusted secret key. Also, the application must provide a public key object (i.e. pk) to convert the external public key buffer, ibuf, into an internal IRE public key form.

The external public key to import can not reside (or covered by) under a parent KEK that is trusted (i.e. LSV, GKEK, or trusted KEK). When it was exported it must have been under an untrusted secret key KEK only. If an attempt to uncover the imported key under anything but the correct untrusted KEK the operation will fail. However, the KEK to cover the converted public key with (the newly converted IRE public key) can be a trusted or untrusted secret key KEK.

The public key to imported is eventually copied into the argument, pk, the publickey object. The privkey, type and length members must be present in order to import the public key. Therefore, the private key is the only portion of the public keyset that is imported. The application can move the public and modulus portion itself As part of the command the application must indicate the number of salt bits that will be skipped before it can extract the private key bits. This is accomplished via the argument, skip_len, and it must be in multiples of 2 bytes.

Command Interfaces:
```
/*import an external private key under an untrusted secret key KEK */
cgx_import_pubkey( kernelblock   *kb,
    unsigned short   *ibuf;
    crypto_cntxt     *ikek,
    unsigned short   skip_len
    publickey        *pk,
    crypto_cntxt     *pkek)
Arguments:
    kb->cb->cmd      =CGX_IMPORT_PUBKEY;
    /* the BLACK IRE private key to import into */
    kb->cb->argument[0] = (VPTR)pk;
    /* the KCR K or KEK location to uncover the external private key */
    kb->cb->argument[1] = (VPTR)ikek;
    /* the buffer that houses the external private key */
    kb->cb->argument[2] = (VPTR)ibuf;
    /* the KCR KEK location to cover the IRE private key */
    kb->cb->argument[3] = (VPTR)pkek;
    /*salt bits to skip */
    kb->cb->argument[5] = (VPTR)skip_len;
Status:
    kb->sb->status = CGX_SUCCESS_S, or
                     CGX_INVALID_REG_S
See Also: CGX_GEN_PUBKEY, CGX_GEN_NEWPUBKEY, and
CGX_EXPORT_PUBKEY
```

Digital Signature Commands

Sign (Digitally Sign A Message)

Command Name: CGX_SIGN

Command Description:

The digital signature sign command is used to sign the application's message using the DSA digital signature algorithm.

The application can pass in a covered(i.e. BLACK) DSA public key or an uncovered (i.e. RED) public key. If the color of the public key is determined by the argument, kek. If it is NULL then the public key is assumed to be in the RED form. If the argument is non-NULL then the public key is in the BLACK form and must be uncovered with the kek.

To digitally sign a message a one-way hash result is processed by the digital signature algorithm. The result of the sign command is placed into the signblock.

The result is returned in the signblock, it's the data in this block that must be used by the CGX_VERIFY command to verify the message's signature.

Also, the application is allowed to pass in K, of the DSA vectors. Remember K is typically a random vector that should be considered secret. If K is known by anyone they can forge the signature. Therefore, using this feature must be used only in extreme cases; otherwise pass in a NULL pointer and let the secure Kernel generate K.

Prior to using this command the application must calculate the one-way hash value of the message to sign. The result of the one-way hash value is stored in the hash_cntxt block object. This block must be passed in as an argument to the command.

Command Interface:
```
/* DSA sign the application's message */
cgx_sign( kernelblock   *kb,
    publickey         *pk,
    crypto_cntxt      *kek,
    signblock         *sb,
    hash_cntxt        *hc,
    unsigned short    *K)
Arguments:
    kb->cb->cmd       =CGX_SIGN;
    /* the DSA public keyset */
    kb->cb->argument[0] = (VPTR)pk;
    /* signature block, contains result of signature (input/output) */
    kb->cb->argument[1] = (VPTR)sb;
    /* one-way hash value of message to sign */
    kb->cb->argument[2] = (VPTR)hc;
    /* The KEK to uncover the DSA private part, NULL private is RED */
    kb->cb->argument[3] = (VPTR)kek;
    /* vector K, NULL Kernel generates K, highly risky to use */
    kb->cb->argument[4] = (VPTR)K;
    /* a non-zero value requests the sign be verified */
    kb->cb->argument[5] = (VPTR)recheck;
```

-continued

```
Status:
    kb->sb->status = CGX_SUCCESS_S,
              CGX_FAIL_S,
              CGX_BAD_KEYSET_S /* empty key RAM or wrong alg */
See Also: CGX_VERIFY, CGX_INIT_HASH, and CGX_HASH_DATA
```

Verify (Verify A Digital Signature)

Command Name: CGX_VERIFY

Command Description:

The digital signature verify command is used to verify the signature of the application's message using the DSA public key algorithm.

To verify a digital signature a one-way hash is calculated over the message and its result is processed by the digital signature algorithm for verification. The result of the verify command is compared to the result already in the signblock.

The result of the calculation is compared to the signature result already stored in the signblock, if the results compare then the signature is valid; otherwise the signature fails and is not valid.

The application need only pass in the modulus and public parts of the DSA public keyset, the private part is ignored.

Prior to using this command the application must calculate the one-way hash value of the message to verify. The result of the one-way hash value is stored in the hash_cntxt block object. This block must be passed in as an argument to the command.

```
Command Interface:
/*DSA verify the application's signed message */
cgx_verify(kernelblock  *kb,
           publickey    *pk,
           signblock    *sb,
           hash_cntxt   *hc)
   Arguments:
       kb->cb->cmd = CGX_VERIFY;
       /* the DSA public keyset */
       kb->cb->argument[0] = (VPTR)pk;
       /* signature block, contains result of signature (input/output) */
       kb->cb->argument[1] = (VPTR)sb;
       /* one-way hash value of message to sign */
       kb->cb->argument[2] = (VPTR)hc;
```

```
Status:
    kb->sb->status = CGX_SUCCESS_S,
                     CGX_INVALID_SIGNATURE_S, or
                     /* sig not valid */
                     CGX_BAD_KEYSET_S /* empty key
                     RAM or wrong alg */
See Also: CGX_SIGN, CGX_INIT_HASH, and CGX_HASH_DATA
```

Extended Algorithm Commands

Load Extended (Load/Enable Extended Algorithm Block)

Command Name: CGX_LOAD_EXTENDED

Command Description:

The load extended algorithm command allows up to 8 kilo-words of expansion for secure kernel program memory. This block can be used to augment the secure kernel with algorithms (e.g., IDEA or Blowfish) or features which are not contained in the standard kernel. Because this command will cause the kernel to accept the application code as legitimate, the application must be signed by IRE. When invoking the load extended command, the application must present the signature provided by IRE. The signature will be authenticated by the secure kernel before enabling the extended algorithm block. If the signature is not successfully authenticated, the secure kernel will not transfer the application code to the extended algorithm block and hardware protection for the extended algorithm block will not be enabled.

The extended algorithm block must be bound beginning at location xxxx. When the signature over the algorithm block has been verified, the kernel will transfer the application from program memory into the extended algorithm block and enable kernel protection over the block.

Once the extended algorithm block has been authenticated and loaded, the application can invoke operations in the extended algorithm block via the CGX_EXEC_EXTENDED command. When the application no longer needs the extended algorithm block, the block may be disabled via the CGX_CLEAR_EXTENDED command.

If the application does not to use the extended algorithm block to expand the secure kernel, it may still be used for application code.

```
Command Interface:
    /* load the extended algorithm block and enable hardware protection */
    cgx_load_extended(kernelblock  *kb,
                      unsigned char pm *prog,
                      UINT16       len,
                      signblock    *sb)
    Arguments:
        kb->cb->cmd       =CGX_LOAD_EXTENDED;
        /* the address of the extended algorithm block */
        kb->cb->argument[0] = (VPTR)prog;
        /* the length of the block in 24-bit words */
        kb->cb->argument[1] = (VPTR)len;
```

-continued

```
       /* the signature for the extended algorithm block */
       kb->cb->argument[2] = (VPTR)sb;
    Status:
       kb->sb->status = CGX_SUCCESS_S,
                   CGX_ACCESS_DENIED, /* Extended algorithms not
                                  * permitted.
                                  */
                   or CGX_INVALD_SIGNATURE_S.
See Also: CGX_EXEC_EXTENDED and CGX_CLEAR_EXTENDED
```

Execute Extended (Execute Extended Algorithm Block)

Command Name: CGX_EXEC_EXTENDED

Command Description:

The execute extended algorithm command allows the application to invoke operations contained in the extended algorithm block. Operations are permitted a maximum of 10 parameters stored in the argument member of the cmdblock structure. In order for a request to execute from the extended algorithm block to be honored, the algorithm must already have been loaded via the CGX_LOAD_EXTENDED command.

Before invoking the extended algorithm block, the secure kernel will verify that the block is active (i.e., has a valid algorithm loaded). If so, control is transferred to the extended algorithm block via the block's entry point (the specific location is yet to be determined). It is the algorithm block's responsibility to handle branching to the appropriate handler operation. In other words, once control is transferred to the extended algorithm block's entry point, the application is responsible for handling the command.

Upon completion of command processing, the extended algorithm can return a UINT16 value indicating the completion status of the command. This value will be available to the application in the status field of the kernel block.

```
Command Interface:
    /* execute from the extended algorithm block */
    cgx_execute_extended(kernelblock   *kb)
    Arguments:
       kb->cb->cmd      = CGX_EXEC_EXTENDED;
       /* arguments can be passed by the application via the argument
        * array. This data will be available to the algorithm block.
        */
```

-continued

```
    Status:
       kb->sb->status = CGX_ACCESS_DENIED_S, /* extended
          algorithms not
                                  * permitted.
                                  */
                   CGX_FAIL_S,  /* extended algorithm block not
                                  * initialized.
                                  */
          result from extended algorithm.
See Also: CGX_LOAD_EXTENDED and CGX_CLEAR_EXTENDED
```

Hash Commands

Hash INIT (Initialize The HASH Operator)

Command Name: CGX_HASH_INIT

Command Description:

The Initialize Hash command is used to initialize a Hash context block, hash_cntxt, and prepare it for the start of a Hash calculation. The application must invoke the initialize Hash operation prior to starting a new Hash calculation; if not the hash_cntxt is not initialized and the Hash calculation will be incorrect. Having the Iinitialize Hash command allows the application to run simultaneous Hash calculations, interleaving the calls to CGX_HASH_DATA. This is facilitated due to the Hash context management.

The Hash operations support SHS-1 and MD5 one way Hash algorithms. Both Hash algorithms have a limit of $2^{64}$ bits message length and both process units of words.

The application must setup the hash_cntxt with an algorithm mode (i.e., CGX_SHS_A or CGX_MD5_A) prior to the execution of the initialize Hash command. Upon completion of this operation, the hash context will contain a NULL value in the digest member of the hash_cntxt. When the hash is closed, the digest member will be a valid pointer to the hash digest.

```
Command Interface:
    /* initialize HASH context, prepare to HASH */
    cgx_hash_init(kernelblock   *kb,
       hash_cntxt           *hb)
    Arguments:
       kb->cb->cmd      =CGX_INIT_HASH;
       /* the hash context block to initialize */
       kb->cb->argument[0] = (VPTR)hb;
    Status:
       kb->sb->status = CGX_SUCCESS_S, or
                   CGX_BAD_MODE_S /* only SHS-1 or MD5 available */
See Also: CGX_HASH_DATA
```

Hash Data (HASH Customer Data)

Command Name: CGX_HASH_DATA

Command Description:

The Hash Data command is used to calculate a Hash value of the application's data. The hash may include a data key either prepended to the data, appended to the data, or both (the keys need not be the same). The key may not be inserted into the middle of the data due to security concerns [in this context, "data" encompasses the entire data stream to be hashed—in other words, keys can only be hashed at the very beginning or end of the data]. Neither the key, nor its parent in the key hierarchy (i.e., its KEK) may be trusted. Any attempt to hash a trusted key will result in a failure. The hash_cntxt block allows the application to run simultaneous Hash calculations interleaving the calls to CGX_HASH_DATA.

The HASH operations support SHS-1 and MD5 one-way Hash algorithms. Both Hash algorithms have a message length limit of $2^{64}$ bits and operate on units of bytes.

The application must set up the hash_cntxt with an algorithm mode (i.e., CGX_SHS_M or CGX_MD5_M) prior to the execution of the HASH data command. The application must set the context block up and invoke the CGX_INIT_HASH command first.

Because it illegal to request hashing of the LSV, a value of non-0 for the key indicates that a keyed hash is being requested. When keyed hashing is requested, the position of the key in the data must be identified as either CGX_PREPEND_O, CGX_APPEND_O, or both. The position parameter is a bit field.

Setting the final argument to 1 signals the end of the message. This causes the secure kernel to prepare the message digest. If the final operation is not performed, the message digest is incorrect. If the application has no message to Hash and has set final to 1 then it must set message_len to 0. When message_len is set to 0 the message buffer is ignored. However, if there are still more messages to Hash, the application must set final to 0.

```
Command Interface:
/* calculate HASH of message */
cgx_hash_data(kernelblock *kb,
     unsigned short message_pg,
     unsigned short *message,
     unsigned long length,
     unsigned short final,
     kcr       key,
     unsigned short position,
     hash_cntxt   *hb)
Arguments:
     kb->cb->cmd     =CGX_HASH_DATA;
     /* the hash context block */
     kb->cb->argument[0] = (VPTR)hb;
     /* the data page of the message. If necessary, the underlying
      * software will up temporarily switch pages in order to access
      * the message data.
      */
     kb->cb->argument[1] = (VPTR)message_pg;
     /* pointer to length bytes of memory to HASH, a message can
     be
      * variable length. The application can make as many calls to
      * calculate the HASH message digest. This is because of the
      * hash_cntxt block. If final operation and no message set to
     NULL.
      */
     kb->cb->argument[2] = (VPTR)message;
     /* length, set to 0 if no more data to hash. The data length is 4
      * bytes long, broken into two arguments. Length represents the
      * number of bytes to hash, up to a total of $2^{64}$ bits ($2^{61}$
      * bytes) to hash.
      */
     kb->cb->argument[3] = (VPTR)((length >> 16) & 0xffff);
     kb->cb->argument[4] = (VPTR)(length & 0xffff);
     /* if no more message data to hash, set final to 1 */
     /* otherwise there is more data to come or at least another */
     /* call to CGX_HASH_DATA so set final to a 0 */
     kb->cb->argument[5] = (VPTR)final;
     /* identify the KCR containing the key to be hashed into the */
     /* data. The key (and its KEK) cannot be trusted keys or the*/
     /* operation will fail */
     kb->cb->argument[6] = (VPTR)key;
     /* specify where the key is to be added relative to the data */
     /* this parameter is a bit-field; so, prepending and appending */
     /* of the key is permitted using arithmetic OR */
     kb->cb->argument[7] = (VPTR)position;
Status:
     kb->sb->status = CGX_SUCCESS_S,
          CGX_FAIL_S,   /* length = 0 and final = 0 */ or
          CGX_BAD_MODE_S /* only SHS-1 or MD5
          available */
See Also: CGX_INIT_HASH
```

Hash Encrypt (Hash and Encrypt User Data)

Command Name: CGX_HASH_ENCRYPT

Command Description:

The Hash and Encrypt command is used to perform a hash calculation and symmetrical encryption of the customer's data. Having a hash_cntxt and crypto_cntxt block allows the application to run simultaneous hash calculations interleaving the calls with CGX_HASH_DATA and CGX_HASH_DECRYPT commands; this is because of the context management objects, hash_cntxt and crypto_cntxt.

The hash algorithms supported are SHS-1 and MD5 one-way hash algorithms. For any invocation of hash_encrypt, the algorithms have a limit of $2^{16}$ bytes. Due to requirements imposed by the encryption operations, the length must be evenly divisible by 8 (the encryption/decryption operations operate on blocks of 8 bytes). A message not evenly divisible by 8 must be padded by the application. The message or block may be padded with any pattern the application wishes.

The encrypt algorithms supported are: DES, Triple DES, and RC5, in several modes: ECB, CFB, OFB, and CBC. The encryption algorithms only support block encryption, a block must be divisible by 64 bits long (to be performed by the application). A encrypted data session can extend beyond one call to the encryption command; this is accomplished via a crypto_cntxt block (described below).

The data buffers, datain (plain-text) and dataout (cipher-text), can share the same address.

Prior to invoking the hash and encrypt command the application must setup the crypto_cntxt block. The application is responsible for setting the configuration, masking in one of the special key load options (described below), setting the appropriate secret key KCR ID, and for priming the iv buffer with an initial random number (only for the first call). After this, the application need not modify the crypto_cntxt block unless something changes (i.e., secret key KCR ID location, and/or the iv to cause a resynchronization).

The iv buffer of the crypto_cntxt block must be read- and write-able; the iv buffer is used to maintain the feedback register for the CBC, CFB, and OFB modes. In the ECB mode the iv buffer is ignored.

The hash and encryption command allows the application to mask in one of the special mode control bits defined in section 0, into the config field of the crypto_cntxt block. The control bits are used by the secure kernel to determine how to load secret keys before the actual encryption of the plain-text takes place. The control bits allow the application to request one of these options: auto-load, force-load, or no-load. Auto-load allows the secure kernel to check which key is currently loaded into the KG, if it's the same as the key specified for the encryption command it is not loaded; otherwise the key is loaded. Force-load tells the secure kernel to always load the key. No-load tells the secure kernel to not load the key; more than likely the application has already loaded the key (maybe via the CGX_LOAD_KG command). By default auto-load is assumed.

The application must also set up the hash_cntxt with an algorithm (i.e., CGX_SHS_M or CGX_MD5_M) prior to the execution of the hash_data command. The application must set-up the context block and invoke the CGX_INIT_HASH command first.

Setting the final argument to 1 instructs the secure kernel to prepare the hash value for return to the application. If the final operation is not performed the message digest is incorrect. If the application has no message to hash and has set final to 1 then it must set length to 0. When length is 0, the datain buffer is ignored. If there are still more messages to hash the application must set final to 0.

The order parameter allows the application to specify the hash and encrypt order. The value CGX_HASH_CRYPT_O indicates hash before encrypt and CGX_CRYPT_HASH_O implies encrypt before hash.

The offset parameter indicates the number of bytes to process according to the value of order before applying the other operation. That is, if offset=4 and order=CGX_HASH_CRYPT_O, then 4 bytes of data will be hashed, and then the remaining length-4 bytes will be hashed and encrypted. The value of offset must be even (i.e., align on a word boundary).

The secret key to be loaded as referenced via the crypto_cntxt must have the key usage setting of CGX_KCR_K. This command only allows traffic or data keys to be loaded or it will fail. The key usage information is programmed by the application at the time a secret key has been loaded, generated, derived, or negotiated and is maintained securely by the secure Kernel. This means an LSV, GKEK, or KEK type of secret key can not be loaded by this command.

Command Interface:
```
/* calculate HASH and encrypt the message */
cgx_hash_encrypt( kernelblock *kb,
    UINT16        datain_pg,
    UINT16        *datain,
    UINT16        dataout_pg,
    UINT16        *dataout,
    UINT16        length,
    UINT16        order,
    UINT16        offset,
    UINT16        final,
    crypto_cntxt  *cb
    hash_cntxt    *hb)
```

Arguments:
```
kb->cb->cmd      =CGX_HASH_ENCRYPT;
/* mode selection, mask the special mode and configuration
 * control bits with the mode here via the crypto_cntxt block
 */
kb->cb->argument[0] = (VPTR)cb;
/* the hash context block to initialize */
kb->cb->argument[1] = (VPTR)hb;
/* input message to be encrypted and hashed (data page,
offset) */
kb->cb->argument[2] = (VPTR)datain_pg;
kb->cb->argument[3] = (VPTR)datain;
/* number of bytes (byte = 8 bits) to encrypt */
kb->cb->argument[4] = (VPTR)length;
/* if no more message data, set final to a 1 */
/* otherwise there are more messages to come or at least
another */
/* call to CGX_HASH_DATA so set final to a 0 */
kb->cb->argument[5] = (VPTR)final;
/* if hash before encrypt set order to a CGX_HASH_CRYPT_O */
/* if encrypt before hash set order to a CGX_CRYPT_HASH_O */
kb->cb->argument[6] = (VPTR)order;
/* output the encrypted data blocks (data page, offset) */
kb->cb->argument[7] = (VPTR)dataout;
kb->cb->argument[8] = (VPTR)dataout_pg;
/* hash/decrypt offset */
kb->cb->argument[9] = (VPTR)offset;
```
Status:
```
kb->sb->status = CGX_SUCCESS_S,
                 CGX_WEAK_KEY_S,
                 CGX_BAD_MODE_S,
                 CGX_EMPTY_REG_S, or
                 CGX_INVALID_REG_S
```
See Also: CGX_INIT_HASH, CGX_ENCRYPT, and CGX_HASH_DATA Hash Decrypt (Hash and Decrypt User Data)

Command Name: CGX_HASH_DECRYPT

Command Description:

The hash and decrypt command is used to perform a hash calculation and symmetrical decryption of the customer's data. Having a hash_cntxt and crypto_cntxt blocks allows the application to run simultaneous hash calculations interleaving the calls with CGX_HASH_DATA and CGX_HASH_ENCRYPT commands; this is because of the context management objects, hash_cntxt and crypto_cntxt.

The one-way hash algorithms supported are: SHS-1 and MD5. For any invocation of hash_decrypt, the algorithms have a limit of $2^{16}$ bytes. Due to requirements of the encryption algorithms, message lengths must be evenly divisible by 8. Any message or block not evenly divisible by 8 bytes must be padded by the application. The message may be padded with any pattern which the application chooses.

The decrypt algorithms supported are: DES, Triple DES, and RC5, in several modes: ECB, CFB, OFB, and CBC. The decryption algorithms only support block decryption, a block must be 64 bits long. The decryption command can handle up to $2^{13}$ bytes at one time. Furthermore, an encrypted data session can extend beyond one call to the decryption command; this is accomplished via a crypto_cntxt block (described below).

The data buffers, datain (plain-text) and dataout (ciphertext), can share the same address.

Prior to invoking the hash and decrypt command the application must setup the crypto_cntxt block. The application is responsible for setting the configuration, masking in one of the special key load options (described below), setting the appropriate secret key KCR ID, and for priming the iv buffer with an initial random number (only for the first call). After this, the application need not modify the crypto_cntxt block unless something changes (i.e., secret key KCR ID location, algorithm, and/or the iv to cause a resynchronization).

The iv buffer of the crypto_cntxt block must be read- and write-able; the iv buffer is used to maintain the feedback register for the CBC, CFB, and OFB modes. In the ECB mode, the iv buffer is ignored.

The hash and decrypt command allows the application to mask one of the special mode control bits, defined in section 0, into the algorithm field of the crypto_cntxt block. The control bits are used by the secure kernel to determine how to load secret keys before the actual encryption of the plain-text takes place. The control bits allow the application to request one of these options: auto-load, force-load, or no-load. Auto-load allows the secure kernel to check which key is currently loaded into the KG, if its the same as the key specified for the decryption command it is not loaded; otherwise the key is loaded. Force-load tells the secure kernel to always load the key. No-load tells the secure kernel to not load the key; more than likely the application has already loaded the key (maybe via the CGX_LOAD_KG command). By default auto-load is assumed.

The application must also set up the hash_cntxt with an algorithm mode (i.e., CGX_SHS_M or CGX_MD5_M) prior to the execution of the hash_data command. The application must setup the context block and invoke the CGX_INIT_HASH command first.

Setting the final argument to 1 signals the secure kernel to prepare the message digest for the application. This is important to correctly calculating the message digest. If the final operation is not performed the message digest is incorrect. If the application has no message to hash and has set final to 1. When nblocks is set to 0 the datain buffer is ignored. However, if there are still more messages to hash the application must set final to 0.

The parameter order allows the application to specify the hash and decrypt order. The value CGX_HASH_CRYPT_O indicates hash before decrypt and CGX_CRYPT_HASH_O implies decrypt before hash. The offset parameter indicates the number of bytes to process according to the value of order before applying the other operation. That is, if offset=4 and order=CGX_HASH_CRYPT_O, then 4 bytes of data will be hashed, and then the remaining length-4 bytes will be hashed and decrypted. The value of offset must be even (i.e., align on a word boundary).

The secret key to be loaded as referenced via the crypto_cntxt must have the key usage setting of CGX_KCR_K. This command only allows traffic or data keys to be loaded or it will fail. The key usage information is programmed by the application at the time a secret key has been loaded, generated, derived, or negotiated and is maintained securely by the secure Kernel. This means an LSV, GKEK, or KEK type of secret key can not be loaded by this command.

Command Interface:
```
    /* calculate HASH and encrypt the message */
    cgx_hash_decrypt( kernelblock *kb,
        UINT16        datain_pg,
        UINT16        *datain,
        UINT16        dataout_pg,
        UINT16        *dataout,
        UINT16        length,
        UINT16        order,
        UINT16        offset,
        UINT16        final,
        crypto_cntxt  *cb
        hash_cntxt    *hb)
    Arguments:
        kb->cb->cmd        =CGX_HASH_DECRYPT;
        /* algorithm and mode selection,
         * mask one of the special algorithm
         * control bits with the mode here via the crypto_cntxt block
         */
        kb->cb->argument[0] = (VPTR)cb;
        /* the hash context block to initialize */
        kb->cb->argument[1] = (VPTR)hb;
        /* data to be decrypted and hashed, data page and offset */
        kb->cb->argument[2] = (VPTR)datain_pg;
        kb->cb->argument[3] = (VPTR)datain;
        /* number of bytes to hash/decrypt */
        kb->cb->argument[4] = (VPTR)nblocks;
        /* if no more data, set final to 1 */
        /* otherwise there is more data to come or at least another */
        /* call to CGX_HASH_DATA so set final to a 0 */
        kb->cb->argument[5] = (VPTR)final;
        /* if hash before decrypt set order to a CGX_HASH_
        CRYPT_O */
        /* if decrypt before hash set order to a CGX_CRYPT_
        HASH_O */
        kb->cb->argument[6] = (VPTR)order;
        /* output the decrypted data blocks, data page and offset */
        kb->cb->argument[7] = (VPTR)dataout_pg;
        kb->cb->argument[8] = (VPTR)dataout;
        /* hash/decrypt offset */
        kb->cb->argument[9] = (VPTR)offset;
    Status:
        kb->sb->status = CGX_SUCCESS_S,
                         CGX_WEAK_KEY_S,
                         CGX_BAD_MODE_S,
                         CGX_EMPTY_REG_S, or
                         CGX_INVALID_REG_S
See Also: CGX_INIT_HASH, CGX_DECRYPT, and CGX_HASH_DATA
```

Math Commands

Math (Math Utilities)

Command Name: CGX_MATH

Command Description:

The Math utilities expose multiple primitive Math functions which are accelerated by the Public Key engine. Primitive functions include: 64-bit vector Add, 64-bit vector Subtract, 64-bit vector Multiply, 64-bit vector Exponentiate, and 64-bit vector Reduction.

More information to follow in next revision.

Command Interface:
```
    /* Information Coming */
    cgx_math( kernelblock *kb,
    ...)
    Arguments:
        kb->cb->cmd        =CGX_MATH;
    Status:
        kb->sb->status = CGX_SUCCESS_S,
```

PRF Commands

The commands in this section allow an application to perform manipulations on keys and other secret data required to perform certain IPSec transforms. ("PRF" is an abbreviation of pseudo-random function.)

Merge Key

Command Name: CGX_MERGE_KEY

Command Description:

The CGX_MERGE_KEY command takes key material from two secret keys and combines the material to form a third secret key. The key material in two input keys, key1 and key2, is combined in a caller specified way.

The input keys are presented to the function in the black; crypto contexts for each must be supplied to uncover them internally. The resulting output key will be returned in the black so a crypto context for it must also be supplied as a function argument.

The output key pointer, bk, may point to the same memory as an input key pointer, in which case the output will overwrite the input. Also, any of the kek pointers supplied may be equal, in which case the same covering key will be used to cover or uncover parameters, as appropriate.

The possible combine operations are concatenate, exclusive-or, and hash. The resulting material (or the leading bytes of the resulting material, if the resulting material is more than needed to create the new key) becomes the key material for a new key.

For the concatenate operation, key2's key material is appended to that of key1, resulting in material whose length is the sum of the lengths of key1 and key2.

For the exclusive-or operation, key2's key material is bitwise exclusive-ored with that of key1, resulting in material whose length is the greater of the lengths of key1 and key2. (The shorter key is zero padded for purposes of the exclusive-or.)

For the hash operation, key2's key material is appended to that of key1, resulting in intermediate material whose length is the sum of the lengths of key1 and key2. Then the resulting material is hashed by the specified hash algorithm and the resulting hash digest is used as the new key's material. The length of the material in this case is the hash digest length.

For operations concatenate and hash, the order of input keys is significant, especially when one is attempting to perform operations according to an external specification. Another way to state which input order results in which intermediate key material order is that, for operations concatenate and hash, key2 becomes the most significant and key1 becomes the least significant part of the intermediate key material after concatenation.

The new key's length and type are specified as arguments. The supplied length must be in the allowed range for secret keys and the key material generated by combining the input keys must be sufficient to produce a key of the specified length.

The use of the new key may be KEK or K (encryption key.) The two input keys must either both be KEKs or neither be a KEK.

The astute reader will note that three or more input keys may be combined by merging the output of one merge_key operation with yet another input key, and repeating this step as often as necessary.

Command Interface:
```
/* merge two keys and create a third from the combined key material*/
cgx_merge_key( kernelblock *kb,
    secretkey       *key1,
    crypto_cntxt    *kek1,
    secretkey       *key2,
    crypto_cntxt    *kek2,
    UINT16          operation,
    UINT16          type,
    UINT16          length,
    UINT16          use,
    secretkey       *bk,
    crypto_cntxt    *bk_kek)
Arguments:
    kb->cb->cmd        =CGX_MERGE_KEY;
    kb->cb->argument[0] = (VPTR)key1;
    /* the first input key to be merged */
    kb->cb->argument[1] = (VPTR)kek1;
    /* crypto context used to uncover key1 */
    kb->argument[2] = (VPTR)key2;
    /* the second input key to be merged */
    kb->cb->argument[3] = (VPTR)kek2;
    /* crypto context used to uncover key2*/
    kb->cb->argument[4] = (VPTR)operation;
    /* CGX_CONCAT_O, CGX_XOR_O, CGX_HASH_O
    | CGX_SHS_A, CGX_HASH_O | CGX_MD5_A, or
    CGX_HASH_O | <other_hash_alg_type> */
    kb->cb->argument[5] = (VPTR)type;
    /* key type of result key to be produced */
    /* CGX_DES_A or CGX_TRIPLE_DES_A or other key type */
    k->cb->argument[6] = (VPTR)length;
    /* desired length in bytes of result key to be created */
    kb->cb->argument[7] = (VPTR)use;
    /* intended use of result key: key type and trust attribute */
    kb->cb->argument[8] = (VPTR)bk;
    /* pointer to result key to be returned */
    kb->cb->argument[9] = (VPTR)bk_kek;
    /* crypto context used to cover bk */
Status:
    kb->status =
                    CGX_SUCCESS_S,
                    CGX_BAD_KEK_S,
                    CGX_NULL_PTR_S,
                    CGX_FAIL_S
```

Merge Long Key

Command Name: CGX_MERGE_LONG_KEY

Command Description:

The CGX_MERGE_LONG_KEY command is quite similar to the CGX_MERGE_KEY command. The essential difference is that the output key created by CGX_MERGE_LONG_KEY is not a data encryption key; rather it is merely a container for key material that can be used subsequently (for example by command CGX_EXTRACT_LONG) to create encryption keys. The output data type of CGX_MERGE_LONG_KEY is a container, not a true key; it is perhaps misnamed as a longkey data type. A variable of this type can hold up to 64 bytes of key information. Such a data type provides intermediate storage, for example, for the 48 bytes resulting from concatenating two 24 byte keys, which then can be used (by CGX_EXTRACT_LONG) to produce an encryption key from the middle 24 bytes of the concatenation.

The CGX_MERGE_LONG_KEY command takes key material from two keys and combines the material to form a new long key. The first input key, key1, may be either an ordinary encryption key (type secretkey) or a longkey. The second input key, key2, must be an ordinary encryption key. The key material in two input keys, key1 and key2, is combined in a caller specified way.

The input keys are presented to the function in the black; crypto contexts for each must be supplied to uncover them internally. The resulting long output key will be returned in the black so a crypto context for it must also be supplied as a function argument.

The output key pointer, lk, may point to the same memory as an input key pointer, (provided the allocated memory is sufficient to hold a longkey type datum) in which case the output will overwrite the input. Also, any of the kek pointers supplied may be equal, in which case the same covering key will be used to cover or uncover parameters, as appropriate.

The possible combine operations are concatenate, exclusive-or, or hash. The resulting material becomes the key material for the new key.

For the concatenate operation, key2's key material is appended to that of key1, resulting in material whose length is the sum of the lengths of key1 and key2.

For the exclusive-or operation, key2's key material bit-wise exclusive-ored with that of key1, resulting in material whose length is the greater of the lengths of key1 and key2. (The shorter key is zero padded for purposes of the xor.)

For the hash operation, key2's key material is appended to that of key1, resulting in material whose length is the sum of the lengths of key1 and key2. Then the resulting material is hashed by the specified hash algorithm and the resulting hash digest is used as the new key's material. The length of the material in this case is the hash digest length.

For operations concatenate and hash, the order of input keys is significant, especially when one is attempting to perform operations according to an external specification. Another way to state which input order results in which intermediate key material order is that, for operations concatenate and hash, key2 becomes the most significant and key1 becomes the least significant part of the intermediate key material after concatenation.

The second input key may be a data encryption key or a KEK and must be untrusted.

The astute reader will note that three or more input keys may be combined by merging the output of one merge_long_key operation with yet another input key. One caveat to be observed is that when the concatenate operation is requested, the user must unsure that the sum of the two lengths of the input keys does not exceed the 64 byte maximum length of a long key.

Command Interface:
/* merge two keys and create a long key from the combined key material */
cgx_merge_long_key( kernelblock *kb,
    longblob    *key1,/* either secretkey or longkey type */
    crypto_cntxt    *kek1,
    secretkey    *key2,
    crypto_cntxt    *kek2,
    UINT16    operation,
    longkey    *lk,
    crypto_cntxt    *bk_kek)
Arguments:
    kb->cb->cmd    =CGX_MERGE_LONG_KEY;
    kb->cb->argument[0] = (VPTR)key1;
    /* the first input key to be merged (long key type or encryption key */
    kb->cb->argument[1] = (VPTR)kek1;
    /* crypto context used to uncover key1 */
    kb->cb->argument[2] = (VPTR)key2;

-continued

```
/* the second input key to be merged */
kb->cb->argument[3] = (VPTR)kek2;
/* crypto context used to uncover key2*/
kb->cb->argument[4] = (VPTR)operation;
/* CGX_CONCAT_O, CGX_XOR_O, CGX_HASH_O
| CGX_SHS_A, CGX_HASH_O | CGX_MD5_A, or
CGX_HASH_O | <other_hash_alg_type> */
kb->cb->argument[8] = (VPTR)lk;
/* pointer to result long key to be returned */
kb->cb->argument[9] = (VPTR)bk_kek;
/* crypto context used to cover bk */
Status:
    kb->status =
            CGX_SUCCESS_S,
            CGX_BAD_KEK_S,
            CGX_NULL_PTR_S,
            CGX_FAIL_S
```

Extract(secret key from) Long Key

Command Name: CGX_EXTRACT_LONG_KEY

Command Description:

The CGX_EXTRACT_LONG_KEY command creates a secret key from key material supplied within a longkey.

The input longkey is presented to the function in the black; a crypto context for it must be supplied to uncover it internally. The resulting output secret key will be returned in the black so a crypto context for it must also be supplied as a function argument.

The material used to create the secret key consists of length bytes taken from the input long key starting at position offset. (Length and offset are parameters of the function call.) Naturally, the operation will fail if the input long key does not contain length+offset bytes.

The type and use of the result key are also specified as parameters.

Command Interface:
/* extract key material from long key and create secret key from it */
cgx_extract_long( kernelblock *kb,
    longkey    *key1,
    crypto_cntxt    *kek1,
    UINT16    type,
    UINT16    length,
    UINT16    use,
    UINT16    offset,
    secretkey    *bk,
    crypto_cntxt    *bk_kek)
Arguments:
    kb->cb->cmd    =CGX_LONG_KEY_EXTRACT;
    kb->cb->argument[0] = (VPTR)key1;
    /* the longkey container from which key info. will be extracted */
    kb->cb->argument[1] = (VPTR)kek1;
    /* crypto context used to uncover key1*/
    kb->cb->argument[2] = (VPTR)type;
    /* key type of result key to be produced */
    /* CGX_DES_A or CGX_TRIPLE_DES_A or other key type */
    kb->cb->argument[3] = (VPTR)length;
    /* desired length in bytes of result key to be created */
    kb->cb->argument[4] = (VPTR)use;
    /* attributes of key being created */
    kb->cb->argument[5] = (VPTR)offset;
    /* byte offset within key1 of first byte to extract */
    kb->cb->argument[6] = (VPTR)bk;
    /* pointer to result long key to be returned */
    kb->cb->argument[7] = (VPTR)bk_kek;
    /* crypto context used to cover bk */

-continued

```
Status:
    kb->status =
                  CGX_SUCCESS_S,
                  CGX_BAD_KEK_S,
                  CGX_NULL_PTR_S,
                  CGX_FAIL_S
```

CGX PRF Data

Command Name: CGX_PRF_DATA

Command Description:

The intended use of this command is to add data to the open inner hash context in an IPSec HMAC generation.

The CGX_PRF_DATA command hashes one, two or three data items, of different types, into the inner hash of an HMAC being generated: the items (in the order they are processed) are a secret key (specified by argument secretkey *bk)

a g^xy DH shared key specified in argument publickey *gxypk (previously produced in the BLACK by cgx_negkey_gxy( ) for example.)

RED data (specified in argument (VPTR)*dptr of a specified number of bytes (bytecount.)

If bk, gxypk, and/or dptr are NULL, the corresponding data are not processed.

If the secret key bk is not NULL, argument crpto_cntxt *bkek must specify the kek to uncover it. Also bk must be an untrusted key; it can be a data encryption key (K) or a KEK, etc.

If gxypk is non NULL, argument gxykek must specify the key to uncover the g^xy key (presumably the same context used to cover gxypk in the first place.) Only the private key member (which holds the shared DH key) of gxypk and the modulus length of the public key are used in this operation. The other members of the public key need not be populated.

Argument hash_cntxt *ihci specifies the previously initialized and still open source (input) hash context into which the data items will be hashed. (ihci MUST be supplied.) ihci can be RED or BLACK; if argument crypto_cntxt *ikek is non NULL, ikek will be used to uncover ihci. if ikek is NULL ihci is assumed to be RED.

Argument hash_cntxt *ihco specifies the destination context into which the result will be placed. (ihco may equal ihci, if desired) ihco can be returned RED or BLACK; if argument crypto_cntxt *okek is non NULL, okek will be used to cover ihco. if okek is NULL ihco will be returned in the RED. okek, if specified, must be an untrusted key.

The resulting output hash context is not closed by this function. Repeated calls can be made to this function to add more data to the hash context by supplying the output hash context of one command invocation as the input hash context of a subsequent invocation.

Several variants of this command are provided. The first, cgx_prf_secretkey_gxy_data( ), is the generic command decribed above in this section. The other variants merely provide convenient special case commands.

Command Interface:
```
/* hash additional data into open hash context */
cgx_prf_secretkey_gxy_data(
        kernelblock    *kb,
        hash_cntxt     *ihci,
        crypto_cntxt   *ikek,
        hash_cntxt     *ihco,
        crypto_cntxt   *okek,
        secretkey      *bk,
        crypto_cntxt   *bkek,
        publickey      *gxypk,
        crypto_cntxt   *gxykek,
        void           *dptr,
        UINT 16        bytecount)
Arguments:
    kb->cb->cmd        = CGX_PRF_DATA;
    kb->cb->argument[0].ptr = (VPTR)(ihci);
    kb->cb->argument[1].ptr = (VPTR)(ikek); /* NULL allowed */
    kb->cb->argument[2].ptr = (VPTR)(ihco);
    kb->cb->argument[3].ptr = (VPTR)(okek);
    kb->cb->argument[4].ptr = (VPTR)(bk);
    kb->cb->argument[5].ptr = (VPTR)(bkek);
    kb->cb->argument[6].ptr = (VPTR)(gxypk);
    kb->cb->argument[7].ptr = (VPTR)(gxykek);
    kb->cb->argument[8].ptr = (VPTR)(dptr);
    kb->cb->argument[9].ptr = (VPTR)(bytecount);
    Status:
        kb->status =
                      CGX_SUCCESS_S,
                      CGX_BAD_KEK_S,
                      CGX_NULL_PTR_S,
                      CGX_FAIL_S
/* macros that invoke particular, less general, cases of
cgx_prf_secretkey_gxy_data */
/* hash a secret key into an open hash context */
#define cgx_prf_secretkey(kb, ihci, ikek, ihco, okek, bk, bkek)
        cgx_prf_secretkey_gxy_data(kb, ihci, ikek, ihco,
        okek, bk, bkek, NULL, NULL, NULL,
NULL)
/* hash a shared DH private key into an open hash context */
#define cgx_prf_gxy(kb, ihci, ikek, ihco, okek, gxypk, gxykek)
cgx_prf_secretkey_gxy_data(kb, ihci, ikek, ihco, okek,
NULL, NULL, gxypk, gxykek, NULL, NULL)
/* hash bytecount-many bytes of uncovered data into an open hash
context */
/* If final != 0, this operation closes the hash context before returning it.
*/
#define cgx_prf_data(kb, ihci, ikek, ihco, okek, dptr, bytecount, final)
cgx_prf_secretkey_gxy_data(kb, ihci, ikek, ihco, okek, NULL, final,
NULL, NULL, dptr, bytecount)
/* hash a secret key and a shared DH private key into an open hash
context */
#define cgx_prf_secretkey_gxy(kb, ihci, ikek, ihco, okek, bk, bkek,
gxypk, gxykek)
cgx_prf_secretkey_gxy_data(kb, ihci, ikek, ihco, okek, bk, bkek,
gxypk, gxykek, NULL, NULL)
```

CGX PRF Key

Command Name: CGX_PRF_KEY

Command Description:

Command CGX_PRF_KEY can be used to complete the IPSec HMAC. Command arguments supply two open hash contexts known as the inner hash context and the outer hash context, both of which are covered. (Additional arguments supply the crypto contexts needed to uncover the hash contexts.) The command closes the inner hash context (its internal copy of the inner hash context—the caller's copy is not affected.) Then it hashes the digest of the inner hash context into the outer hash context. Then it closes the outer hash context (its copy of the outer hash context) and creates a secretkey of type specified by the caller from the outer hash digest and returns the key, covered, to the caller. It also leaves the created key in a specified key cache register, ready to use for encryption.

A second variant of this command does not create a secret key from the outer hash digest but rather returns the outer hash digest, still open, in the red, to the caller.

```
Command Interface:
*/ Complete the IPSec HMAC - create a secret key from resulting hash
digest */
cgx_prf_key(
        kernelblock     *kb,
        hash_cntxt      *ihci,
        crypto_cntxt    *ikek,
        hash_cntxt      *ohcntxt_in,
        crypto_cntxt    *okek,
        destkcr,
        UINT16          type,
        UINT16          length,
        UINT16          use,
        secretkey       *bk,
        crypto_cntxt    *bkek)
Arguments:
    kb->cb->cmd     = CGX_PRF_KEY;
    kb->cb->argument[0].ptr = (VPTR)(ihci);
    kb->cb->argument[1].ptr = (VPTR)(ikek);
    kb->cb->argument[2].ptr = (VPTR)(ohcntxt_in);
    kb->cb->argument[3].ptr = (VPTR)(okek);
    kb->cb->argument[4].ptr = (VPTR)(destkcr);
    kb->cb->argument[5].ptr = (VPTR)(type);
    kb->cb->argument[6].ptr = (VPTR)(len);
    kb->cb->argument[7].ptr = (VPTR)(use);
    kb->cb->argument[8].ptr = (VPTR)(bk);
    kb->cb->argument[9].ptr = (VPTR)(bkkek);
Status:
    kb->status =
                CGX_SUCCESS_S,
                CGX_BAD_KEK_S,
                CGX_NULL_PTR_S,
                CGX_FAIL_S
/* Second Variant: Complete the IPSec HMAC - return resulting outer
hash context, still open, in the red. Do not create a secret key from
resulting hash digest */
cgx_prf_hash(
        kernelblock     *kb,
        hash_cntxt      *ihci,
        crypto_cntxt    *ikek,
        hash_cntxt      *ohcntxt_in,
        crypto_cntxt    *okek,
        crypto_cntxt    *ohco_red)
Arguments:
    kb->cb->cmd     = CGX_PRF_KEY;
    kb->cb->argument[0].ptr = (VPTR)(ihci);
    kb->cb->argument[1].ptr = (VPTR)(ikek);
    kb->cb->argument[2].ptr = (VPTR)(ohcntxt_in);
    kb->cb->argument[3].ptr = (VPTR)(okek);
    kb->cb->argument[4].ptr = (VPTR)(NULL);
```

```
-continued kb->cb->argument[5].ptr = (VPTR)(NULL);
    kb->cb->argument[6].ptr = (VPTR)(NULL);
    kb->cb->argument[7].ptr = (VPTR)(NULL);
    kb->cb->argument[8].ptr = (VPTR)(NULL);
    kb->cb->argument[9].ptr = (VPTR)(ohco_red);
Status:
    kb->status =
                CGX_SUCCESS_S,
                CGX_BAD_KEK_S,
                CGX_NULL_PTR_S,
                CGX_FAIL_S
```

Acronyms/terms

Acronyms

The following table is a list of acronyms used with the description of the co-processor.

| Acronym | Meaning |
|---|---|
| ASIC | Application-Specific Integrated Circuit |
| CBC | Cipher Block Chaining (a block cipher mode) |
| CFB | Cipher FeedBack (a block cipher mode) |
| CGX | CryptoGraphic eXtensions (IRE's crypto library) |
| CT | Cipher Text |
| DEK | Data Encryption Key |
| DES | Data Encryption Standard |
| D-H | Diffie-Hellman |
| DMA | Direct Memory Access |
| DSA | Digital Signature Algorithm |
| ECB | Electronic Code Book (a block cipher mode) |
| FIFO | First-In, First-Out |
| HMAC | Hash Message Authentication Code |
| IV | Initialization Vector |
| KCR | Key Cache Register (an internal key storage location) |
| KEK | Key Encryption Key |
| LSV | Local Storage Variable |
| MAC | Message Authentication Code |
| OFB | Output FeedBack (a block cipher mode) |
| PCDB | Program Control Data Bits |
| PIN | Personal Identification Number |
| PT | Plain Text |
| SHA | Secure Hash Algorithm |
| SHS | Secure Hash Standard |

Terms

The following table is a list of terms used with the description of the co-processor.

| Term | Meaning |
|---|---|
| Black Key | A secret/private key that is encrypted or covered by a KEK, it can be securely given to another party. |
| Covered Key | A secret key that has been encrypted, via a KEK, to protect the key from being seen by an untrusted party. Same as a Black key or a Wrapped key. |
| Export | In the CryptIC, exporting a key refers to the process of covering the key with a KEK and then providing it to an external application in the 'Interoperable External Form'. |
| Import | In the CryptIC, importing a key refers to the process of uncovering the key from its 'Interoperable External Form' and storing it in an internal Key Cache Register. |
| Key Cache Register (KCR) | A working storage area for secret keys, addressable via a register ID between 0 and 14. |
| Key RAM (KRAM) | A volatile public key work area. The public key will be lost during a power-down or reset. |

-continued

| Term | Meaning |
| --- | --- |
| Local Storage Variable (LSV) | A non-volatile Laser-programmed secret key that can be used by the application as its own unique private key. Each CryptIC has a unique LSV programmed into it at the factory. |
| Off-Load | In the CryptIC, off-loading a key refers to the process of covering the key with a KEK and then providing it to an external application in the 'IRE External Form'. |
| Program Control Data Bits (PCDB) | Programmable control bits to customize the CGX Kernel features (such as allowing Red key exportation/importation, LSV changes, exportable chip, etc.). |
| Public Keyset | Specifies the related key pair (Public and Private) which make up a 'public key' |
| Red Key | A secret/private key that is not encrypted or covered by another KEK. It is in its raw unprotected form. |
| Salt | Random data which precedes a message in order to randomize its |
| Symmetric Key | A key which is used in a ciphering algorithm where the encrypting key and the decrypting key are the same (eg. DES) |
| Wrapped Key | A secret key that has been encrypted, via a KEK, to protect the key from being seen by an untrusted party. Same as a Black key or a Covered key. |

Although illustrative embodiments of the present invention have been described herein with reference to the accompanying drawing, it is to be understood that the invention is not limited to those precise embodiments, and that various other changes and modifications may be effected by one skilled in the art without departing from the scope or spirit of the invention.

What is claimed is:

1. A circuit for encrypting, decrypting, hashing and monitoring data streams in a processor comprising:

at least one register circuit, electronically linked to the processor, for storing configuration bits, status bits, and control bits;

a first memory circuit for storing data, electronically linked to the processor;

a first pad insertion circuit, electronically linked to the first memory circuit, for counting data that is transferred into the first memory circuit and comparing a first data count to a first preset value and when the first data count does not end at an eight byte boundary, data bits are added so that data transferred into the first memory circuit ends at the eight byte boundary;

an encryption and decryption circuit, for performing encryption and decryption operations, electronically linked to the first memory circuit;

a pad consume and verify circuit, electronically linked to the first memory circuit, for counting data exiting the encryption and decryption circuit and comparing a second data count to a second preset value so that data bits added in the pad insertion circuit can be removed;

a context storage circuit, electronically linked to the encryption and decryption circuit, for providing security association data for use in encryption and decryption;

a second memory circuit for storing data, electronically linked to the processor;

a second pad insertion circuit, electronically linked to the second memory circuit, for counting data that is transferred into the second memory circuit and comparing a third data count to a third preset value and adding data bits after all data has been counted and the third data count is less than the preset value; and a hash circuit for hashing data, electronically linked to the second memory circuit.

2. A circuit for encrypting, decrypting, hashing and monitoring data streams in a processor as defined in claim 1, wherein the second pad insertion circuit adds data bits so that the second memory circuit is full.

3. A circuit for encrypting, decrypting, hashing and monitoring data streams in a processor as defined in claim 1, wherein the encryption and decryption circuit includes Data Encryption Standard (DES) and Triple Data Encryption Standard (TDES) circuits.

4. A circuit for encrypting, decrypting, hashing and monitoring data streams in a processor as defined in claim 1, wherein the hash circuit includes Message Digest (MD5) and Secure Hash Algorithm (SHA-1) circuits.

5. A method of implementing parallel Internet Protocol Security (IPsec) operations within an integrated circuit comprising the steps of:

initializing configuration and status registers;

fetching context data from memory containing security associations;

storing the fetched context data in registers;

storing plaintext data in an encrypt memory and in a hash memory;

loading the fetched context data stored in the registers into an encryption circuit and into a hash circuit;

loading the plaintext data into the encryption circuit and into the hash circuit;

encrypting the plaintext data in the encryption circuit to generate ciphertext data; hashing the plaintext data in the hash circuit to generate a hash digest; and storing the ciphertext data in the encrypt memory and the hash digest in a register.

6. A method as defined in claim 5, further comprising the step of:

padding the plaintext data stored in the encrypt memory and the plaintext data stored in the hash memory to generate padded plaintext data, wherein the plaintext data used in the steps of loading the plaintext data, encrypting the plaintext data and hashing the plaintext data includes a padded portion of data.

7. A method as defined in claim 5, further comprising the steps of:

creating an initialization vector (IV) using a predetermined number of bytes of the ciphertext data stored in the encrypt memory; and storing the initialization vector in a register.

8. A method as defined in claim 6, further comprising the steps of:
   creating an initialization vector (IV) using a predetermined number of bytes of the ciphertext data stored in the encrypt memory; and
   storing the initialization vector in a register.

9. A method as defined in claim 7, wherein the ciphertext data stored in the encrypt memory includes a last portion having eight bytes, and wherein the initialization vector includes the eight bytes of the last portion of the ciphertext data.

10. A method as defined in claim 8, wherein the ciphertext data stored in the encrypt memory includes a last portion having eight bytes, and wherein the initialization vector includes the eight bytes of the last portion of the ciphertext data.

11. A method of implementing parallel Internet Protocol Security (IPsec) operations within an integrated circuit comprising the steps of:
   initializing configuration and status registers;
   fetching context data from memory containing security associations;
   storing the fetched context data in registers;
   storing ciphertext data in a decrypt memory and in a hash memory;
   loading the fetched context data stored in the registers into a decryption circuit and into a hash circuit;
   loading the ciphertext data into the encryption circuit and into the hash circuit;
   decrypting the ciphertext data in the decryption circuit to generate plaintext data; hashing the ciphertext data in the hash circuit to generate a hash digest; and
   storing the plaintext data in the decrypt memory and the hash digest in a register.

12. A method as defined in claim 11, further comprising the steps of:
   verifying pad bytes for correct pad properties; and
   discarding a padded portion of data from the plaintext data.

13. A method as defined in claim 11, further comprising the steps of:
   creating an initialization vector (IV) using a predetermined number of bytes of the plaintext data stored in the decrypt memory; and
   storing the initialization vector in a register.

14. A method as defined in claim 12, further comprising the steps of:
   creating an initialization vector (IV) using a predetermined number of bytes of the plaintext data stored in the decrypt memory; and
   storing the initialization vector in a register.

15. A method as defined in claim 13, wherein the plaintext data stored in the decrypt memory includes a last portion having eight bytes, and wherein the initialization vector includes the eight bytes of the last portion of the plaintext data.

16. A method as defined in claim 14, wherein the plaintext data stored in the decrypt memory includes a last portion having eight bytes, and wherein the initialization vector includes the eight bytes of the last portion of the plaintext data.

17. A method of implementing pipeline Internet Protocol Security (IPsec) operations simultaneously within an integrated circuit comprising the steps of:
   initializing configuration and status registers;
   fetching context data from memory containing security associations;
   storing the fetched context data in registers;
   storing plaintext data in an encrypt memory;
   loading the fetched context data stored in the registers into an encryption circuit and into a hash circuit;
   loading the plaintext data into the encryption circuit;
   encrypting the plaintext data in the encryption circuit to generate ciphertext data;
   storing the ciphertext data in the encrypt memory and in the hash memory;
   loading the ciphertext data stored in the hash memory into the hash circuit;
   hashing the ciphertext data in the hash circuit into a hash digest; and
   storing the hash digest in a register.

18. A method as defined in claim 17, further comprising the step of:
   padding the plaintext data stored in the encrypt memory to generate padded plaintext data, wherein the plaintext data used in the steps of loading the plaintext data and encrypting the plaintext data includes a padded portion of data.

19. A method as defined in claim 17, further comprising the steps of:
   creating an initialization vector (IV) using a predetermined number of bytes of the ciphertext data stored in the encrypt memory; and
   storing the initialization vector in a register.

20. A method as defined in claim 18, further comprising the steps of:
   creating an initialization vector (IV) using a predetermined number of bytes of the ciphertext data stored in the encrypt memory; and
   storing the initialization vector in a register.

21. A method as defined in claim 19, wherein the ciphertext data stored in the encrypt memory includes a last portion having eight bytes, and wherein the initialization vector includes the eight bytes of the last portion of the ciphertext data.

22. A method as defined in claim 20, wherein the ciphertext data stored in the encrypt memory includes a last portion having eight bytes, and wherein the initialization vector includes the eight bytes of the last portion of the ciphertext data.

23. A method of implementing pipeline Internet Protocol Security (IPsec) operations simultaneously within an integrated circuit comprising the steps of:
   initializing configuration and status registers;
   fetching context data from memory containing security associations;
   storing the fetched context data in registers;
   storing ciphertext data in a decrypt memory;
   loading the fetched context data stored in the registers into a decryption circuit and into a hash circuit;
   loading the ciphertext data into the decryption circuit;
   decrypting the ciphertext data in the decryption circuit to generate plaintext data;
   storing the plaintext data in the decrypt memory and in the hash memory;
   loading the plaintext data into the hash circuit;
   hashing the plaintext data in the hash circuit to generate a hash digest; and
   storing the hash digest in a register.

24. A method as defined in claim 23, further comprising the steps of:
verifying pad bytes for correct pad properties; and
discarding a padded portion of data from the plaintext data.

25. A method as defined in claim 23, further comprising the steps of:
creating an initialization vector (IV) using a predetermined number of bytes of the plaintext data stored in the decrypt memory; and
storing the initialization vector in a register.

26. A method as defined in claim 24, further comprising the steps of:
creating an initialization vector (IV) using a predetermined number of bytes of the plaintext data stored in the decrypt memory; and
storing the initialization vector in a register.

27. A method as defined in claim 25, wherein the plaintext data stored in the decrypt memory includes a last portion having eight bytes, and wherein the initialization vector includes the eight bytes of the last portion of the plaintext data.

28. A method as defined in claim 26, wherein the plaintext data stored in the decrypt memory includes a last portion having eight bytes, and wherein the initialization vector includes the eight bytes of the last portion of the plaintext data.

29. A method of implementing Internet Protocol Security (IPsec) operations within an integrated circuit comprising the steps of:
initializing configuration and status registers;
fetching context data from memory containing security associations;
storing the fetched context data in registers;
storing ciphertext data in a decrypt memory;
loading the fetched context data stored in the registers into a decryption circuit;
loading the ciphertext data into the decryption circuit;
decrypting the ciphertext data in the decryption circuit to generate plaintext data; and
storing the plaintext data in the decrypt memory.

30. A method as defined in claim 29, further comprising the steps of:
verifying pad bytes for correct pad properties; and
discarding a padded portion of data from the plaintext data.

31. A method as defined in claim 29, further comprising the steps of:
creating an initialization vector (IV) using a predetermined number of bytes of the plaintext data stored in the decrypt memory; and
storing the initialization vector in a register.

32. A method as defined in claim 30, further comprising the steps of:
creating an initialization vector (IV) using a predetermined number of bytes of the plaintext data stored in the decrypt memory; and
storing the initialization vector in a register.

33. A method as defined in claim 31, where in the plaintext data stored in the decrypt memory includes a last portion having eight bytes, and wherein the initialization vector includes the eight bytes of the last portion of the plaintext data.

34. A method as defined in claim 22, wherein the plaintext data stored in the decrypt memory includes a last portion having eight bytes, and wherein the initialization vector includes the eight bytes of the last portion of the plaintext data.

35. A method of implementing Internet Protocol Security (IPsec) operations within an integrated circuit comprising the steps of:
initializing configuration and status registers;
fetching context data from memory containing security associations;
storing the fetched context data in registers;
storing plaintext data in an encrypt memory;
loading the fetched context data stored in the registers into an encryption circuit;
loading the plaintext data into the encryption circuit;
encrypting the plaintext data in the encryption circuit to generate ciphertext data; and
storing the ciphertext data in the encrypt memory.

36. A method as defined in claim 35, further comprising the step of:
padding the plaintext data stored in the encrypt memory to generate padded plaintext data, wherein the plaintext data used in the steps of loading the plaintext data and encrypting the plaintext data includes a padded portion of data.

37. A method as defined in claim 35, further comprising the steps of:
creating an initialization vector (IV) using a predetermined number of bytes of the ciphertext data stored in the encrypt memory; and
storing the initialization vector in a register.

38. A method as defined in claim 36, further comprising the steps of:
creating an initialization vector (IV) using a predetermined number of bytes of the ciphertext data stored in the encrypt memory; and
storing the initialization vector in a register.

39. A method as defined in claim 37, wherein the ciphertext data stored in the encrypt memory includes a last portion having eight bytes, and wherein the initialization vector includes the eight bytes of the last portion of the ciphertext data.

40. A method as defined in claim 38, wherein the ciphertext data stored in the encrypt memory includes a last portion having eight bytes, and wherein the initialization vector includes the eight bytes of the last portion of the ciphertext data.

41. A method of implementing Internet Protocol Security (IPsec) operations within an integrated circuit comprising the steps of:
initializing configuration and status registers;
fetching context data from memory containing security associations;
storing the fetched context data in registers;
storing ciphertext data in a hash memory;
loading the fetched context data stored in the registers into a hash circuit;
loading the ciphertext data into the hash circuit;
hashing the ciphertext data in the hash circuit to generate a hash digest; and
storing the hash digest in a register.

42. A method of implementing Internet Protocol Security (IPsec) operations within an integrated circuit comprising the steps of:

initializing configuration and status registers;
 fetching context data from memory containing security associations;
 storing the fetched context data in registers;
 storing plaintext data in a hash memory;
 loading the fetched context data stored in the registers into a hash circuit;
 loading the plaintext data into the hash circuit;
 hashing the plaintext data in the hash circuit to generate a hash digest; and
 storing the hash digest in a register.

43. A method as defined in claim 42, further comprising the step of:

padding the plaintext data stored in the hash memory to generate padded plaintext data, wherein the plaintext data used in the steps of loading the plaintext data and hashing the plaintext data includes a padded portion of data.

* * * * *